US012634922B2

(12) United States Patent
Babaei

(10) Patent No.: US 12,634,922 B2
(45) Date of Patent: May 19, 2026

(54) WIRELESS DEVICE AND WIRELESS NETWORK PROCESSES FOR ENHANCED SCHEDULING

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/566,802

(22) Filed: Dec. 31, 2021

(65) Prior Publication Data

US 2022/0210800 A1 Jun. 30, 2022

Related U.S. Application Data

(60) Provisional application No. 63/132,673, filed on Dec. 31, 2020.

(51) Int. Cl.
*H04W 76/28* (2018.01)
*H04W 72/1263* (2023.01)
(Continued)

(52) U.S. Cl.
CPC ....... *H04W 72/1263* (2013.01); *H04W 72/23* (2023.01); *H04W 76/28* (2018.02); *H04W 80/02* (2013.01)

(58) Field of Classification Search
CPC ............. H04W 72/1263; H04W 76/28; H04W 72/1289; H04W 80/02; H04W 72/23; H04L 1/1819; H04L 27/2602; H04L 5/001; H04L 5/0012; H04L 5/0023; H04L 5/0032; H04L 5/0053; H04L 5/0092
See application file for complete search history.

(56) References Cited

U.S. PATENT DOCUMENTS

2018/0042043 A1* 2/2018 Babaei .............. H04W 72/0446
2020/0128565 A1* 4/2020 Golitschek Edler Von
                                   Elbwart ........... H04W 72/1215
(Continued)

FOREIGN PATENT DOCUMENTS

WO    WO-2021062778 A1 *  4/2021
WO    WO-2021140673 A1 *  7/2021
WO    WO-2021159254 A1 *  8/2021  ........... H04L 5/0053

OTHER PUBLICATIONS

Lenovo et al. "Feature lead summary#1 on multi-cell scheduling by a single DCI", 3GPP TSG RAN WG1 Meeting #103-e, R1-20XXXXX, Nov. 13, 2020 (Year: 2020).*
(Continued)

*Primary Examiner* — Marcus Smith
*Assistant Examiner* — Zhaohui Yang
(74) *Attorney, Agent, or Firm* — Alireza Babaei

(57) ABSTRACT

A wireless device may receive message(s) comprising configuration parameters of multiple cells. The wireless device may receive a first DCI indicating scheduling information. The wireless device may determine, based at least on one of the first DCI and a second downlink control parameter, whether the first DCI is for scheduling TB(s) via a single cell, in the multiple cells, or for scheduling TBs via the multiple cells. The wireless device may transmit or may receive the TBs via the multiple cells based on the scheduling information and in response to the determining indicating that the first DCI is for scheduling the TBs via the multiple cells.

18 Claims, 79 Drawing Sheets

(51) Int. Cl.
  *H04W 72/23* (2023.01)
  *H04W 80/02* (2009.01)

(56) References Cited

U.S. PATENT DOCUMENTS

| | | | | |
|---|---|---|---|---|
| 2020/0396760 | A1* | 12/2020 | Yi | H04L 1/1812 |
| 2021/0274535 | A1* | 9/2021 | Yi | H04W 76/11 |
| 2021/0377996 | A1* | 12/2021 | Lee | H04L 5/0055 |
| 2022/0029758 | A1* | 1/2022 | Bae | H04L 5/0033 |
| 2022/0346131 | A1* | 10/2022 | Shi | H04L 5/0044 |
| 2023/0209627 | A1* | 6/2023 | Wu | H04L 1/189 |
| | | | | 370/329 |
| 2023/0217456 | A1* | 7/2023 | Yi | H04L 5/0094 |
| | | | | 370/329 |

OTHER PUBLICATIONS

3GPP TS 38.211 V16.3.0 (Sep. 2020); Technical Specification; 3rd Generation Partnership Project; Technical Specification Group Radio Access Network; NR; Physical channels and modulation; (Release 16).

3GPP TS 38.212 V16.3.0 (Sep. 2020); Technical Specification; 3rd Generation Partnership Project; Technical Specification Group Radio Access Network; NR; Multiplexing and channel coding; (Release 16).

3GPP TS 38.213 V16.3.0 (Sep. 2020); Technical Specification; 3rd Generation Partnership Project; Technical Specification Group Radio Access Network; NR; Physical layer procedures for control; (Release 16).

3GPP TS 38.214 V16.3.0 (Sep. 2020); Technical Specification; 3rd Generation Partnership Project; Technical Specification Group Radio Access Network; NR; Physical layer procedures for data; (Release 16).

3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).

3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).

3GPP TS 38.331 V16.2.0 (Sep. 2020); Technical Specification; 3rd Generation Partnership Project; Technical Specification Group Radio Access Network; NR; Radio Resource Control (RRC); Protocol specification; (Release 16).

3GPP TSG RAN WG1; Meeting #102-e; R1-2005441; e-Meeting, Aug. 17-28, 2020; Source: ZTE; Title: Discussion on Multi-cell PDSCH Scheduling via a Single DCI; Agenda item: 8.13.2; Document for: Discussion/Decision.

3GPP TSG RAN WG1 Meeting #102-e; R1-2005628; e-Meeting, Aug. 17-Aug. 28, 2020; Agenda Item: 8.13.2; Source: MediaTek Inc.; Title: On Multi-cell PDSCH scheduling via a single DCI; Document for: Discussion and decision.

3GPP TSG RAN WG1 Meeting #102-e; R1-2005697; e-Meeting, Aug. 17-28, 2020; Source: CATT; Title: Discussion on multi-cell PDSCH scheduling via a single DCI; Agenda Item: 8.13.2; Document for: Discussion and Decision.

3GPP TSG RAN WG1 Meeting #102_e; R1-2005901; e-Meeting, Aug. 17-28, 2020; Agenda Item: 8.13.2; Source: Intel Corporation; Title: On 2-cell scheduling via single DCI; Document for: Discussion/Decision.

3GPP TSG RAN WG1 #102; R1-2005909; e-Meeting, Aug. 17-28, 2020; Agenda item: 8.13.2; Source: Nokia, Nokia Shanghai Bell; Title: On support of Single DCI scheduling two cells; Document for: Discussion and Decision.

3GPP TSG RAN WG1 #102-e; R1-2006064; e-Meeting, Aug 17-Aug. 28, 2020; Source: OPPO; Title: Multi-cell PDSCH scheduling via a single DCI; Agenda Item: 8.13.2; Document for: Discussion and Decision.

3GPP TSG RAN WG1 #102-e; R1-2006177; e-Meeting, Aug. 17-28, 2020; Agenda item: 8.13.2; Source: Samsung; Title: On the use of one DCI format for scheduling on two cells; Document for: Discussion and Decision.

3GPP TSG RAN WG1 #102-e; R1-2006282; e-Meeting, Aug. 17-28, 2020; Agenda item: 8.13.2; Source: Spreadtrum Communications; Title: Discussion on multi-cell PDSCH scheduling via a single DCI; Document for: Discussion and decision.

3GPP TSG RAN WG1 #102-e; R1-2006319; e-Meeting, Aug. 17-28, 2020; Agenda Item: 8.13.2; Source: LG Electronics; Title: Discussion on multi-cell PDSCH scheduling via a single DCI; Document for: Discussion and decision.

3GPP TSG RAN WG1 Meeting #102-e; R1-2006413; E-meeting, Aug. 17-28, 2020; Agenda Item: 8.13.2; Source: Huawei, HiSilicon; Title: Discussion on the PDCCH of P(S)Cell/SCell scheduling PDSCH on multiple cells using a single DCI; Document for: Discussion and Decision.

3GPP TSG RAN WG1 #102-e; R1-2006474; e-Meeting, Aug. 17-28, 2020; Agenda Item: 8.13.2; Source: InterDigital, Inc.; Title: A single DCI scheduling multi-cell; Document for: Discussion and Decision.

3GPP TSG RAN WG1 #102-e; R1-2006510; e-Meeting, Aug. 17-28, 2020; Agenda Item: 8.13.2; Source: Apple Inc.; Title: Views on Rel-17 DSS Multi-cell PDSCH scheduling via a single DCI; Document for: Discussion/Decision.

3GPP TSG RAN WG1 #102; R1-2006583; e-Meeting, Aug. 17-Aug. 28, 2020; Agenda Item: 8.13.2; Source: ASUSTek; Title: Discussion on multi-cell PDSCH scheduling via a single DCI; Document for: Discussion and Decision.

3GPP TSG RAN WG1 #102-e; R1-2006672; eMeeting, Aug. 17-28, 2020; Source: Ericsson; Title: Discussion on single DCI scheduling PDSCH on multiple cells; Agenda Item: 8.13.2; Document for: Discussion and Decision.

3GPP TSG RAN WG1#102-e; R1-2006750; e-Meeting, Aug. 17-28, 2020; Source: NTT Docomo, Inc.; Title: Discussion on multi-cell PDSCH scheduling via a single DCI for NR DSS; Agenda Item: 8.13.2; Document for: Discussion and Decision.

3GPP TSG-RAN WG1 #102-e; R1-2006834; e-Meeting, Aug. 17-28, 2020; Agenda item: 8.13.2; Source: Qualcomm Incorporated; Title: Views on multi-cell PDSCH scheduling via a single DCI; Document for: Discussion/Decision.

3GPP TSG RAN WG1 #102; R1-2006987; e-Meeting, Aug. 17-28, 2020; (updated from R1-2005410); Source: vivo; Title: Discussion on joint scheduling; Agenda Item: 8.13.2; Document for: Discussion and Decision.

3GPP TSG RAN WG1 Meeting #103-e; R1-2007580; E-meeting, Oct. 26-Nov. 13, 2020; Agenda Item: 8.13.2; Source: Huawei, HiSilicon; Title: Discussion on multi-carrier scheduling using single PDCCH; Document for: Discussion and Decision.

3GPP TSG RAN WG1 #103-e; R1-2007696; e-Meeting, Oct. 26-Nov. 13, 2020; Source: vivo; Title: Discussion on joint scheduling; Agenda Item: 8.13.2; Document for: Discussion and Decision.

3GPP TSG RAN WG1 #103-e; R1-2007840; e-Meeting, Oct. 26-Nov. 13, 2020; Source: CATT; Title: Discussion on multi-cell PDSCH scheduling via a single DCI; Agenda Item: 8.13.2; Document for: Discussion and Decision.

3GPP TSG RAN WG1 #103-e; R1-2008063; e-Meeting, Oct. 26-Nov. 13, 2020; Agenda Item: 8.13.2; Source: LG Electronics; Title: Discussion on multi-cell PDSCH scheduling via a single DCI; Document for: Discussion and decision.

3GPP TSG RAN WG1 #103-e; R1-2008108; e-Meeting, Oct. 26-Nov. 13, 2020; Agenda item: 8.13.2; Source: Spreadtrum Communications; Title: Discussion on multi-cell PDSCH scheduling via a single DCI; Document for: Discussion and decision.

3GPP TSG RAN WG1 #103-e; R1-2008196; e-Meeting, Oct. 26-Nov. 13, 2020; Agenda item: 8.13.2; Source: Samsung; Title: On the use of one DCI format for scheduling on two cells; Document for: Discussion and Decision.

3GPP TSG RAN WG1 #103-e; R1-2008285; e-Meeting, Oct. 26-Nov. 13, 2020; Source: OPPO; Title: Discussion on multi-cell PDSCH scheduling via a single DCI; Agenda Item: 8.13.2; Document for: Discussion and Decision.

(56) References Cited

OTHER PUBLICATIONS

3GPP TSG-RAN WG1 Meeting #103-e; R1-2008452; e-Meeting, Oct. 26-Nov. 13, 2020; Agenda Item: 3.13.2; Source: Apple Inc.; Title: Views on Rel-17 DSS Multi-cell PDSCH scheduling via a single DCI; Document for: Discussion/Decision.

3GPP TSG RAN WG1 #103; R1-2008696; e-Meeting, Oct. 26-Nov. 13, 2020; Agenda Item: 8.13.2; Source: ASUSTek; Title: Discussion on multi-cell PDSCH scheduling via a single DCI; Document for: Discussion and Decision.

3GPP TSG RAN WG1 Meeting #103e; R1-2008831; e-Meeting, Oct. 26-Nov. 13, 2020; Source: ZTE; Title: Discussion on Multi-cell PDSCH Scheduling via a Single DCI; Agenda item: 8.13.2; Document for: Discussion/Decision.

3GPP TSG RAN WG1 Meeting #103-e; R1-2008835; eMeeting, Oct. 26-Nov. 13, 2020; Agenda item: 3.13.2; Source: Charter Communications; Title: Multi-cell scheduling and dormancy; Document for: Discussion.

3GPP TSG RAN WG1 #103-e; R1-2008929; E-meeting, Oct. 26-Nov. 13, 2020; Agenda Item: 8.13.2; Source: Lenovo, Motorola Mobility; Title: Discussion on multi-cell PDSCH scheduling via a single DCI; Document for: Discussion & Decision.

3GPP TSG RAN WG1 Meeting #103-e; R1-2008963; e-Meeting, Oct. 26-Nov. 13, 2020; Agenda Item: 8.13.2; Source: MediaTek Inc.; Title: On Multi-cell PDSCH Scheduling via Single DCI; Document for: Discussion and decision.

3GPP TSG RAN WG1 Meeting #103_e; R1-2009004; e-Meeting, Oct. 26-Nov. 13, 2020; Agenda Item: 8.13.2; Source: Intel Corpo-ration; Title: On 2-cell scheduling via single DCI; Document for: Discussion/Decision.

3GPP TSG RAN WG1 #103-e; R1-2009024; e-Meeting, Oct. 26-Nov. 13, 2020; Source: ETRI; Title: Discussion on multi-cell PDSCH scheduling via a single DCI; Agenda Item: 8.13.2 Multi-cell PDSCH scheduling via a single DCI; Document for: Discussion/Decision.

3GPP TSG RAN WG1 #103; R1-2009047; e-Meeting, Oct. 26-Nov. 13, 2020; Agenda item: 8.13.2; Source: Nokia, Nokia Shanghai Bell; Title: On support of Single DCI scheduling two cells; Document for: Discussion and Decision.

3GPP TSG RAN WG1 #103-e; R1-2009086; e-Meeting, Oct. 26-Nov. 13, 2020; Agenda Item: 8.13.2; Source: InterDigital, Inc.; Title: Discussion on the support of single DCI scheduling multi-cell; Document for: Discussion and Decision.

3GPP TSG RAN WG1#103-e; R1-2009196; e-Meeting, Oct. 26-Nov. 13, 2020; Source: NTT Docomo, Inc.; Title: Discussion on multi-cell PDSCH scheduling via a single DCI for NR DSS; Agenda Item: 8.13.2; Document for: Discussion and Decision.

3GPP TSG RAN WG1 #103-e; R1-2009207; eMeeting, Oct. 26-Nov. 13, 2020; Source: Ericsson; Title: Study on single DCI scheduling PDSCH on multiple cells; Agenda Item: 8.13.2; Document for: Discussion and Decision.

3GPP TSG RAN WG1 Meeting #103-e; R1-2009278; E-meeting, Oct. 26-Nov. 13, 2020; Source: Qualcomm Incorporated; Title: Views on multi-cell PDSCH scheduling via a single DCI; Agenda Item: 8.13.2; Document for: Discussion and Decision.

* cited by examiner

| | Oct 1 | Oct 2 | Oct 3 | | Oct N |
|---|---|---|---|---|---|
| | BWP ID | $T_0$ | $T_8$ | | $T_{(N-2)\times 8}$ |
| | | $T_1$ | $T_9$ | | $T_{(N-2)\times 8+1}$ |
| | Serving Cell ID | $T_2$ | $T_{10}$ | | $T_{(N-2)\times 8+2}$ |
| | | $T_3$ | $T_{11}$ | $\cdots$ | $T_{(N-2)\times 8+3}$ |
| | | $T_4$ | $T_{12}$ | | $T_{(N-2)\times 8+4}$ |
| | | $T_5$ | $T_{13}$ | | $T_{(N-2)\times 8+5}$ |
| | | $T_6$ | $T_{14}$ | | $T_{(N-2)\times 8+6}$ |
| | CORESET Pool ID | $T_7$ | $T_{15}$ | | $T_{(N-2)\times 8+7}$ |

FIG. 16

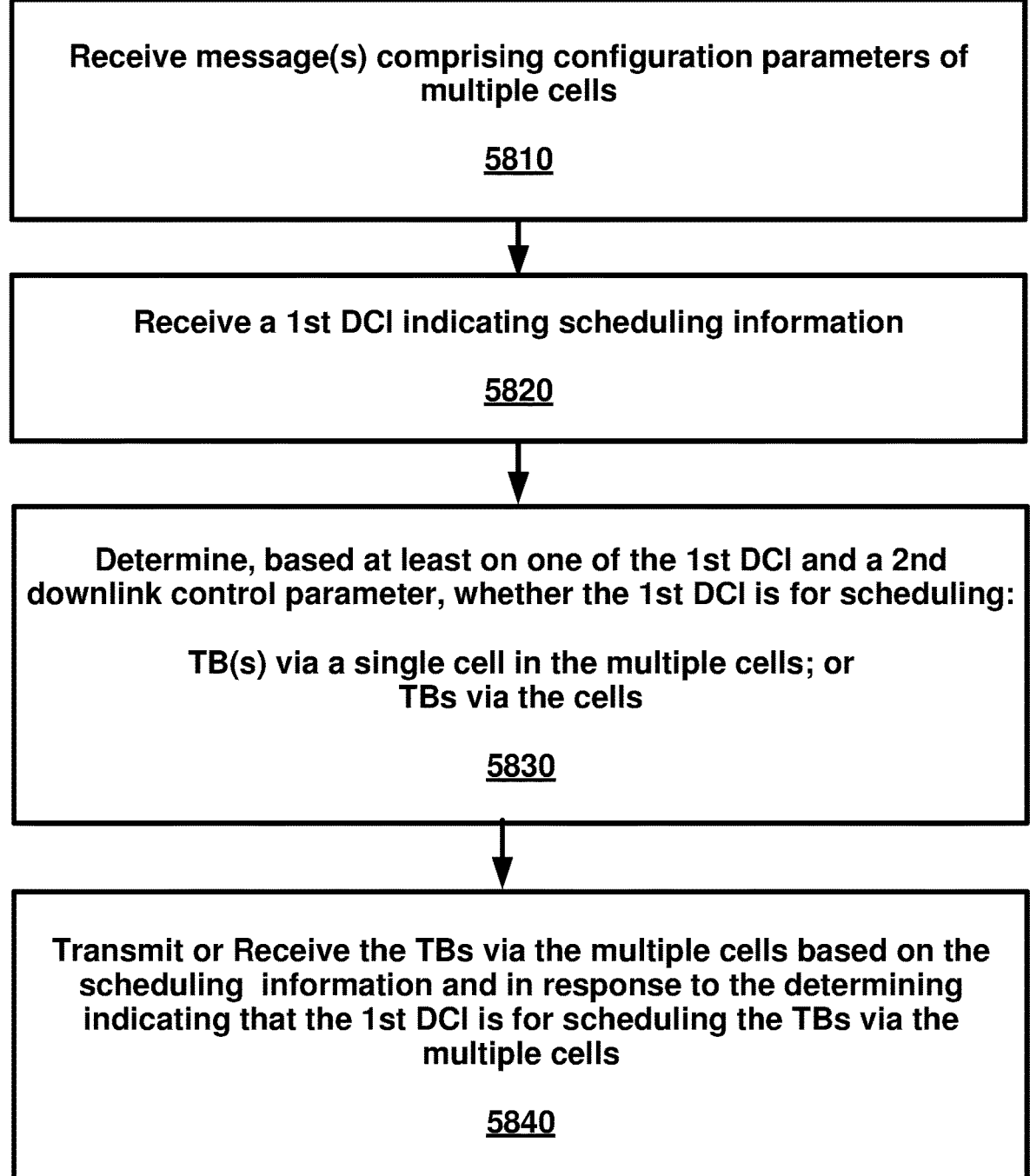

Receive message(s) comprising configuration parameters of multiple cells

5810

Receive a 1st DCI indicating scheduling information

5820

Determine, based at least on one of the 1st DCI and a 2nd downlink control parameter, whether the 1st DCI is for scheduling:

TB(s) via a single cell in the multiple cells; or
TBs via the cells

5830

Transmit or Receive the TBs via the multiple cells based on the scheduling  information and in response to the determining indicating that the 1st DCI is for scheduling the TBs via the multiple cells

Receive message(s) comprising configuration parameters of multiple cells

5910

Receive a 1st DCI indicating scheduling information

5920

Determine, based at least on one of the 1st DCI and a 2nd downlink control parameter, that the 1st DCI is for scheduling TBs via the multiple cells

5930

Transmit or Receive the TBs via the multiple cells based on the scheduling information

5940

Figure 61:
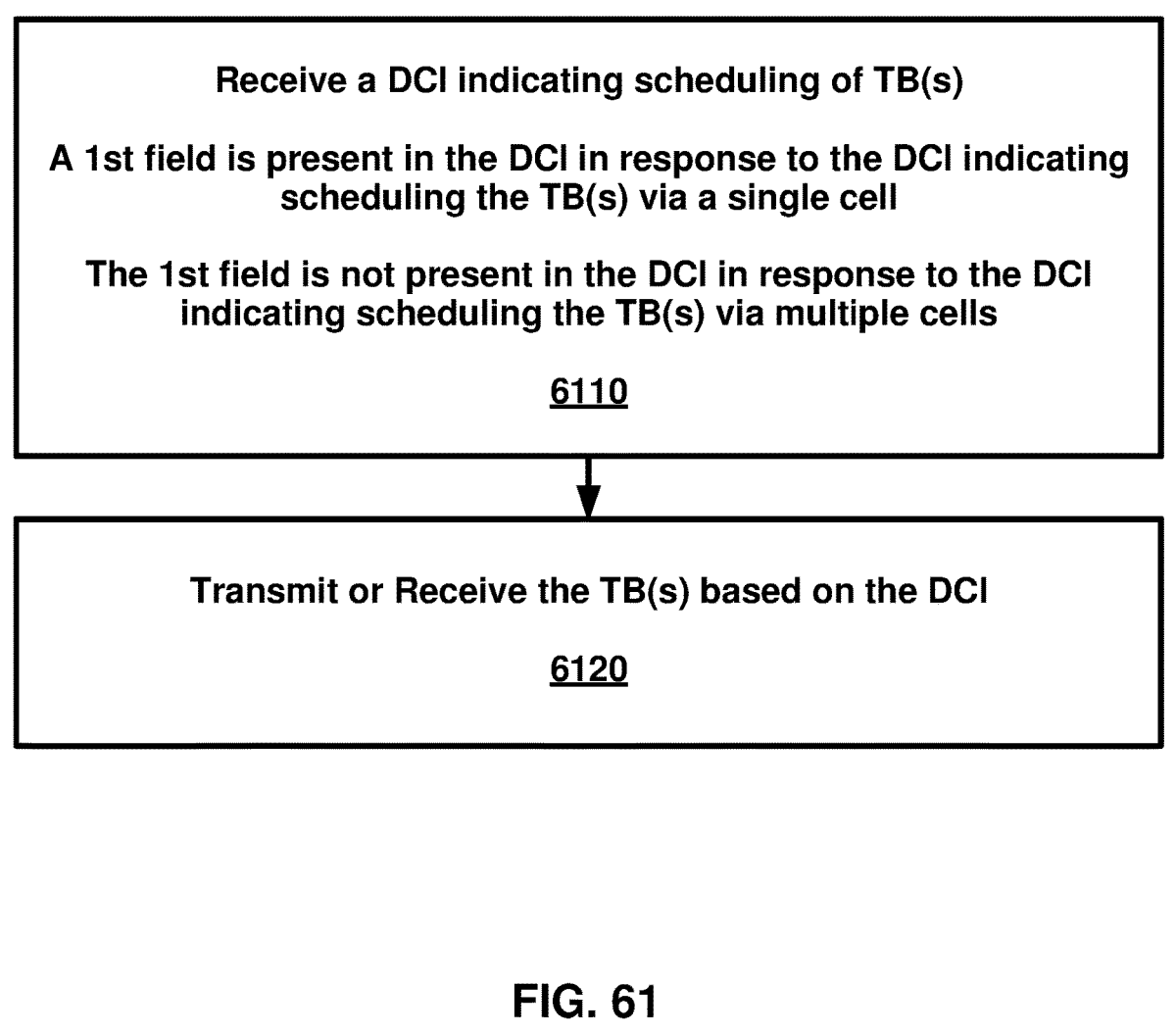

Receive a DCI indicating scheduling of TB(s)

A 1st field is present in the DCI in response to the DCI indicating scheduling the TB(s) via a single cell The 1st field is not present in the DCI in response to the DCI indicating scheduling the TB(s) via multiple cells <u>6110</u>

Transmit or Receive the TB(s) based on the DCI

Figure 62:
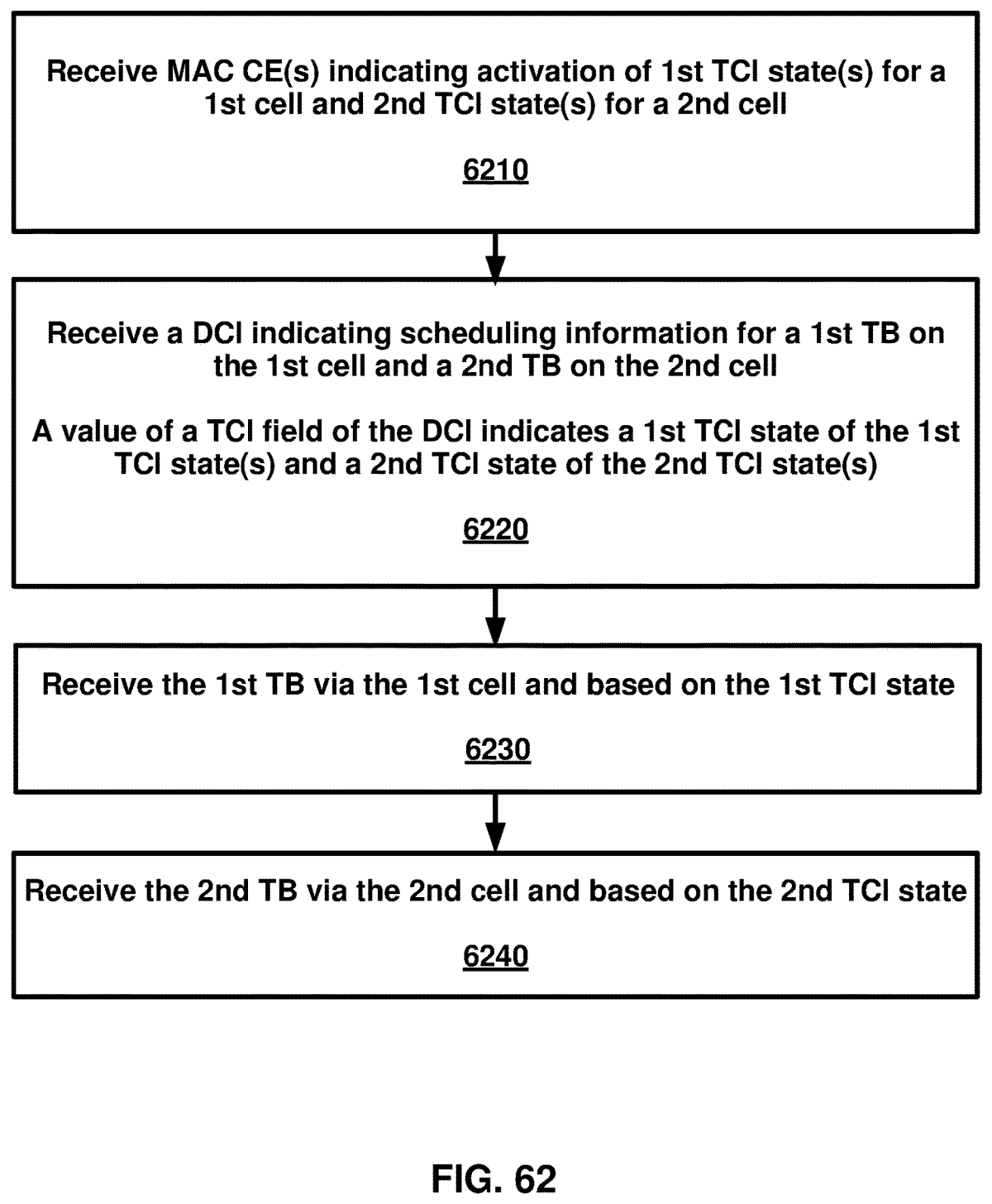

Receive MAC CE(s) indicating activation of 1st TCI state(s) for a
1st cell and 2nd TCI state(s) for a 2nd cell

6210

Receive a DCI indicating scheduling information for a 1st TB on
the 1st cell and a 2nd TB on the 2nd cell A value of a TCI field of the DCI indicates a 1st TCI state of the 1st
TCI state(s) and a 2nd TCI state of the 2nd TCI state(s)

6220

Receive the 1st TB via the 1st cell and based on the 1st TCI state

6230

Receive the 2nd TB via the 2nd cell and based on the 2nd TCI state

Receive a DCI indicating scheduling information for a 1st TB via a 1st cell and a 2nd TB via a 2nd cell the DCI comprises a TCI field

6310

Determine that a value of the TCI field indicates a 1st TCI state for the 1st cell

6320

Receive the 1st TB via the 1st cell and based on the 1st TCI state

6330

Receive the 2nd TB via the 2nd cell and based on a 2nd TCI state (not based on the 1st TCI state)

6340

Receive configuration parameter(s) indicating at least one TCI state for reception of TBs, via cells, that are jointly scheduled by a DCI

6410

Receive a DCI indicating scheduling TBs via cells

6420

Receive the TBs based on the at least one TCI state, indicated by the configuration parameter(s), via the cells

6430

Figure 65:
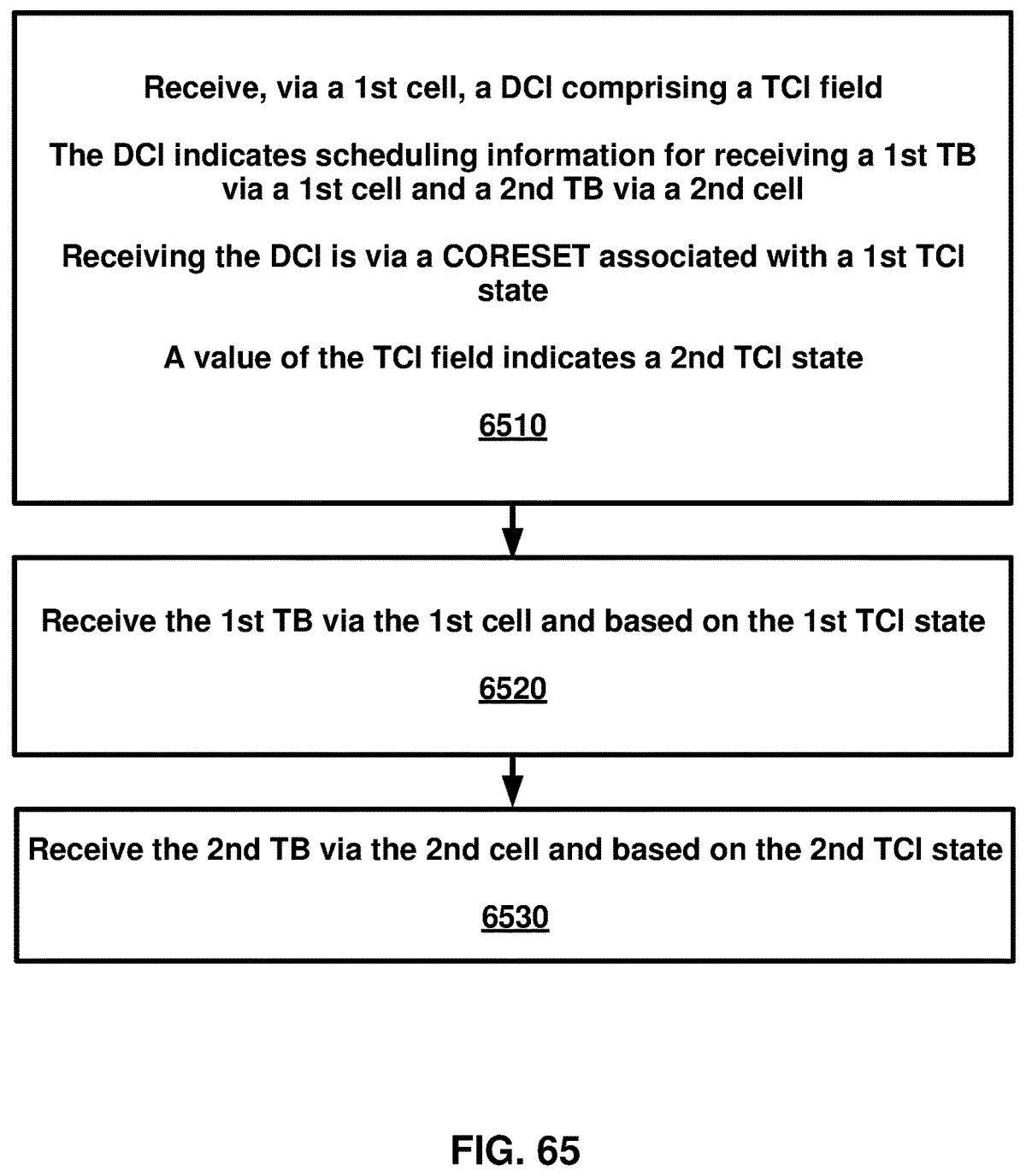

Receive, via a 1st cell, a DCI comprising a TCI field

The DCI indicates scheduling information for receiving a 1st TB via a 1st cell and a 2nd TB via a 2nd cell Receiving the DCI is via a CORESET associated with a 1st TCI state A value of the TCI field indicates a 2nd TCI state

6510

Receive the 1st TB via the 1st cell and based on the 1st TCI state

6520

Receive the 2nd TB via the 2nd cell and based on the 2nd TCI state

Figure 66:
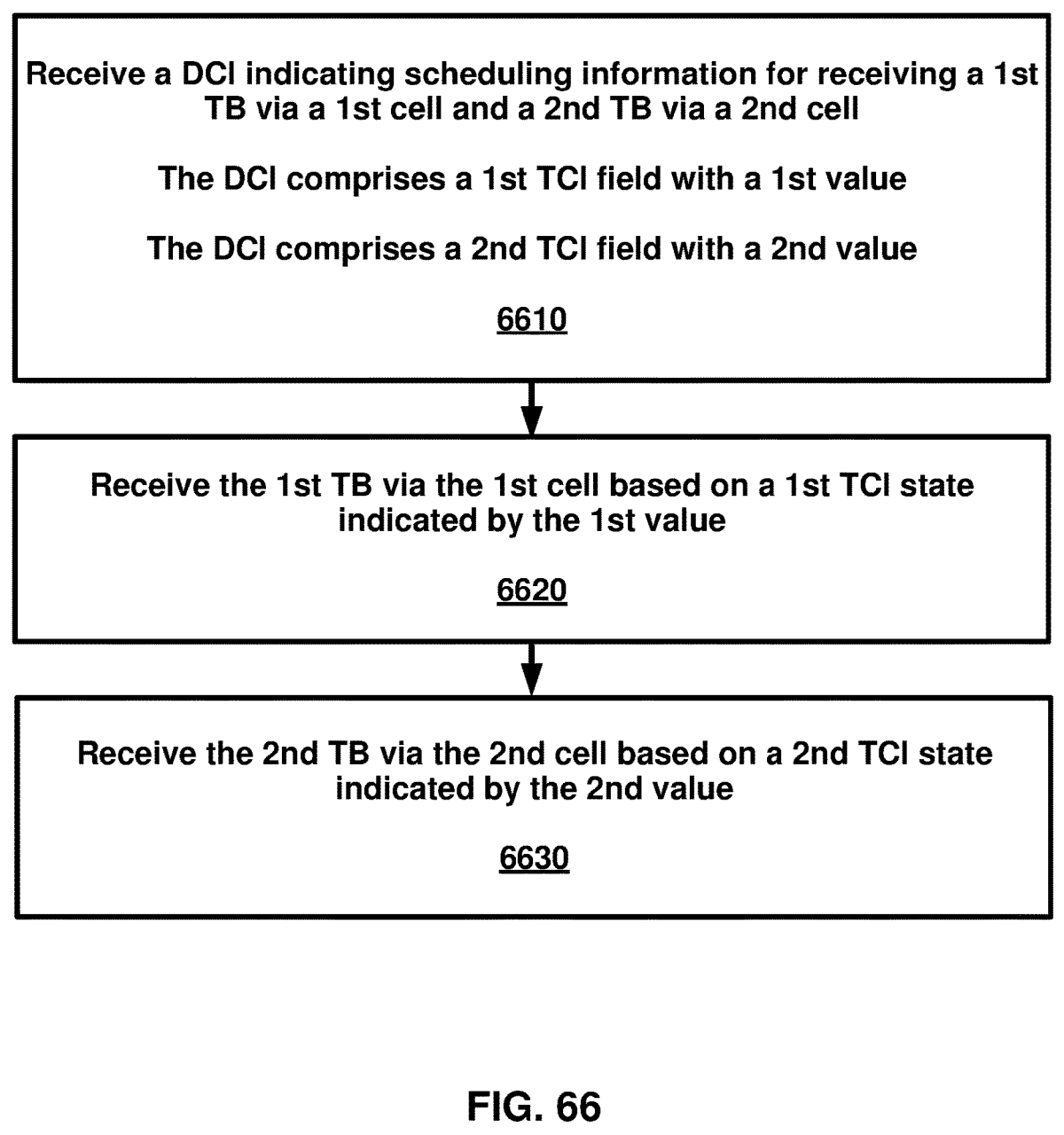

Receive a DCI indicating scheduling information for receiving a 1st TB via a 1st cell and a 2nd TB via a 2nd cell The DCI comprises a 1st TCI field with a 1st value The DCI comprises a 2nd TCI field with a 2nd value

6610

Receive the 1st TB via the 1st cell based on a 1st TCI state indicated by the 1st value

6620

Receive the 2nd TB via the 2nd cell based on a 2nd TCI state indicated by the 2nd value

Figure 67:
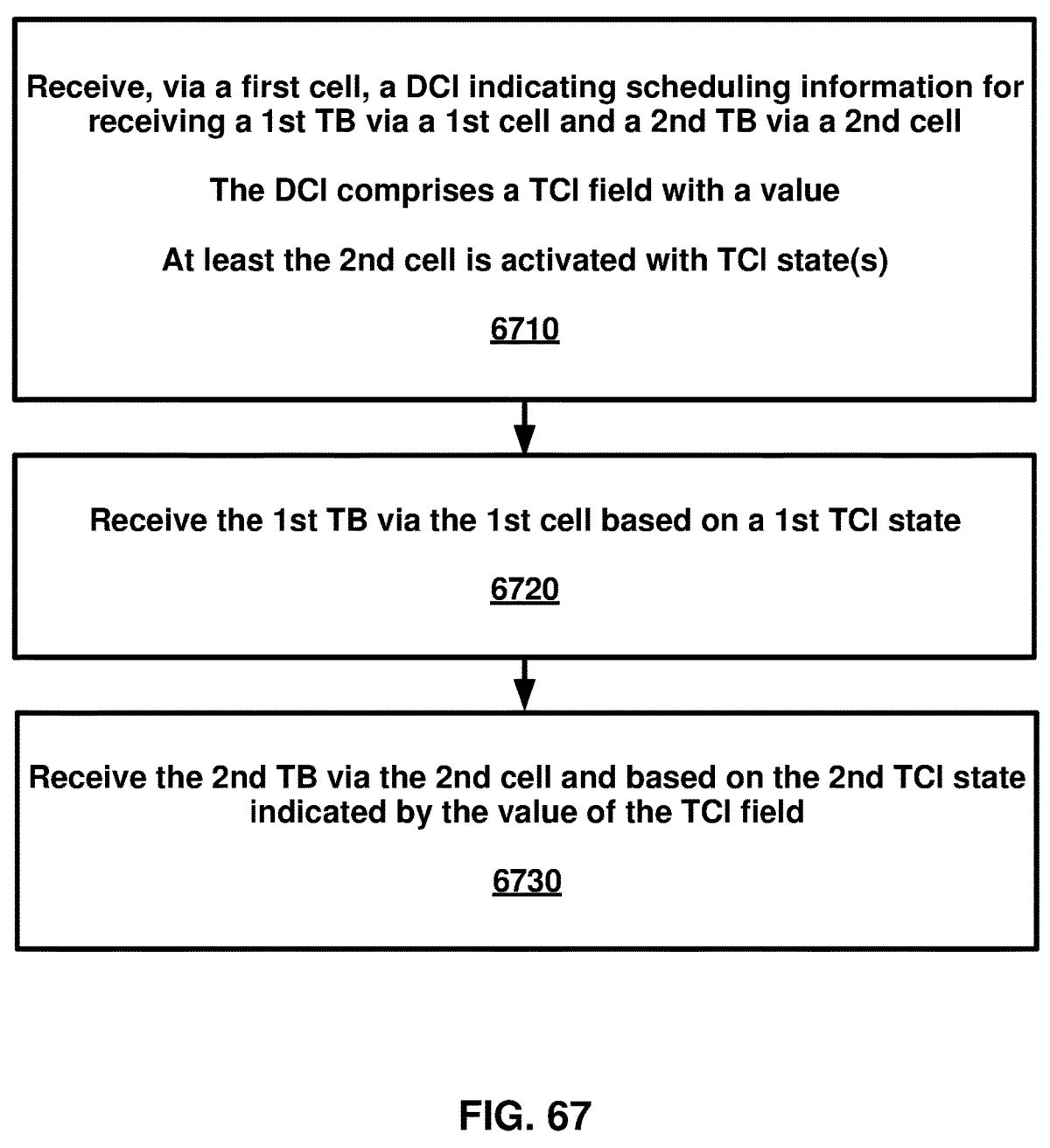

Receive, via a first cell, a DCI indicating scheduling information for receiving a 1st TB via a 1st cell and a 2nd TB via a 2nd cell The DCI comprises a TCI field with a value At least the 2nd cell is activated with TCI state(s)

6710

Receive the 1st TB via the 1st cell based on a 1st TCI state

6720

Receive the 2nd TB via the 2nd cell and based on the 2nd TCI state indicated by the value of the TCI field

Figure 68:
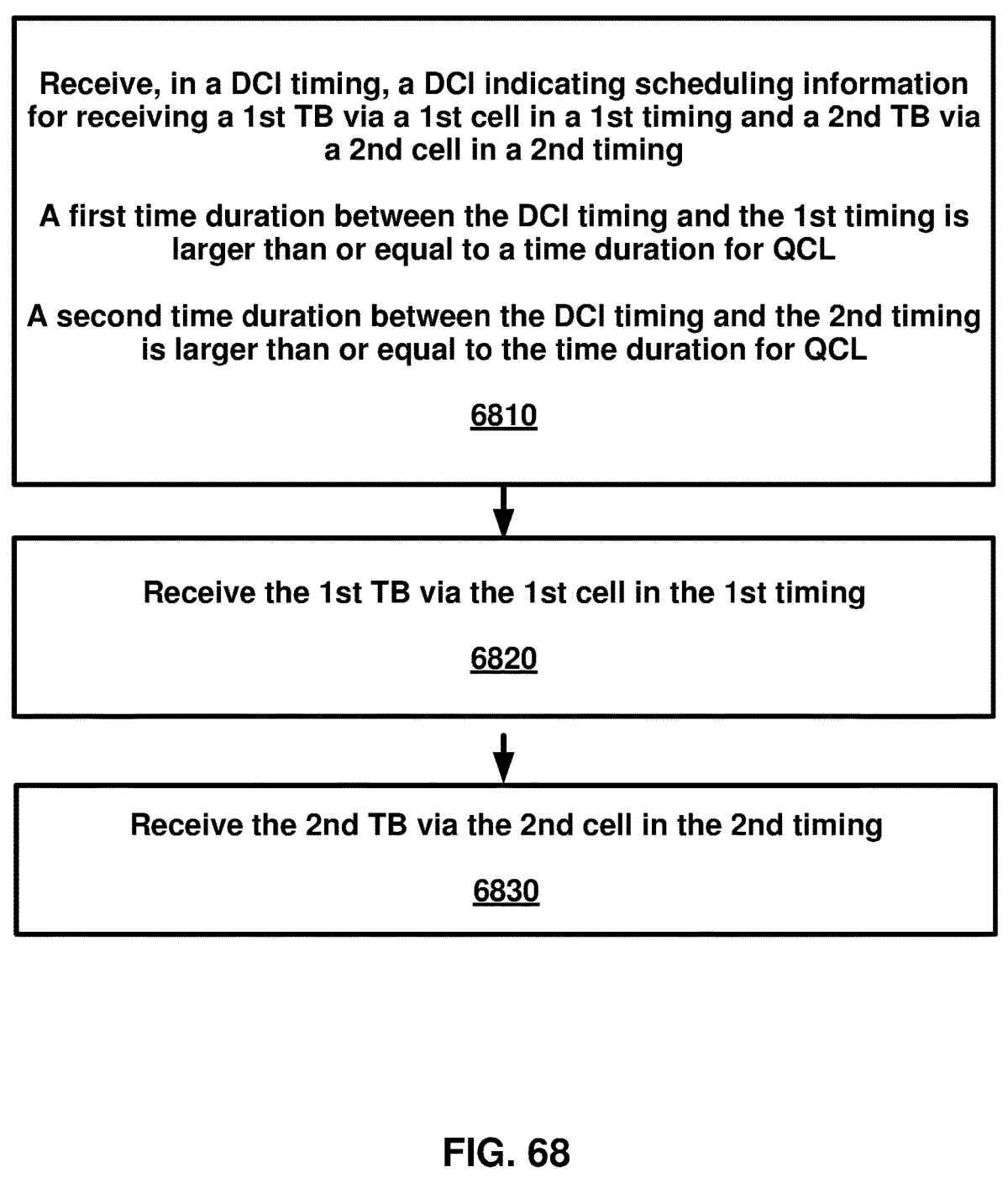

Receive, in a DCI timing, a DCI indicating scheduling information for receiving a 1st TB via a 1st cell in a 1st timing and a 2nd TB via a 2nd cell in a 2nd timing A first time duration between the DCI timing and the 1st timing is larger than or equal to a time duration for QCL A second time duration between the DCI timing and the 2nd timing is larger than or equal to the time duration for QCL

6810

Receive the 1st TB via the 1st cell in the 1st timing

6820

Receive the 2nd TB via the 2nd cell in the 2nd timing

Figure 69:
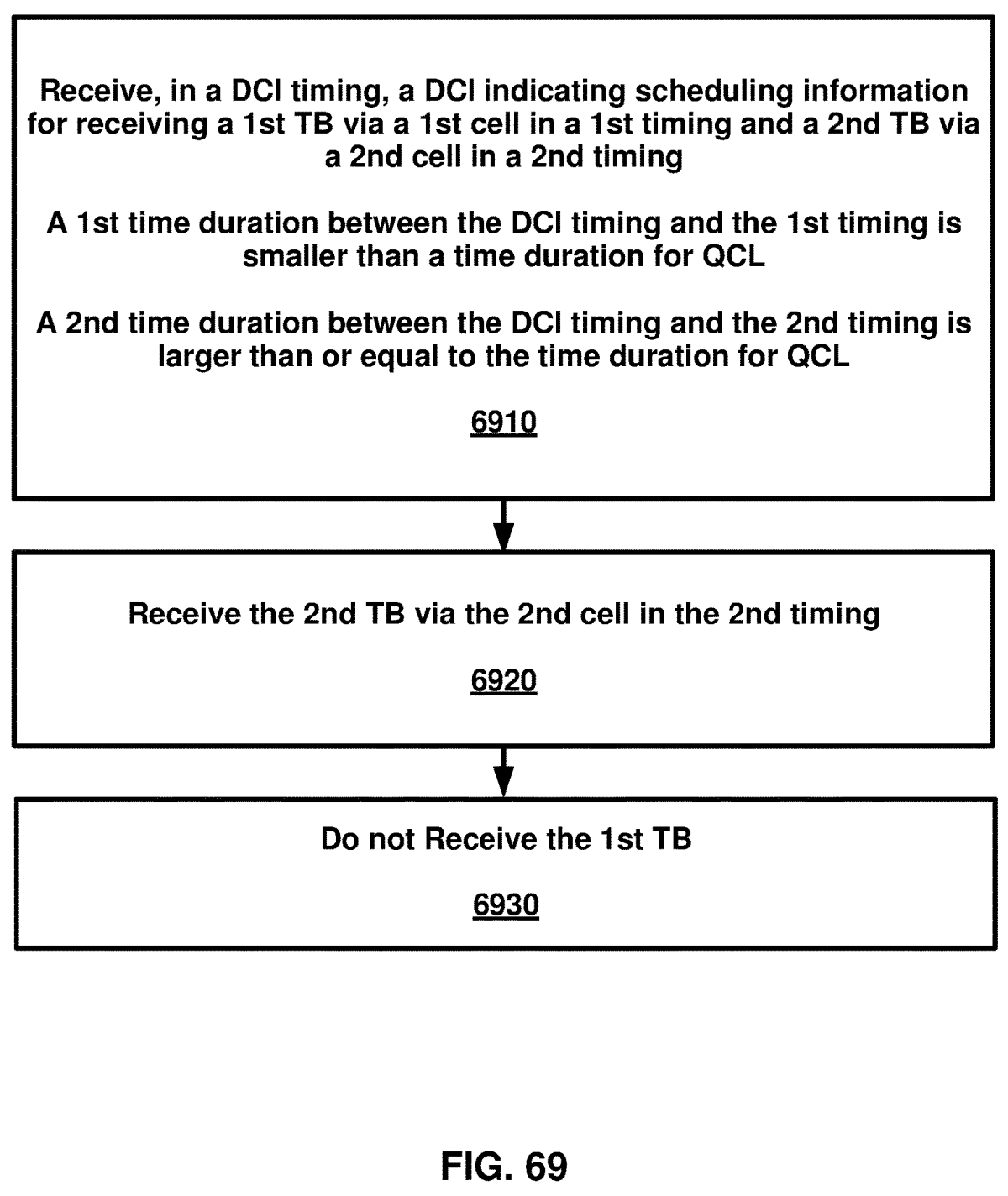

Receive, in a DCI timing, a DCI indicating scheduling information for receiving a 1st TB via a 1st cell in a 1st timing and a 2nd TB via a 2nd cell in a 2nd timing A 1st time duration between the DCI timing and the 1st timing is smaller than a time duration for QCL A 2nd time duration between the DCI timing and the 2nd timing is larger than or equal to the time duration for QCL

6910

Receive the 2nd TB via the 2nd cell in the 2nd timing

6920

Do not Receive the 1st TB

Figure 70:
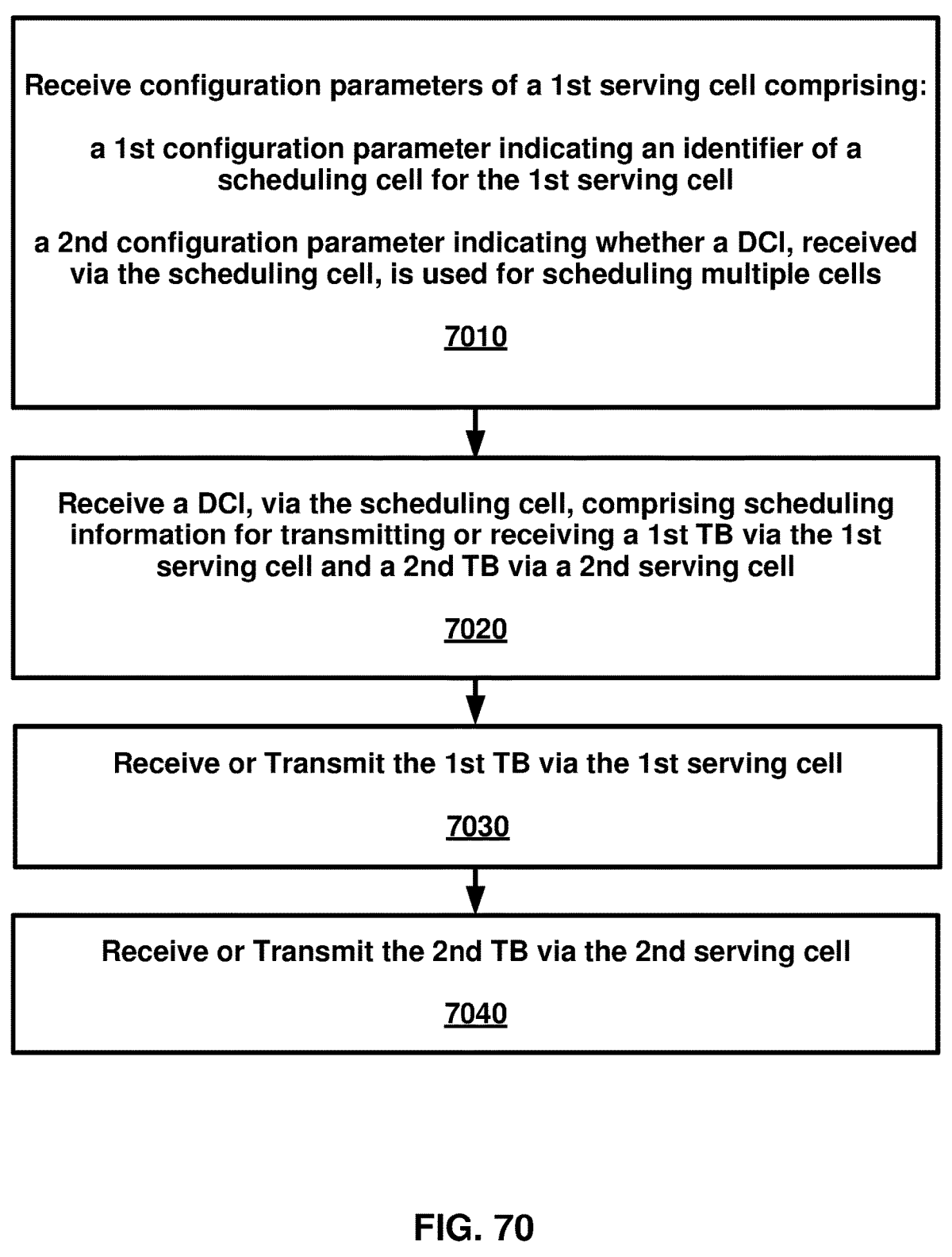

Receive configuration parameters of a 1st serving cell comprising:

a 1st configuration parameter indicating an identifier of a scheduling cell for the 1st serving cell a 2nd configuration parameter indicating whether a DCI, received via the scheduling cell, is used for scheduling multiple cells

7010

Receive a DCI, via the scheduling cell, comprising scheduling information for transmitting or receiving a 1st TB via the 1st serving cell and a 2nd TB via a 2nd serving cell

7020

Receive or Transmit the 1st TB via the 1st serving cell

7030

Receive or Transmit the 2nd TB via the 2nd serving cell

Figure 71:
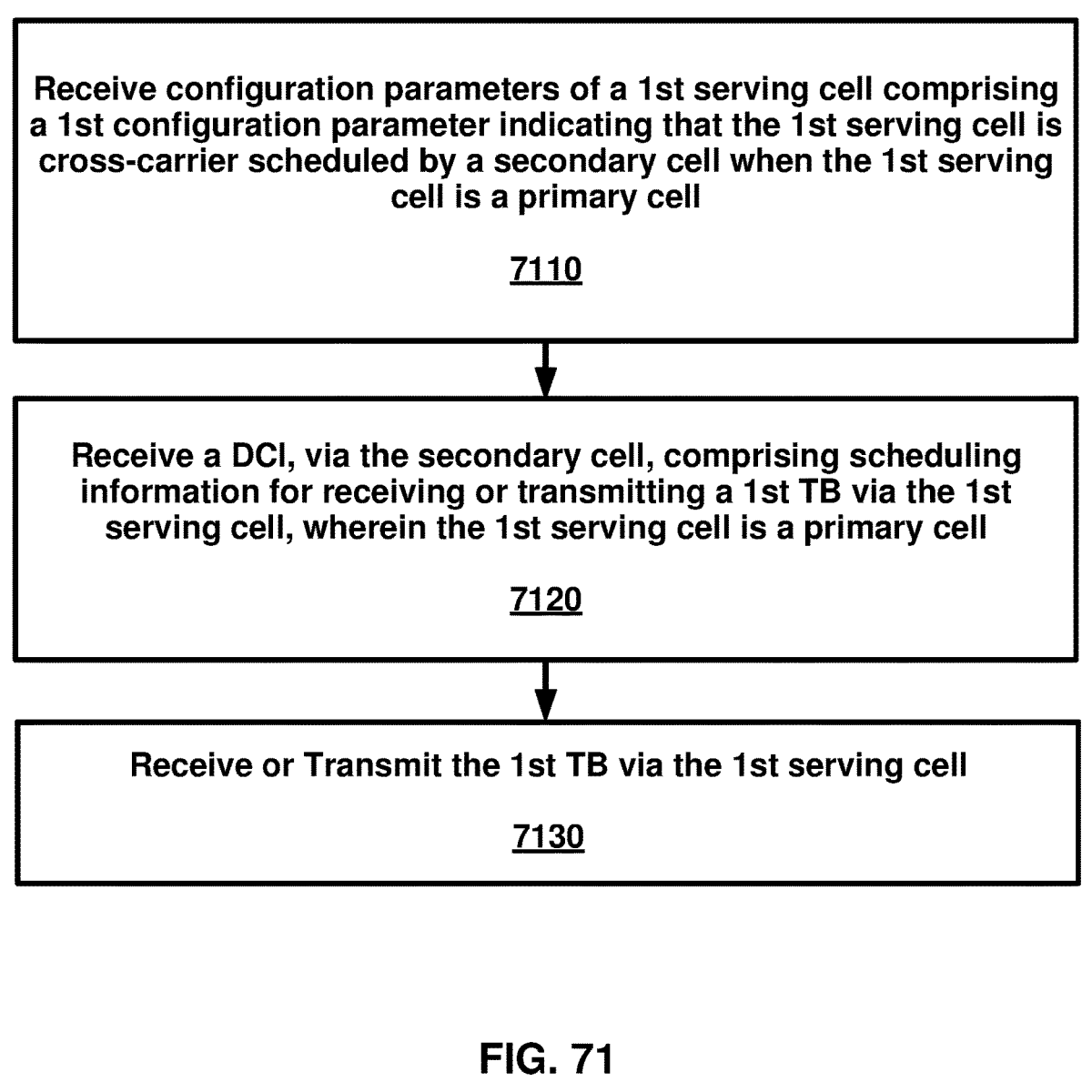

Receive configuration parameters of a 1st serving cell comprising a 1st configuration parameter indicating that the 1st serving cell is cross-carrier scheduled by a secondary cell when the 1st serving cell is a primary cell

7110

Receive a DCI, via the secondary cell, comprising scheduling information for receiving or transmitting a 1st TB via the 1st serving cell, wherein the 1st serving cell is a primary cell

7120

Receive or Transmit the 1st TB via the 1st serving cell

Figure 72:
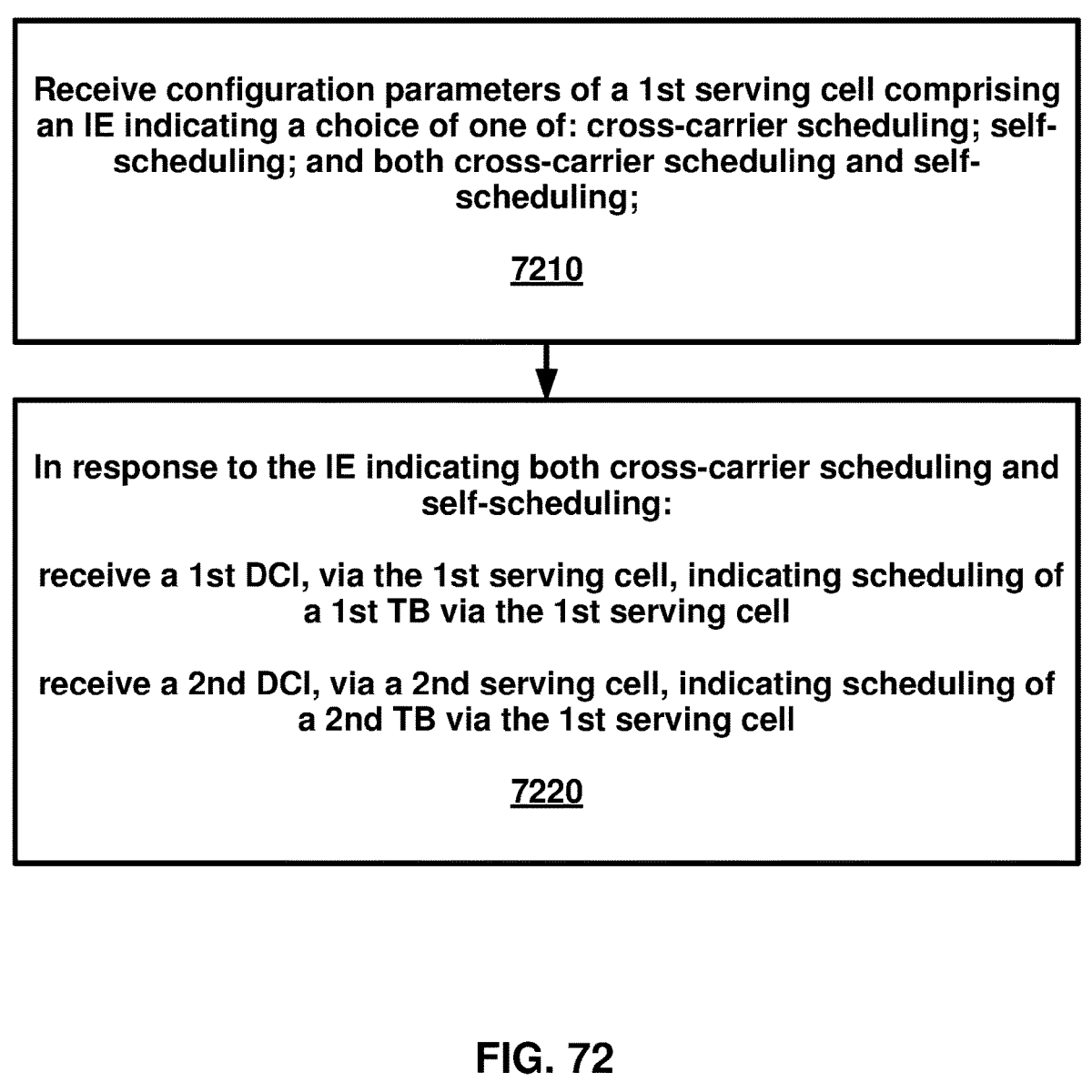

Receive configuration parameters of a 1st serving cell comprising an IE indicating a choice of one of: cross-carrier scheduling; self-scheduling; and both cross-carrier scheduling and self-scheduling;

7210

In response to the IE indicating both cross-carrier scheduling and self-scheduling:

receive a 1st DCI, via the 1st serving cell, indicating scheduling of a 1st TB via the 1st serving cell receive a 2nd DCI, via a 2nd serving cell, indicating scheduling of a 2nd TB via the 1st serving cell

Figure 73:
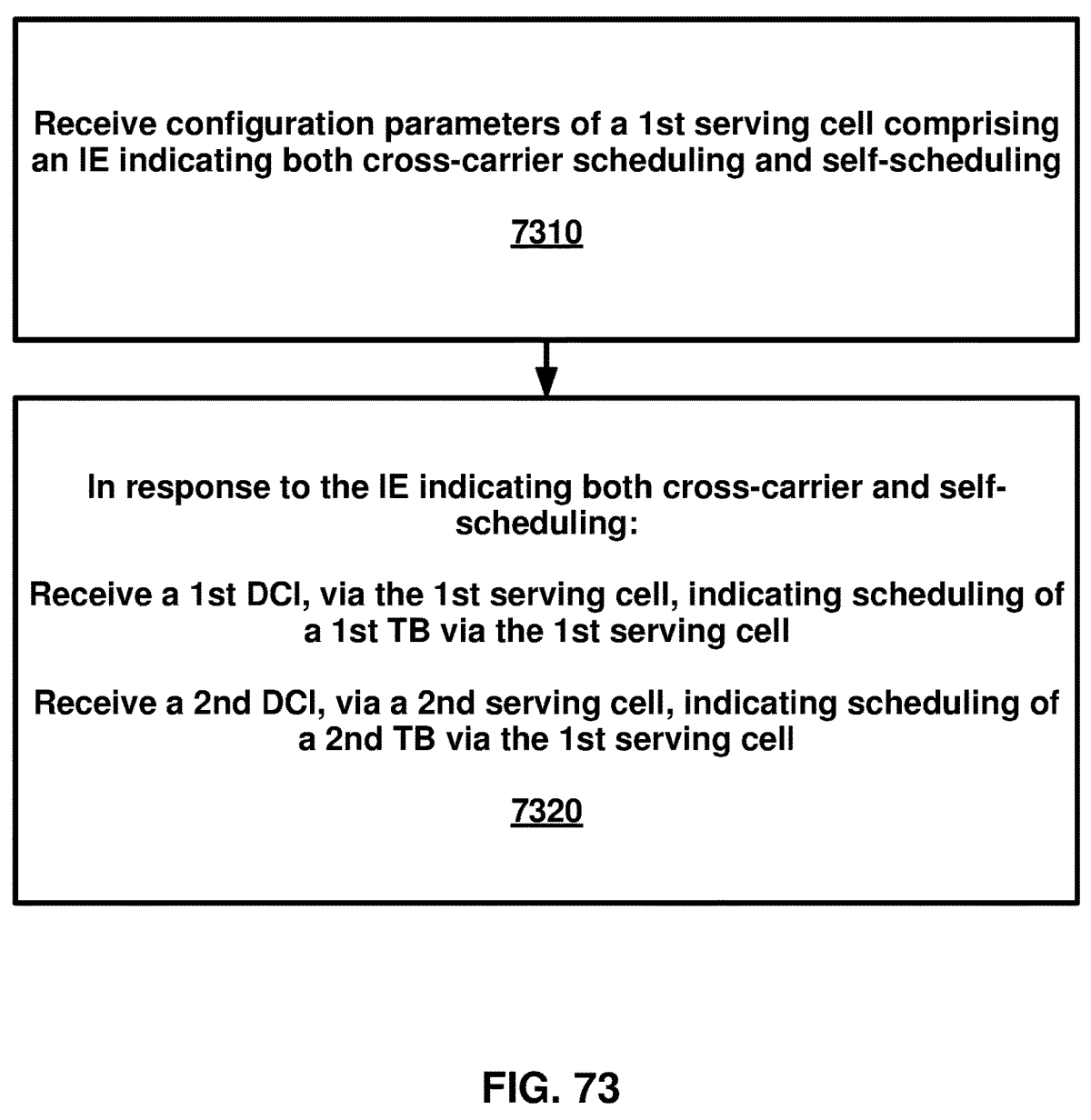

Receive configuration parameters of a 1st serving cell comprising an IE indicating both cross-carrier scheduling and self-scheduling

7310

In response to the IE indicating both cross-carrier and self-scheduling:

Receive a 1st DCI, via the 1st serving cell, indicating scheduling of a 1st TB via the 1st serving cell Receive a 2nd DCI, via a 2nd serving cell, indicating scheduling of a 2nd TB via the 1st serving cell

Figure 74:
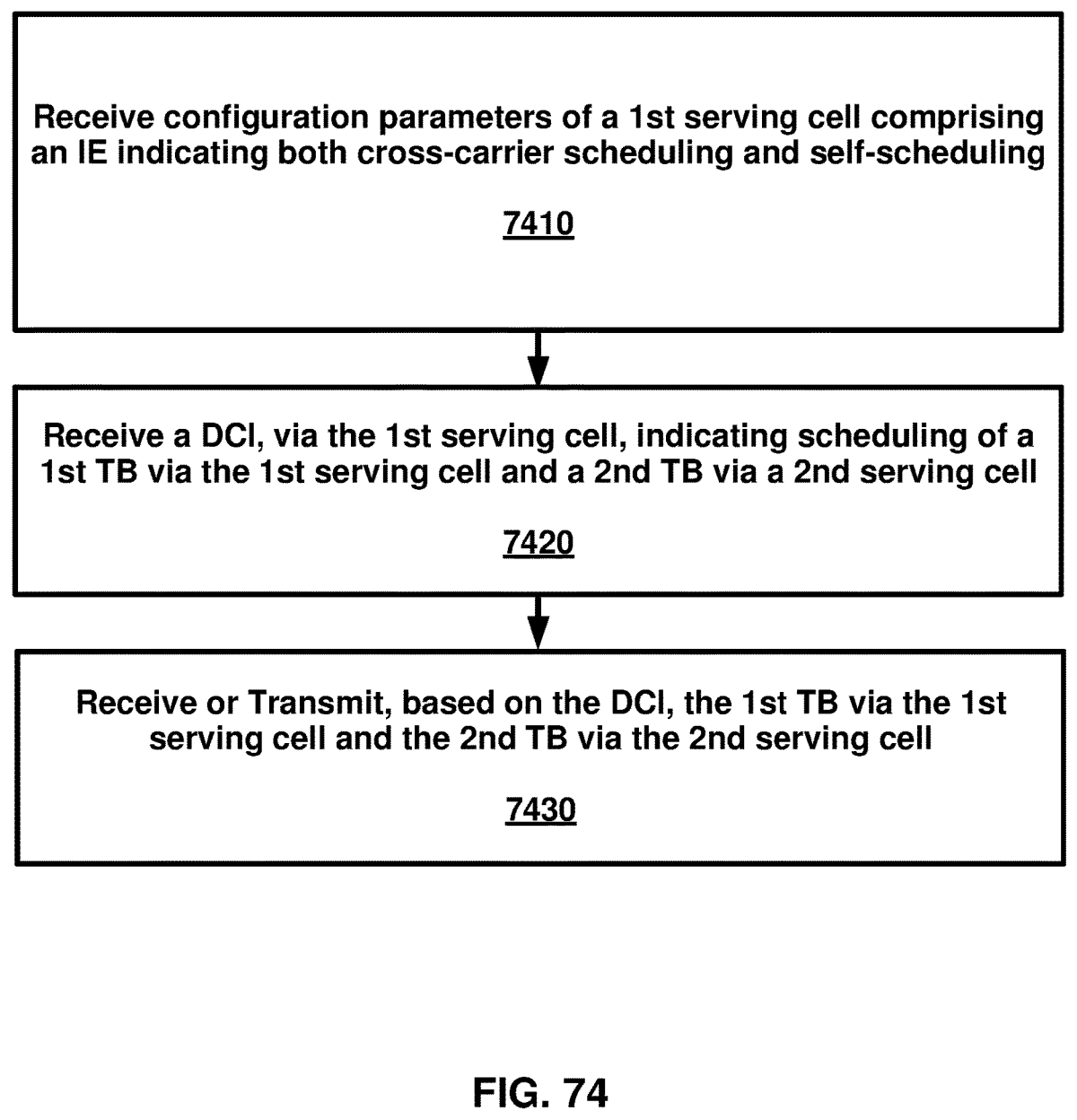

Receive configuration parameters of a 1st serving cell comprising an IE indicating both cross-carrier scheduling and self-scheduling

7410

Receive a DCI, via the 1st serving cell, indicating scheduling of a 1st TB via the 1st serving cell and a 2nd TB via a 2nd serving cell

7420

Receive or Transmit, based on the DCI, the 1st TB via the 1st serving cell and the 2nd TB via the 2nd serving cell

Figure 75:
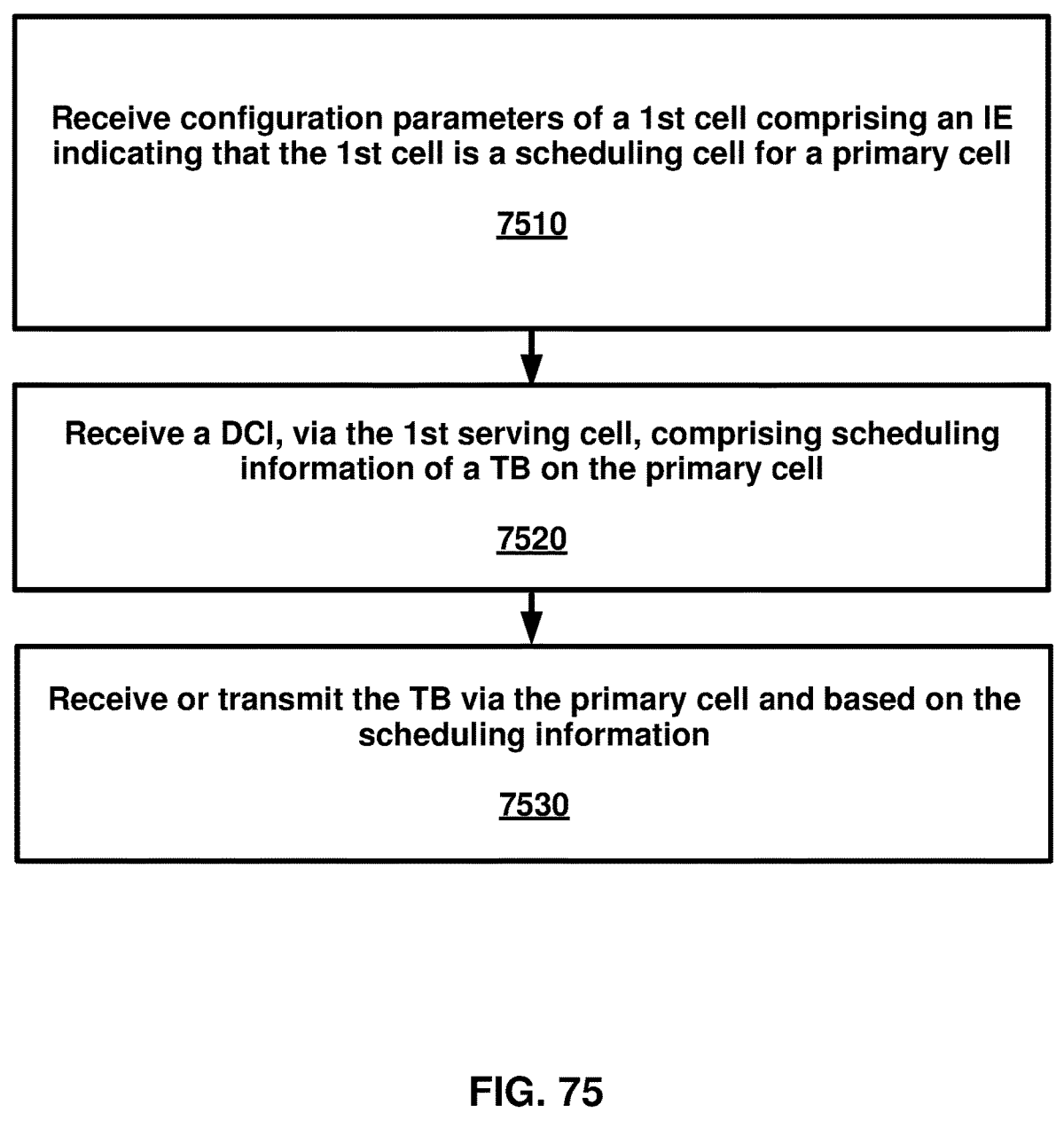

Receive configuration parameters of a 1st cell comprising an IE indicating that the 1st cell is a scheduling cell for a primary cell

7510

Receive a DCI, via the 1st serving cell, comprising scheduling information of a TB on the primary cell

7520

Receive or transmit the TB via the primary cell and based on the scheduling information

Figure 76:
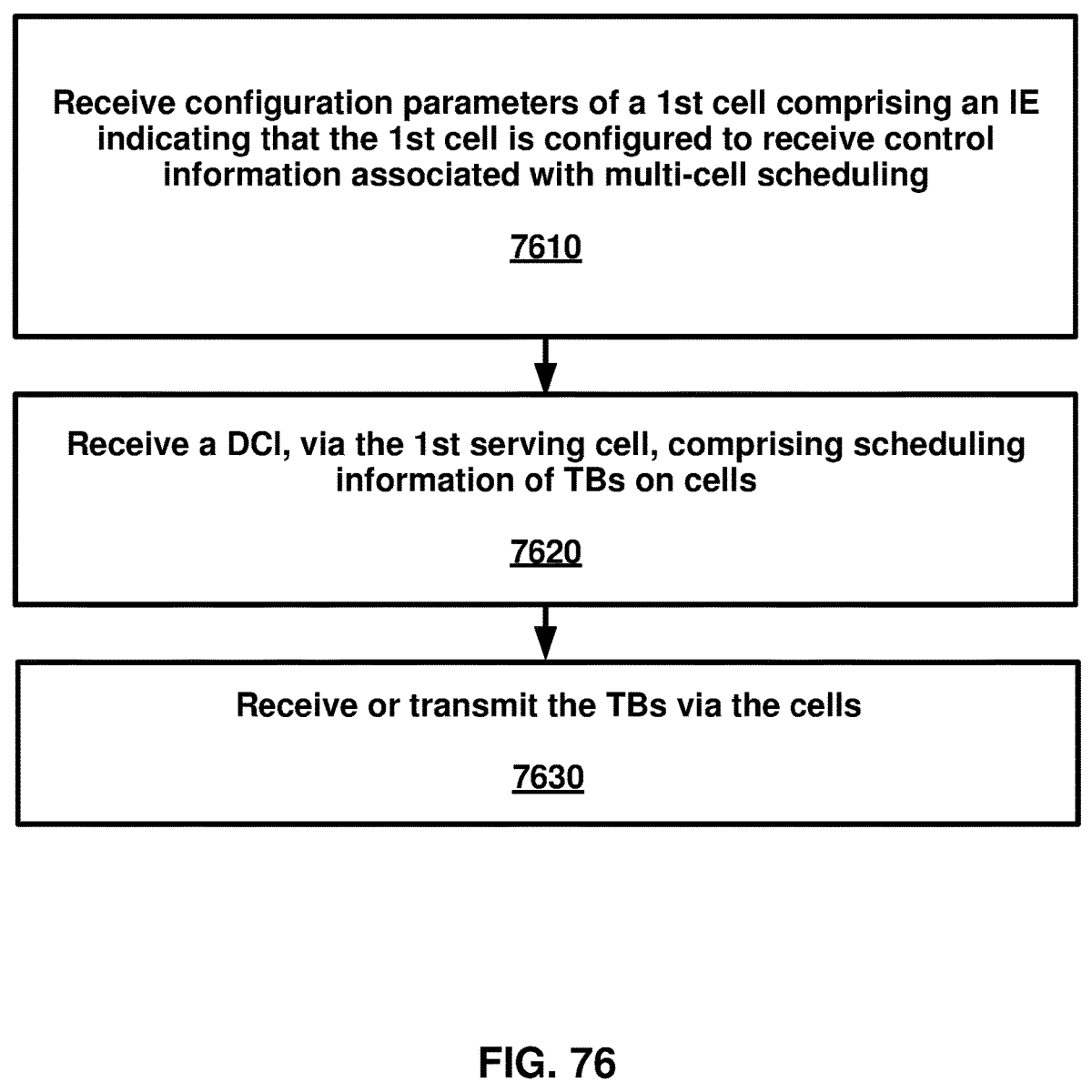

Receive configuration parameters of a 1st cell comprising an IE indicating that the 1st cell is configured to receive control information associated with multi-cell scheduling

7610

Receive a DCI, via the 1st serving cell, comprising scheduling information of TBs on cells

7620

Receive or transmit the TBs via the cells

Figure 77:
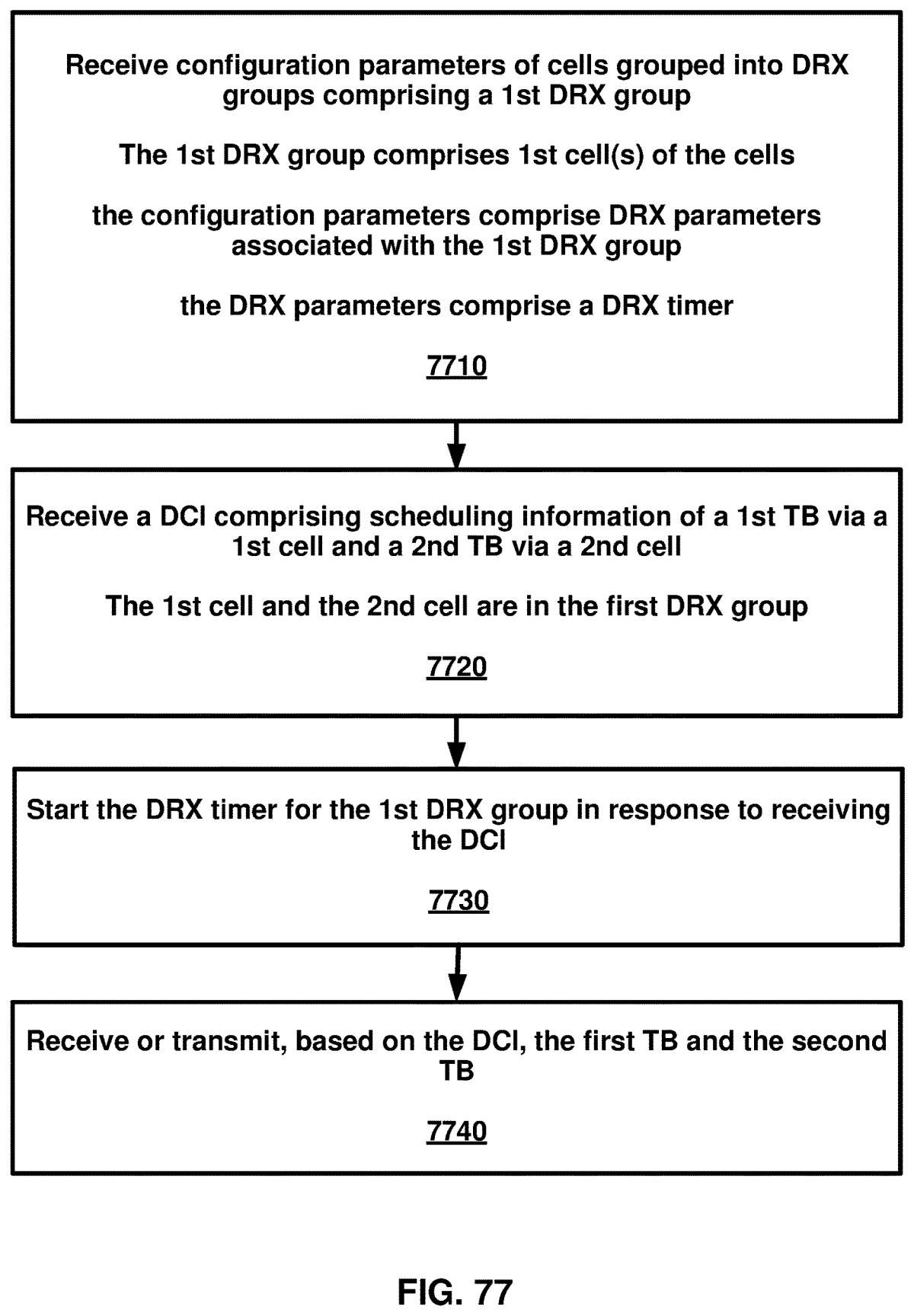

Receive configuration parameters of cells grouped into DRX
groups comprising a 1st DRX group The 1st DRX group comprises 1st cell(s) of the cells the configuration parameters comprise DRX parameters
associated with the 1st DRX group the DRX parameters comprise a DRX timer

7710

Receive a DCI comprising scheduling information of a 1st TB via a
1st cell and a 2nd TB via a 2nd cell The 1st cell and the 2nd cell are in the first DRX group

7720

Start the DRX timer for the 1st DRX group in response to receiving
the DCI

7730

Receive or transmit, based on the DCI, the first TB and the second
TB

Figure 78:
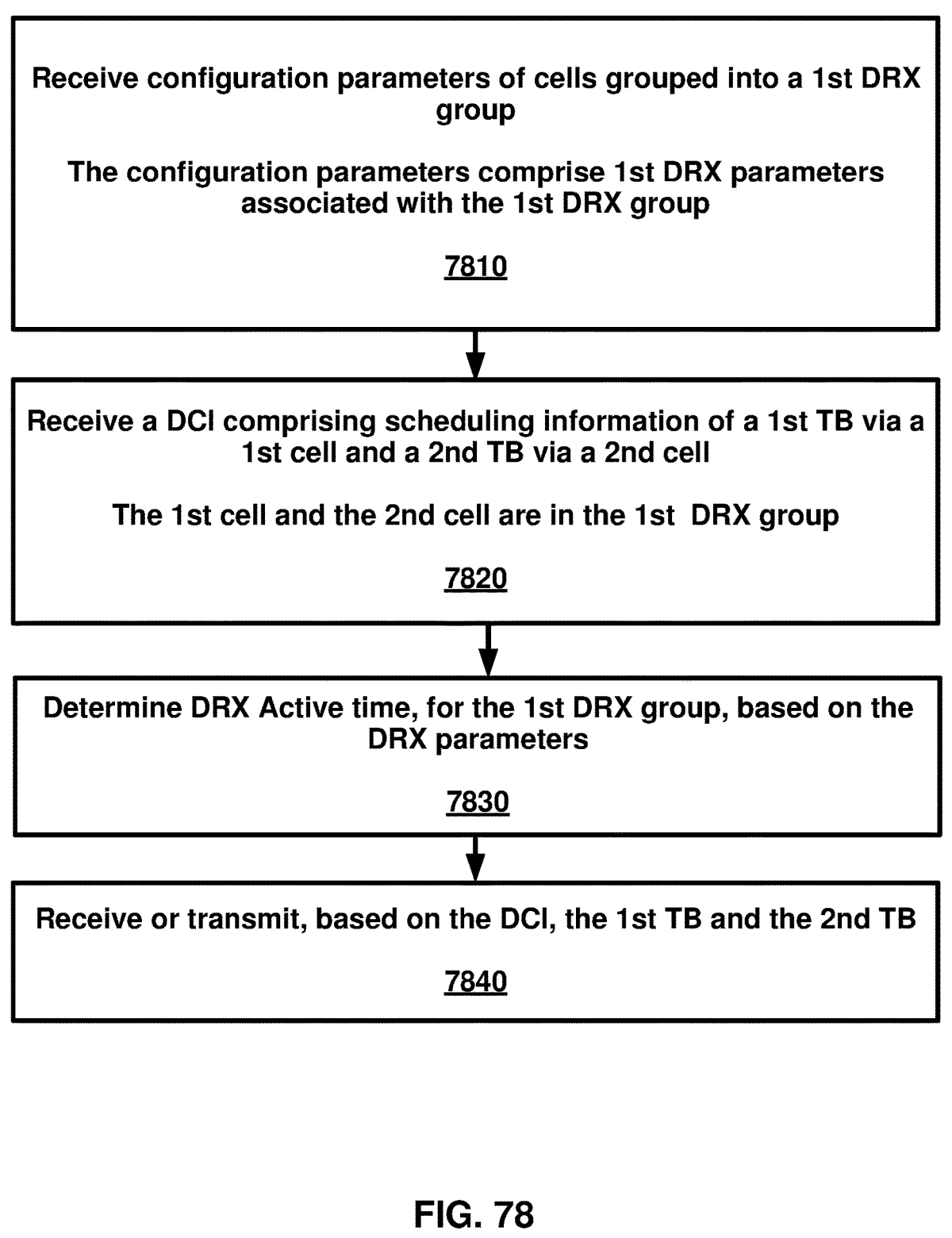

Receive configuration parameters of cells grouped into a 1st DRX group

The configuration parameters comprise 1st DRX parameters associated with the 1st DRX group

7810

Receive a DCI comprising scheduling information of a 1st TB via a 1st cell and a 2nd TB via a 2nd cell The 1st cell and the 2nd cell are in the 1st DRX group

7820

Determine DRX Active time, for the 1st DRX group, based on the DRX parameters

7830

Receive or transmit, based on the DCI, the 1st TB and the 2nd TB

Figure 79:
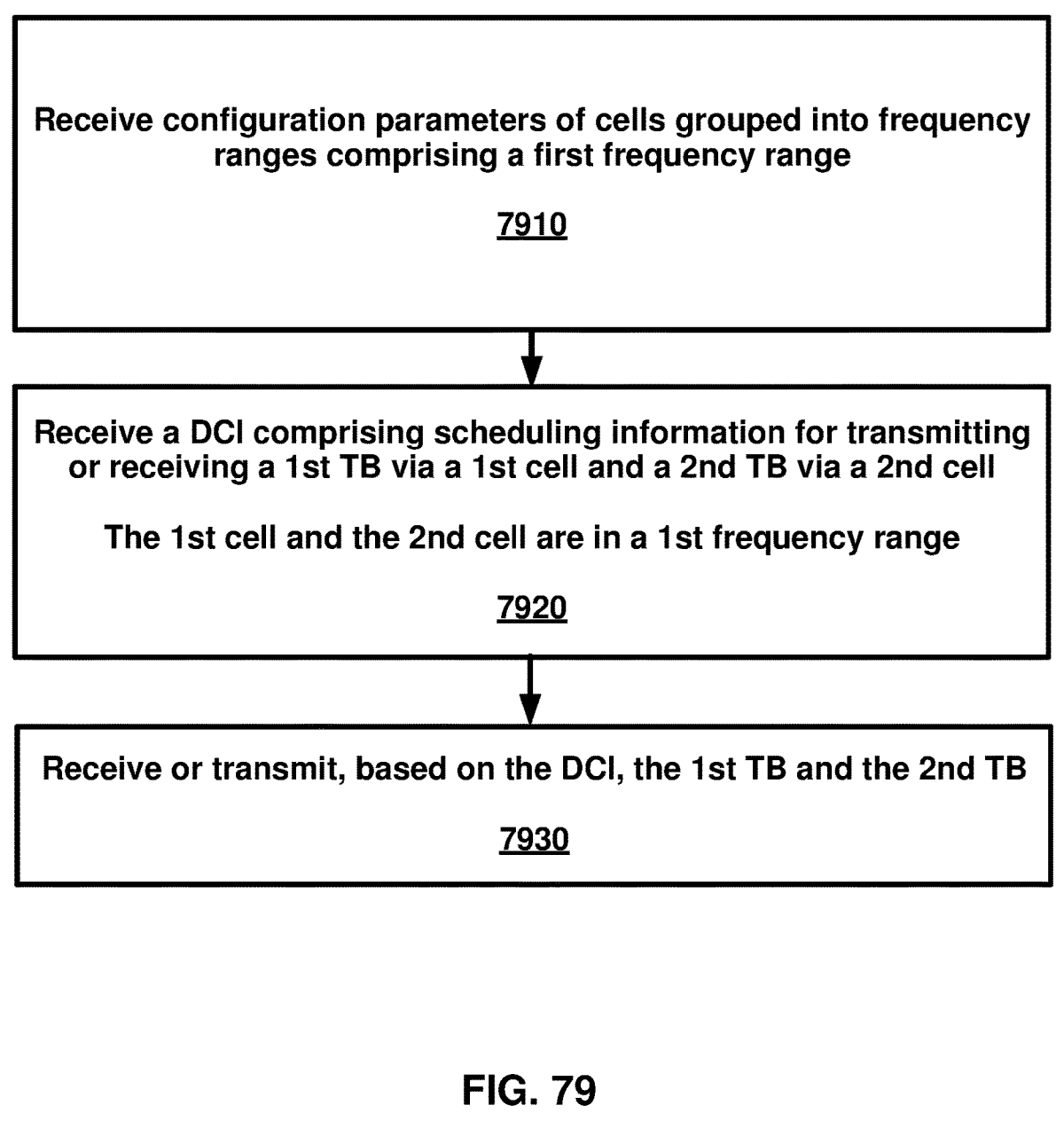

Receive configuration parameters of cells grouped into frequency ranges comprising a first frequency range

7910

Receive a DCI comprising scheduling information for transmitting or receiving a 1st TB via a 1st cell and a 2nd TB via a 2nd cell The 1st cell and the 2nd cell are in a 1st frequency range

7920

Receive or transmit, based on the DCI, the 1st TB and the 2nd TB

WIRELESS DEVICE AND WIRELESS NETWORK PROCESSES FOR ENHANCED SCHEDULING

CROSS-REFERENCE TO RELATED APPLICATIONS

This application claims the benefit of U.S. Provisional Application No. 63/132,673, filed Dec. 31, 2020, which is hereby incorporated by reference in its entirety.

BRIEF DESCRIPTION OF THE DRAWINGS

FIG. 4 shows example flow of packets through the protocol layers in accordance with several of various embodiments of the present disclosure.

FIG. 16 shows an example MAC CE format in accordance with several of various embodiments of the present disclosure.

FIG. 58 shows an example flow diagram in accordance with several of various embodiments of the present disclosure.

FIG. 61 shows an example flow diagram in accordance with several of various embodiments of the present disclosure.

FIG. 62 shows an example flow diagram in accordance with several of various embodiments of the present disclosure.

FIG. 65 shows an example flow diagram in accordance with several of various embodiments of the present disclosure.

FIG. 66 shows an example flow diagram in accordance with several of various embodiments of the present disclosure.

FIG. 67 shows an example flow diagram in accordance with several of various embodiments of the present disclosure.

FIG. 68 shows an example flow diagram in accordance with several of various embodiments of the present disclosure.

FIG. 69 shows an example flow diagram in accordance with several of various embodiments of the present disclosure.

FIG. 70 shows an example flow diagram in accordance with several of various embodiments of the present disclosure.

FIG. 71 shows an example flow diagram in accordance with several of various embodiments of the present disclosure.

FIG. 72 shows an example flow diagram in accordance with several of various embodiments of the present disclosure.

FIG. 73 shows an example flow diagram in accordance with several of various embodiments of the present disclosure.

FIG. 74 shows an example flow diagram in accordance with several of various embodiments of the present disclosure.

FIG. 75 shows an example flow diagram in accordance with several of various embodiments of the present disclosure.

FIG. 76 shows an example flow diagram in accordance with several of various embodiments of the present disclosure.

FIG. 77 shows an example flow diagram in accordance with several of various embodiments of the present disclosure.

FIG. 78 shows an example flow diagram in accordance with several of various embodiments of the present disclosure.

FIG. 79 shows an example flow diagram in accordance with several of various embodiments of the present disclosure.

DETAILED DESCRIPTION

The exemplary embodiments of the disclosed technology enable processes for a wireless device and/or one or more base stations for scheduling enhancement. The exemplary disclosed embodiments may be implemented in the technical field of wireless communication systems. More particularly, the embodiments of the disclosed technology may enable multi-cell scheduling with a downlink control information and/or may enhance cross-carrier scheduling.

The devices and/or nodes of the mobile communications system disclosed herein may be implemented based on various technologies and/or various releases/versions/ amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figures 1A, 1B:
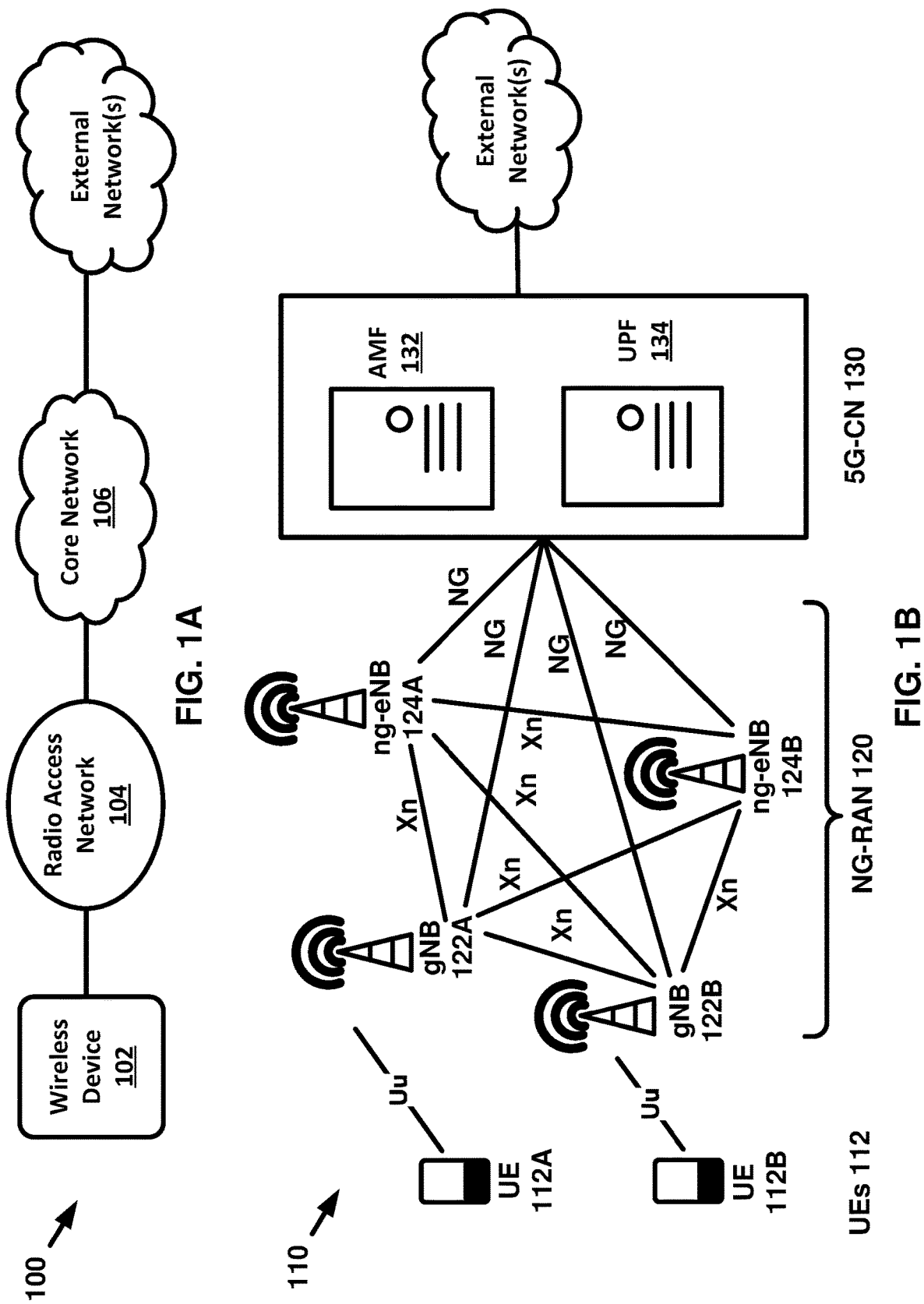
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP)

is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS)

handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
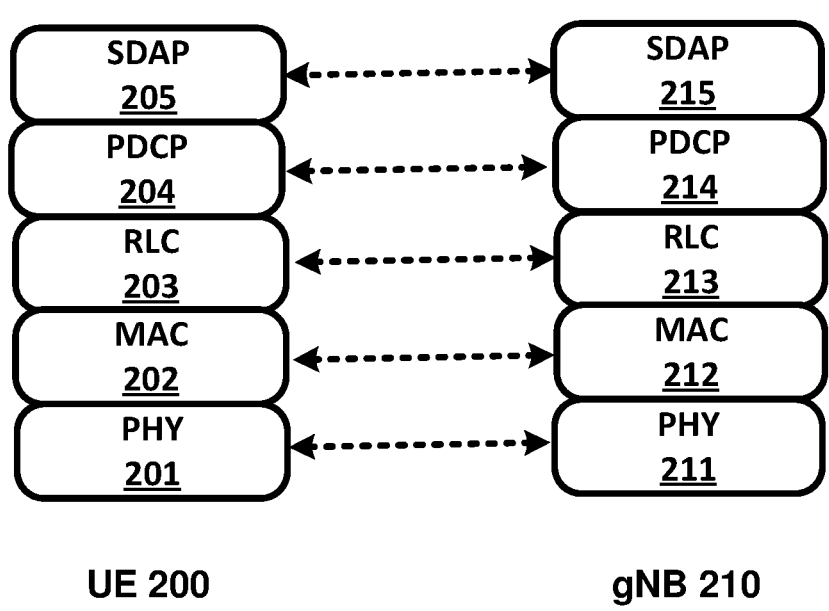
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
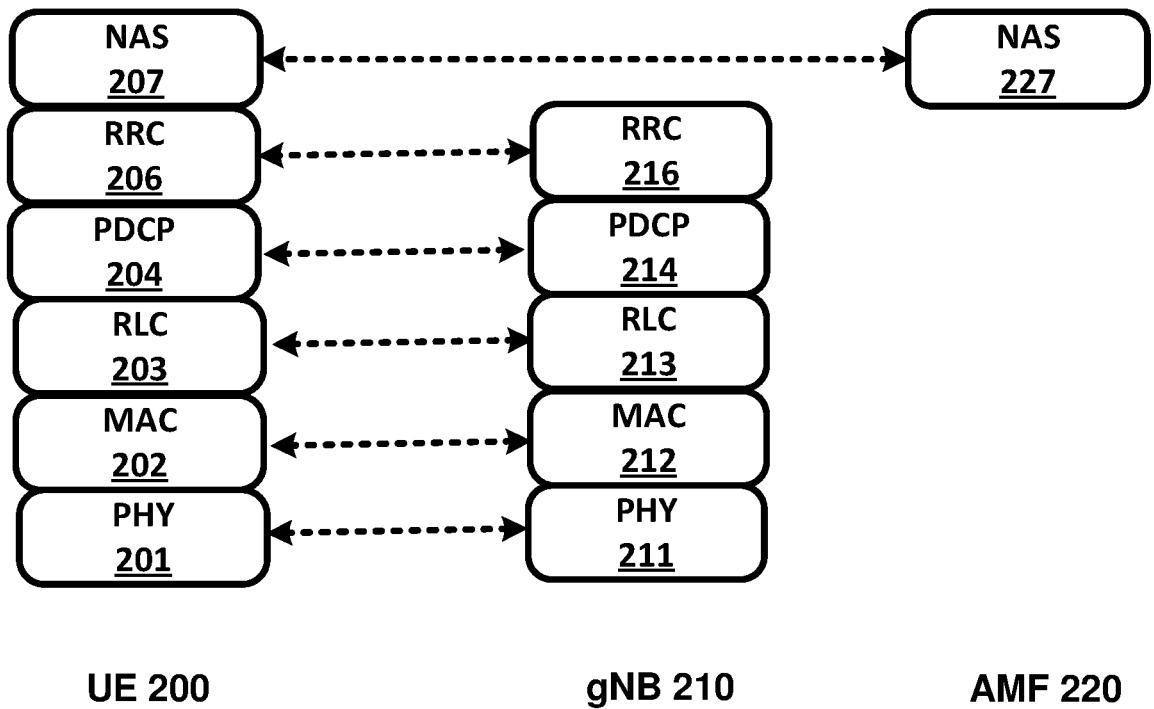

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
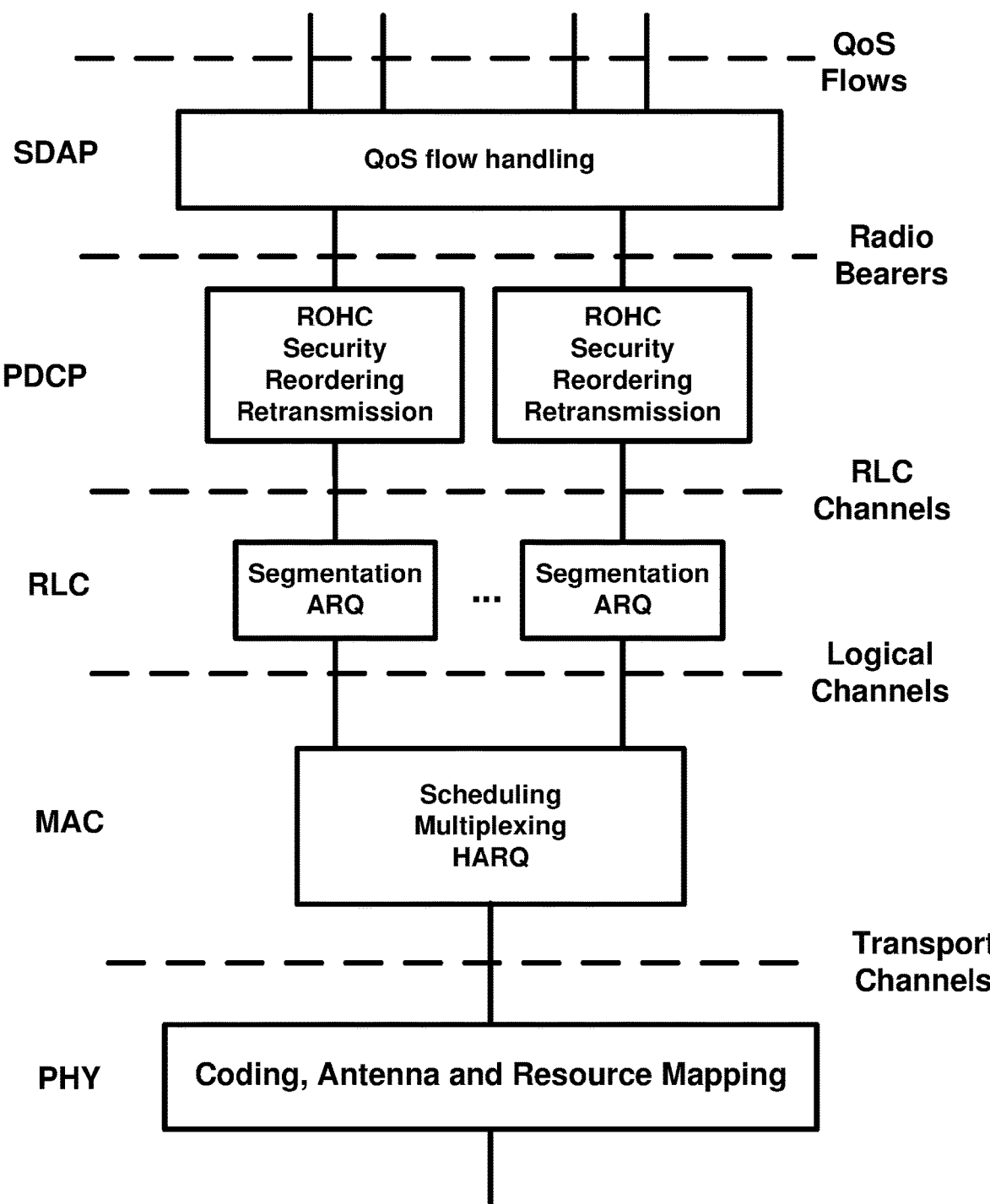
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
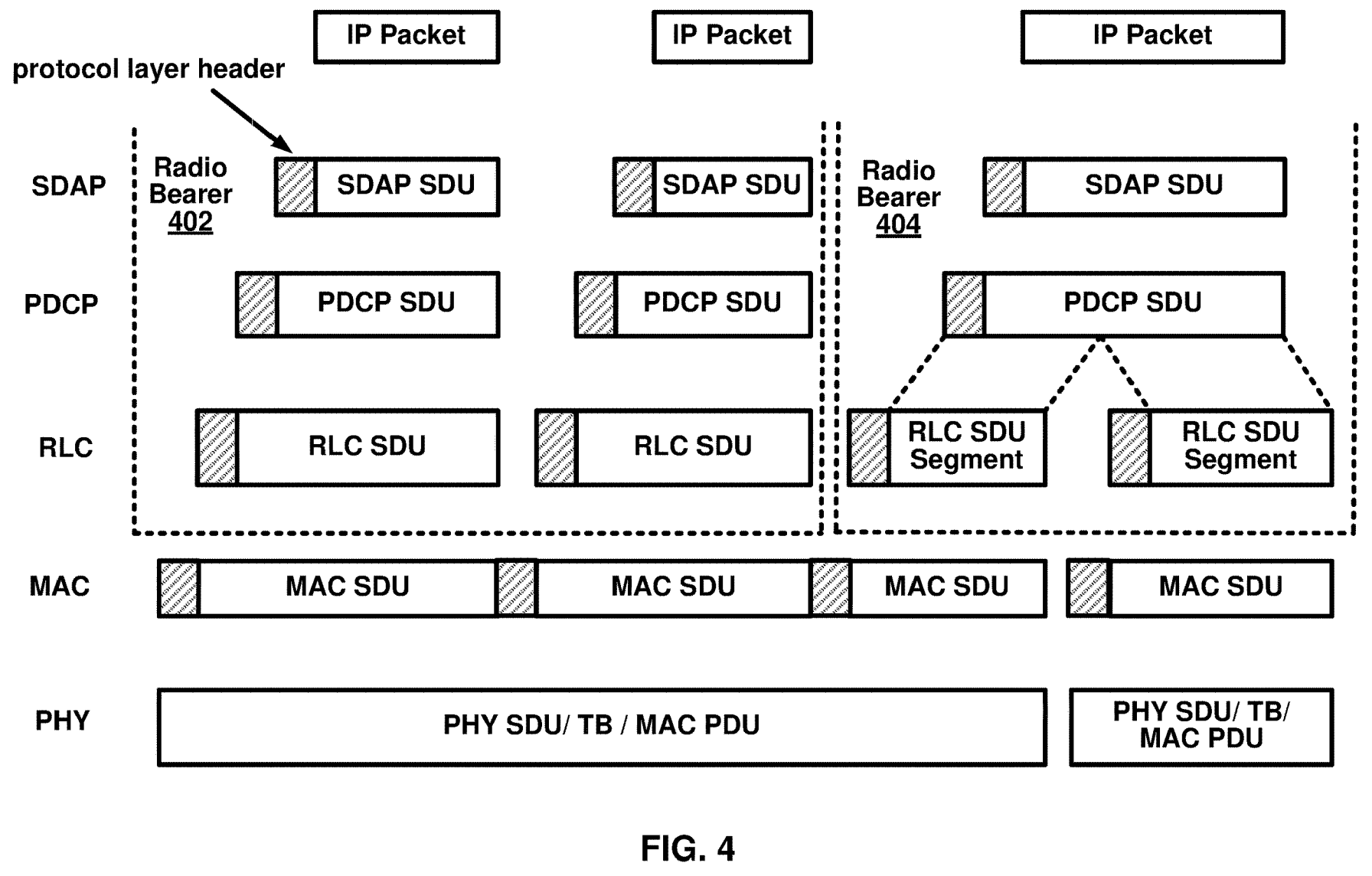

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
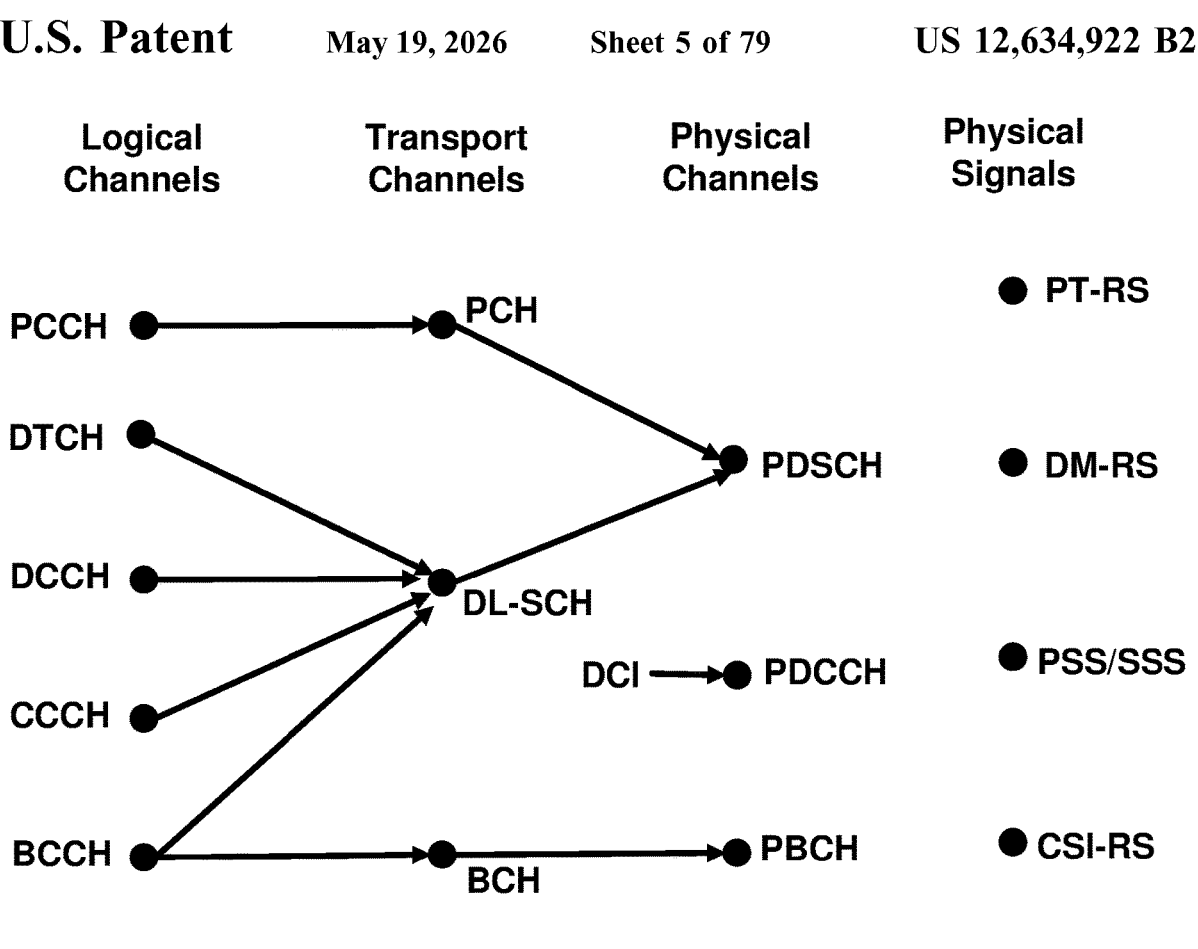
FIG. 5A shows example mapping of channels between layers of the protocol stack and different physical signals in downlink in accordance with several of various embodiments of the present disclosure.
Figure 5B:
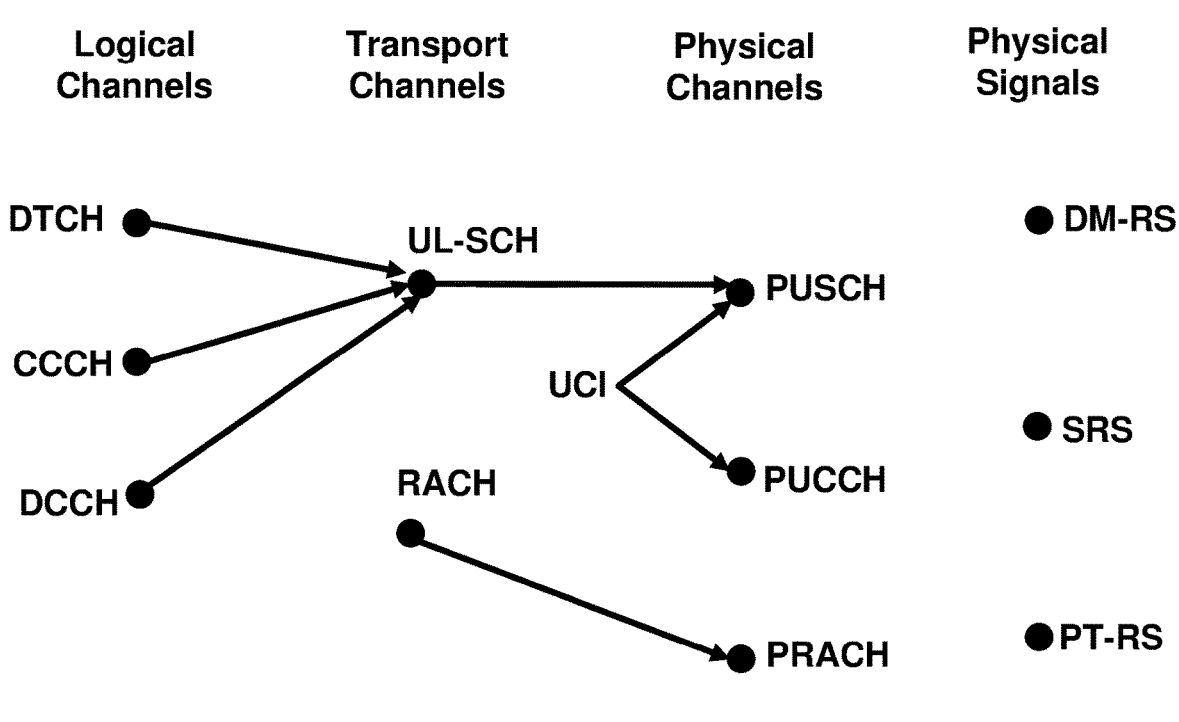
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH)

which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
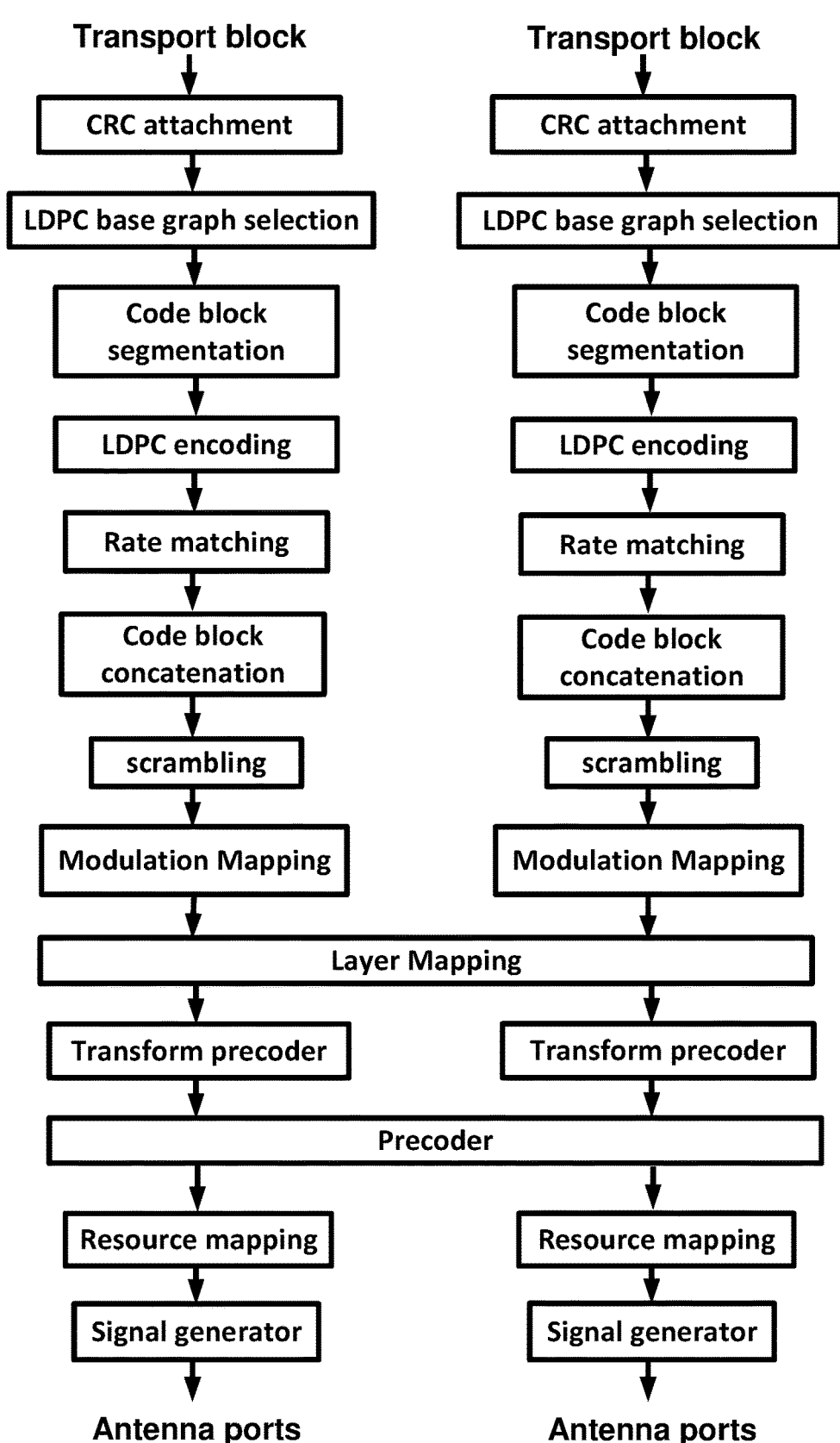
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
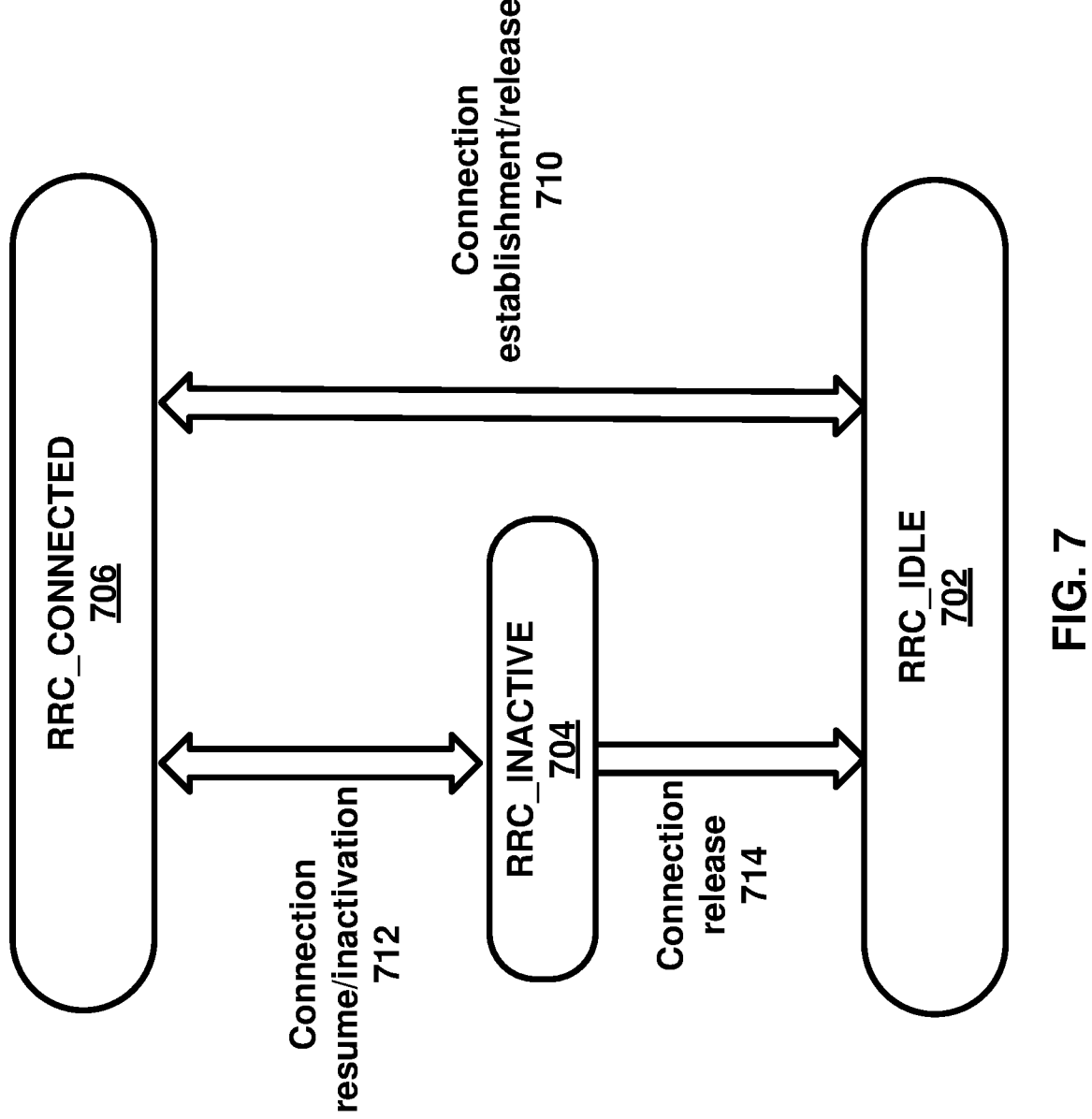
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^{\mu} \cdot 15$ KHz ($\mu$=0, 1, 2, ...). Example subcarrier spacings used in NR include 15 KHz ($\mu$=0), 30 KHz ($\mu$=1), 60 KHz ($\mu$=2), 120 KHz ($\mu$=3) and 240 KHz ($\mu$=4). As discussed before, a duration of OFDM symbol is inversely proportional to the subcarrier spacing and therefor OFDM symbol duration may depend on the numerology (e.g., the $\mu$ value).

Figure 8:
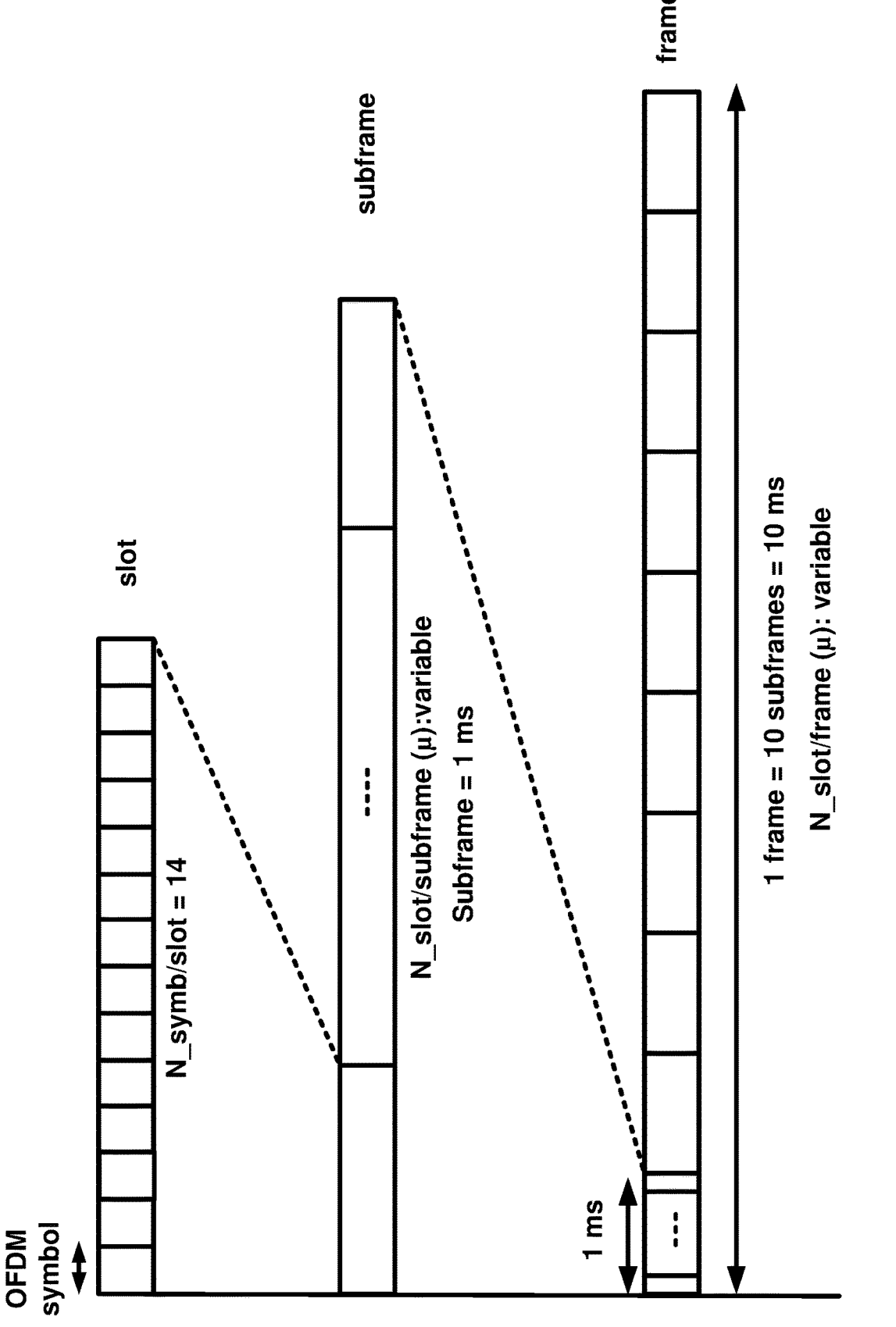
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of $\mu$ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
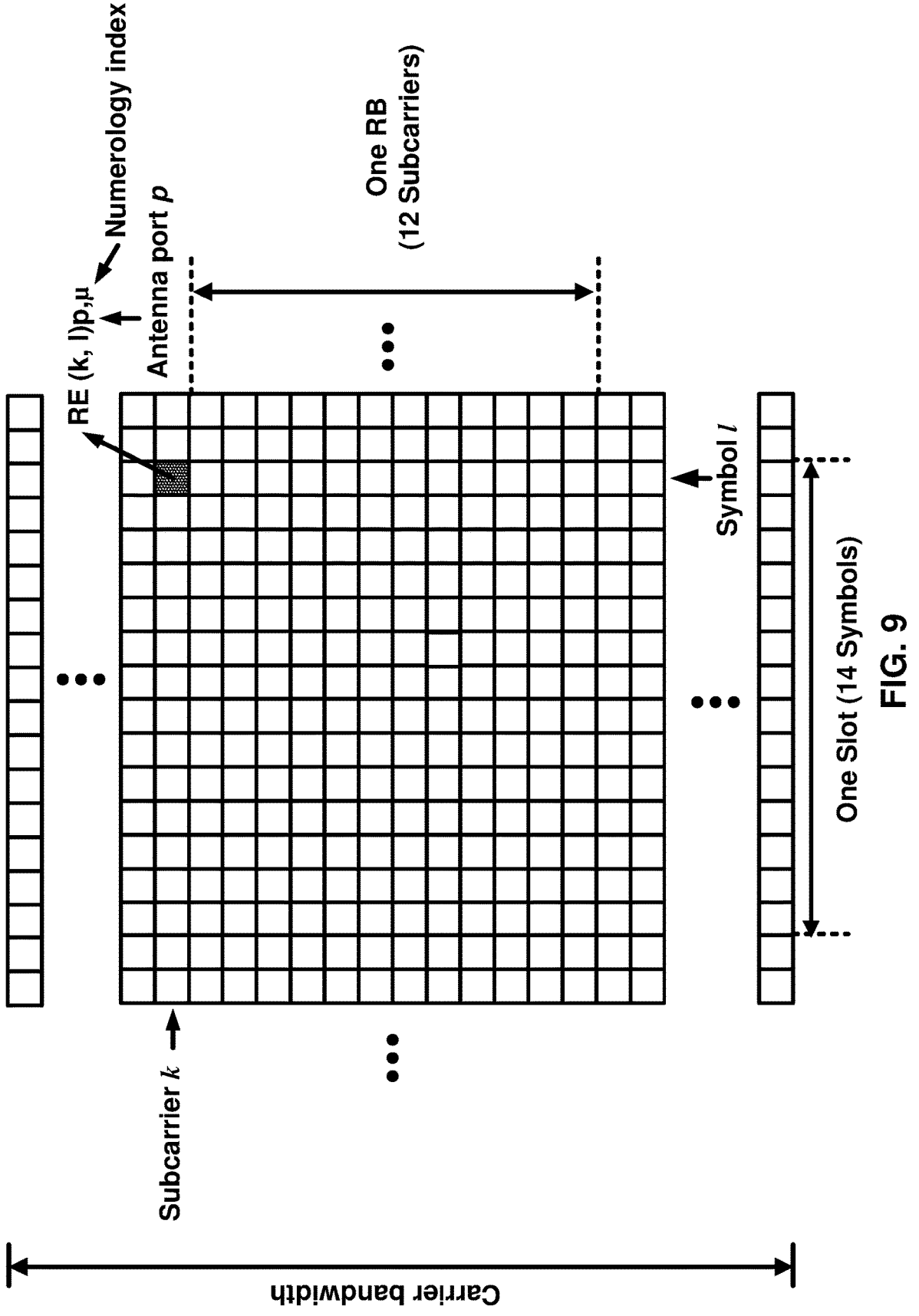
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration $\mu$ may be uniquely identified by $(k,l)_{p,\mu}$ where k is the index of a subcarrier in the frequency domain and 1 may refer to the symbol position in the time domain relative to some reference point. A resource block may be defined as $N_{SC}^{RB}$=12 subcarriers. Since subcarrier spacing depends on the numerology of OFDM transmission, the frequency domain span of a resource block may be variable and may depend on the numerology. For example, for a subcarrier spacing of 15 KHz (e.g., $\mu$=0), a resource block may be 180 KHz and for a subcarrier spacing of 30 KHz (e.g., $\mu$=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
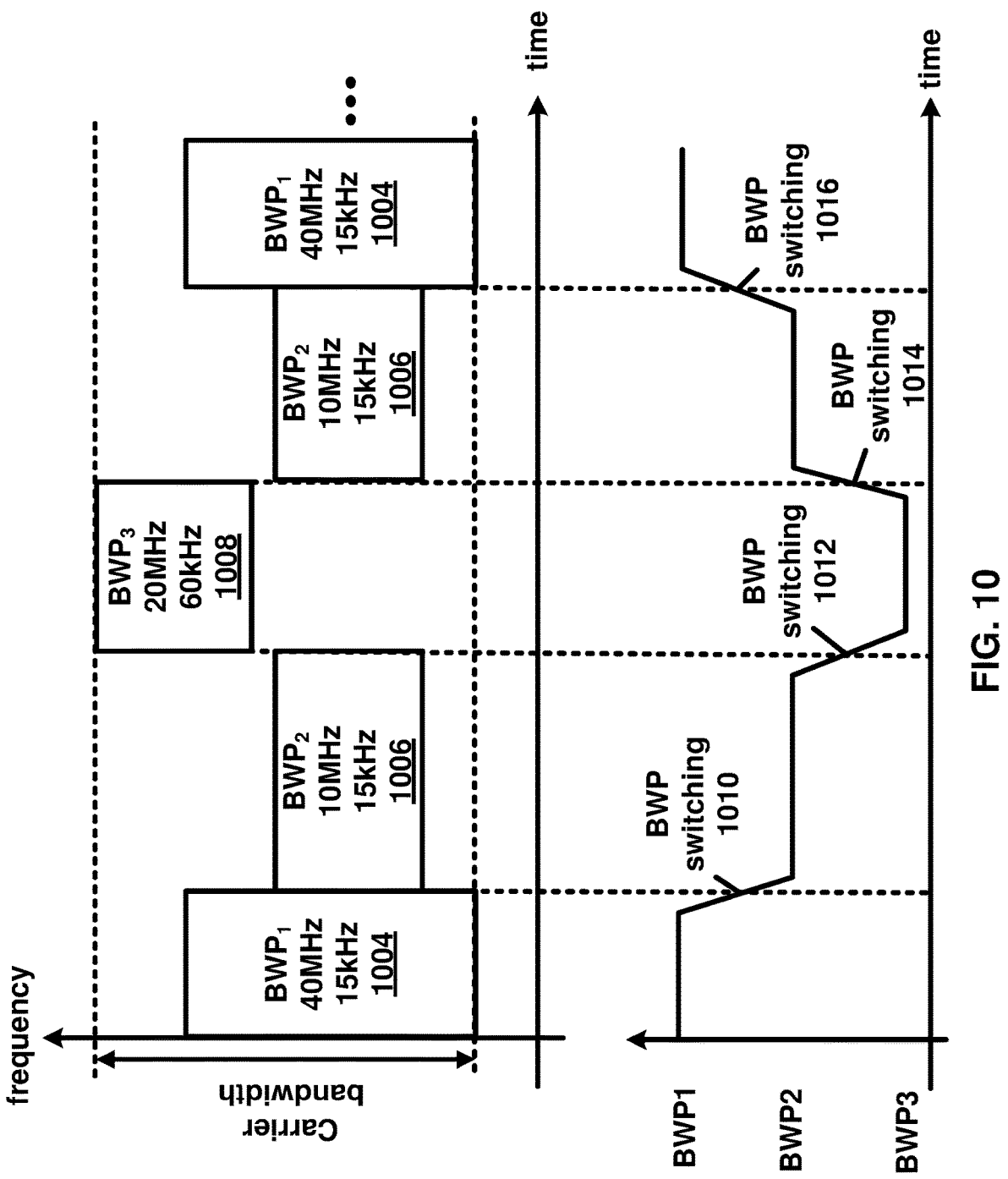
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figures 11A, 11B:
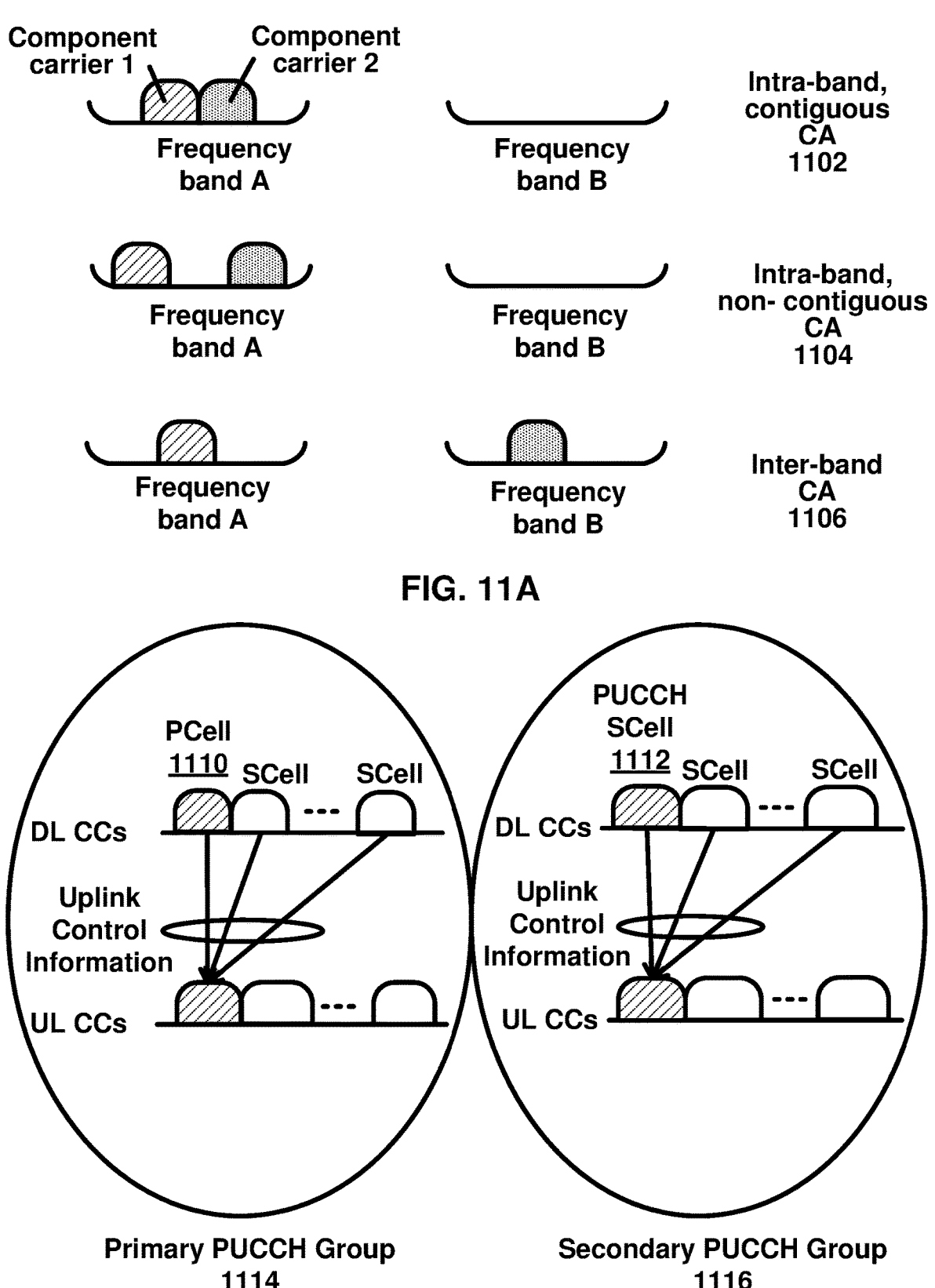
FIG. 11A shows example arrangements of carriers in carrier aggregation in accordance with several of various embodiments of the present disclosure.
FIG. 11B shows examples of uplink control channel groups in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
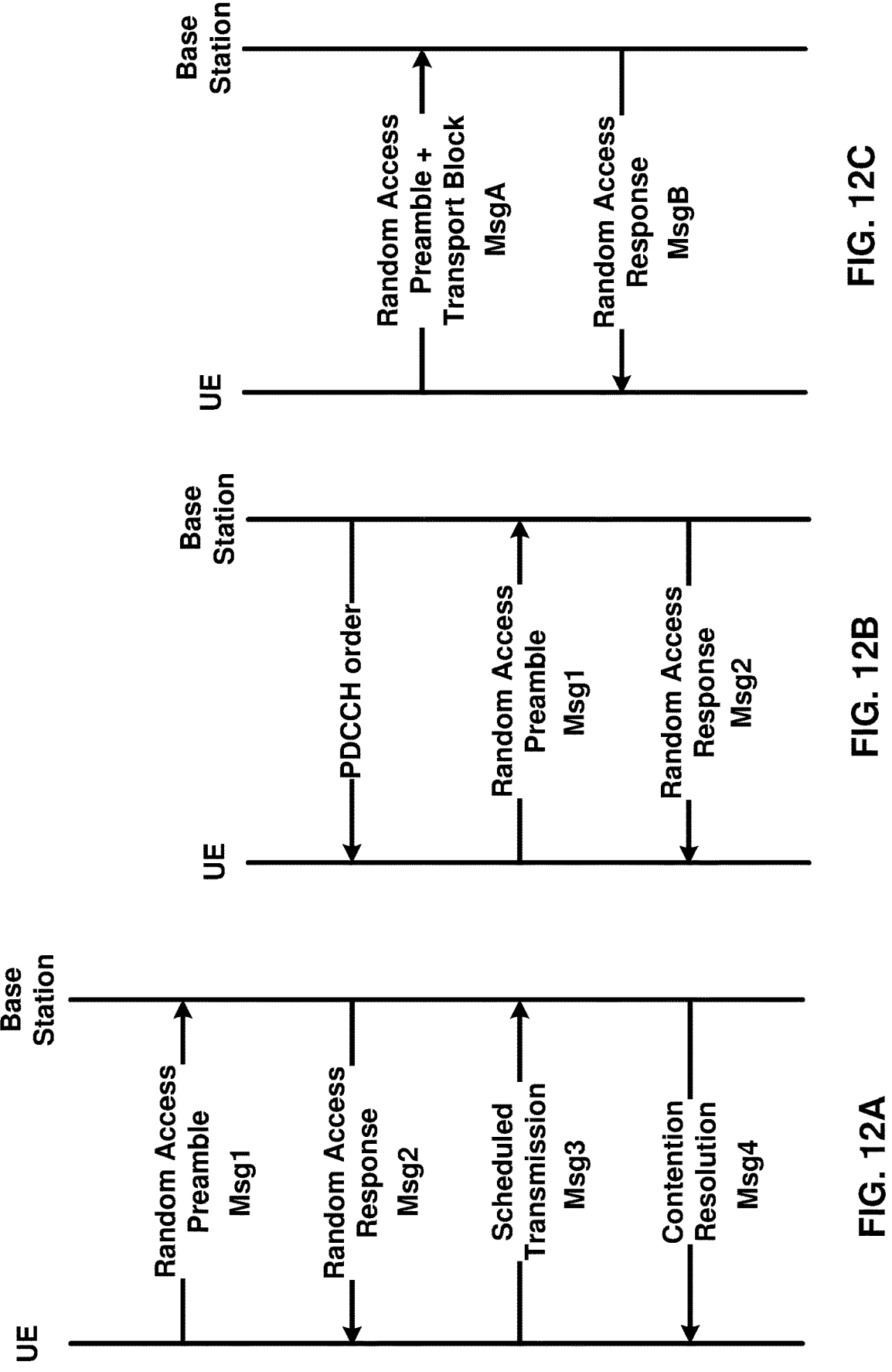
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CBRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
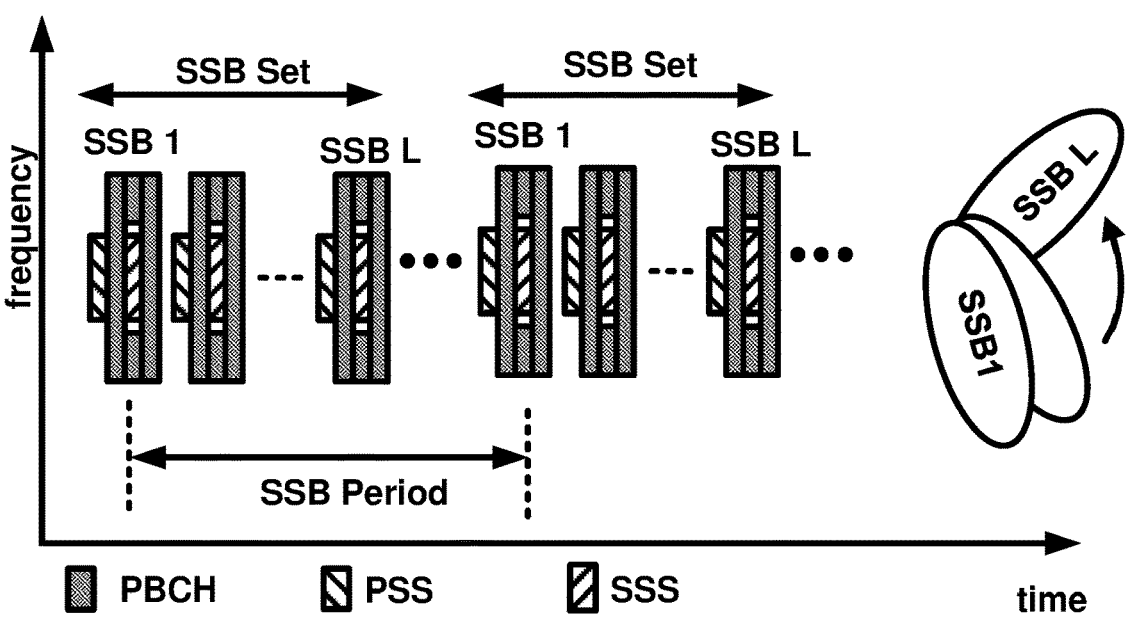
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/De-activation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
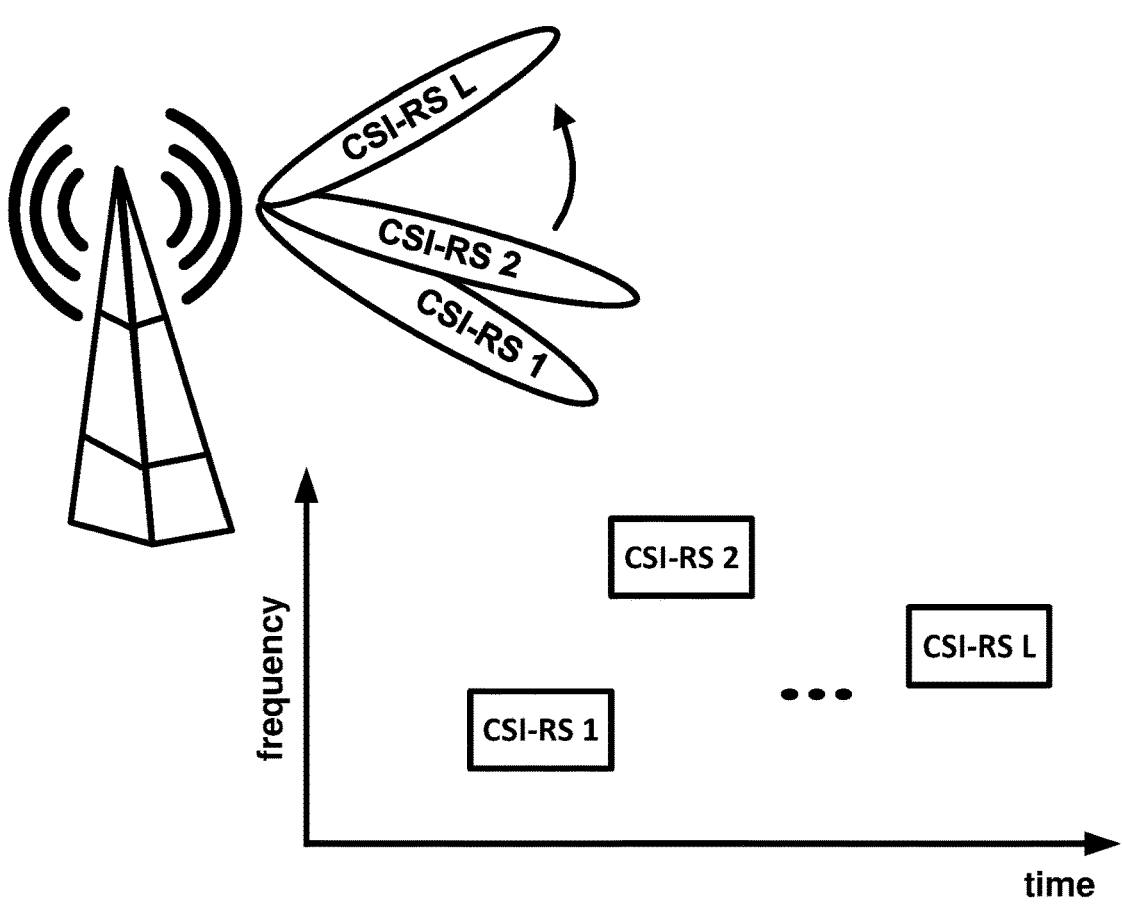
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14C:
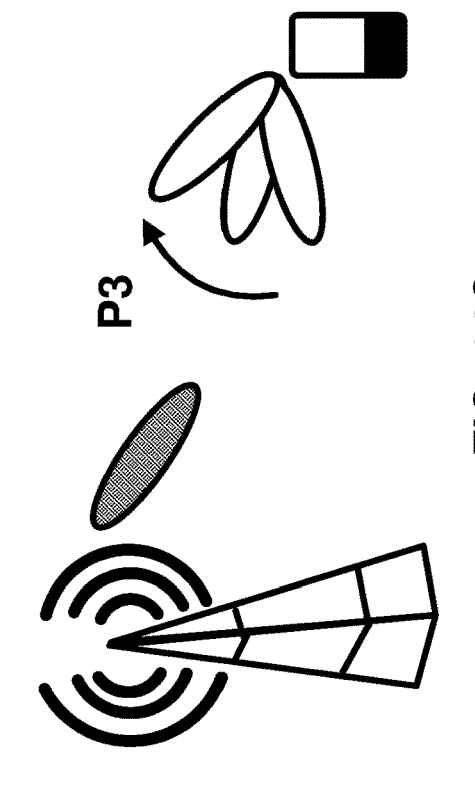
FIG. 14A, FIG. 14B and FIG. 14C show example beam management processes in accordance with several of various embodiments of the present disclosure.
Figure 14A:
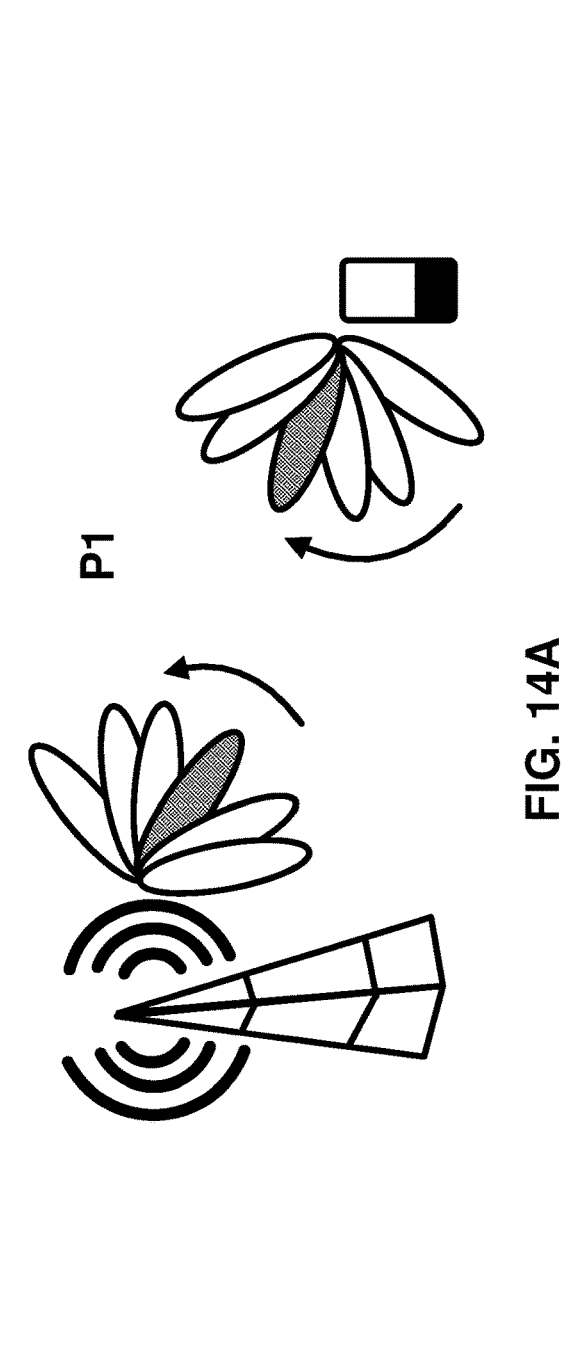
Figure 14B:
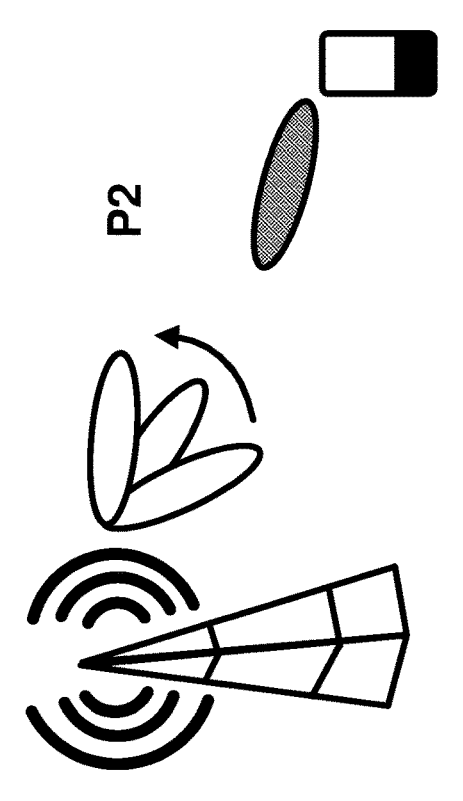

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
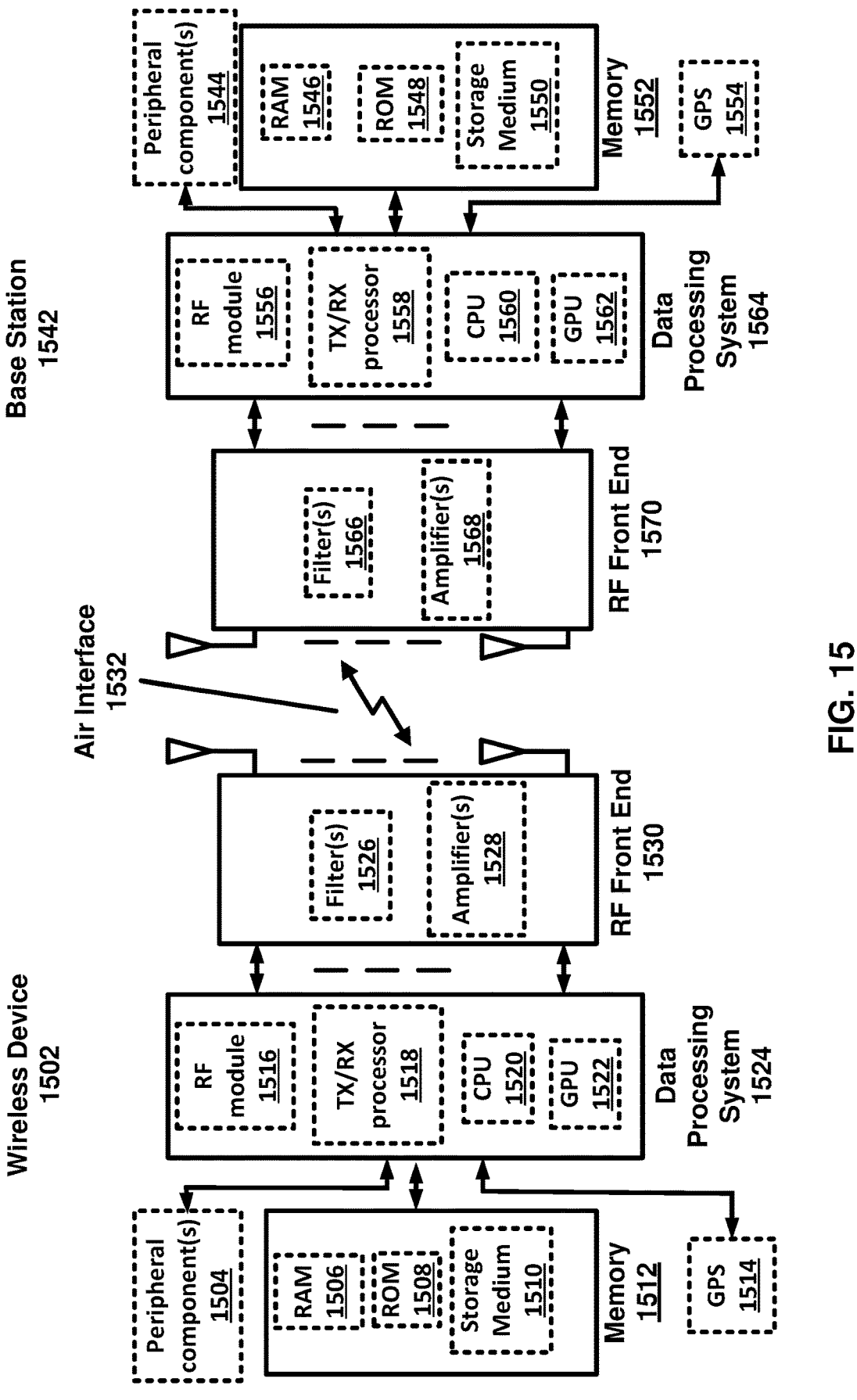
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In example embodiments, various DCI formats may be used for scheduling of physical uplink shared channel(s) (PUSCH(s))/uplink transport block(s) (TB(s)) or physical downlink shared channel(s) (PDSCH(s))/downlink transport block(s) (TB(s)). An example DCI format may be a DCI format 0_0 that may be used for the scheduling of PUSCH in one cell.

In an example, the following information may be transmitted by means of the DCI format 0_0 with CRC scrambled by C-RNTI or CS-RNTI or MCS-C-RNTI: Identifier for DCI formats; Frequency domain resource assignment; Time domain resource assignment; Frequency hopping flag; Modulation and coding scheme; New data indicator; Redundancy version; HARQ process number; TPC command for scheduled PUSCH; ChannelAccess-CPext (e.g., indicating combinations of channel access type and CP extension for operation in a cell with shared spectrum channel access); and UL/SUL indicator.

In an example, the following information may be transmitted by means of the DCI format 0_0 with CRC scrambled by TC-RNTI: Identifier for DCI formats; Frequency domain resource assignment; Time domain resource assignment; Frequency hopping flag; Modulation and coding scheme; New data indicator; Redundancy version; HARQ process number; TPC command for scheduled PUSCH; ChannelAccess-CPext (e.g., indicating combinations of channel access type and CP extension for operation in a cell with shared spectrum channel access); and UL/SUL indicator.

In example embodiments, DCI format 0_1 may be used for the scheduling of one or multiple PUSCH in one cell or indicating configured grant (CG) downlink feedback information (CG-DFI) to a UE.

In an example, the following information may be transmitted by means of the DCI format 0_1 with CRC scrambled by C-RNTI or CS-RNTI or SP-CSI-RNTI or MCS-C-RNTI: Identifier for DCI formats; Carrier indicator; DFI flag; HARQ-ACK bitmap in case DCI format 0_1 is used for indicating CG-DFI; TPC command for scheduled PUSCH; UL/SUL indicator; Bandwidth part indicator; Frequency domain resource assignment; Time domain resource assignment; Frequency hopping flag; Modulation and coding scheme; New data indicator; Redundancy version; HARQ process number; 1st downlink assignment index; 2nd downlink assignment index; TPC command for scheduled PUSCH; SRS resource indicator; Antenna ports; SRS request; CSI request; CBG transmission information (CBGTI); PTRS-DMRS association; beta_offset indicator; DMRS sequence initialization; UL-SCH indicator; ChannelAccess-CPext-CAPC; SCell dormancy indication; and Sidelink assignment index.

In an example, a UE may not expect that the bit width of a field in DCI format 0_1 with CRC scrambled by CS-RNTI to be larger than corresponding bit width of same field in DCI format 0_1 with CRC scrambled by C-RNTI for the same serving cell. If the bit width of a field in the DCI format 0_1 with CRC scrambled by CS-RNTI is not equal to that of the corresponding field in the DCI format 0_1 with CRC scrambled by C-RNTI for the same serving cell, a number of most significant bits with value set to '0' may be inserted to the field in DCI format 0_1 with CRC scrambled by CS-RNTI until the bit width equals that of the corresponding field in the DCI format 0_1 with CRC scrambled by C-RNTI for the same serving cell.

In an example, if the number of information bits in DCI format 0_1 scheduling a single PUSCH prior to padding is not equal to the number of information bits in DCI format 0_1 scheduling multiple PUSCHs for the same serving cell, zeros may be appended to the DCI format 0_1 with smaller size until the payload size is the same for scheduling a single PUSCH and multiple PUSCHs.

In example embodiments, DCI format 0_2 may be used for the scheduling of PUSCH in one cell.

In an example, all or a subset of the following information may be transmitted by means of the DCI format 0_2 with CRC scrambled by C-RNTI or CS-RNTI or SP-CSI-RNTI or MCS-C-RNTI: Identifier for DCI formats; Carrier indicator; UL/SUL indicator; Bandwidth part indicator; Frequency domain resource assignment; Time domain resource assignment; Frequency hopping flag; Modulation and coding scheme; New data indicator; Redundancy version; HARQ process number; Downlink assignment index; TPC command for scheduled PUSCH; SRS resource indicator; Antenna ports; CSI request; PTRS-DMRS association; beta_offset indicator; DMRS sequence initialization; UL-SCH indicator; Open-loop power control parameter set indication; Priority indicator; and Invalid symbol pattern indicator.

In an example, a UE may not expect that the bit width of a field in DCI format 0_2 with CRC scrambled by CS-RNTI to be larger than corresponding bit width of same field in DCI format 0_2 with CRC scrambled by C-RNTI for the same serving cell. If the bit width of a field in the DCI format 0_2 with CRC scrambled by CS-RNTI is not equal to that of the corresponding field in the DCI format 0_2 with CRC scrambled by C-RNTI for the same serving cell, a number of most significant bits with value set to '0' may be inserted to the field in DCI format 0_2 with CRC scrambled by CS-RNTI until the bit width equals that of the corresponding field in the DCI format 0_2 with CRC scrambled by C-RNTI for the same serving cell.

In example embodiments, DCI format 1_0 may be used for the scheduling of PDSCH in one DL cell.

In an example, all or a subset of the following information may be transmitted by means of the DCI format 1_0 with CRC scrambled by C-RNTI or CS-RNTI or MCS-C-RNTI: Identifier for DCI formats; Frequency domain resource assignment; Time domain resource assignment; VRB-to-PRB mapping; Modulation and coding scheme; New data indicator; Redundancy version; HARQ process number; Downlink assignment index; TPC command for scheduled PUCCH; PUCCH resource indicator; PDSCH-to-HARQ_feedback timing indicator; and ChannelAccess-CPext (e.g., indicating combinations of channel access type and CP extension for operation in a cell with shared spectrum channel access).

In example embodiments, DCI format 1_1 may be used for the scheduling of PDSCH in one cell.

In an example, all or a subset of the following information may be transmitted by means of the DCI format 1_1 with CRC scrambled by C-RNTI or CS-RNTI or MCS-C-RNTI: Identifier for DCI formats; Carrier indicator; Bandwidth part indicator; Frequency domain resource assignment; Time domain resource assignment; VRB-to-PRB mapping; PRB bundling size indicator; Rate matching indicator; ZP CSI-RS trigger; Modulation and coding scheme, New data indicator, and Redundancy version for one or more two transport blocks; HARQ process number; Downlink assignment index; TPC command for scheduled PUCCH; PUCCH resource indicator; PDSCH-to-HARQ_feedback timing indicator; One-shot HARQ-ACK request; PDSCH group index; New feedback indicator; Number of requested PDSCH group(s); Antenna port(s); Transmission configuration indication; SRS request; CBG transmission information (CBGTI); CBG flushing out information (CB GFI); DMRS sequence initialization; Priority indicator; ChannelAccess-CPext; Minimum applicable scheduling offset indicator; and SCell dormancy indication.

If DCI formats 1_1 are monitored in multiple search spaces associated with multiple CORESETs in a BWP for scheduling the same serving cell, zeros shall be appended until the payload size of the DCI formats 1_1 monitored in the multiple search spaces equal to the maximum payload size of the DCI format 1_1 monitored in the multiple search spaces.

In example embodiments, DCI format 1_2 may be used for the scheduling of PDSCH in one cell.

In an example, all or a subset of the following information may be transmitted by means of the DCI format 1_2 with CRC scrambled by C-RNTI or CS-RNTI or MCS-C-RNTI: Identifier for DCI formats; Carrier indicator; Bandwidth part indicator; Frequency domain resource assignment; Time domain resource assignment; VRB-to-PRB mapping; PRB bundling size indicator; Rate matching indicator; ZP CSI-RS trigger; Modulation and coding scheme; New data indicator; Redundancy version; HARQ process number; Downlink assignment index; TPC command for scheduled PUCCH; PUCCH resource indicator; PDSCH-to-HARQ_feedback timing indicator; Antenna port(s); Transmission configuration indication; SRS request; DMRS sequence initialization; and Priority indicator.

In an example, if DCI formats 1_2 are monitored in multiple search spaces associated with multiple CORESETs in a BWP for scheduling the same serving cell, zeros may be appended until the payload size of the DCI formats 1_2 monitored in the multiple search spaces equal to the maximum payload size of the DCI format 1_2 monitored in the multiple search spaces.

In an example, a wireless device may be configured with a list of up to M TCI-State configurations within the higher layer parameter PDSCH-Config to decode PDSCH according to a detected PDCCH with DCI intended for the UE and the given serving cell, where M may depend on the UE capability (e.g., maxNumberConfiguredTCIstatesPerCC). A TCI-State may contain parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship may be configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to a DL RS may be given by a higher layer parameter (e.g., qcl-Type in QCL-Info) and may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}.

In an example, a wireless device may receive an activation command used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs may be determined by indicated CC in the activation command, the same set of TCI state IDs may be applied for DL BWPs in the indicated CCs.

In an example, when a wireless device supports two TCI states in a codepoint of the DCI field 'Transmission Configuration Indication' the UE may receive an activation command, the activation command may be used to map up to 8 combinations of one or two TCI states to the codepoints of the DCI field 'Transmission Configuration Indication'. In an example, the wireless device may not be expected to receive more than 8 TCI states in the activation command.

In an example, when the wireless device would transmit a PUCCH with HARQ-ACK information in slot n corresponding to the PDSCH carrying the activation command, the indicated mapping between TCI states and codepoints of the DCI field 'Transmission Configuration Indication' may be applied starting from the first slot that is after slot $$n + 3N_{slot}^{subframe,\mu}$$

where $\mu$ is the subcarrier spacing (SCS) configuration for the PUCCH. If tci-PresentInDCI is set to "enabled" or tci-PresentForDCI-Format1-2-r16 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

In an example, if a wireless device is configured with the higher layer parameter tci-PresentInDCI that is set as 'enabled' for the CORESET scheduling the PDSCH, the wireless device may assume that the TCI field is present in the DCI format 1_1 of the PDCCH transmitted on the CORESET. If a wireless device is configured with the higher layer parameter tci-PresentForDCI-Format1-2-r16 for the CORESET scheduling the PDSCH, the wireless device may assume that the TCI field with a DCI field size indicated by tci-PresentForDCI-Format1-2-r16 is present in the DCI format 1_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability, for determining PDSCH antenna port quasi co-location, the wireless device may assume that the TCI state or the QCL assumption for the PDSCH is identical to the TCI state or QCL assumption whichever is applied for the CORESET used for the PDCCH transmission within the active BWP of the serving cell.

In an example, if the PDSCH is scheduled by a DCI format having the TCI field present, the TCI field in DCI in the scheduling component carrier may point to the activated TCI states in the scheduled component carrier or DL BWP, the UE may use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold may be based on reported UE capability. When the UE is configured with a single slot PDSCH, the indicated TCI state may be based on the activated TCI states in the slot with the scheduled PDSCH. When the UE is configured with a multi-slot PDSCH, the indicated TCI state may be based on the activated TCI states in the first slot with the scheduled PDSCH, and UE may expect the activated TCI states are the same across the slots with the scheduled PDSCH. When the UE is configured with CORESET associated with a search space set for cross-carrier scheduling and the UE is not configured with enableDefaultBeamForCSS, the UE may expect tci-PresentInDCI is set as 'enabled' or tci-PresentForDCI-Format1-2-r16 is configured for the CORESET, and if one or more of the TCI states configured for the serving cell scheduled by the search space set contains 'QCL-TypeD', the UE may expect the time offset between the reception of the detected PDCCH in the search space set and the corresponding PDSCH is larger than or equal to the threshold timeDurationForQCL.

In an example, the network may activate and deactivate the configured TCI states for PDSCH of a Serving Cell or a set of Serving Cells configured in a simultaneousTCI-UpdateList1 or simultaneousTCI-UpdateList2 by sending the TCI States Activation/Deactivation for UE-specific PDSCH MAC CE. The network may activate and deactivate the configured TCI states for a codepoint of the DCI Transmission configuration indication field for PDSCH of a Serving Cell by sending the Enhanced TCI States Activation/Deactivation for UE-specific PDSCH MAC CE. The configured TCI states for PDSCH may be initially deactivated upon configuration and after a handover.

In an example, if the MAC entity receives a TCI States Activation/Deactivation for UE-specific PDSCH MAC CE on a Serving Cell: the MAC entity may indicate to lower layers the information regarding the TCI States Activation/Deactivation for UE-specific PDSCH MAC CE.

In an example, if the MAC entity receives an Enhanced TCI States Activation/Deactivation for UE-specific PDSCH MAC CE on a Serving Cell: the MAC entity may indicate to lower layers the information regarding the Enhanced TCI States Activation/Deactivation for UE-specific PDSCH MAC CE.

In an example, the network may indicate a TCI state for PDCCH reception for a CORESET of a Serving Cell or a set of Serving Cells configured in simultaneousTCI-UpdateList1 or simultaneousTCI-UpdateList2 by sending the TCI State Indication for UE-specific PDCCH MAC CE.

In an example, if the MAC entity receives a TCI State Indication for UE-specific PDCCH MAC CE on a Serving Cell: the MAC entity may indicate to lower layers the information regarding the TCI State Indication for UE-specific PDCCH MAC CE.

In an example, a TCI States Activation/Deactivation for UE-specific PDSCH MAC CE may be identified by a MAC subheader with an associated LCID. It may have a variable size. An example TCI States Activation/Deactivation for UE-specific PDSCH MAC CE is shown in FIG. 16. A Serving Cell ID field may indicate the identity of the Serving Cell for which the MAC CE applies. The length of the field may be 5 bits. If the indicated Serving Cell is configured as part of a simultaneousTCI-UpdateList1 or simultaneousTCI-UpdateList2, this MAC CE may apply to all the Serving Cells configured in the set simultaneousTCI-UpdateList1 or simultaneousTCI-UpdateList2, respectively. A BWP ID field may indicate a DL BWP for which the MAC CE applies as the codepoint of the DCI bandwidth part indicator field. The length of the BWP ID field may be 2 bits. This field may be ignored if this MAC CE applies to a set of Serving Cells. A Ti may be used as follows: if there is a TCI state with TCI-StateId i, this field may indicate the activation/deactivation status of the TCI state with TCI-StateId i, otherwise MAC entity may ignore the Ti field. The Ti field may be set to 1 to indicate that the TCI state with TCI-StateId i may be activated and mapped to the codepoint of the DCI Transmission Configuration Indication field. The Ti field may be set to 0 to indicate that the TCI state with TCI-StateId i may be be deactivated and may not be mapped to the codepoint of the DCI Transmission Configuration Indication field. The codepoint to which the TCI State is mapped may be determined by its ordinal position among all the TCI States with Ti field set to 1, e.g., the first TCI State with Ti field set to 1 may be mapped to the codepoint value 0, second TCI State with Ti field set to 1 may be mapped to the codepoint value 1 and so on. The maximum number of activated TCI states may be 8. A CORESET Pool ID field may indicate that mapping between the activated TCI states and the codepoint of the DCI Transmission Configuration Indication set by field Ti is specific to the ControlResource-SetId configured with CORESET Pool ID. This field set to 1 may indicate that this MAC CE may be applied for the DL transmission scheduled by CORESET with the CORESET pool ID equal to 1, otherwise, this MAC CE may be applied for the DL transmission scheduled by CORESET pool ID equal to 0. If the coresetPoolIndex is not configured for any CORESET, MAC entity may ignore the CORESET Pool ID field in this MAC CE when receiving the MAC CE. If the Serving Cell in the MAC CE is configured in a cell list that contains more than one Serving Cell, the CORSET Pool ID field may be ignored when receiving the MAC CE.

Figure 17:
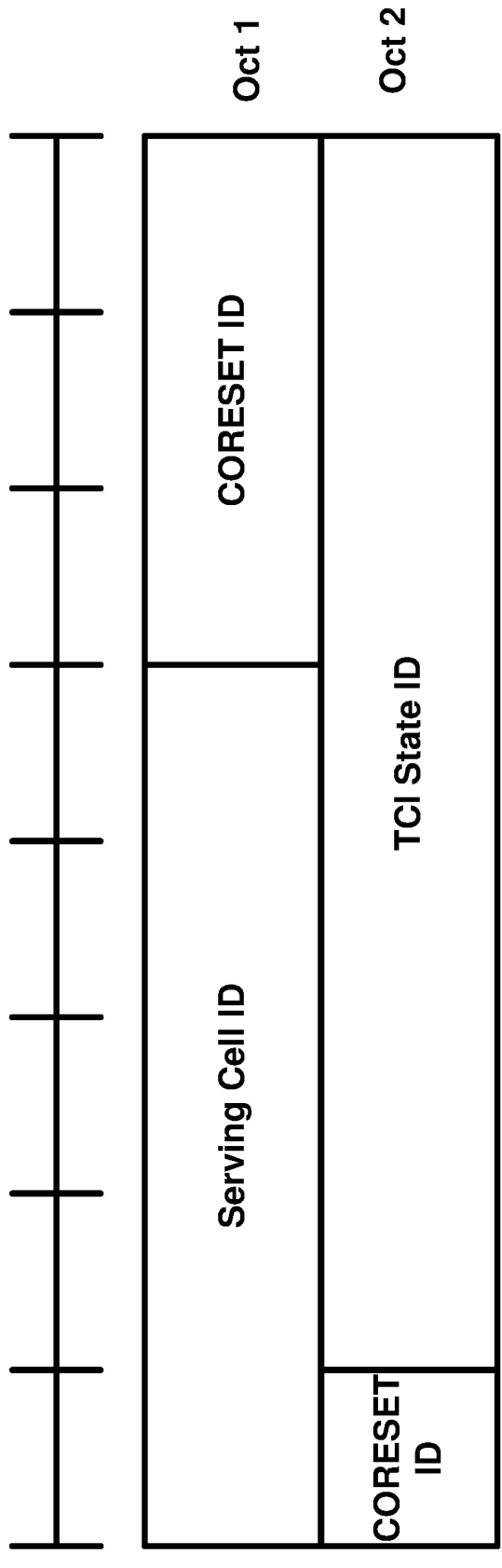
FIG. 17 shows an example MAC CE format in accordance with several of various embodiments of the present disclosure.

In an example, a TCI State Indication for UE-specific PDCCH MAC CE may be identified by a MAC subheader with associated LCID. It may have a fixed size of 16. An example TCI State Indication for UE-specific PDCCH MAC CE is shown in FIG. 17. A Serving Cell ID field may indicate the identity of the Serving Cell for which the MAC CE applies. The length of the field may be 5 bits. If the indicated Serving Cell is configured as part of a simultaneousTCI-UpdateList1 or simultaneousTCI-UpdateList2, this MAC CE may apply to all the Serving Cells in the set simultaneousTCI-UpdateList1 or simultaneousTCI-UpdateList2, respectively. A CORESET ID field may indicate a Control Resource Set identified with ControlResourceSetId, for which the TCI State is being indicated. In case the value of the field is 0, the field may refer to the Control Resource Set configured by controlResourceSetZero. The length of the field may be 4 bits. A TCI State ID field may indicate the TCI state identified by TCI-StateId applicable to the Control Resource Set identified by CORESET ID field. If the field of CORESET ID is set to 0, this field may indicate a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field may indicate a TCI-StateId configured by tci-StatesPDCCH-ToAddList and tci-StatesPDCCH-ToReleaseList in the controlResourceSet identified by the indicated CORESET ID. The length of the field may be 7 bits.

In an example, the MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When in RRC_CONNECTED, if DRX is configured, for the activated Serving Cells, the MAC entity may monitor the PDCCH discontinuously using the DRX operation.

In an example, RRC may control DRX operation by configuring the following parameters: drx-onDuration-Timer: the duration at the beginning of a DRX cycle; drx-SlotOffset: the delay before starting the drx-onDuration-Timer; drx-InactivityTimer: the duration after the PDCCH occasion in which a PDCCH indicates a new UL or DL transmission for the MAC entity; drx-RetransmissionTimerDL (per DL HARQ process except for the broadcast process): the maximum duration until a DL retransmission is received; drx-RetransmissionTimerUL (per UL HARQ process): the maximum duration until a grant for UL retransmission is received; drx-LongCycleStartOffset: the Long DRX cycle and drx-StartOffset which may define the subframe where the Long and Short DRX cycle starts; drx-ShortCycle (optional): the Short DRX cycle; drx-ShortCycleTimer (optional): the duration the UE may follow the Short DRX cycle; drx-HARQ-RTT-TimerDL (per DL HARQ process except for the broadcast process): the minimum duration before a DL assignment for HARQ retransmission may be expected by the MAC entity; drx-HARQ-RTT-TimerUL (per UL HARQ process): the minimum duration before a UL HARQ retransmission grant may be expected by the MAC entity.

In an example, serving Cells of a MAC entity may be configured by RRC in two DRX groups with separate DRX parameters. When RRC does not configure a secondary DRX group, there may be only one DRX group and Serving Cells belong to that one DRX group. When two DRX groups are configured, a Serving Cell may be uniquely assigned to either of the two groups. In an example, the DRX parameters that are separately configured for each DRX group may be: drx-onDurationTimer, drx-InactivityTimer. In an example, the DRX parameters that are common to the DRX groups may be: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In an example, when a DRX cycle is configured, the Active Time for Serving Cells in a DRX group may include the time while: drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer or msgB-ResponseWindow is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment: the MAC entity may start the drx-HARQ-RTT-TimerDL for the corresponding HARQ process in the first symbol after the end of the corresponding transmission carrying the DL HARQ feedback. The MAC entity may stop the drx-RetransmissionTimerDL for the corresponding HARQ process.

In an example, when DRX is configured, if a MAC PDU is transmitted in a configured uplink grant and LBT failure indication is not received from lower layers: the MAC entity may start the drx-HARQ-RTT-TimerUL for the corresponding HARQ process in the first symbol after the end of the first repetition of the corresponding PUSCH transmission. The MAC entity may stop the drx-RetransmissionTimerUL for the corresponding HARQ process.

In an example, when DRX is configured, if a drx-HARQ-RTT-TimerDL expires: if the data of the corresponding HARQ process was not successfully decoded: the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires: the MAC entity may start the drx-RetransmissionTimerUL for the corresponding HARQ process in the first symbol after the expiry of drx-HARQ-RTT-TimerUL.

In an example, when DRX is configured, if a DRX Command MAC CE or a Long DRX Command MAC CE is received: the MAC entity may stop drx-onDurationTimer for each DRX group. The MAC entity may stop drx-InactivityTimer for each DRX group.

In an example, when DRX is configured, if drx-InactivityTimer for a DRX group expires: if the Short DRX cycle is configured: the MAC entity may start or restart drx-ShortCycleTimer for this DRX group in the first symbol after the expiry of drx-InactivityTimer; and the MAC entity may use the Short DRX cycle for this DRX group. Otherwise if the Short DRX cycle is not configured: the MAC entity may use the Long DRX cycle for this DRX group.

In an example, when DRX is configured, if a DRX Command MAC CE is received: if the Short DRX cycle is configured: the MAC entity may start or restart drx-ShortCycleTimer for each DRX group in the first symbol after the end of DRX Command MAC CE reception; and the MAC entity may use the Short DRX cycle for each DRX group. Otherwise, the MAC entity may use the Long DRX cycle for each DRX group.

In an example, when DRX is configured, if drx-ShortCycleTimer for a DRX group expires: the MAC entity may use the Long DRX cycle for this DRX group.

In an example, when DRX is configured, if a Long DRX Command MAC CE is received: the MAC entity may stop drx-ShortCycleTimer for each DRX group. The MAC entity may use the Long DRX cycle for each DRX group.

In an example, when DRX is configured, if the Short DRX cycle is used for a DRX group, and [(SFN×10)+subframe number] modulo (drx-ShortCycle)=(drx-StartOffset) modulo (drx-ShortCycle): the MAC entity may start drx-onDurationTimer for this DRX group after drx-SlotOffset from the beginning of the subframe.

In an example, when DRX is configured, if a DRX group is in Active Time: the MAC entity may monitor the PDCCH on the Serving Cells in this DRX group. If the PDCCH indicates a DL transmission: the MAC entity may start the drx-HARQ-RTT-TimerDL for the corresponding HARQ process in the first symbol after the end of the corresponding transmission carrying the DL HARQ feedback. The MAC entity may stop the drx-RetransmissionTimerDL for the corresponding HARQ process. If the PDSCH-to-HARQ_feedback timing indicate a non-numerical kl value, the MAC entity may start the drx-RetransmissionTimerDL in the first symbol after the PDSCH transmission for the corresponding HARQ process.

In an example, when DRX is configured, when DRX is configured, if a DRX group is in Active Time: the MAC entity may monitor the PDCCH on the Serving Cells in this DRX group. If the PDCCH indicates a UL transmission: the MAC entity may start the drx-HARQ-RTT-TimerUL for the corresponding HARQ process in the first symbol after the end of the first repetition of the corresponding PUSCH transmission. The MAC entity may stop the drx-RetransmissionTimerUL for the corresponding HARQ process.

In an example, when DRX is configured, when DRX is configured, if a DRX group is in Active Time: the MAC entity may monitor the PDCCH on the Serving Cells in this DRX group. If the PDCCH indicates a new transmission (DL or UL) on a Serving Cell in this DRX group: the MAC entity may start or restart drx-InactivityTimer for this DRX group in the first symbol after the end of the PDCCH reception.

In an example, when DRX is configured, when DRX is configured, if a DRX group is in Active Time: the MAC entity may monitor the PDCCH on the Serving Cells in this DRX group. If a HARQ process receives downlink feedback information and acknowledgement is indicated: the MAC entity may stop the drx-RetransmissionTimerUL for the corresponding HARQ process.

In an example, when DRX is configured, when DRX is configured

In an example, regardless of whether the MAC entity is monitoring PDCCH or not on the Serving Cells in a DRX group, the MAC entity may transmit HARQ feedback, aperiodic CSI on PUSCH, and aperiodic SRS on the Serving Cells in the DRX group when such is expected.

In an example, a CellGroupConfig IE may be used to configure a master cell group (MCG) or secondary cell group (SCG). A cell group may comprise of one MAC entity, a set of logical channels with associated RLC entities and of a primary cell (SpCell) and one or more secondary cells (SCells). In an example, a simultaneousTCI-UpdateList1, or simultaneousTCI-UpdateList2 may indicate a list of serving cells which may be updated simultaneously for TCI relation with a MAC CE. The simultaneousTCI-UpdateList1 and simultaneousTCI-UpdateList2 may not contain same serving cells. In an example, network may not configure serving cells that are configured with a BWP with two different values for the coresetPoolIndex in these lists.

In an example, an IE ControlResourceSet may be used to configure a time/frequency control resource set (CORESET) in which to search for downlink control information. A controlResourceSetId field may identify the instance of the ControlResourceSet IE. A coresetPoolIndex may indicate an index of the CORESET pool for this CORESET. A duration field may indicate contiguous time duration of the CORE-SET in number of symbols. A frequencyDomainResources field may indicate frequency domain resources for the CORESET. A tci-StatesPDCCH-ToAddList field may indicate a subset of the TCI states defined in pdsch-Config included in the BWP-DownlinkDedicated corresponding to the serving cell and to the DL BWP to which the Control-ResourceSet belong to. They may be used for providing QCL relationships between the DL RS(s) in one RS Set (TCI-State) and the PDCCH DMRS ports. The network may configure at most maxNrofTCI-StatesPDCCH entries.

A ControlResourceSetId IE may concern a short identity, used to identify a control resource set within a serving cell. The ControlResourceSetId=0 may identify the ControlResourceSet #0 configured via PBCH (MIB) and in controlResourceSetZero (ServingCellConfigCommon).

In an example, a PDCCH-Config IE may be used to configure UE specific PDCCH parameters such as control resource sets (CORESET), search spaces and additional parameters for acquiring the PDCCH. In an example, if this IE is used for the scheduled cell in case of cross carrier scheduling, the fields other than searchSpacesToAddModList and searchSpacesToReleaseList may be absent. In an example, if the IE is used for a dormant BWP, the fields other than controlResourceSetToAddModList and controlResourceSetToReleaseList may be absent. The fields controlResourceSetToAddModList and controlResourceSetToAddModList2I may indicate a list of UE specifically configured Control Resource Sets (CORESETs) to be used by the UE.

In an example, an IE SearchSpace may define how/where to search for PDCCH candidates. A search space may be associated with one ControlResourceSet. A controlResourceSetId field may indicate the CORESET applicable for this SearchSpace. A common field may configure this search space as common search space (CSS) and DCI formats to monitor. A duration field may indicate a number of consecutive slots that a SearchSpace lasts in every occasion, i.e., upon every period as given in the periodicityAndOffset. A searchSpaceType may indicate whether this is a common search space or a UE specific search space as well as DCI formats to monitor for. A searchSpaceId field may indicate an identity of the search space.

An IE SearchSpaceId may be used to identify Search Spaces. The ID space is used across the BWPs of a Serving Cell. The search space with the SearchSpaceId=0 may identify the search space configured via PBCH (MIB) and in ServingCellConfigCommon (searchSpaceZero).

In an example, an IE CrossCarrierSchedulingConfig may be used to specify the configuration when the cross-carrier scheduling is used in a cell. A cif-Presence field may indicate whether carrier indicator field is present (value true) or not (value false) in PDCCH DCI formats. If cif-Presence is set to true, the CIF value indicating a grant or assignment for this cell may be 0. A cif-InSchedulingCell field may indicate the CIF value used in the scheduling cell to indicate a grant or assignment applicable for this cell. A other field may indicate parameters for cross-carrier scheduling. A own field may indicate parameters for self-scheduling. A scheduling-CellId field may indicate which cell signals the downlink allocations and uplink grants, if applicable, for the concerned cell. In case the UE is configured with dual connectivity (DC), the scheduling cell may be part of the same cell group (i.e. MCG or SCG) as the scheduled cell. If drx-ConfigSecondaryGroup is configured in the MAC-Cell-GroupConfig associated with this serving cell, the scheduling cell and the scheduled cell may belong to the same Frequency Range.

In an example, an IE FeatureSetDownlink may indicate a set of features that the UE supports on the carriers corresponding to one band entry in a band combination. The wireless device may include the IE FeatureSetDownlink in a capability message transmitted to the base station.

In an example, a timeDurationForQCL IE may define minimum number of OFDM symbols required by the UE to perform PDCCH reception and applying spatial QCL information received in DCI for PDSCH processing. In an example, the UE may indicate one value of the minimum number of OFDM symbols per each subcarrier spacing of 60 kHz and 120 kHz.

In an example, following scheduling combinations may be allowed/not allowed when cross-carrier scheduling from an SCell to PCell/PSCell is configured: self-scheduling on PCell/PSCell may be allowed; cross-carrier scheduling from PCell/PSCell to another SCell may not be allowed; self-scheduling on the 'SCell used for scheduling PCell/PSCell' may be allowed; cross-carrier scheduling from the 'SCell used for scheduling PCell/PSCell' to another serving cell may be allowed; cross-carrier scheduling from another serving cell to the 'SCell used for scheduling PCell/PSCell' may not be allowed.

A DCI may be used for scheduling multiple TBs/physical channels (e.g., PUSCHs or PDSCHs) via multiple cells. Existing DCI formats and scheduling processes may lead to degraded performance including increased PDCCH blocking rate, reduced scheduling flexibility and lower throughput. There is a need to enhance the existing DCI formats and/or indication of scheduling information and/or related processes when a single DCI scheduled multiple TBs/physical channels (e.g., PUSCHs or PDSCHs) via multiple cells. Example embodiments enhance the existing DCI formats and/or indication of scheduling information and/or related processes when a single DCI scheduled multiple TBs/physical channels (e.g., PUSCHs or PDSCHs) via multiple cells.

In an example embodiment, a wireless device may receive one or more messages (e.g., one or more RRC messages) comprising configuration parameters. The one or more messages may comprise configuration parameters of a plurality of cells. The plurality of cells may comprise a primary cell and one or more secondary cells. The plurality of cells may be provided by one (e.g., in a single connectivity scenario) or a plurality of base stations (e.g., in a multi-connectivity scenario). In an example, with multi-connectivity, a secondary cell may be configured as a primary secondary cell (PSCell) for a group of cells provided by a base station (e.g., a secondary base station). In an example, the wireless device may be configured to receive a DCI for scheduling multiple TBs. In an example, the wireless device may be configured to receive a DCI for scheduling multiple physical channels (e.g., PDSCHs/PUSCHs) via multiple cells. The multiple PUSCHs/PDSCHs may be for transmission/reception of a single TB or for transmission/reception of multiple TBs.

In an example, scheduling of multiple TBs/physical channels (e.g., PDSCHs/PUSCHs) via multiple cells using a single DCI may be based one or more configuration parameters. The wireless device may receive one or more configuration parameters indicating that scheduling multiple TBs/physical channels (e.g., PDSCHs/PUSCHs) via multiple cells using a single DCI (e.g., using a DCI of a specific format or associated with specific parameters (e.g., RNTI, value of a DCI field, etc.) or received via specific CORE-SETs/search spaces) is configured for the wireless device. In an example, the reception of the one or more configuration parameters that indicate configuration of multi-cell scheduling via a single DCI may be in response to transmission of a capability message by the wireless device to a base station. The wireless device may transmit, to the base station, a capability message comprising at least one capability IE indicating that the wireless device is capable of (e.g., has software and/or hardware capability) scheduling multiple TBs/physical channels (e.g., PDSCHs/PUSCHs) via multiple cells using a single DCI. The wireless device may receive, in response to transmission of the capability message including the at least one capability IE, one or more configuration parameters indicating configuration of multi-cell scheduling of multiple TBs/physical channels (e.g., PDSCHs/PUSCHs) via a single DCI (e.g., using a DCI of a specific format or associated with specific parameters (e.g., RNTI, value of a DCI field, etc.) or received via a specific CORESET/search space).

In an example embodiment, the wireless device may receive a DCI indicating scheduling a first physical channel (e.g., a first PUSCH/PDSCH) via a first cell and a second physical channel (e.g., a second PUSCH/PDSCH) via a second cell. In an example, the first PUSCH/PDSCH may be associated with a first TB and the second PUSCH/PDSCH may be associated with a second TB. In an example, the first PUSCH/PDSCH and the second PUSCH/PDSCH may be associated with a single TB. For example, the single TB may be mapped to first radio resources of the first cell and second radio resources of the second cell. In an example, the first cell may be a cell on which the DCI is received and a field (e.g., carrier indicator field (CIF)) of the DCI may indicate the second cell. In an example, the first cell may be a cell on which the DCI is received, and the second cell may be a predetermined/preconfigured cell (e.g., a primary cell). In an example, a field (e.g., carrier indicator field (CIF)) of the DCI may indicate the first cell and the second cell may be a pre-configured/predetermined cell (e.g., a primary cell). In an example, a first field (e.g., a first carrier indicator field (CIF)) of the DCI may indicate the first cell and a second field (e.g., a second carrier indicator field (CIF)) of the DCI may indicate the second cell.

The DCI may comprise a plurality of fields including a first field. In an example embodiment, the wireless device may determine that a value of the first field of the DCI applies to one of the first TB/physical channel/cell and the second TB/physical channel/cell. In an example, the TB/physical channel/cell that the value of the first field of the DCI may be applied to may be, and/or may be based on, the cell on which the DCI is received. In an example, the cell that the value of the first field of the DCI may be applied to may be and/or may be based on a cell other than the cell that the DCI is received. In an example, determining the TB/physical channel/cell that the value of the first field of the DCI may be applied to may be based on a first cell index of the first cell and a second cell index of the second cell. For example, the cell that the value of the first field of the DCI may be applied may be the cell with a lower cell index among the first cell index and the second cell index. For example, the cell that the value of the first field of the DCI may be applied to may be the cell with a larger cell index among the first cell index and the second cell index. The wireless device may receive configuration parameters of the first cell comprising a parameter indicating the first cell index of the first cell. The wireless device may receive configuration parameters of the second cell comprising a parameter indicating the second cell index of the second cell. In an example, the wireless device may receive a configuration parameter indicating the cell (e.g., one of the first cell and the second cell) that the value of the first field of the DCI may be applied to.

Figure 18:
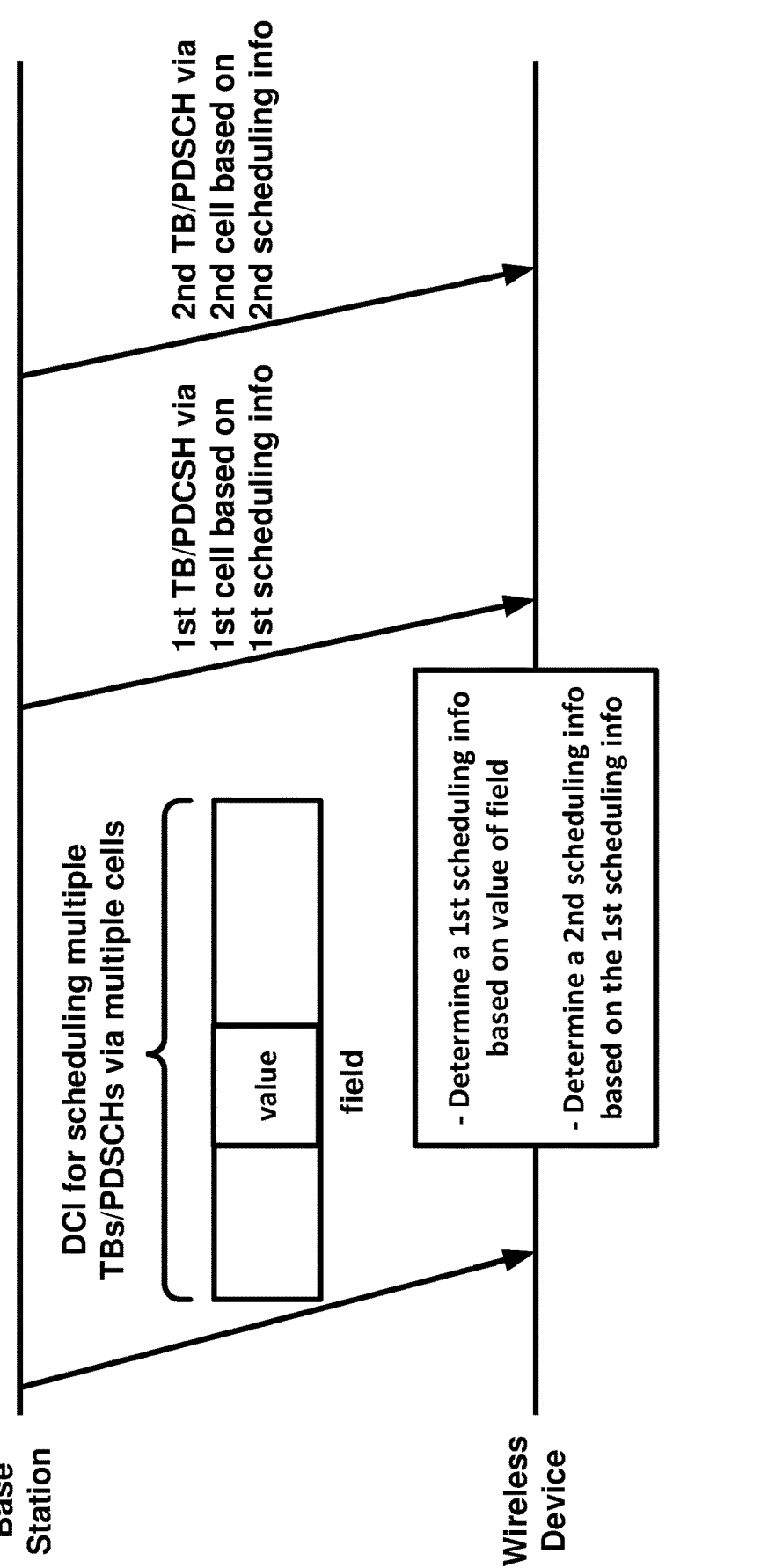
FIG. 18 shows an example process in accordance with several of various embodiments of the present disclosure.
Figure 19:
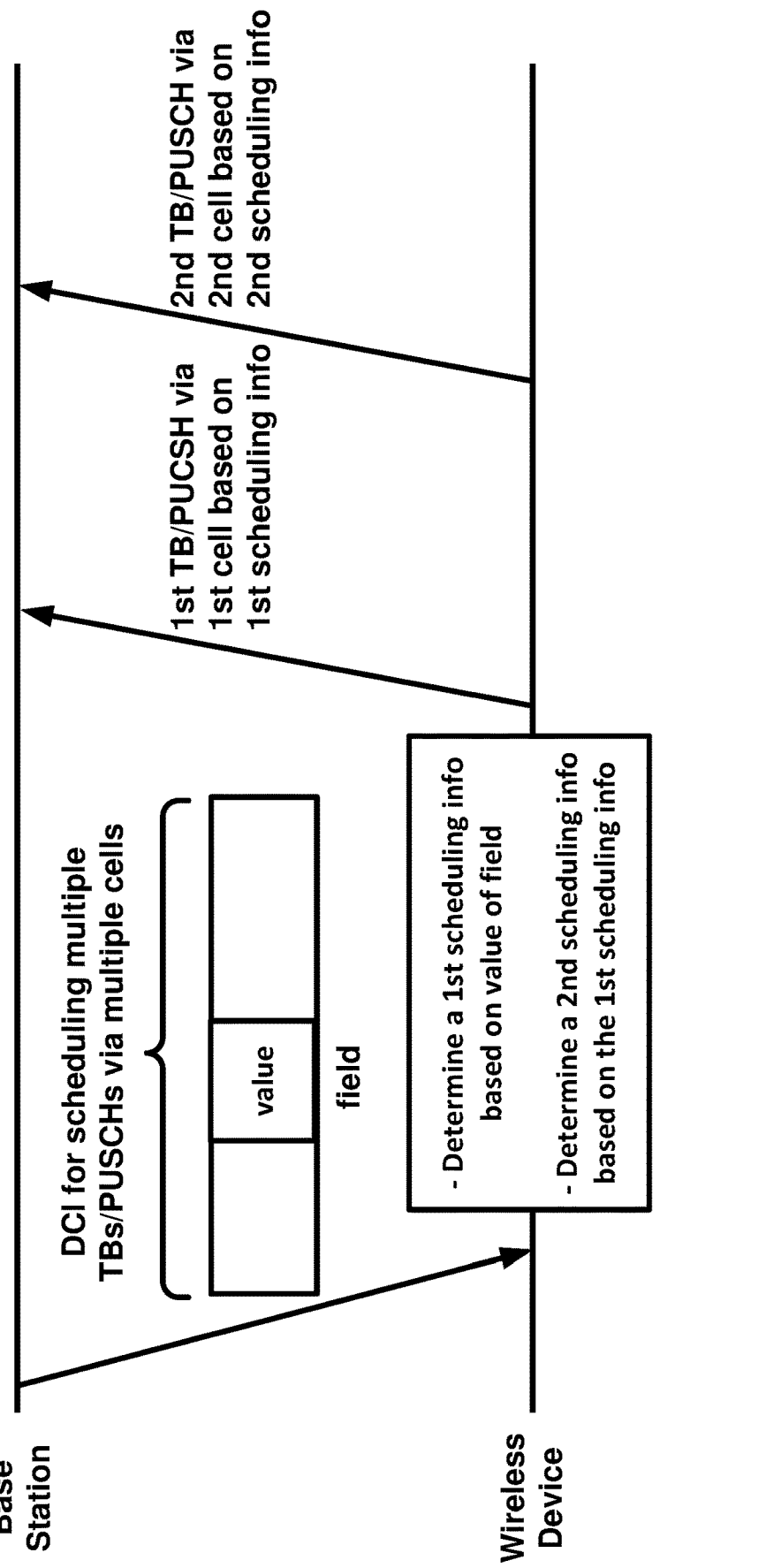
FIG. 19 shows an example process in accordance with several of various embodiments of the present disclosure.

In example embodiment as shown in FIG. 18 and FIG. 19, the wireless device may determine a first scheduling information/parameter of a first TB/physical channel, for reception/transmission via the first cell, based on a value of the first field of the DCI. The wireless device may determine a second scheduling information/parameter of a second TB/physical channel, for transmission/reception via the second cell, based on (e.g., derived from) the first scheduling information/parameter indicated by the value of the first field of the DCI. In an example, the wireless device may determine the second scheduling information/parameter of the second TB/physical channel further based on a configuration parameter (e.g., an RRC parameter). For example, the configuration parameters may indicate an offset and the wireless device may determine the second scheduling information/parameter based on the first scheduling information/parameter (e.g., indicated by the value of the first field of the DCI) and the offset. In an example, the offset may be pre-determined/pre-configured. The wireless device may determine the second scheduling information/parameter of the second TB/physical channel based on the first scheduling information/parameter of the first TB/physical channel and the pre-determined/pre-configured offset.

In an example, the DCI may comprise one or more second fields. One or more second values of the one or more second fields may indicate parameters (e.g., scheduling information) that are shared for the first TB/physical channel/cell and the second TB/physical channel/cell.

In an example, the first field of the DCI may be a HARQ process ID field. The wireless device may determine a first HARQ process ID for the first TB based on the value of the first field of the DCI. The wireless device may determine a second HARQ process ID for the second TB based on the first HARQ process ID indicated by the value of the first field of the DCI. In an example, the wireless device may receive a configuration parameter and may determine the second HARQ process ID based on the first HARQ process ID and the configuration parameter (e.g., based on an offset indicated by the configuration parameter). For example, the second HARQ process ID may be the first HARQ process ID plus an offset indicated by the configuration parameter. In an example, the offset may be pre-determined/pre-configured and the wireless device may determine the second HARQ process ID based on the first HARQ process ID and the pre-determined/pre-configured offset.

In an example, the first field of the DCI may be a transmission configuration indication (TCI) field. The wireless device may determine a first TCI state for reception of the first TB based on the value of the first field of the DCI. The wireless device may determine a second TCI state for reception of the second TB based on the first TCI state indicated by the value of the first field of the DCI. In an example, the wireless device may receive a configuration parameter and may determine the second TCI state based on the first TCI state and the configuration parameter (e.g., based on an offset indicated by the configuration parameter). In an example, the offset may be pre-determined/pre-configured and the wireless device may determine the second TCI state based on the first TCI state and the pre-determined/pre-configured offset.

In an example, the first field of the DCI may be a carrier indicator field. The wireless device may determine a first identifier of the first cell based on the value of the first field of the DCI. The wireless device may determine a second identifier of the second cell based on the first identifier of the first cell indicated by the value of the first field of the DCI. In an example, the wireless device may receive a configuration parameter and may determine the second identifier of the second cell based on the first identifier of the first cell and the configuration parameter (e.g., based on an offset indicated by the configuration parameter). In an example, the offset may be pre-determined/pre-configured and the wireless device may determine the second identifier of the second cell based on the first identifier of the first cell and the pre-determined/pre-configured offset.

In an example, the first field of the DCI may be an SRS request field. The wireless device may determine a first SRS request of the first cell based on the value of the first field of the DCI. The wireless device may determine a second SRS request of the second cell based on the first SRS request of the first cell indicated by the value of the first field of the DCI. In an example, the wireless device may receive a configuration parameter and may determine the second SRS request of the second cell based on the first SRS request of the first cell and the configuration parameter. In an example, the wireless device may determine the second SRS request based on the first SRS request, indicated by the first field of the DCI, and a pre-determined/pre-configured value.

In an example, the first field of the DCI may be a downlink assignment index (DAI) field. The wireless device may determine a first DAI for the first TB based on the value of the first field of the DCI. The wireless device may determine a second DAI for the second TB based on the first DAI, for the first TB, indicated by the value of the first field of the DCI. In an example, the wireless device may receive a configuration parameter and may determine the second DAI for the second TB based on the first DAI for the first TB and the configuration parameter. In an example, the wireless device may determine the second DAI for the second TB based on the first DAI for the first TB and a pre-determined/pre-configured parameter/value.

In an example, the first field of the DCI may be a BWP identifier field. The wireless device may determine a first BWP identifier of a first BWP of the first cell based on the value of the first field of the DCI. The wireless device may determine a second BWP identifier of a second BWP of the second cell based on the first BWP identifier of the first BWP of the first cell indicated by the value of the first field of the DCI. In an example, the wireless device may receive a configuration parameter and may determine the second BWP identifier of the second BWP of the second cell based on the first BWP identifier of the first BWP of the first cell and the configuration parameter. In an example, the wireless device may determine the second BWP identifier of the second BWP of the second cell based on the first BWP identifier of the first BWP of the first cell and a pre-determined/pre-configured parameter/value.

In an example, the first field of the DCI may be a redundancy version (RV) field. The wireless device may determine a first RV for the first TB based on the value of the first field of the DCI. The wireless device may determine a second RV for the second TB based on the first RV, for the first TB, indicated by the value of the first field of the DCI. In an example, the wireless device may receive a configuration parameter and may determine the second RV of the second TB based on the first RV of the first TB and the configuration parameter. In an example, the wireless device may determine the second RV of the second TB based on the first RV of the first TB and a pre-configured/pre-determine parameter/value.

In an example, the first field of the DCI may be a new data indicator (NDI) field. The wireless device may determine a first NDI for the first TB based on the value of the first field of the DCI. The wireless device may determine a second NDI for the second TB based on the first NDI, for the first TB, indicated by the value of the first field of the DCI. In an example, the wireless device may receive a configuration parameter and may determine the second NDI of the second TB based on the first NDI of the first TB and the configuration parameter. In an example, the wireless device may determine the second NDI of the second TB based on the first NDI of the first TB and a pre-determined/pre-configured parameter.

In an example, the first field of the DCI may be a PDSCH to HARQ feedback timing field. The wireless device may determine a first PDSCH to HARQ feedback timing for the first TB based on the value of the first field of the DCI. The wireless device may determine a second PDSCH to HARQ feedback timing for the second TB based on the first PDSCH to HARQ feedback timing, for the first TB, indicated by the value of the first field of the DCI. In an example, the wireless device may receive a configuration parameter and may determine the second PDSCH to HARQ feedback timing for the second TB based on the first PDSCH to HARQ feedback timing for the first TB and the configuration parameter (e.g., an offset (e.g., positive or negative offset), indicated by the configuration parameter, from the first PDSCH to HARQ feedback timing). For example, the second PDSCH to HARQ feedback timing for the second TB may be the first PDSCH to HARQ feedback timing for the first TB plus/minus a value/offset indicated by the configuration parameter. In an example, the wireless device may determine the second PDSCH to HARQ feedback timing for the second TB based on the first PDSCH to HARQ feedback timing for the first TB and a pre-determined/pre-configured parameter, e.g., an offset (e.g., positive or negative offset) from the first PDSCH to HARQ feedback timing).

In an example, the first field of the DCI may be a transmit power control (TPC) command (e.g., a TPC command for scheduled PUCCH) field. The wireless device may determine a first TPC command (e.g., for the first TB or for a scheduled PUCCH) based on the value of the first field of the DCI. The wireless device may determine a second TPC command (e.g., for the second TB or for a scheduled PUCCH) based on the value of the first TPC command indicated by the value of the first field of the DCI. In an example, the wireless device may receive a configuration parameter and may determine the second TPC command based on the first TPC command and the configuration parameter (e.g., an offset (e.g., positive or negative offset), indicated by the configuration parameter, from the first TPC command). For example, the second TPC command may be the first TPC command plus/minus a value/offset indicated by the configuration parameter. In an example, the wireless device may determine the second TPC command based on the first TPC command and a pre-determined/pre-configured parameter/value (e.g., an offset (e.g., positive or negative offset) from the first TPC command. For example, the second TPC command may be the first TPC command plus/minus a value/offset indicated by the pre-determined/pre-configured parameter.

Figure 20:
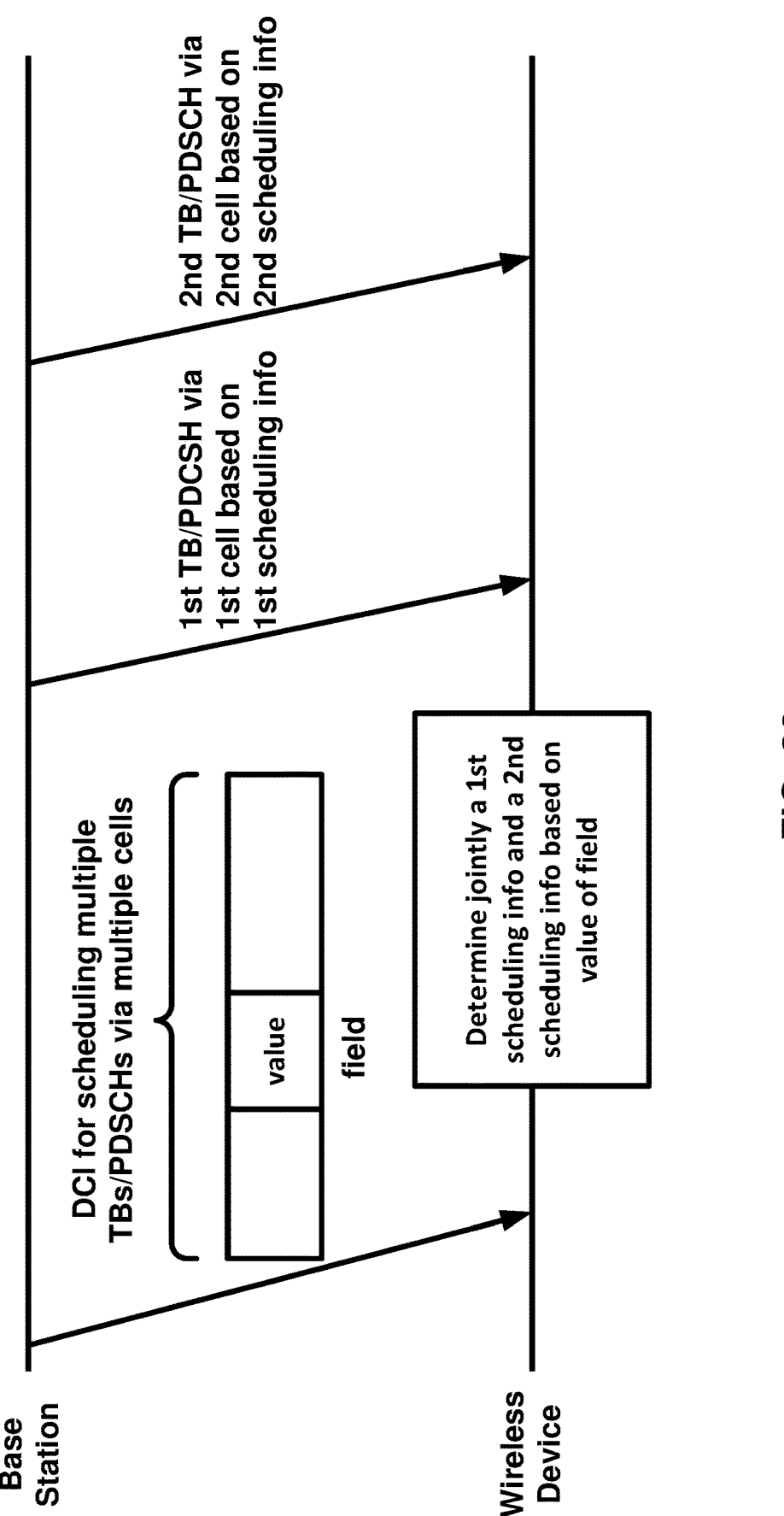
FIG. 20 shows an example process in accordance with several of various embodiments of the present disclosure.
Figure 21:
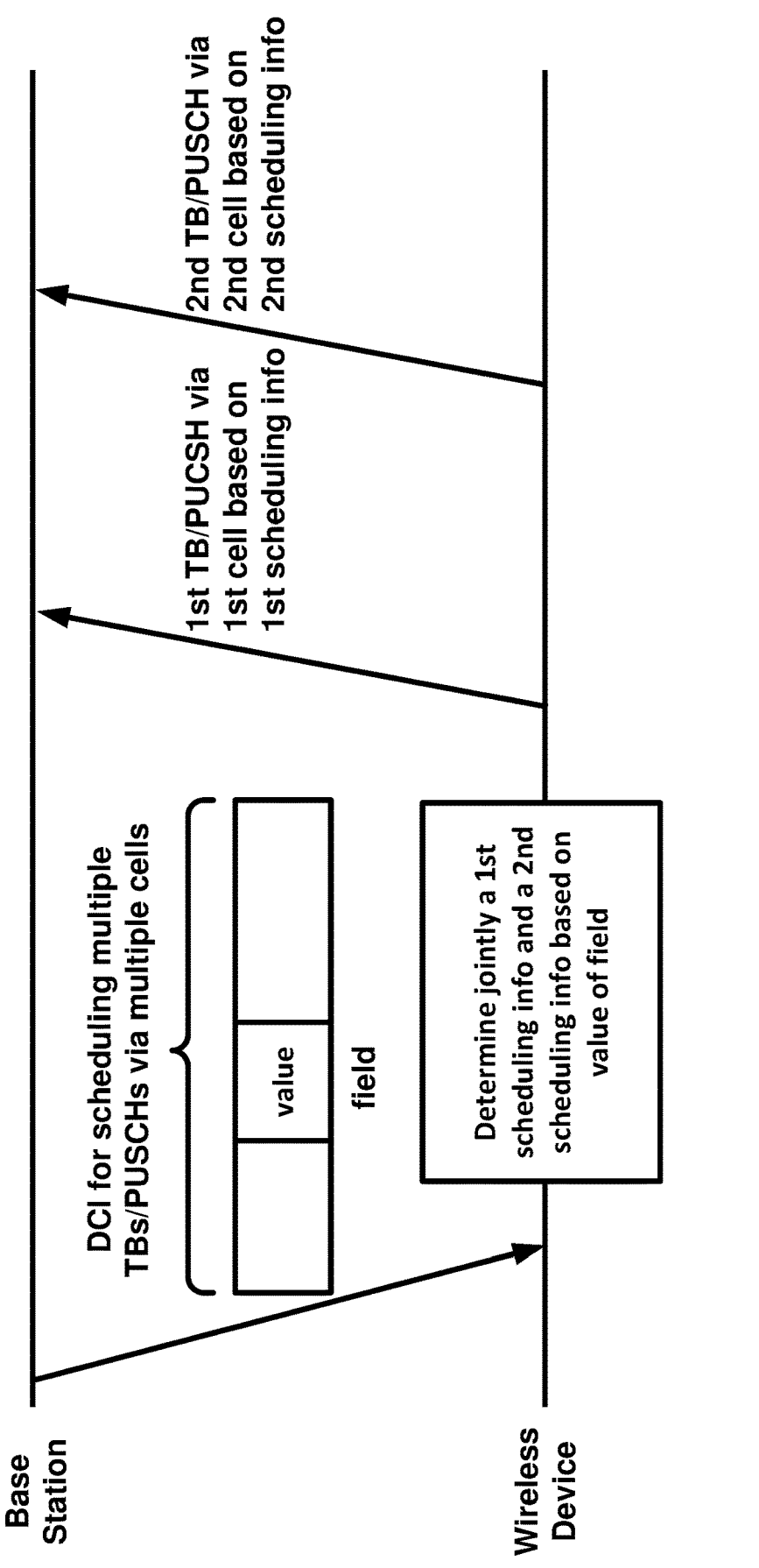
FIG. 21 shows an example process in accordance with several of various embodiments of the present disclosure.

In an example embodiment as shown in FIG. 20 and FIG. 21, the wireless device may jointly determine the first scheduling information/parameter of a first TB/physical channel (e.g., PUSCH/PDSCH), for reception/transmission via the first cell, and the second scheduling information/parameter of a second TB/physical channel (e.g., PUSCH/PDSCH), for transmission/reception via the second cell, based on a value of the first field of the DCI. In an example, the wireless device may receive one or more configuration parameters indicating mappings between values of the first field and first scheduling information/parameter for the first TB/physical channel and second scheduling information/parameter for the second TB/physical channel. The wireless device may further determine the first scheduling information/parameter of the first TB/physical channel and the second scheduling information/parameter of the second TB/physical channel based on the one or more configuration parameters indicating mappings between values of the first field and scheduling information/parameters for the first TB/physical channel and the second TB/physical channel.

In an example, the first field of the DCI may be a HARQ process ID field. The wireless device may jointly determine a first HARQ process ID for the first TB and a second HARQ process ID for the second TB based on the value of the first field of the DCI. In an example, the wireless device may determine the first HARQ process ID for the first TB and the second HARQ process ID for the second TB based on the value of the HARQ process ID field and one or more configuration parameters indicating mappings between the values of the HARQ process ID field of the DCI and the first HARQ process ID for the first TB and the second HARQ process ID for the second TB.

In an example, the first field of the DCI may be a TCI field. The wireless device may jointly determine a first TCI state for reception of the first TB/physical channel and a second TCI state for reception of the second TB/physical channel based on the value of the first field of the DCI. In an example, the wireless device may determine the first TCI state for reception of the first TB and the second TCI state for reception of the second TB based on the value of the TCI field and one or more configuration parameters indicating mappings between the values of the TCI field of the DCI and the first TCI state for reception of the first TB and the second TCI state for reception of the second TB.

In an example, the first field of the DCI may be a carrier indicator field. The wireless device may jointly determine a first identifier of the first cell and a second identifier of the second cell based on the value of the first field of the DCI. In an example, the wireless device may determine the first identifier of the first cell and the second identifier of the second cell based on the value of the carrier indicator field of the DCI and one or more configuration parameters indicating mappings between the values of the carrier indicator field of the DCI and the first identifier of the first cell and the second identifier of the second cell.

In an example, the first field of the DCI may be an SRS request field. The wireless device may jointly determine a first SRS request of the first cell and a second SRS request of the second cell based on the value of the first field of the DCI. In an example, the wireless device may determine the first SRS request of the first cell and the second SRS request of the second cell based on the value of the SRS request field and one or more configuration parameters indicating mappings between the values of the SRS request field of the DCI and the first SRS request of the first cell and the second SRS request of the second cell.

In an example, the first field of the DCI may be a downlink assignment index (DAI) field. The wireless device may jointly determine a first DAI associated with the first TB and a second DAI associated with the second TB based on the value of the first field of the DCI. In an example, the wireless device may determine the first DAI associated with the first TB and the second DAI associated with the second TB based on the value of the DAI field and one or more configuration parameters indicating mappings between the values of the DAI field of the DCI and the first DAI associated with the first TB and the second DAI associated with the second TB.

In an example, the first field of the DCI may be a BWP identifier field. The wireless device may jointly determine a first BWP identifier of a first BWP of the first cell and a second BWP identifier of a second BWP of the second cell based on the value of the first field of the DCI. In an example, the wireless device may determine the BWP identifier of the first BWP of the first cell and the second BWP identifier of the second BWP of the second BWP of the second cell based on the value of the BWP identifier field and one or more configuration parameters indicating mappings between the values of the BWP identifier field of the DCI and the first BWP identifier of the first cell and the second BWP identifier of the second BWP of the second cell.

In an example, the first field of the DCI may be a redundancy version (RV) field. The wireless device may jointly determine a first RV for the first TB and a second RV for the second TB based on the value of the first field of the DCI. In an example, the wireless device may determine the first RV for the first TB and the second RV for the second TB based on the value of the RV field and one or more configuration parameters indicating mappings between the values of the RV field of the DCI and the first RV for the first TB and the second RV for the second TB.

In an example, the first field of the DCI may be a new data indicator (NDI) field. The wireless device may jointly determine a first NDI for the first TB and a second NDI for the second TB based on the value of the first field of the DCI. In an example, the wireless device may determine the first NDI for the first TB and the second NDI for the second TB based on the value of the NDI field and one or more configuration parameters indicating mappings between the values of the NDI field of the DCI and the first NDI for the first TB and the second NDI for the second TB.

In an example, the first field of the DCI may be a PDSCH to HARQ feedback timing field. The wireless device may jointly determine a first PDSCH to HARQ feedback timing for the first TB and a second PDSCH to HARQ feedback timing for the second TB based on the value of the first field of the DCI. In an example, the wireless device may determine the first PDSCH to HARQ feedback timing for the first TB and the second PDSCH to HARQ feedback timing for the second TB based on the value of the PDSCH to HARQ feedback timing field and one or more configuration parameters indicating mappings between the values of the PDSCH to HARQ feedback timing field of the DCI and the first PDSCH to HARQ feedback timing for the first TB and the second PDSCH to HARQ feedback timing for the second TB.

In an example, the first field of the DCI may be a transmit power control (TPC) command (e.g., a TPC command for scheduled PUCCH) field. The wireless device may jointly determine a first TPC command (e.g., for the first TB or for a scheduled PUCCH) and a second TPC command (e.g., for the second TB or for a scheduled PUCCH) based on the value of the first field of the DCI. In an example, the wireless device may determine the first TPC command (e.g., for the first TB or for a scheduled PUCCH) and the second TPC command (e.g., for the first TB or for a scheduled PUCCH) based on the value of the TPC command field and one or more configuration parameters indicating mappings between the values of the TPC field of the DCI and the first TPC command and the second TPC command.

The wireless device may receive/transmit the first TB/physical channel (e.g., PDSCH/PUSCH) based on the first scheduling information/parameter. The wireless device may receive/transmit the second TB/physical channel (PDSCH/PUSCH) based on the second scheduling information/parameter.

Figure 22:
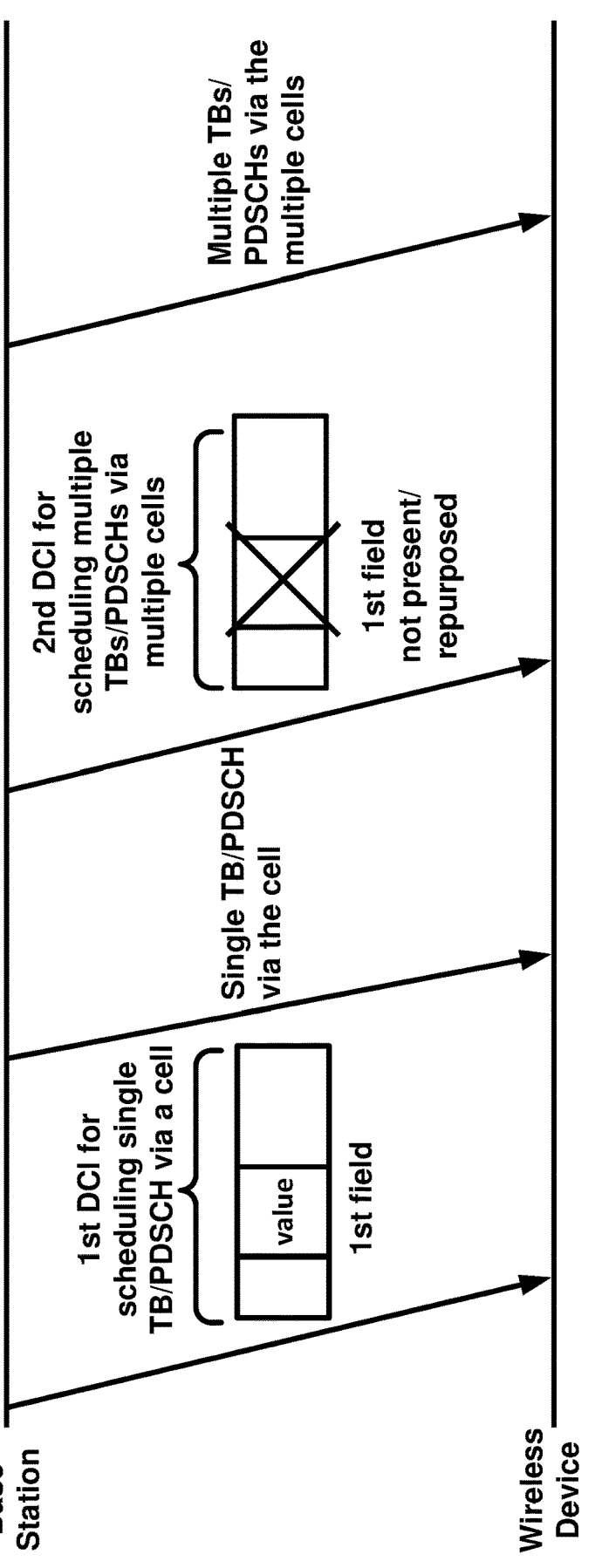
FIG. 22 shows an example process in accordance with several of various embodiments of the present disclosure.
Figure 23:
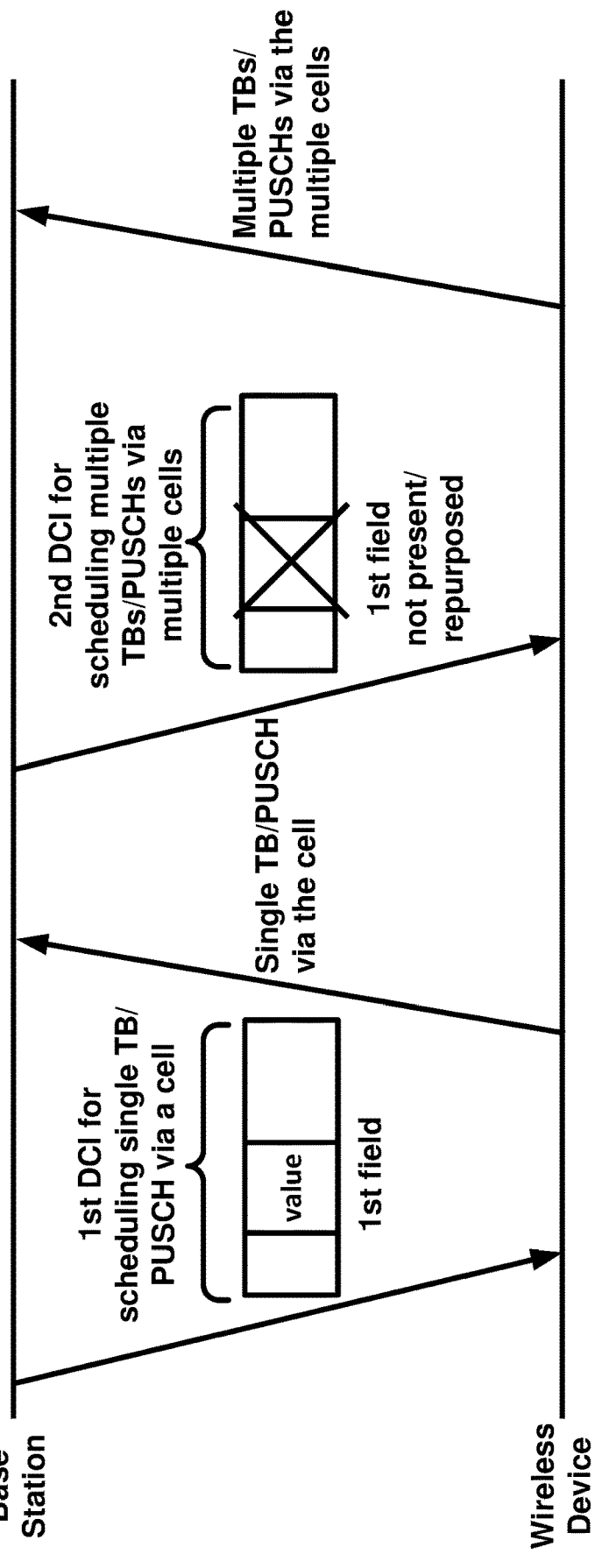
FIG. 23 shows an example process in accordance with several of various embodiments of the present disclosure.

In an example embodiment as shown in FIG. 22 and FIG. 23, the wireless device may receive a first DCI and a second DCI. The first DCI may indicate/be used for scheduling of one or more TBs/physical channels (e.g., PUSCH, PDSCH) on a single cell. The wireless device may receive or may transmit the one or more TBs/physical channels via the single cell based on the first DCI. The second DCI may indicate/be used for scheduling multiple TBs/physical channels (e.g., PUSCHs/PDSCHs) via multiple cells. The first DCI, used for scheduling of one or more physical channels/TBs via the single cell, may comprise a first field. A value of the first field may indicate a scheduling information/parameter for reception or transmission of the one or more TBs/physical channels via the single cell. The second DCI, used for scheduling of multiple physical channels/TBs via the multiple cells (e.g., at least for scheduling of a first TB via a first cell and a second TB via a second cell), may not comprise the first field and/or the first field may not be present in the second DCI and/or the first field in the second DCI may be repurposed. In an example, the first field may not be present in the second DCI and/or a parameter, associated with the first field, may have a predetermined/configurable value at least for one of the multiple TBs/physical channels scheduled by the second DCI. For example, the wireless device may receive one or more configuration parameters indicating the value, associated with the first field, for at least one of the multiple TBs/physical channels scheduled by the second DCI. In an example, the predetermined/configurable value, associated with the first field, may be separate for each of the multiple scheduled TBs/physical channels/cells or may be shared among the multiple TBs/physical channels/cells.

Figure 24:
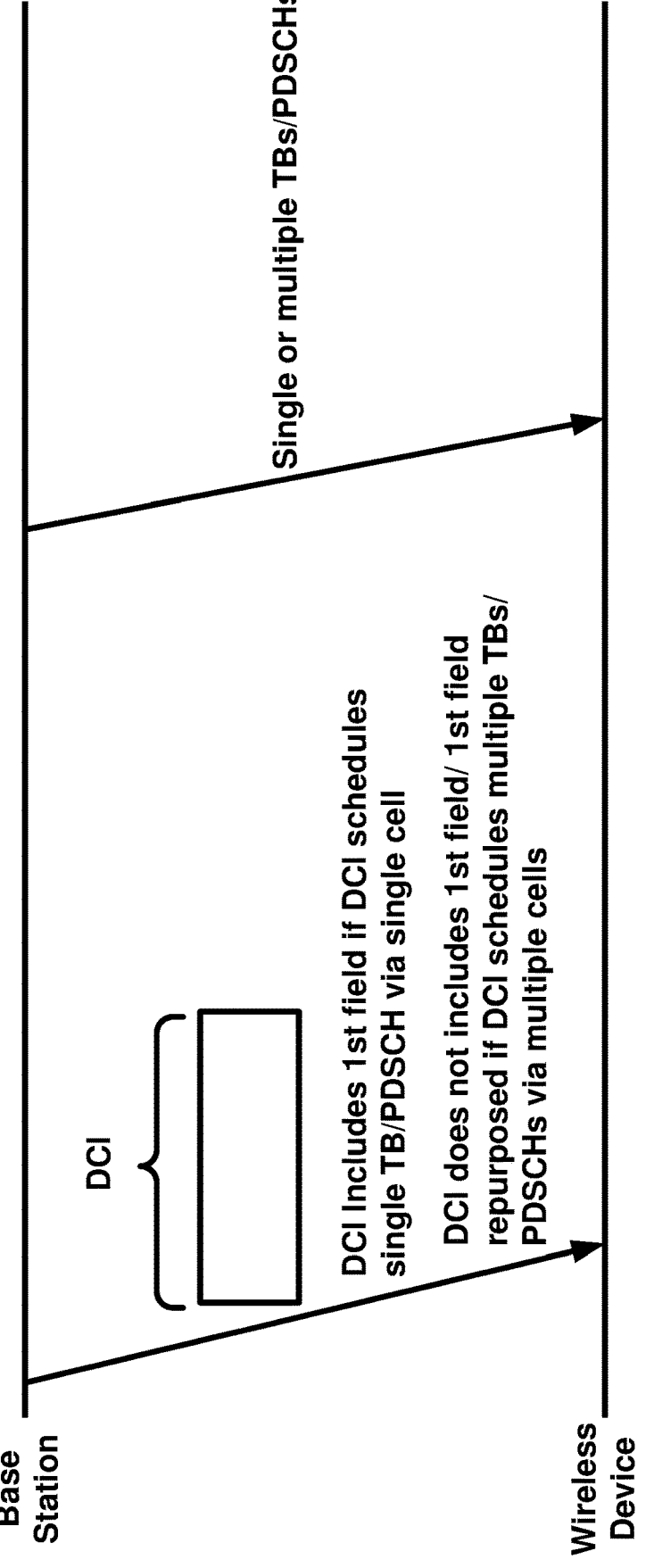
FIG. 24 shows an example process in accordance with several of various embodiments of the present disclosure.
Figure 25:
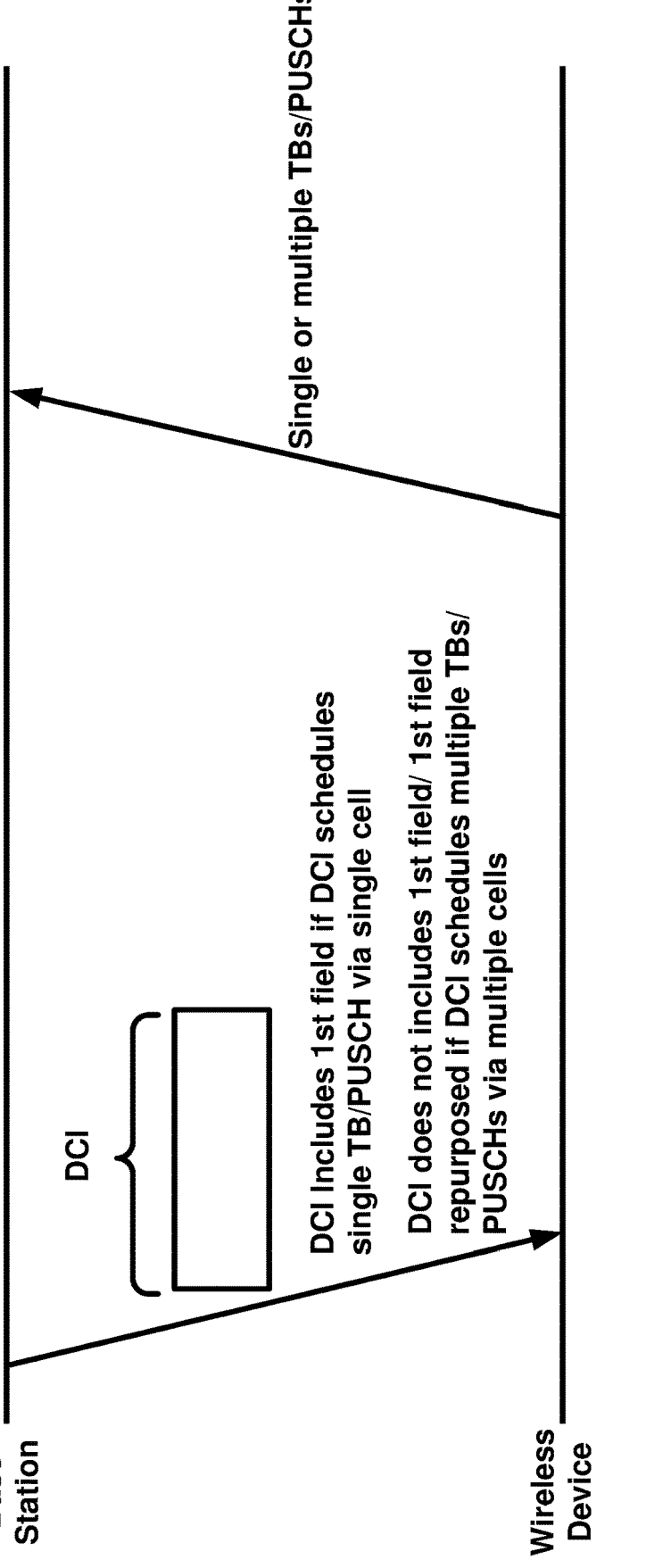
FIG. 25 shows an example process in accordance with several of various embodiments of the present disclosure.

In an example embodiment as shown in FIG. 24 and FIG. 25, the wireless device may receive a DCI indicating scheduling one or more TBs/physical channels (e.g., PUSCHs/PDSCHs). The DCI may comprise a first field in response to the DCI indicating/being used for scheduling of the one or more TBs/physical channels via a single cell. The DCI may not comprise the first field or the first field may be repurposed in the DCI, in response to the DCI indicating/being used for scheduling of a plurality of TBs/physical channels via a plurality of cells, e.g., scheduling of at least a first TB/physical channel via a first cell and a second TB/physical channel via a second cell. The wireless device may receive or transmit the one or more TBs/physical channels based on the DCI.

In an example, the wireless device may determine that a DCI is used for scheduling one or more TBs/physical channels (e.g., PUSCHs/PDSCHs) via a single cell or that the DCI schedules a plurality of TBs/physical channels (e.g., PUSCHs/PDSCHs) via multiple cells based on one or more parameters associated with the DCI. For example, the wireless device may determine that a DCI is used for scheduling one or more TBs/physical channels (e.g., PUSCHs/PDSCHs) via a single cell or that the DCI schedules a plurality of TBs/physical channels (e.g., PUSCHs/PDSCHs) via multiple cells, based on a second value of a second field of the DCI. The second value of the second field of the DCI may indicate whether the DCI is used for scheduling one or more TBs/physical channels via a single cell or for scheduling multiple TBs/physical channels via multiple cells. For example, the wireless device may determine that a DCI is used for scheduling one or more TBs/physical channels (e.g., PUSCHs/PDSCHs) via a single cell or that the DCI is used for scheduling a plurality of TBs/physical channels (e.g., PUSCHs/PDSCHs) via multiple cells, based on an RNTI associated with the DCI (e.g., based on an RNTI that scrambles the CRC field of the DCI). The wireless device may determine that the DCI is used for scheduling multiple TBs/physical channels (e.g., PUSCHs/PDSCHs) via multiple cells based on the RNTI associated with the DCI being a first RNTI. The wireless device may receive one or more configuration parameters indicating the first RNTI. For example, the wireless device may determine that a DCI is used for scheduling one or more TBs/physical channels (e.g., PUSCHs/PDSCHs) via a single cell or that the DCI schedules a plurality of TBs/physical channels (e.g., PUSCHs/PDSCHs) via multiple cells, based on a CORE-SET/search space that the DCI is received. The wireless device may determine that the DCI is used for scheduling multiple TBs/physical channels (e.g., PUSCHs/PDSCHs) via multiple cells based on the CORESET/search space that the DCI is received being a first CORESET/search space. The wireless device may receive configuration parameters indicating that the first CORESET/search space is associated with and/or is used for monitoring DCIs that schedule multiple TBs/physical channels on multiple cells. For example, the wireless device may receive a downlink signaling (e.g., one or more RRC parameters via an RRC message and/or a MAC CE) and the wireless device may determine that a DCI is used for scheduling one or more TBs/physical channels (e.g., PUSCHs/PDSCHs) via a single cell or that the DCI is used for scheduling a plurality of TBs/physical channels (e.g., PUSCHs/PDSCHs) via multiple cells, based on the downlink signaling (e.g., based on the values of the one or more RRC parameters or based on one or more values of one or more fields of the MAC CE).

In an example, in response to a DCI indicating/being used for scheduling multiple TBs/physical channels via multiple cells and the DCI not comprising the first field, a value of the first field may be a predetermined/pre-configured value. In an example, the predetermined value, of the first field, may apply to both of the first TB and the second TB. In an example, the predetermined value, of the first field, may apply to one of the first TB and the second TB. In an example, the wireless device may receive a configuration parameter (e.g., an RRC parameter) indicating a value associated with the first field. In response to the DCI indicating/being used for scheduling the plurality of TBs/physical channels via the plurality of cells (e.g., scheduling the first TB/physical channel via the first cell and the second TB/physical channel via the second cell), the DCI may not comprise the first field. The wireless device may use the value configured by the configuration parameter to determine the scheduling information associated with the first field. In an example, the wireless device may determine, based on the value indicated by the configuration parameter, the scheduling information for the first TB/physical channel and the second TB/physical channel. In an example, the wireless device may determine, based on the value indicated by the configuration parameter, the scheduling information for one of the first TB/physical channel and the second TB/physical channel.

In an example, the wireless device may receive one or more configuration parameters indicating a first value, associated with the first field and for transmission/reception of the first TB/physical channel and a second value, associated with the first field and for transmission/reception of the second TB/physical channel. In an example, the wireless device may receive the one or more configuration parameters and/or may use the one or more configuration parameters in response to the DCI indicating/being used for scheduling the plurality of TBs/physical channels via the plurality of cells (e.g., scheduling the first TB/physical channel via the first cell and the second TB/physical channel via the second cell) and/or in response to the DCI not comprising the first field.

In an example, the first field may be an SRS request field. In response to the DCI indicating/being used for scheduling one or more TBs/physical channels via a single cell, the DCI may comprise the SRS request field. The value of the SRS request field may be used for requesting SRS transmission by the wireless device. In response to the DCI indicating/ being used for scheduling a plurality of TBs/physical channels via a plurality of cells (e.g., a first TB/physical channel via a first cell and a second TB/physical channel via a second cell), the DCI may not comprise the SRS request field and/or the SRS request field may be repurposed.

In an example, the first field may be an SRS request field. In response to the first DCI indicating/being used for scheduling one or more TBs/physical channels via a single cell, the DCI may comprise the SRS request field. The value of the SRS request field may be used for requesting SRS transmission by the wireless device. In response to the second DCI indicating/being used for scheduling a plurality of TBs/physical channels via a plurality of cells (e.g., a first TB/physical channel via a first cell and a second TB/physical channel via a second cell), the second DCI may not comprise the SRS request field and/or the SRS request field may be repurposed.

In an example, the first field may be a redundancy version (RV) field. In response to the DCI indicating/being used for scheduling one or more TBs/physical channels via a single cell, the DCI may comprise the RV field. The value of the RV field may be used for determining a redundancy version associated with a TBscheduled by the DCI. In response to the DCI indicating/being used for scheduling a plurality of TBs/physical channels via a plurality of cells (e.g., a first TB/physical channel via a first cell and a second TB/physical channel via a second cell), the DCI may not comprise the RV field and/or the RV field may be repurposed.

In an example, the first field may be a redundancy version (RV) field. In response to the first DCI indicating/being used for scheduling one or more TBs/physical channels via a single cell, the first DCI may comprise the RV field. The value of the RV field may be used for determining a redundancy version associated with a TBscheduled by the first DCI. In response to the second DCI indicating/being used for scheduling a plurality of TBs/physical channels via a plurality of cells (e.g., a first TB/physical channel via a first cell and a second TB/physical channel via a second cell), the second DCI may not comprise the RV field and/or the RV field may be repurposed.

In an example, the first field may be a new data indicator (NDI) field. In response to the DCI indicating/being used for scheduling one or more TBs/physical channels via a single cell, the DCI may comprise the NDI field. The value of the NDI field may be used for determining whether a TBscheduled by the DCI is a new transmission or a retransmission. In response to the DCI indicating/being used for scheduling a plurality of TBs/physical channels via a plurality of cells (e.g., a first TB/physical channel via a first cell and a second TB/physical channel via a second cell), the DCI may not comprise the NDI field and/or the NDI field may be repurposed.

In an example, the first field may be a new data indicator (NDI) field. In response to the first DCI indicating/being used for scheduling a single TB/physical channel via a single cell, the first DCI may comprise the NDI field. The value of the NDI field may be used for determining whether a TBscheduled by the first DCI is a new transmission or a retransmission. In response to the second DCI indicating/ being used for scheduling a plurality of TBs/physical channels via a plurality of cells (e.g., a first TB/physical channel via a first cell and a second TB/physical channel via a second cell), the second DCI may not comprise the NDI field and/or the NDI field may be repurposed.

In an example, the first field may be a BWP indicator field. In response to the DCI indicating/being used for scheduling one or more TBs/physical channels via a single cell, the DCI may comprise the BWP indicator field. The value of the BWP indicator field may be used for determining the BWP that the one or more TBs/physical channels is scheduled by the DCI. In response to the DCI indicating/being used for scheduling a plurality of TBs/physical channels via a plurality of cells (e.g., a first TB/physical channel via a first cell and a second TB/physical channel via a second cell), the DCI may not comprise the BWP indicator field and/or the BWP indicator field may be repurposed.

In an example, the first field may be a BWP indicator field. In response to the first DCI indicating/being used for scheduling one or more TBs/physical channels via a single cell, the first DCI may comprise the BWP indicator field. The value of the BWP indicator field may be used for determining the BWP that the one or more TBs/physical channels is scheduled by the first DCI. In response to the second DCI indicating/being used for scheduling a plurality of TBs/ physical channels via a plurality of cells (e.g., a first TB/physical channel via a first cell and a second TB/physical channel via a second cell), the second DCI may not comprise the BWP indicator field and/or the BWP indicator field may be repurposed.

In an example, the first field may be a carrier indicator field. In response to the DCI indicating/being used for scheduling one or more TBs/physical channels via a single cell, the DCI may comprise the carrier indicator field. The value of the carrier indicator field may be used for determining the carrier that the one or more TBs/physical channels is scheduled by the DCI. In response to the DCI indicating/being used for scheduling a plurality of TBs/ physical channels via a plurality of cells (e.g., a first TB/physical channel via a first cell and a second TB/physical channel via a second cell), the DCI may not comprise the carrier indicator field and/or the carrier indicator field may be repurposed.

In an example, the first field may be a carrier indicator field. In response to the first DCI indicating/being used for scheduling a single TB/physical channel via a single cell, the first DCI may comprise the carrier indicator field. The value of the carrier indicator field may be used for determining the carrier that the single physical channel/TB is scheduled by the first DCI. In response to the second DCI indicating/being used for scheduling a plurality of TBs/physical channels via a plurality of cells (e.g., a first TB/physical channel via a first cell and a second TB/physical channel via a second cell), the second DCI may not comprise the carrier indicator field and/or the carrier indicator field may be repurposed.

In an example, the first field may be a transmission configuration indicator (TCI) field. In response to the DCI indicating/being used for scheduling one or more TBs/physical channels via a single cell, the DCI may comprise the TCI field. The value of the TCI field may be used for reception/transmission of a TB/physical channel scheduled by the DCI. In response to the DCI indicating/being used for scheduling a plurality of TBs/physical channels via a plurality of cells (e.g., a first TB/physical channel via a first cell and a second TB/physical channel via a second cell), the DCI may not comprise the TCI field and/or the TCI field may be repurposed.

In an example, the first field may be a transmission configuration indicator (TCI) field. In response to the first DCI indicating/being used for scheduling one or more TBs/physical channels via a single cell, the first DCI may comprise the TCI field. The value of the TCI field may be used for reception/transmission of the TB/physical channel scheduled by the first DCI. In response to the second DCI indicating/being used for scheduling a plurality of TBs/physical channels via a plurality of cells (e.g., a first TB/physical channel via a first cell and a second TB/physical channel via a second cell), the second DCI may not comprise the TCI field and/or the TCI field may be repurposed.

In an example, the first field may be a HARQ process ID field. In response to the DCI indicating/being used for scheduling one or more TBs/physical channels via a single cell, the DCI may comprise the HARQ process ID field. The value of the HARQ process ID field may be used for determining a HARQ process ID of a TBscheduled by the DCI. In response to the DCI indicating/being used for scheduling a plurality of TBs/physical channels via a plurality of cells (e.g., a first TB/physical channel via a first cell and a second TB/physical channel via a second cell), the DCI may not comprise the HARQ process ID field and/or the HARQ process ID field may be repurposed.

In an example, the first field may be a HARQ process ID field. In response to the first DCI indicating/being used for scheduling one or more TBs/physical channels via a single cell, the first DCI may comprise the HARQ process ID field. The value of the HARQ process ID field may be used for determining a HARQ process ID of a TBscheduled by the first DCI. In response to the second DCI indicating/being used for scheduling a plurality of TBs/physical channels via a plurality of cells (e.g., a first TB/physical channel via a first cell and a second TB/physical channel via a second cell), the second DCI may not comprise the HARQ process ID field and/or the HARQ process ID field may be repurposed.

In an example, the first field may be a transmit power control (TPC) command field (e.g., a TPC command for scheduled PUCCH field). In response to the DCI indicating/being used for scheduling one or more TBs/physical channels via a single cell, the DCI may comprise the TPC command field. The value of the TPC command field may be used for determining an uplink power of the TB/physical channel scheduled by the DCI. In response to the DCI indicating/being used for scheduling a plurality of TBs/physical channels via a plurality of cells (e.g., a first TB/physical channel via a first cell and a second TB/physical channel via a second cell), the DCI may not comprise the TPC command field and/or the TPC command field may be repurposed.

In an example, the first field may be a transmit power control (TPC) command field (e.g., a TPC command for scheduled PUCCH field). In response to the first DCI indicating/being used for scheduling a single TB/physical channel via a single cell, the first DCI may comprise the TPC command field. The value of the TPC command field may be used for determining an uplink power of the TB/physical channel scheduled by the first DCI or an uplink control channel scheduled by the first DCI. In response to the second DCI indicating/being used for scheduling a plurality of TBs/physical channels via a plurality of cells (e.g., a first TB/physical channel via a first cell and a second TB/physical channel via a second cell), the second DCI may not comprise the TPC command field and/or the TPC command field may be repurposed.

Figure 26:
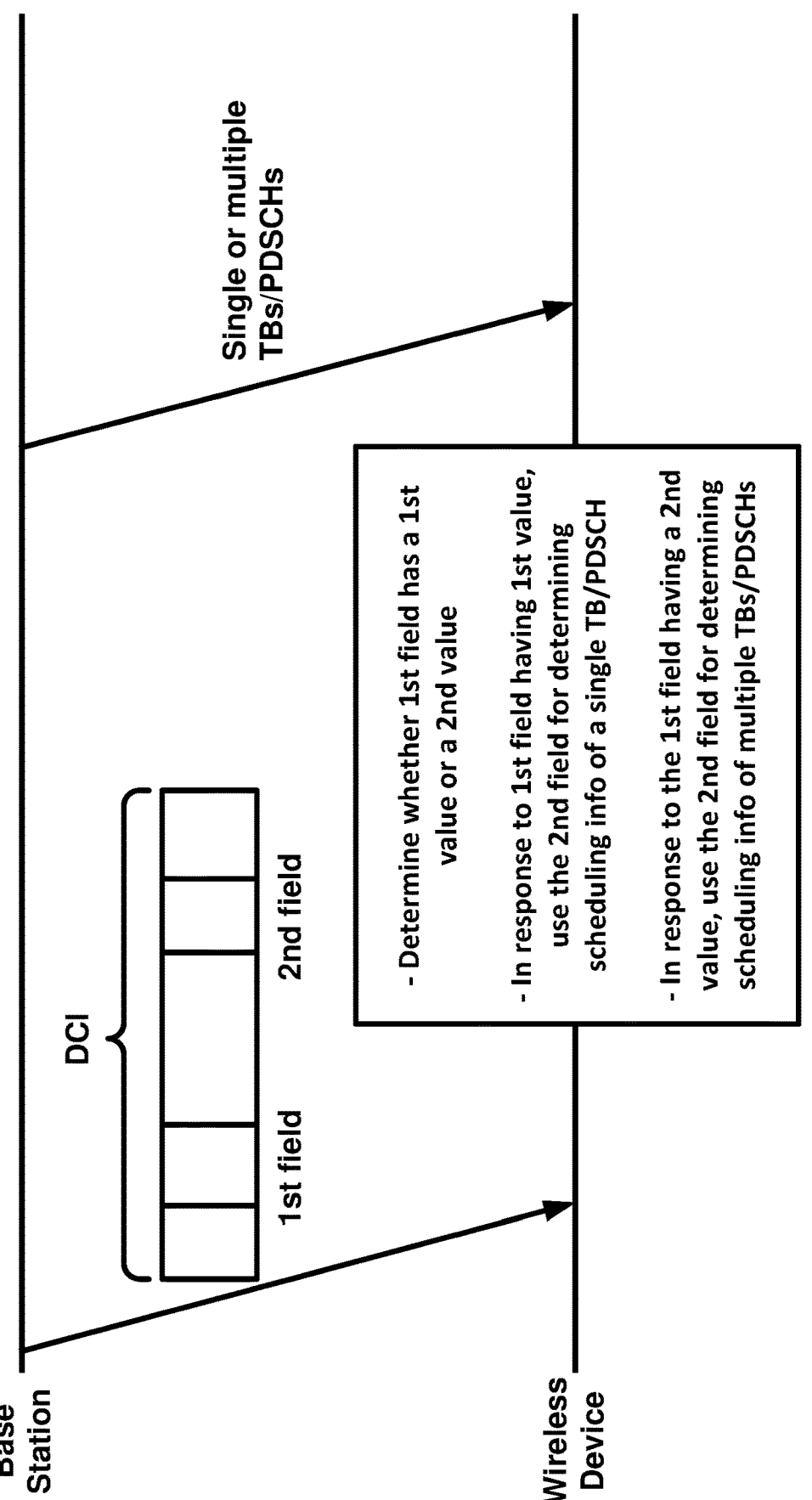
FIG. 26 shows an example process in accordance with several of various embodiments of the present disclosure.
Figure 27:
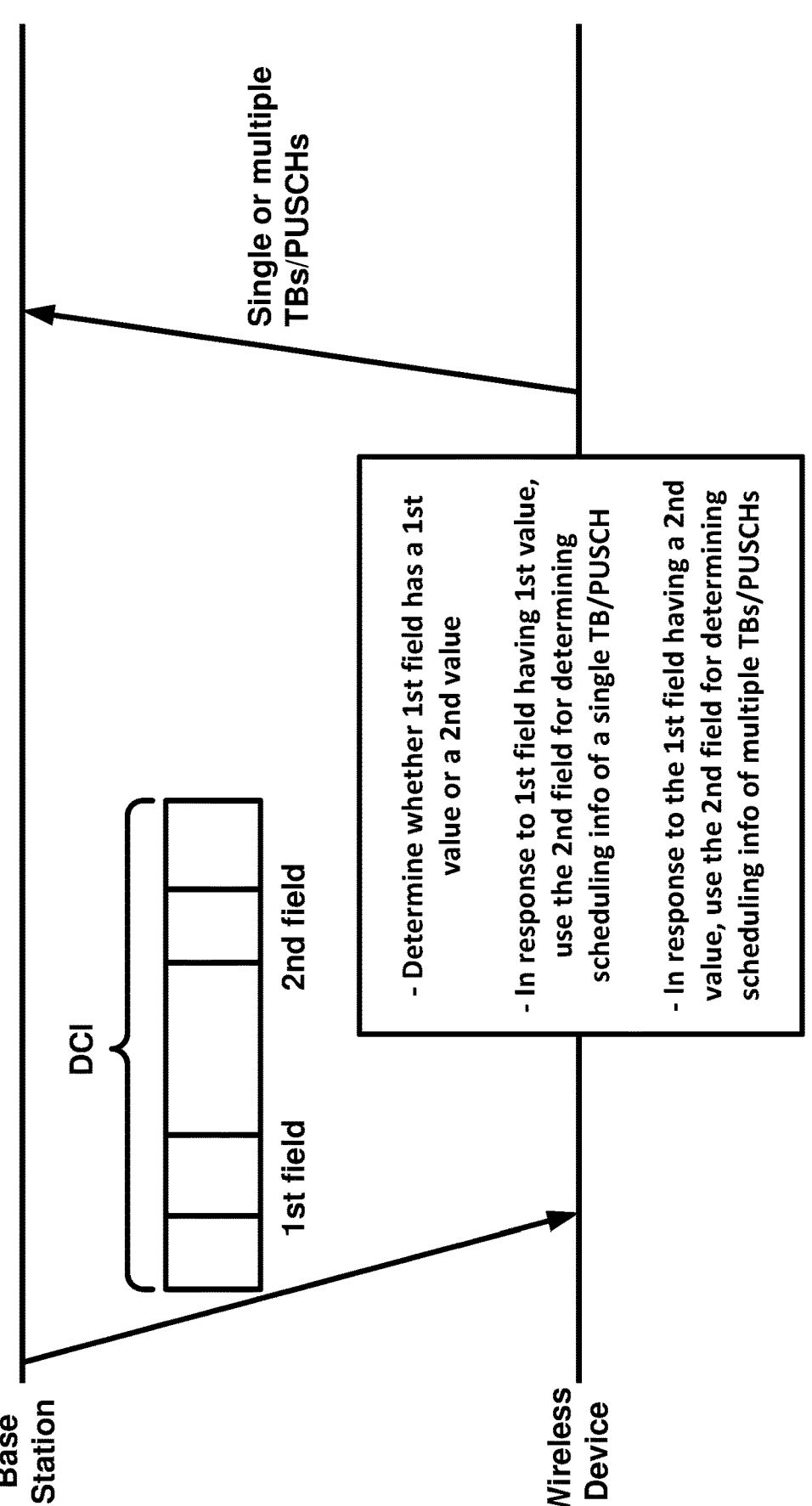
FIG. 27 shows an example process in accordance with several of various embodiments of the present disclosure.

In an example embodiment as shown in FIG. 26 and FIG. 27, a wireless device may receive a DCI for scheduling one or more uplink TBs/physical channels (e.g., PUSCHs) or one or more downlink TBs/physical channels (e.g., PDSCHs). The DCI may comprise a first field and a second field. The first field may be used to indicate whether the DCI is for single-cell scheduling (e.g., scheduling one or more TBs (downlink TBs or uplink TBs)/physical channels (e.g., PDSCHs/PUSCHs) on a single cell) or multi-cell scheduling (e.g., scheduling a plurality of TBs (downlink TBs or uplink TBs)/physical channels (e.g., PDSCHs/PUSCHs) on a plurality of cells). The wireless device may determine a value of the first field of the DCI.

In response to the first field having a first value, the wireless device may determine that the DCI is for single-cell scheduling (e.g., scheduling one or more TBs (downlink TBs or uplink TBs)/physical channels (e.g., PDSCHs/PUSCHs) on a single cell). In response to the first field having the first value, the wireless device may use second field for determining scheduling information/transmission parameter(s) of one or more TBs (downlink TBs or uplink TBs)/physical channels (e.g., PDSCHs/PUSCHs) on a single cell. The wireless device may transmit or receive the one or more TBs/physical channels via the single cell and based on the scheduling information/transmission parameter(s). The single cell that the one or more TBs are scheduled may be a first cell. In an example, the wireless device may receive the DCI by monitoring a control channel on the first cell and the first cell that the one or more TBs/physical channels are received/transmitted may be the cell that the DCI is received. In an example, the DCI may comprise a carrier indicator field. The wireless device may determine the first cell that the one or more TBs/physical channels are received/transmitted based on a value of the carrier indicator field. In an example, the first cell may a predetermined cell (e.g., a primary cell).

In response to the first field having a second value, the wireless device may determine that the DCI is for multi-cell scheduling (e.g., scheduling a plurality of TBs (downlink TBs or uplink TBs)/physical channels (e.g., PDSCHs/PUSCHs) on a plurality of cells). In response to the first field having the second value, the wireless device may use second field for determining scheduling information/transmission parameter(s) of a plurality of TBs (downlink TBs or uplink TBs)/physical channels (e.g., PDSCHs/PUSCHs) on a plurality of cells. In an example, the plurality of TBs/physical channels (e.g., PDSCHs/PUSCHs) may comprise a first TB/physical channel (e.g., PDSCH/PUSCH) on a first cell and a second TB/physical channel (e.g., PDSCH/PUSCH)

on a second cell. The wireless device may transmit or receive the plurality of TBs/physical channels via the plurality of cells and based on the scheduling information/transmission parameter(s). The DCI may comprise a carrier indicator field. In an example, the first cell may be the cell that the DCI is received. The wireless device may determine the second cell based on a value of the carrier indicator field. In an example, the second cell may be a predetermined cell (e.g., a primary cell).

Figure 28:
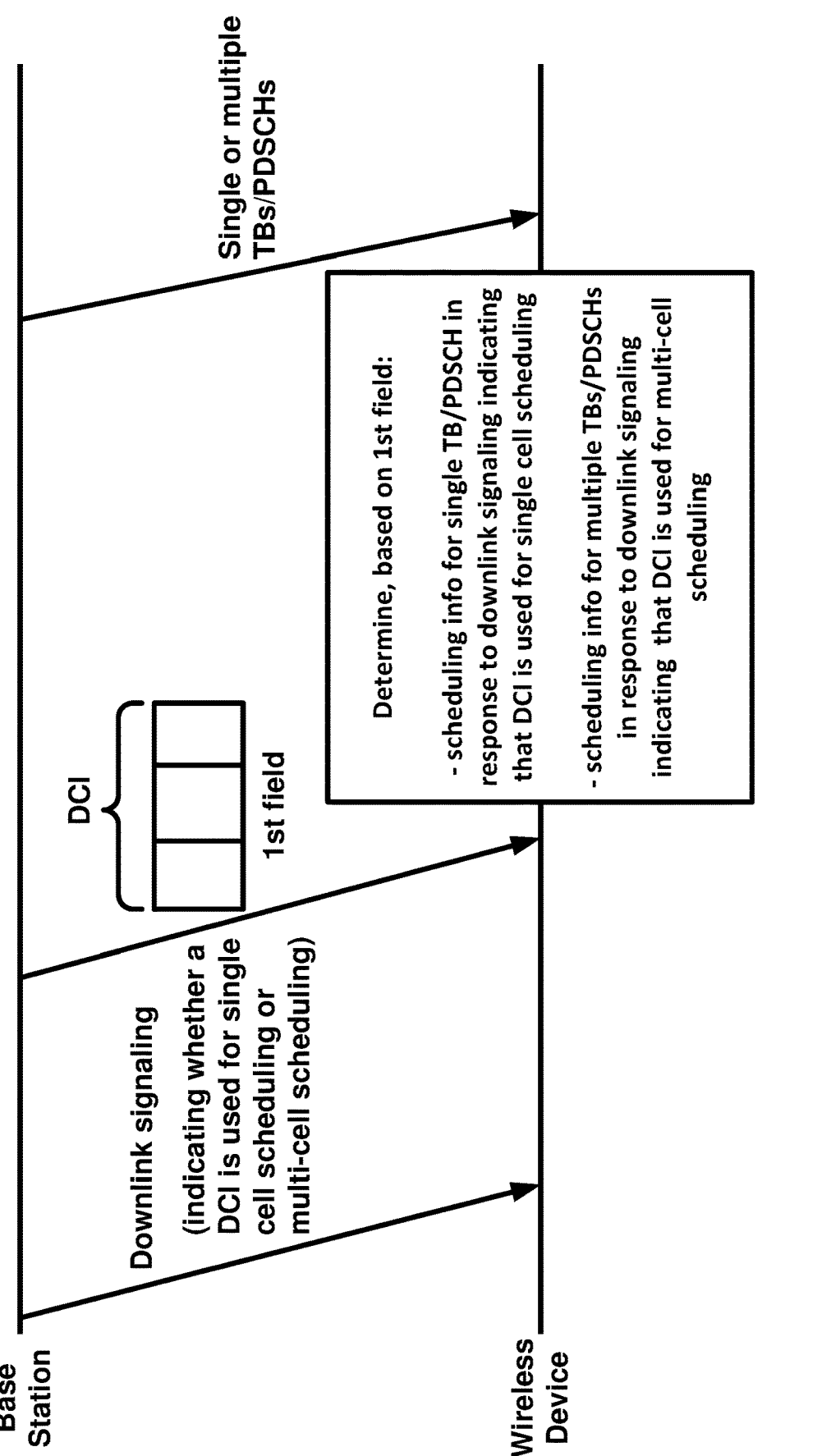
FIG. 28 shows an example process in accordance with several of various embodiments of the present disclosure.
Figure 29:
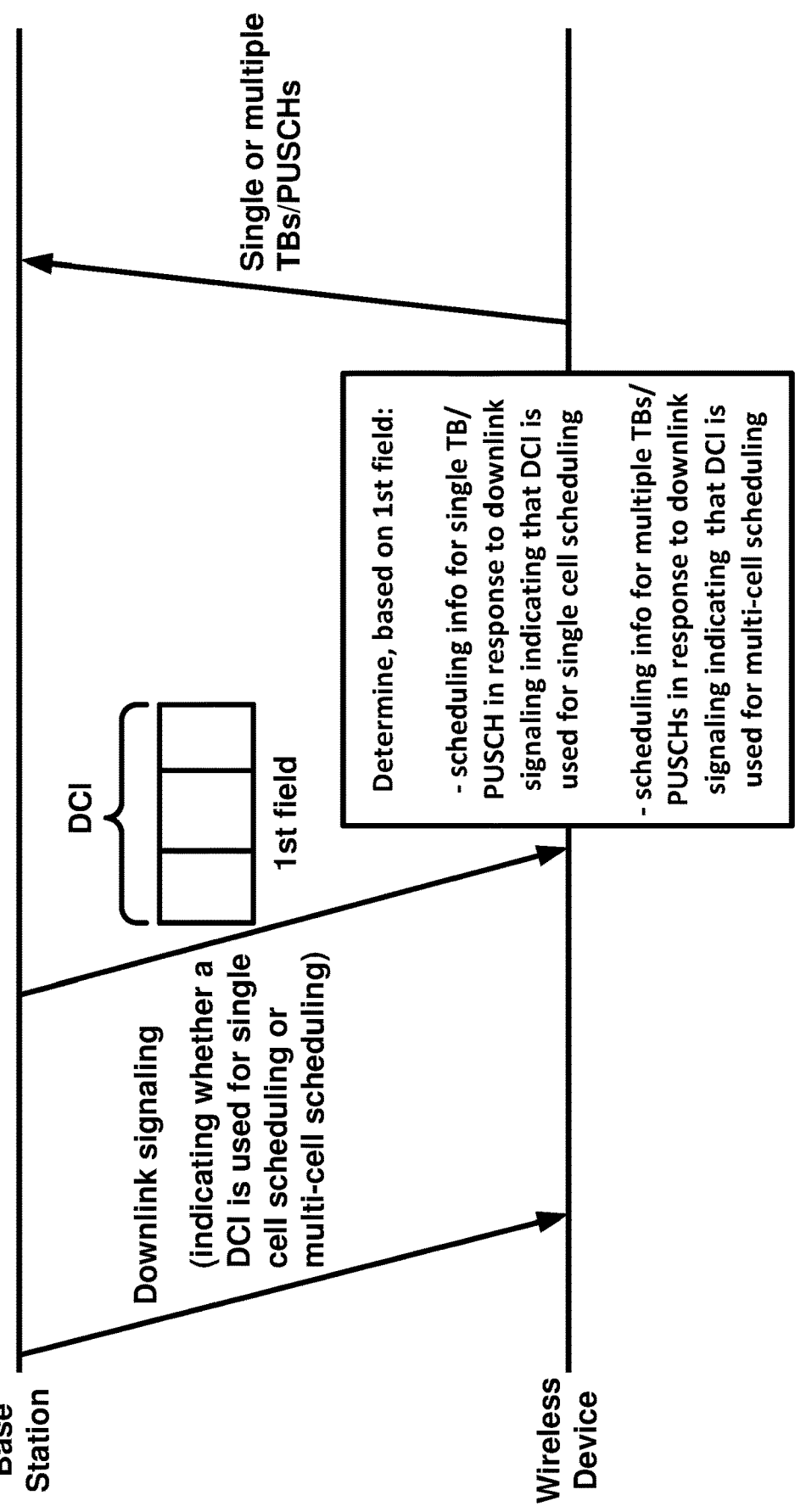
FIG. 29 shows an example process in accordance with several of various embodiments of the present disclosure.

In an example embodiment as shown in FIG. 28 and FIG. 29, a wireless device may receive downlink signaling indicating whether a DCI (e.g., a DCI of a first format and/or a DCI associated with a first RNTI and/or a DCI received via a first CORESET/search space) is used for single cell scheduling (e.g., scheduling one or more TBs/physical channels (e.g., PDSCHs/PUSCHs) via a single cell) or multi-cell scheduling (e.g., scheduling a plurality of TBs/physical channels (e.g., PDSCHs/PUSCHs) via a plurality of cell cell). In an example, the downlink signaling may be based on RRC signaling/one or more RRC messages comprising one or more RRC configuration parameters and the values of the one or more RRC configuration parameters may indicate whether a DCI (e.g., a DCI of a first format and/or a DCI associated with a first RNTI and/or a DCI received via a first CORESET/search space) is used for single cell scheduling (e.g., scheduling one or more TBs/physical channels (e.g., PDSCHs/PUSCHs) via a single cell) or multi-cell scheduling (e.g., scheduling a plurality of TBs/physical channels (e.g., PDSCHs/PUSCHs) via a plurality of cell cell). In an example, the downlink signaling may be based on MAC layer signaling (e.g., one or more MAC CEs) and one or more fields of the one or more MAC CEs (e.g., in combination with one or more configuration parameters) may indicate whether a DCI (e.g., a DCI of a first format and/or a DCI associated with a first RNTI and/or a DCI received via a first CORESET/search space) is used for single cell scheduling (e.g., scheduling one or more TBs/physical channels (e.g., PDSCHs/PUSCHs) via a single cell) or multi-cell scheduling (e.g., scheduling a plurality of TBs/physical channels (e.g., PDSCHs/PUSCHs) via a plurality of cell cell).

The wireless device may receive a DCI (e.g., a DCI of the first format and/or a DCI associated with a first RNTI and/or a DCI received via a first CORESET/search space) comprising a first field. In response to the downlink signaling indicating that the DCI is used for single-cell scheduling (e.g., scheduling one or more TBs/physical channels (e.g., PDSCHs/PUSCHs) via a single cell), the wireless device may use a value of the first field to determine scheduling information for one or more TBs/physical channels (e.g., one or more PDSCHs/PUSCHs) on the single cell. The wireless device may transmit or receive the one or more TBs/physical channels (e.g., one or more PDSCHs/PUSCHs) via the single cell and based on the scheduling information. In response to the downlink signaling indicating that the DCI is used for multi-cell scheduling (e.g., scheduling a plurality of TBs/physical channels (e.g., PDSCHs/PUSCHs) via a plurality of cell cell), the wireless device may use a value of the first field to determine first scheduling information for a first TB/physical channel (e.g., PDSCH/PUSCH) on a first cell and second scheduling information for a second TB/physical channel (e.g., PDSCH/PUSCH) on a second cell. The wireless device may transmit or receive the first TB/physical channel on the first cell based on the first scheduling information and the wireless device may transmit or receive the second TB/physical channel on the second cell based on the second scheduling information.

Figure 30:
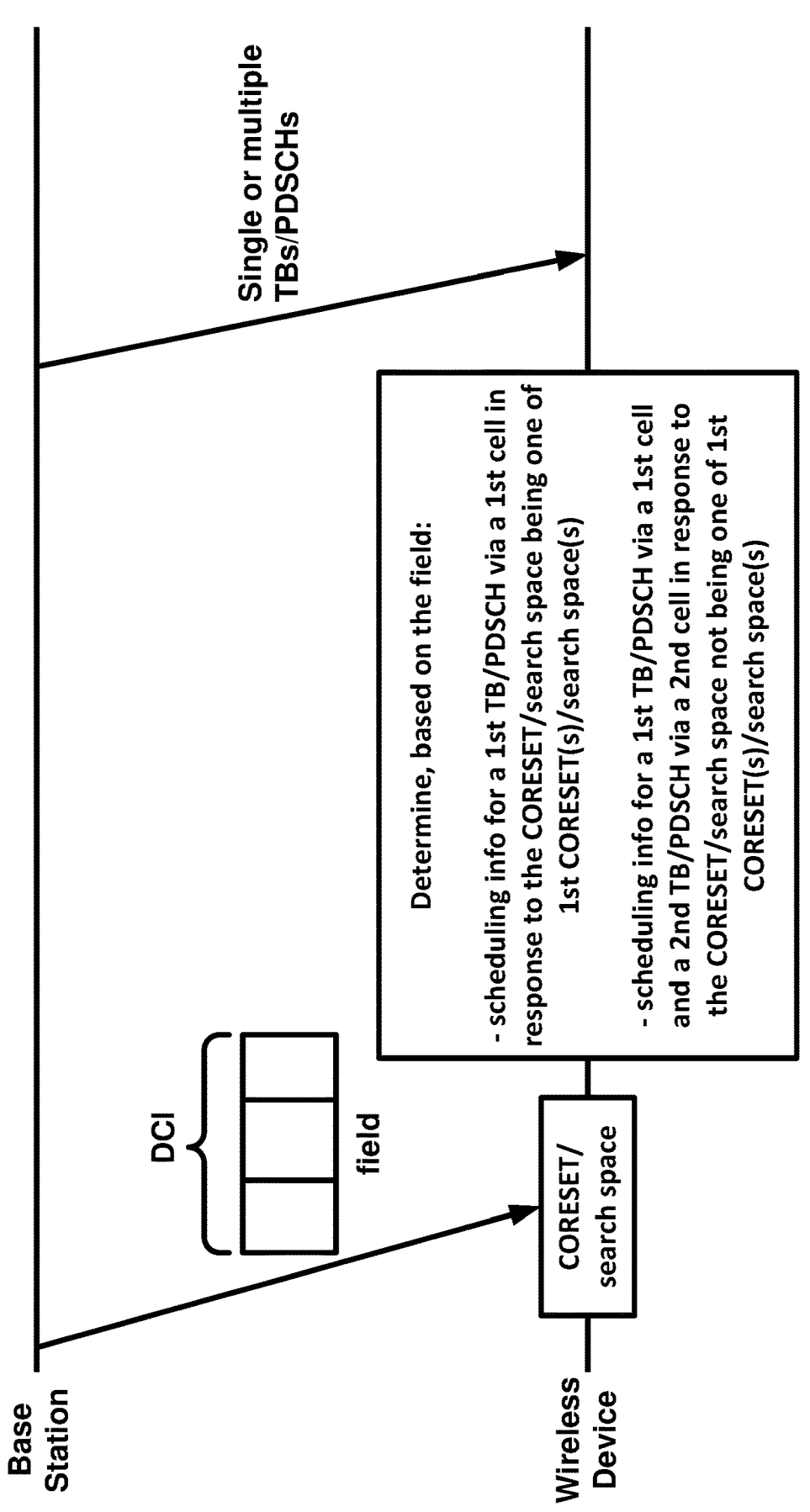
FIG. 30 shows an example process in accordance with several of various embodiments of the present disclosure.
Figure 31:
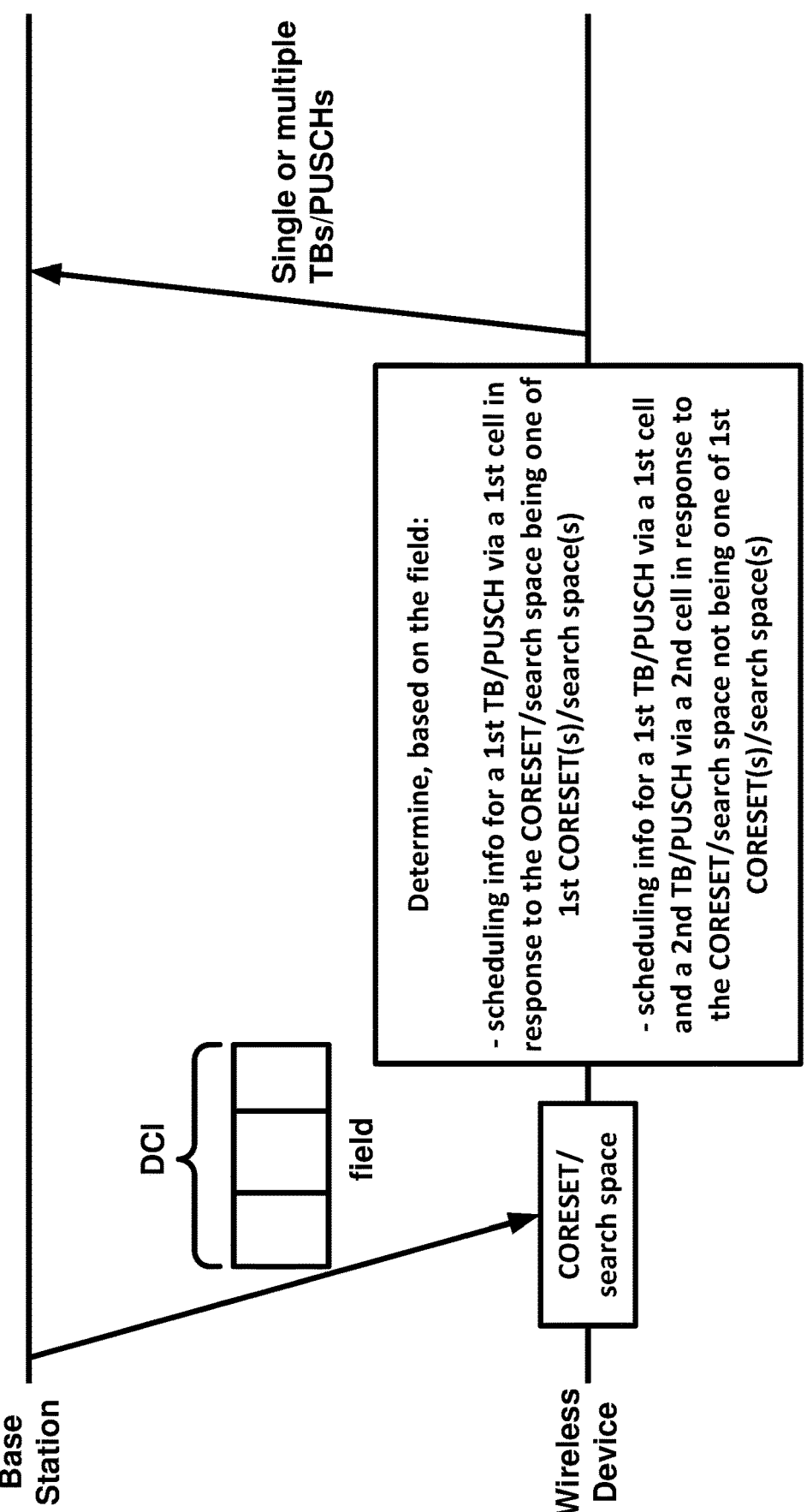
FIG. 31 shows an example process in accordance with several of various embodiments of the present disclosure.

In an example embodiment as shown in FIG. 30 and FIG. 31, a wireless device may receive a DCI via a CORESET/search space. The DCI may comprise a field. The CORESET/search space that the DCI is received may indicate whether the value of the field of the DCI indicates scheduling information/transmission parameter(s) for one or more TBs (e.g., one or more downlink or one or more uplink TBs)/physical channels (e.g., PDSCHs/PUSCHs) via a single cell or the value of the field of the DCI indicates scheduling information/transmission parameter(s) for a plurality of TBs (e.g., a plurality of downlink or uplink TBs)/physical channels (e.g., PDSCHs/PUSCHs) via a plurality of cells. The CORESET/search space that the DCI is received may be one of one or more first CORESETs/search spaces or one of one or more second CORESETs/search spaces. In response to the CORESET/search space that the DCI is received being one of the one or more first CORESETs/search spaces (and/or not being one of the one or more second CORESETs/search spaces), the wireless device may determine scheduling information/transmission parameter(s) for one or more first TBs (e.g., one or more first downlink TBs or one or more first uplink TBs)/physical channels (e.g., PDSCHs/PUSCHs) on a single cell (e.g., a first cell). The wireless device may transmit or receive the one or more first TBs/physical channels via the single cell. In response to the CORESET/search space that the DCI is received being one of the one or more second CORESETs/search spaces, the wireless device may determine first scheduling information/transmission parameter(s) for a first TB (e.g., a first downlink TB or a first uplink TB)/physical channel (e.g., PDSCH/PUSCH) on a first cell and second scheduling information/transmission parameter(s) for a second TB (e.g., a second downlink TB or a second uplink TB)/physical channel (e.g., PDSCH/PUSCH) on a second cell. The wireless device may transmit or may receive the first TB/physical channel via the first cell and based on the first scheduling information/transmission parameter(s) and the wireless device may transmit or may receive the second TB/physical channel via the second cell and based on the second scheduling information/transmission parameter(s).

Figure 32:
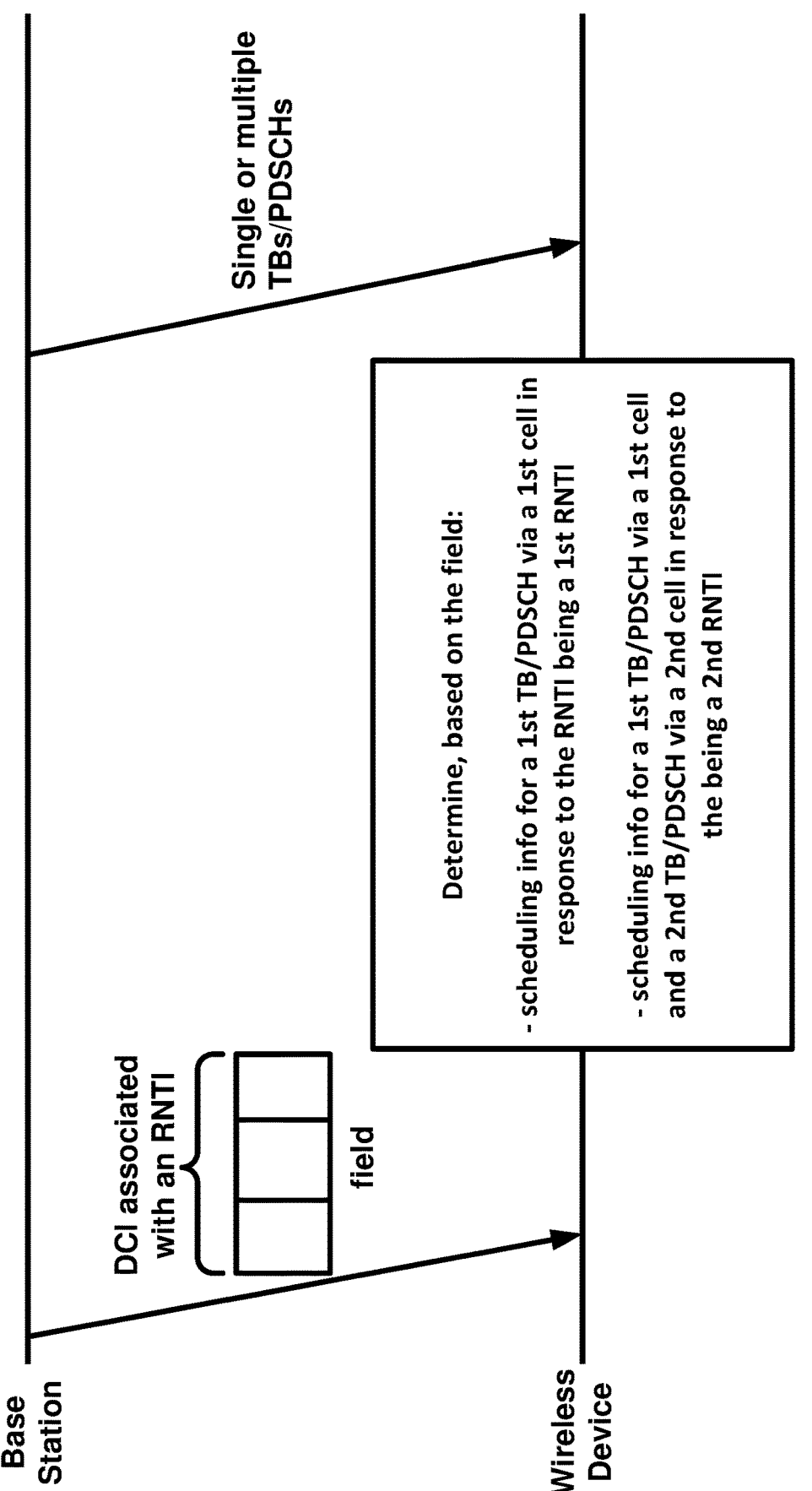
FIG. 32 shows an example process in accordance with several of various embodiments of the present disclosure.
Figure 33:
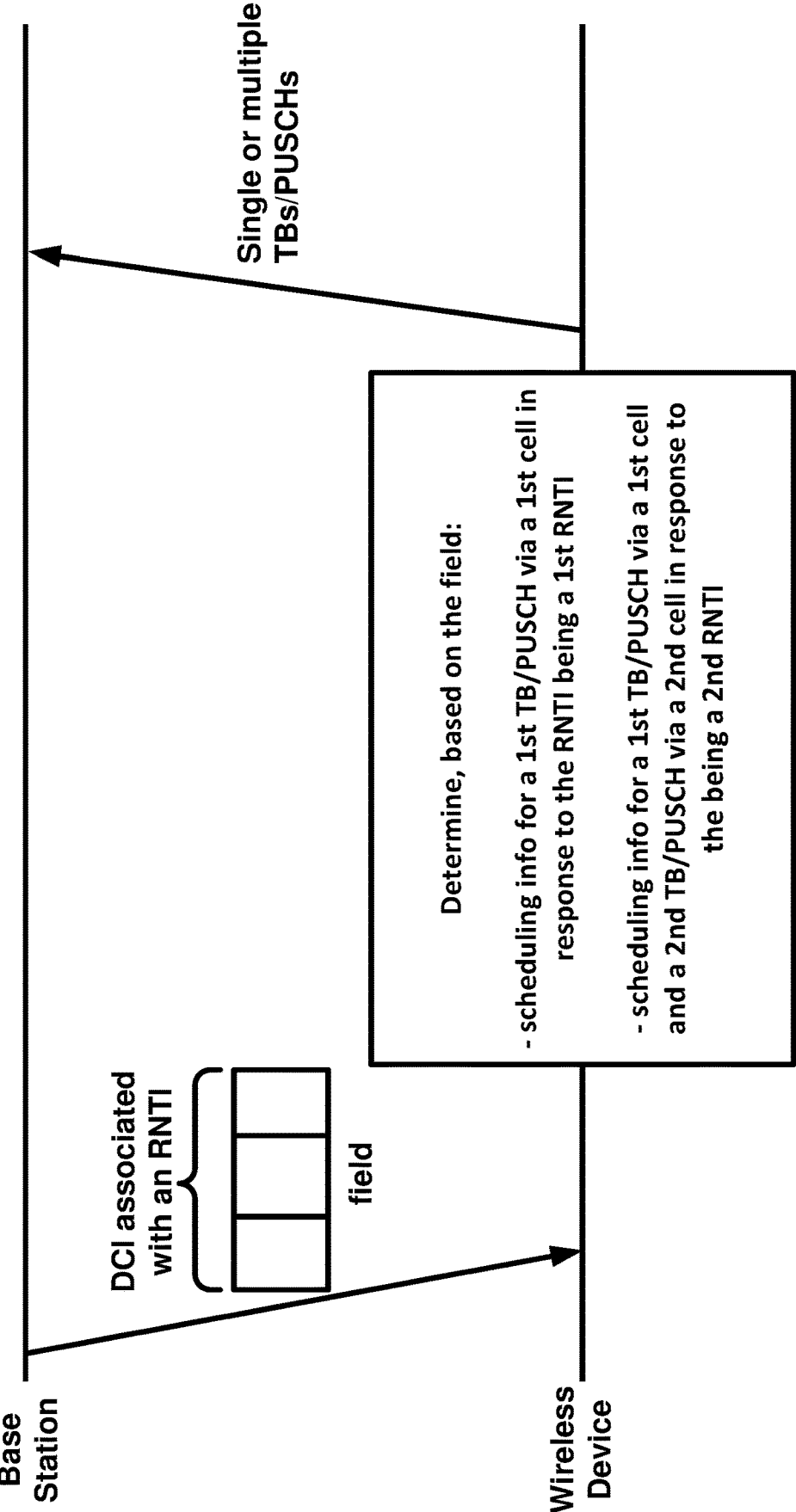
FIG. 33 shows an example process in accordance with several of various embodiments of the present disclosure.

In an example embodiment as shown in FIG. 32 and FIG. 33, a wireless device may receive a DCI associated with an RNTI. The CRC field of the DCI may be scrambled by the RNTI. The DCI may comprise a field. The RNTI that the DCI is associated with may indicate whether the value of the field of the DCI indicates scheduling information/transmission parameter(s) for one or more TBs (e.g., one or more downlink or one or more uplink TBs)/physical channels (e.g., PDSCHs/PUSCHs) via a single cell or the value of the field of the DCI indicates scheduling information/transmission parameter(s) for a plurality of TBs (e.g., a plurality of downlink or uplink TBs)/physical channels (e.g., PDSCHs/PUSCHs) via a plurality of cells. The RNTI that the DCI is associated with may be one of one or more first RNTIs or one of one or more second RNTIs. In response to the RNTI that the DCI is associated with being one of the one or more first RNTIs (and/or not being one of the one or more second RNTIs), the wireless device may determine scheduling information/transmission parameter(s) for one or more first TBs (e.g., one or more first downlink TBs or one or more first uplink TBs)/physical channels (e.g., PDSCHs/PUSCHs) on a single cell (e.g., a first cell). The wireless device may transmit or receive the one or more first TBs/physical channels via the single cell. In response to the RNTI that the DCI is associated with being one of the one or more second RNTIs, the wireless device may determine first scheduling information/transmission parameter(s) for a first TB (e.g., a first downlink TB or a first uplink TB)/ physical channel (e.g., PDSCH/PUSCH) on a first cell and second scheduling information/transmission parameter(s) for a second TB (e.g., a second downlink TB or a second uplink TB)/physical channel (e.g., PDSCH/PUSCH) on a second cell. The wireless device may transmit or may receive the first TB/physical channel via the first cell and based on the first scheduling information/transmission parameter(s) and the wireless device may transmit or may receive the second TB/physical channel via the second cell and based on the second scheduling information/transmission parameter(s).

Figure 34:
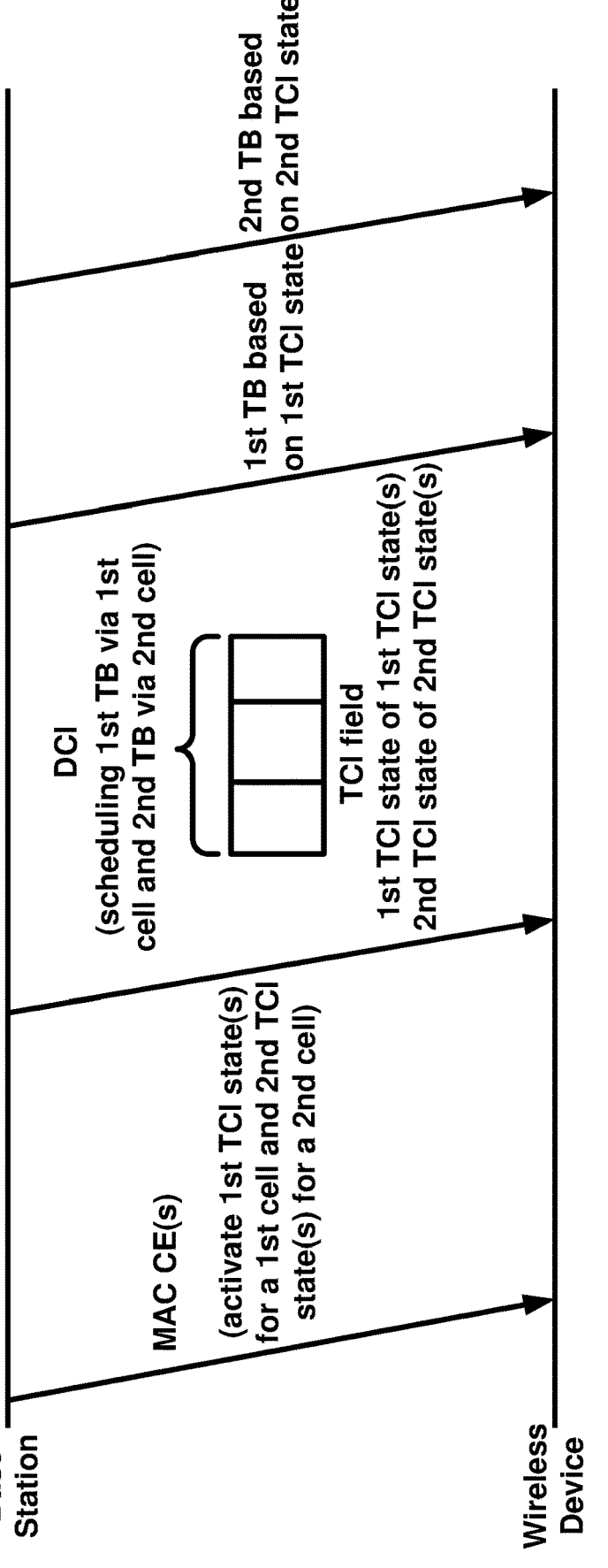
FIG. 34 shows an example process in accordance with several of various embodiments of the present disclosure.

In an example embodiment as shown in FIG. 34, a wireless device may receive one or more messages comprising configuration parameters of a plurality of cells comprising a first cell and a second cell. The one or more messages may comprise first configuration parameters of a first plurality of TCI states for the first cell and second configuration parameters of a second plurality of TCI states for the second cell. The wireless device may receive one or more MAC CEs indicating activation of one or more first TCI states, of the first plurality of TCI states, for the first cell and activation of one or more second TCI states, of the second plurality of TCI states, for the second cell. For example, the wireless device may receive a first MAC CE indicating activation of one or more first TCI states, of the first plurality of TCI states, and the wireless device may receive a second MAC CE indicating activation of one or more second TCI states of the second plurality of TCI states. The one or more MAC CEs may comprise one or more TCI state Activation/Deactivation MAC CEs. A TCI state activation/deactivation MAC CE may comprise a plurality of fields wherein a field, of the plurality of fields, may correspond to a configured TCI state and a value of one for the field may indicate that the corresponding configured TCI state is activated and a value of zero for the field may indicate that the corresponding configured TCI state is deactivated. A TCI state activation/deactivation MAC CE may comprise a field indicating a cell identifier of a cell for which the TCI state activation/deactivation MAC CE applies. The TCI state activation/deactivation MAC CE may comprise a field indicating a BWP identifier of a BWP of a cell for which the TCI state activation/deactivation MAC CE applies.

The wireless device may receive a DCI comprising a transmission configuration indication (TCI) field. The DCI may be a downlink scheduling DCI. The DCI may indicate scheduling a first downlink TB via the first cell and scheduling a second downlink TB via the second cell. A value of the TCI filed of the DCI may indicate a first TCI state of the one or more first activated TCI states for the first cell. The value of the TCI field of the DCI may indicate a second TCI state of the one or more second activated TCI states for the second cell. The codepoint of the DCI to which the first TCI State is mapped may be determined by/based on its ordinal position among the one or more first activated TCI States. For example, the codepoint 0 of the TCI field of the DCI may be mapped to the TCI state with lowest ordinal position in the one or more first activated TCI states. For example, the codepoint 1 of the TCI field of the DCI mapped to the second lowest ordinal position in the one or more first activated states. The codepoint of the DCI to which the second TCI State may be mapped may be determined based on/by its ordinal position among all the one or more second activated TCI States. For example, the codepoint 0 of the TCI field of the DCI may be mapped to the TCI state with lowest ordinal position in the one or more second activated TCI states. For example, the codepoint 1 of the TCI field of the DCI mapped to the second lowest ordinal position in the one or more second activated states. The wireless device may receive a first downlink TB via the first cell based on the first TCI state and based on scheduling information indicated by the DCI. The wireless device may receive a second downlink TB via the second cell based on the second TCI state and based on the scheduling information indicated by the DCI.

In an example, the one or more first activated TCI states, for the first cell, may be the same as the one or more second TCI states for the second cell. In an example, the wireless device may expect that the one or more first activated states and the one or more second TCI states are the same. In an example, the first plurality of configured TCI states for the first cell and the second plurality of configured TCI states for the cell may be the same. In an example, the wireless device may expect that the first plurality of configured TCI states, for the first cell, and the second plurality of configured TCI states, for the second cell, may be the same. In an example, the wireless device may receive one or more configuration parameters indicating one or more lists of cells (e.g., one or more simultaneous update TCI lists). One or more cells in a list of cells (e.g., in a simultaneous update TCI list) may be configured to have the same activated TCI states. In an example, the one or more configuration parameters may indicate that the first cell and the second cell are in a first list of cells (e.g., in a first simultaneous update TCI list) in the one or more lists of cells (e.g., the one or more simultaneous update TCI lists). The wireless device may expect that cells scheduled by a multi-cell scheduling DCI (e.g., the first cell and the second cell scheduled by the DCI) are in the same configured list of cells (e.g., in the same simultaneous update TCI list). Based on the first cell and the second cell being in the same configured list of cells (e.g., in the same simultaneous update TCI list), the wireless device may determine that the one or more first activated TCI states for the first cell and the one or more second activated TCI states for the second cell are the same. For example, a MAC CE in the one or more MAC CE (e.g., a TCI state activation/deactivation MAC CE) may indicate activation of one or more TCI states for a cell in the same configured list of cells (e.g., the same simultaneous update TCI list) that include the first cell and the second cell. The one or more first activated TCI states and the one or more second activated TCI states may be the one or more TCI states based on reception of the MAC CE. Based on the one or more first activated states for the first cell being the same as the one or more second activated states for the second cell, the first TCI state and the second TCI state indicated by the value of the TCI field of the DCI may be the same.

In an example, the one or more MAC CEs may comprise a first MAC CE, for activation of the one or more first TCI states for the first cell, and a second MAC CE for activation of the one or more second TCI states for the second cell. In an example, a first number of the one or more first activated TCI states for the first cell may be the same as a second number of one or more second activated TCI states for the second cell. In an example, the wireless device may expect that the first number of the one or more first activated TCI states for the first cell to be the same as the second number of one or more second activated TCI states for the second cell.

In an example, the one or more MAC CEs may comprise a first MAC CE, for activation of the one or more first TCI states for the first cell, and a second MAC CE for activation of the one or more second TCI states for the second cell. In an example, a first number of the one or more first activated TCI states for the first cell may be different from a second number of one or more second activated TCI states for the second cell. In an example, a codepoint/value of the TCI field of the DCI may be larger than the first number of the one or more first activated TCI states. In an example, a codepoint/value of the TCI field of the DCI may be larger than the second number of the one or more second activated TCI states. In an example, the wireless device may determine the first TCI state, from the one or more first activated TCI states, based on a minimum of the codepoint/value indicated by the TCI field of the DCI and the first number of the one or more first activated TCI states for the first cell. For example, the codepoint/value of the TCI field of the DCI may be 6 and the first number of activated TCI states for the first cell may be 5. The first TCI state, used for reception of the first downlink TB via the first cell may be the min(5, 6)=5. In an example, the wireless device may determine the second TCI state, from the one or more second TCI states, based on a minimum of the codepoint/value indicated by the TCI field of the DCI and the second number of the one or more second activated TCI states for the second cell. For example, the codepoint/value of the TCI field of the DCI may be 6 and the second number of activated TCI states for the second cell may be 4. The second TCI state, used for reception of the second downlink TB via the second cell may be the min(4, 6)=4.

In an example, the wireless device may determine the first TCI state based on the codepoint/value of the TCI field of the DCI and the one or more first activated TCI states for the first cell. The wireless device may determine a second value based on the codepoint/value indicated by the TCI field of the DCI. For example, the wireless device may determine the second value based on the value of the TCI field and an offset (e.g., a configurable offset determined based on an RRC parameter or a pre-determined/pre-configured offset). For example, the wireless device may receive serving cell configuration parameters (for example, serving cell configuration parameters of the second cell) indicating the offset. The wireless device may determine the second TCI state based on the second value and the one or more second activated TCI states for the second cell.

In an example, the wireless device may jointly determine the first TCI state, for the first cell, and the second TCI state for the second cell. The value of the TCI field of the DCI may jointly indicate the first TCI state (e.g., the first TCI state from the one or more first activated TCI states) and the second TCI state (e.g., the second TCI state from the one or more second activated TCI states). The wireless device may determine the first TCI state and the second TCI state based on the value of the field of the TCI and one or more configuration parameters indicating mappings between the value of the TCI field of the DCI and the first TCI state and/or the second TCI state. For example, a codepoint/value of the TCI field of the DCI may be mapped to a tuple (e.g., 2-tuple) of a first TCI state for the first cell and a second TCI state for the second cell. For example, 8 TCI states may be activated for the first cell and 8 TCI states may be activated for the second cell. TCI state 1 of cell 1 and TCI state 2 of cell 2 may be jointly configured as one coding point.

Figure 35:
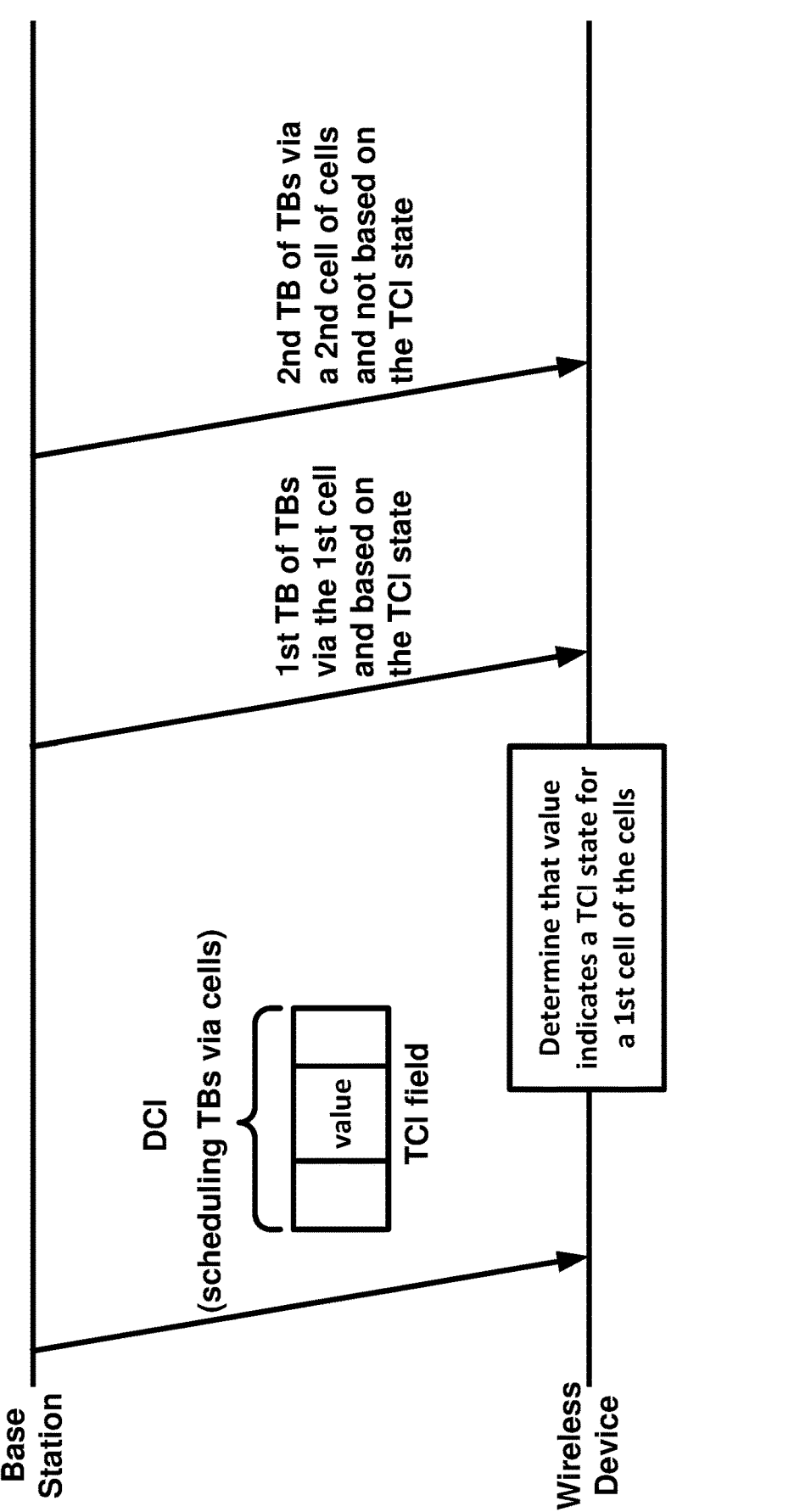
FIG. 35 shows an example process in accordance with several of various embodiments of the present disclosure.

In an example embodiment as shown in FIG. 35, a wireless device may receive a DCI (e.g., a multi-cell scheduling DCI) indicating scheduling information for reception of a first downlink TB via a first cell and reception of a second downlink TB via a second cell. The DCI may comprise a transmission configuration indication (TCI) field. The wireless device may determine to use the TCI field of the DCI for reception of one of the first downlink TB and the second downlink TB and may determine that the TCI field of the DCI is associated with one of first cell and the second cell. The wireless device may determine that the TCI field of the DCI is associated with the first downlink TB/first cell. The wireless device may determine that a value of the TCI field of the DCI indicates a first TCI state for the first cell and for reception of the first downlink TB. The wireless device may receive the first downlink TB via the first cell and based the first TCI state determined from a value of the TCI field of the DCI and based on the scheduling information indicated by the DCI. In an example, the wireless device may determine that the TCI field of DCI is not associated with the second downlink TB and/or is not used for determining a TCI state for reception of the second downlink TB. The wireless device may receive the second downlink TB via the second cell based on the scheduling information indicated by the DCI and not based on the first TCI state.

In an example, based on a first frequency band/frequency range (FR) associated with the first cell and a second frequency band/frequency range (FR) associated with the second cell, the wireless device may determine that the TCI field of the DCI is associated with the first downlink TB/cell and indicates the first TCI state for reception of the first downlink TB via the first cell and that the TCI field of the DCI is not associated with the second downlink TB/cell and does not indicate a TCI state for reception of the second downlink TB via the second cell. For example, in response to the first cell operating in an FR2 frequency range and the second cell operating in an FR1 frequency range, the wireless device may determine that the TCI field of the DCI is associated with the first downlink TB/cell and indicates the first TCI state for reception of the first downlink TB via the first cell and that the TCI field of the DCI is not associated with the second downlink TB/cell and does not indicate a TCI state for reception of the second downlink TB via the second cell.

In an example, the DCI may be received via a PDCCH on the second cell. Based on the DCI/PDCCH being received on the second cell, the wireless device may determine a second TCI state for reception of the second downlink TB based on the TCI state that is used for reception of the DCI/PDCCH. For example, the second TCI state for reception of the second downlink TB may be the same as the TCI state used for reception of the DCI/PDCCH. For example, the wireless device may receive a TCI State Indication for UE-specific PDCCH MAC CE to determine the TCI state for reception of the DCI/PDCCH and may use the same TCI state for reception of the second downlink TB. The wireless device may use the TCI field of the DCI to determine the first TCI state for reception of the first downlink TB via the first cell and may not use the TCI field of the DCI for determining the second TCI state for reception of the second downlink TB.

Figure 36:
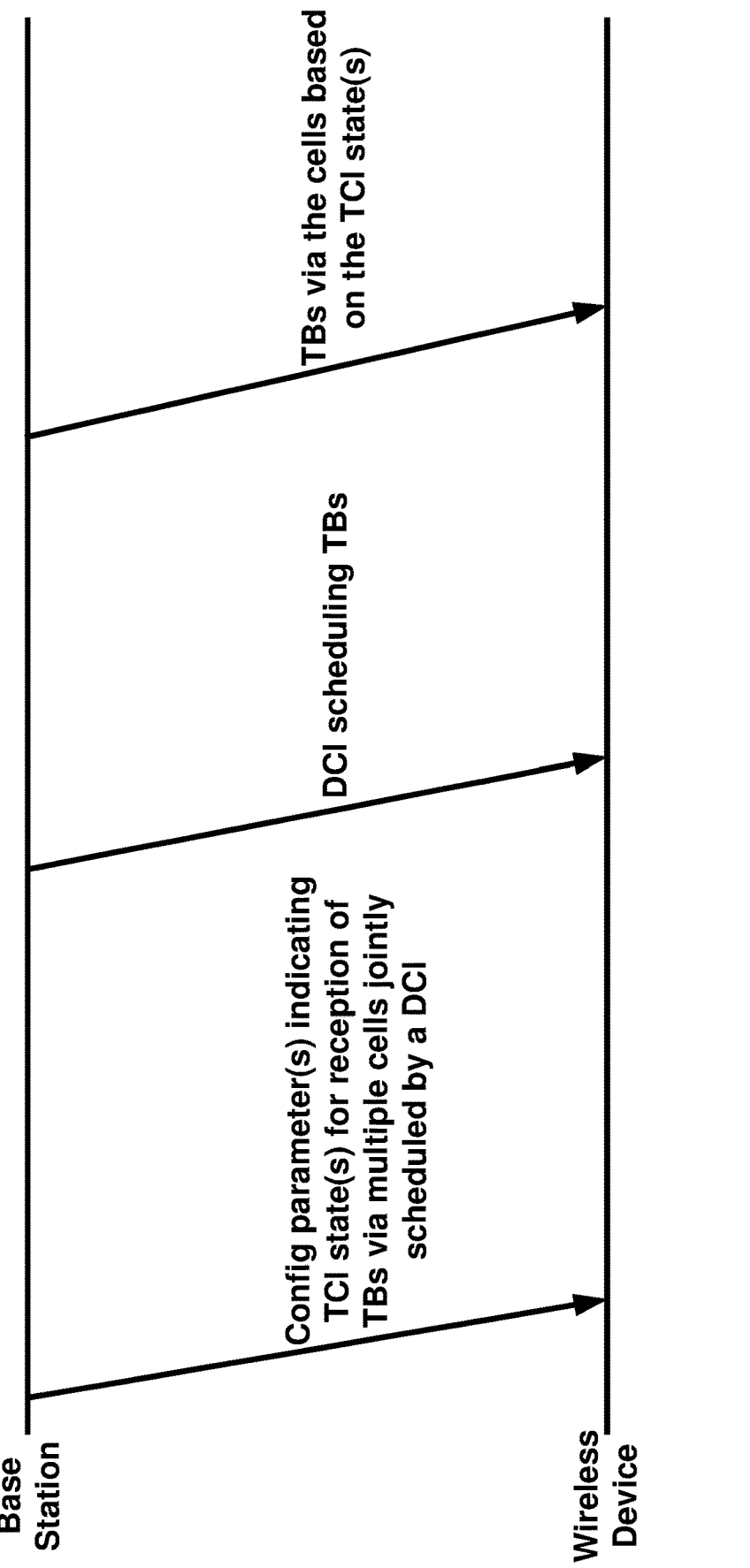
FIG. 36 shows an example process in accordance with several of various embodiments of the present disclosure.

In an example embodiment as shown in FIG. 36, a wireless device may receive one or more configuration parameters indicating at least one TCI state for reception of a plurality of TBs, via a plurality of cells, jointly scheduled by a DCI. The one or more configuration parameters may indicate the at least one TCI state for reception of downlink TBs that are jointly scheduled by a DCI (e.g., a DCI of a specific format or a DCI associated with a specific RNTI or a DCI received via a specific CORESET/search space or a DCI with a field indicating joint scheduling via multiple cells). The wireless device may receive a DCI indicating scheduling a plurality of TBs via a plurality of cells. The wireless device may receive the plurality of TBs based on the at least one TCI state indicated by the one or more configuration parameters.

In an example, a DCI that indicates joint scheduling of a plurality of TBs, via a plurality of cells, may not comprise a Transmission Configuration Indication (TCI) field. In an example, the wireless device may receive the plurality of TBs via the plurality of cells based on default/pre-determined or configurable (e.g., configurable based on RRC configuration parameter(s)) TCI state(s). In an example, the wireless device may receive at least a first TB, of the plurality of TBs, via a first cell of the plurality of cells using a default/pre-determined or configurable (e.g., configurable based on RRC configuration parameter(s)) TCI state. In an example, the first cell may be in a first frequency range/band (e.g., FR1 or FR2). In an example, each cell, of the plurality of cells, may be separately configured with a TCI state, that is used for reception of a corresponding TB, when a DCI jointly schedules a plurality of TBs via the plurality of cells. In an example, for each cell, of the plurality of cells, a predetermined/configurable TCI state (e.g., a TCI state with lowest ID) may be used for reception of the corresponding TB in the plurality of TBs.

Figure 37:
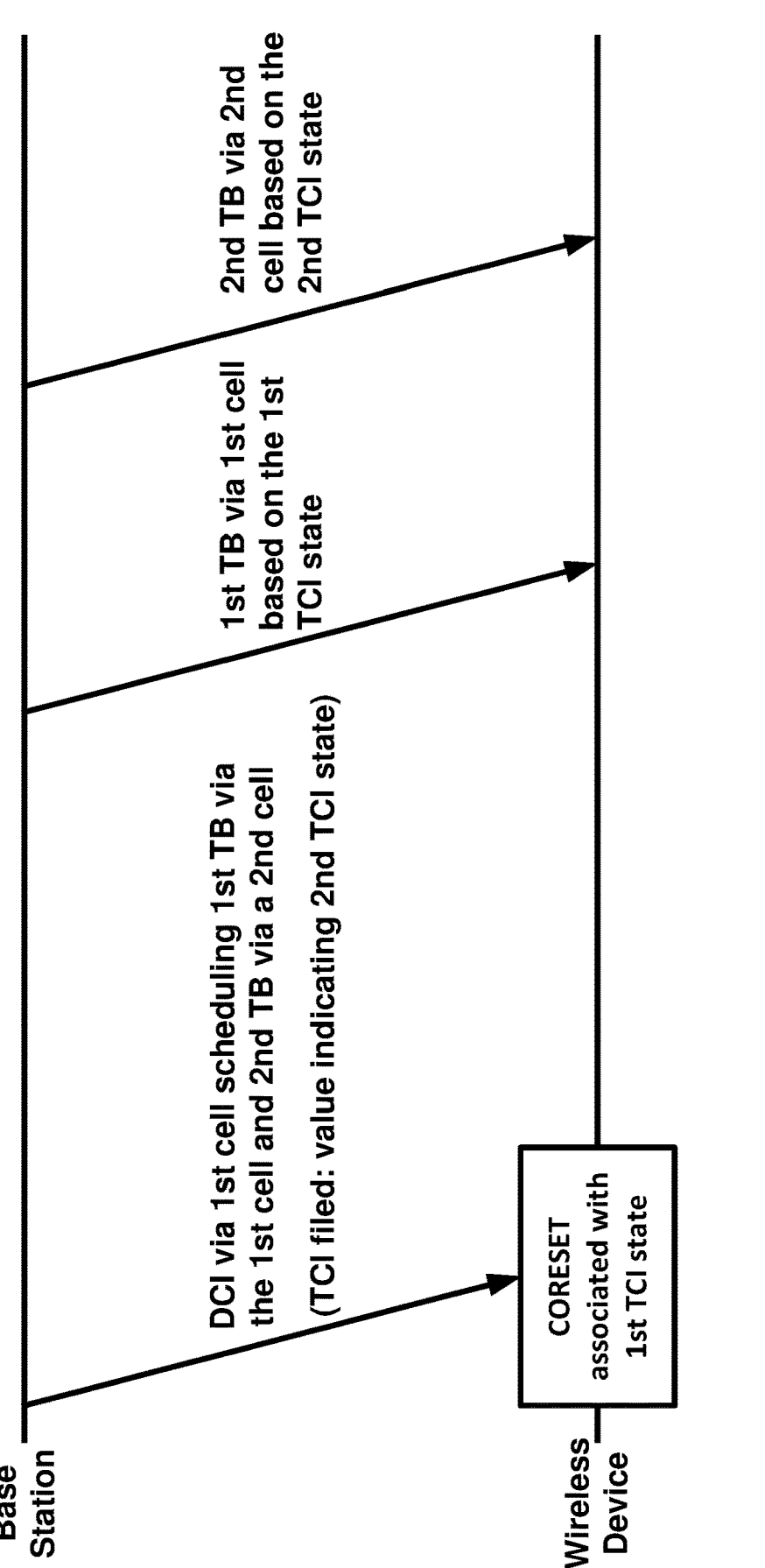
FIG. 37 shows an example process in accordance with several of various embodiments of the present disclosure.

In an example embodiment as shown in FIG. 37, a wireless device may receive a DCI via a first cell. The DCI may be a multi-cell scheduling DCI indicating scheduling information for receiving a first TB via a first cell and receiving a second TB via a second cell. The wireless device may determine that the DCI is a multi-cell scheduling DCI based on a value of a field of the DCI or based on a format of the DCI or based on an RNTI associated with the DCI (e.g., the RNTI scrambling a CRC field of the DCI) or based on a CORESET/search space that the DCI is received. The DCI may comprise a transmission configuration indication (TCI) field. The wireless device may receive the DCI via a CORESET/search space associated with a first TCI state. The wireless device may determine the first TCI state, for reception of the first TB, based on the CORESET/search space that the DCI is received. In an example, the wireless device may receive a MAC CE (e.g., a TCI State Indication for UE-specific PDCCH MAC CE) indicating activation of the first TCI state for receiving of the DCI. In an example, the wireless device may receive configuration parameters of the CORESET that the DCI is received. The configuration parameters of the CORESET may comprise a parameter (e.g., a tci-StatesPDCCH-ToAddList parameter) indicating a subset of the TCI states defined in pdsch-Config included in the BWP-DownlinkDedicated corresponding to the serving cell and to the DL BWP to which the CORESET belongs to. The MAC CE (e.g., the TCI State Indication for UE-specific PDCCH MAC CE) may indicate activation of the first TCI state, from the subset of the TCI states determined based on the CORESET configuration parameters, for receiving of the DCI.

The wireless device may receive the first downlink TB via the first cell based on scheduling information indicated by the DCI and based on the first TCI state associated with the CORESET that the DCI is received. The wireless device may receive the second TB via the second cell based on scheduling information indicated by the DCI and based on a second TCI state. A value of the transmission configuration indication (TCI) field of the DCI may indicate the second TCI state for reception of the second TB via the second cell. The value of the TCI field of the DCI may indicate the second TCI state from one or more activated TCI states of the second cell.

Figure 38:
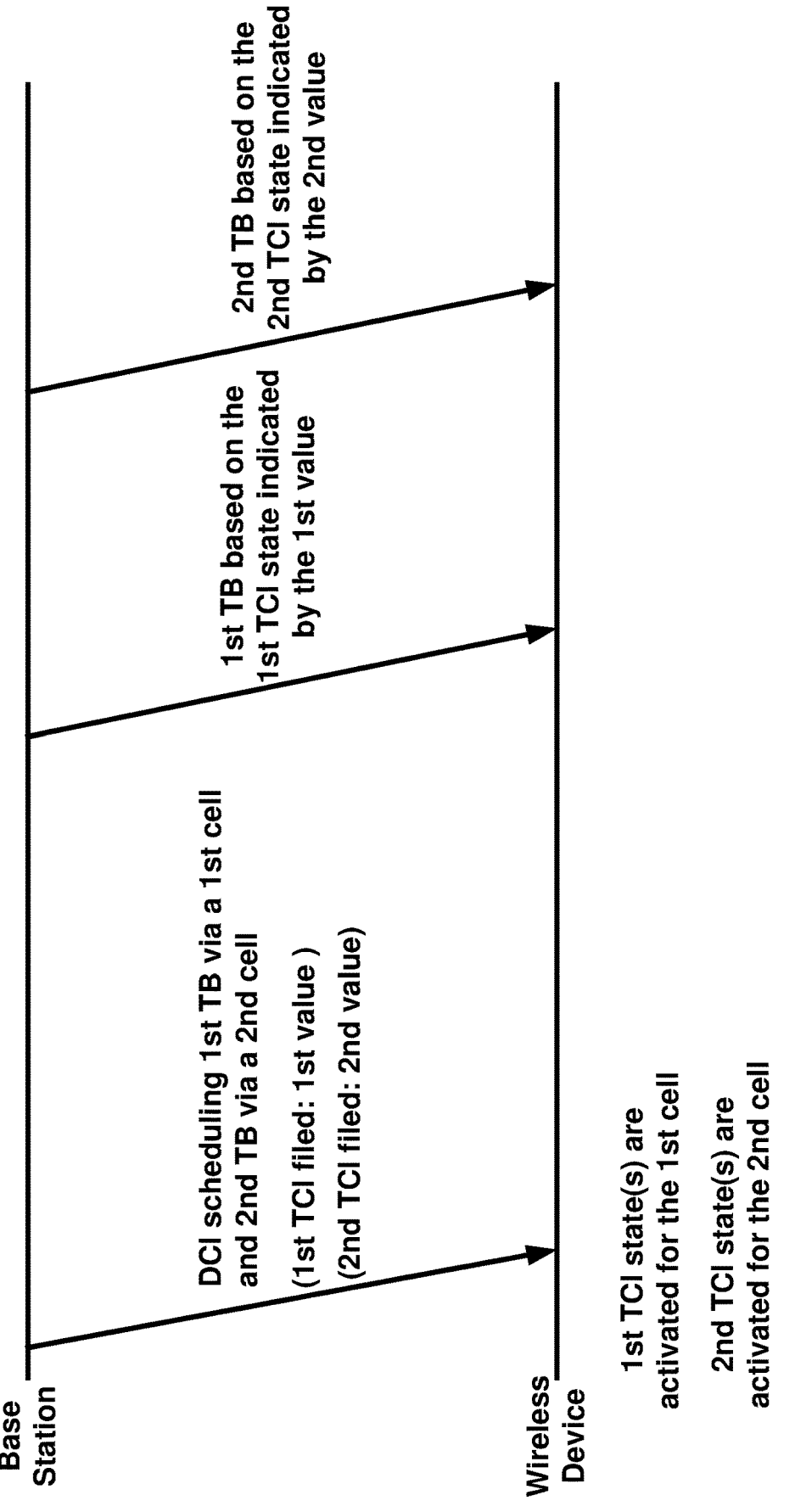
FIG. 38 shows an example process in accordance with several of various embodiments of the present disclosure.

In an example embodiment as shown in FIG. 38, a wireless device may receive a DCI (e.g., a multi-cell scheduling DCI) indicating scheduling information for receiving a first downlink TB via a first cell and a second downlink TB via a second cell. The DCI may comprise a first TCI field, for reception of the first TB via the first cell, and a second TCI field for reception of the second TB via the second cell. The first TCI field may have a first value, indicating the first TCI state, and the second TCI field may have a second value indicating the second TCI state. One or more first TCI states may be activated for the first cell and one or more second TCI states may be activated for the second cell. The wireless device may receive configuration parameters indicating a first plurality of TCI states for the first cell and a second plurality of TCI states for the second cell. The one or more first TCI states, of the first plurality of TCI states, and the one or more second TCI states, of the second plurality of TCI states, may be activated. In an example, when the wireless device receives the DCI, the one or more first TCI states may be activated for the first cell and the one or more second TCI states may be activated for the second cell. The wireless device may expect that the one or more first TCI states be activated for the first cell and the one or more second TCI states be activated for the second cell. The wireless device may expect that, when the wireless device receives the DCI, the one or more first TCI states be activated for the first cell and the one or more second TCI states be activated for the second cell. For example, the wireless device may receive one or more MAC CEs (for example one or more MAC CEs comprising one or more TCI States Activation/Deactivation for UE-specific PDSCH MAC CEs) indicating activation of the one or more first TCI states, from the first plurality of TCI states, for the first cell and activation of the one or more second TCI states, from the second plurality of TCI states, for the second cell.

Figure 39:
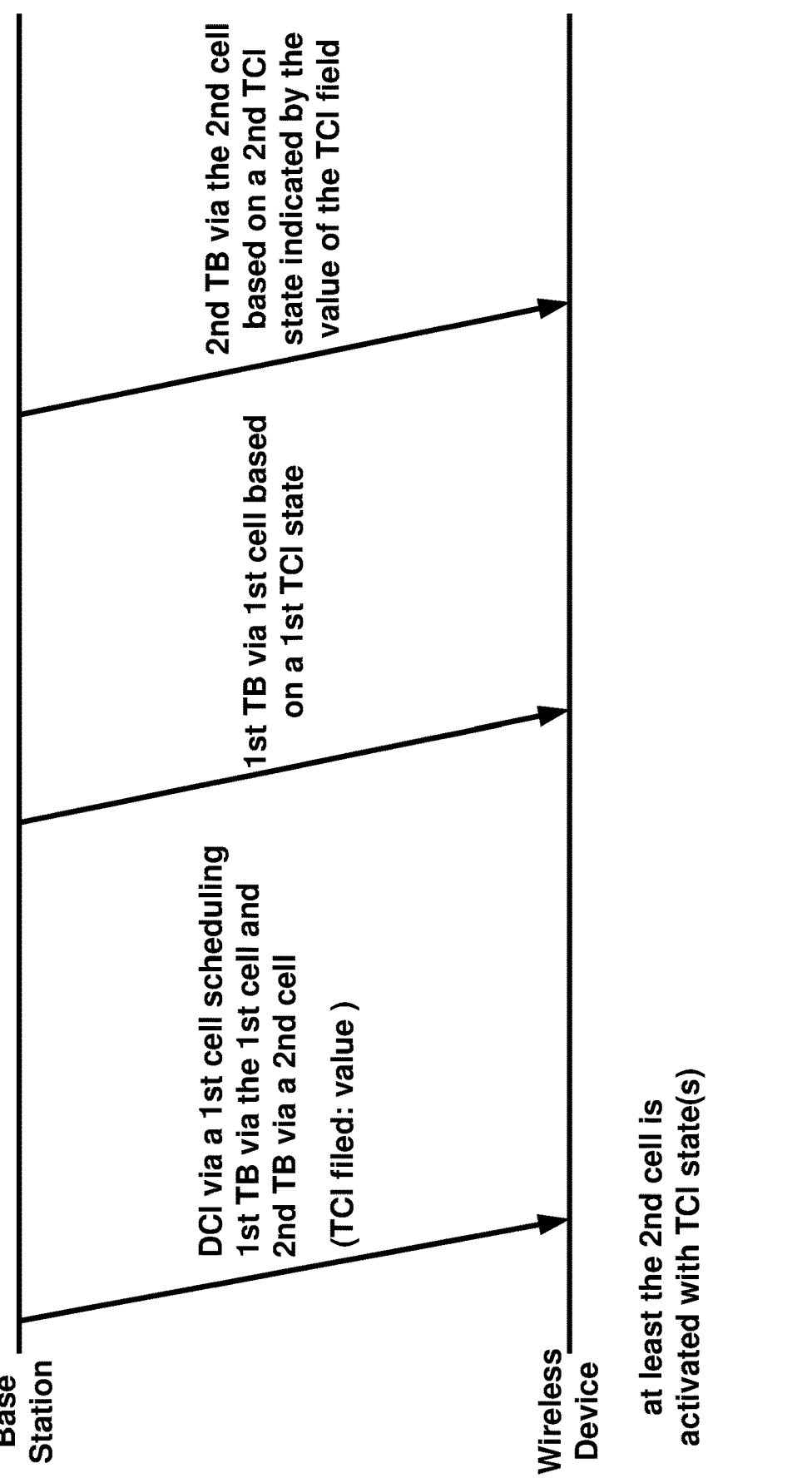
FIG. 39 shows an example process in accordance with several of various embodiments of the present disclosure.

In an example embodiment as shown in FIG. 39, a wireless device may receive a DCI (e.g., a multi-cell scheduling DCI) indicating scheduling information for receiving a first downlink TB via a first cell and a second downlink TB via a second cell. The wireless device may receive the DCI via the first cell. In an example, the first cell may be a primary cell. In an example, the first cell may be a secondary cell. The DCI may comprise a TCI field with a value. At least for the second cell, one or more second TCI states may be activated. The wireless device may receive configuration parameters indicating a first plurality of TCI states for the first cell and a second plurality of TCI states for the second cell. At least for the second cell, one or more second TCI states, of the second plurality of TCI states, may be activated. In an example, when the wireless device receives the DCI, at least the one or more second TCI states may be activated for the second cell. The wireless device may expect that at least the one or more second TCI states, for the second cell, be activated. The wireless device may expect that, when the wireless device receives the DCI, at least the one or more second TCI states be activated for the second cell. For example, the wireless device may receive one or more MAC CEs (for example one or more MAC CEs comprising one or more TCI States Activation/Deactivation for UE-specific PDSCH MAC CEs) indicating activation of at least the one or more second TCI states, from the second plurality of TCI states. In an example, the wireless device may receive the first downlink TB via the first cell based on a first TCI state. In an example, the first TCI state for reception of the first downlink TB, via the first cell, may be based a TCI state used for reception of the DCI via the first cell. For example, the wireless device may receive a TCI State Indication for UE-specific PDCCH MAC CE indicating activation of the first TCI state for the first cell for reception of the DCI via the first cell. In an example, the first cell may not be activated with one or more TCI states. The first TCI state that the downlink TB is received may be a TCI state that is associated with a CORESET of the first cell that the DCI is received.

In an example embodiment, a wireless device may receive may transmit a capability message comprising capability information elements (IEs). The capability IEs may comprise a first capability IE (e.g., a FeatureSetDownlink IE) indicating a set of features that the wireless device supports on the carrier corresponding to one band entry in a band combination. The first IE may comprise a parameter/field (e.g., a minimumDurationForQCL parameter/field) associated with wireless device capabilities related to quasi collocation (QCL). For example, the minimumDuration-ForQCL parameter/field may indicate a minimum number of time (e.g., a minimum number of OFDM symbols) required by the UE to perform PDCCH reception and applying spatial QCL information received in DCI for PDSCH processing. The wireless device may indicate one value of the minimum number of OFDM symbols per each subcarrier spacing (e.g., per each subcarrier spacing of 60 kHz and 120 kHz).

Figure 40:
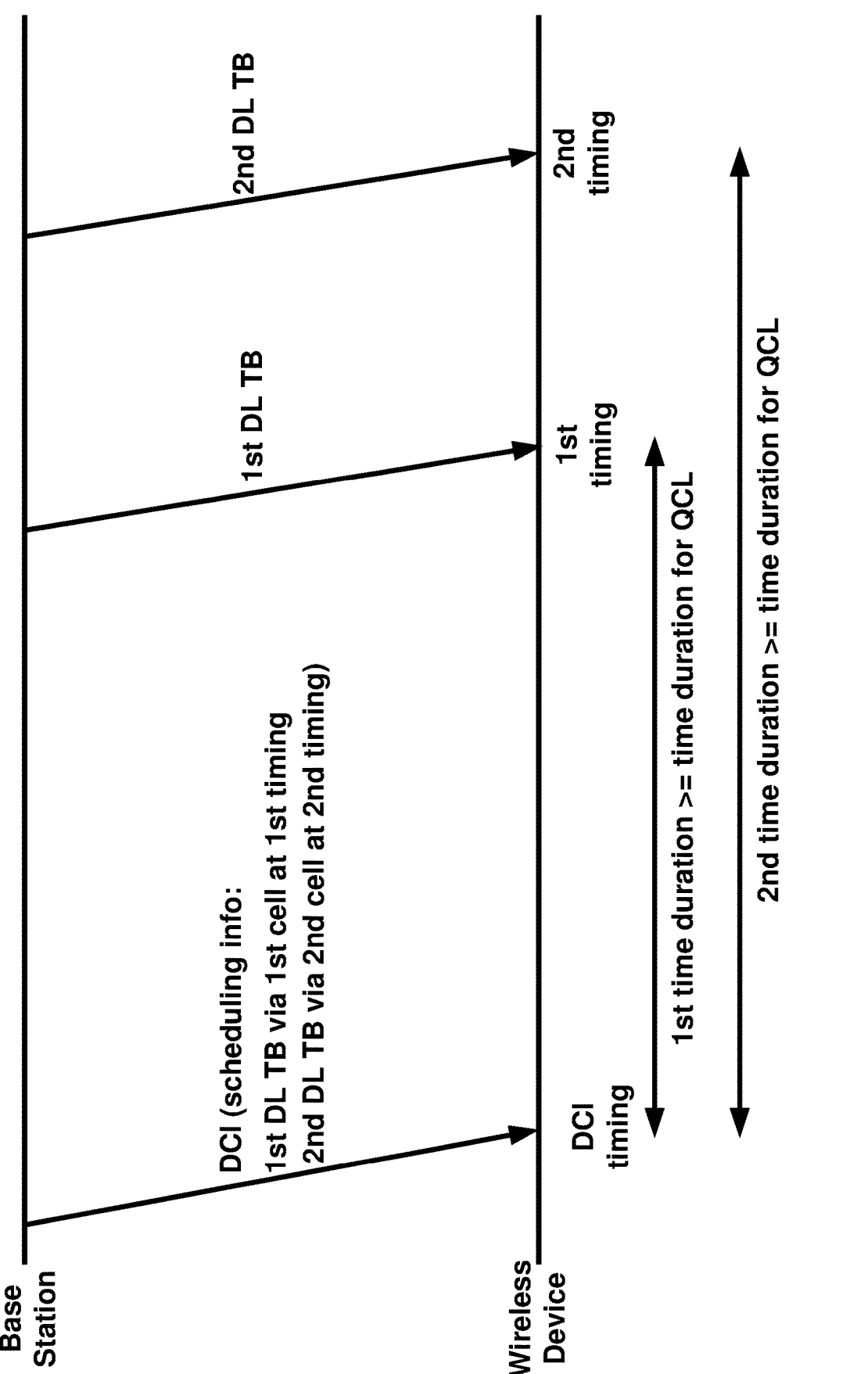
FIG. 40 shows an example process in accordance with several of various embodiments of the present disclosure.

In an example embodiment as shown in FIG. 40, the wireless device may receive a DCI at DCI timing. The wireless device may receive the DCI based on monitoring a CORESET/search space at the DCI timing. In an example, the CORESET/search space may be associated with multi-cell scheduling. The DCI may comprise scheduling information for reception of a first downlink TB, via a first cell at a first timing, and a second downlink TB via a second cell at a second timing. For example, the DCI may comprise one or more fields indicating the first timing of the first downlink TB and the second timing of the second downlink TB. A duration between the DCI timing and the first timing of the first downlink TB may be a first time duration. A duration between the DCI timing and the second timing of the second downlink TB may be a second time duration. The first time duration may be larger than or equal to the time duration for QCL indicated by the minimumDurationForQCL parameter of the wireless device capability message. The wireless device may expect that the first time duration be larger than or equal to the time duration for QCL indicated by the minimumDurationForQCL parameter of the wireless device capability message. The second time duration may be larger than or equal to the time duration for QCL indicated by the minimumDurationForQCL parameter of the wireless device capability message. The wireless device may expect that the second time duration be larger than or equal to the time duration for QCL indicated by the minimumDuration-ForQCL parameter of the wireless device capability message. The wireless device may receive the first downlink TB, via the first cell, at the first timing and based on the DCI. The wireless device may receive the first downlink TB based on the first time duration being larger than or equal to the time duration for QCL indicated by the minimumDuration-ForQCL parameter of the wireless device capability message. The wireless device may receive the second downlink TB, via the second cell, at the second timing and based on the DCI. The wireless device may receive the second downlink TB based on the second time duration being larger than or equal to the time duration for QCL indicated by the minimumDurationForQCL parameter of the wireless device capability message.

Figure 41:
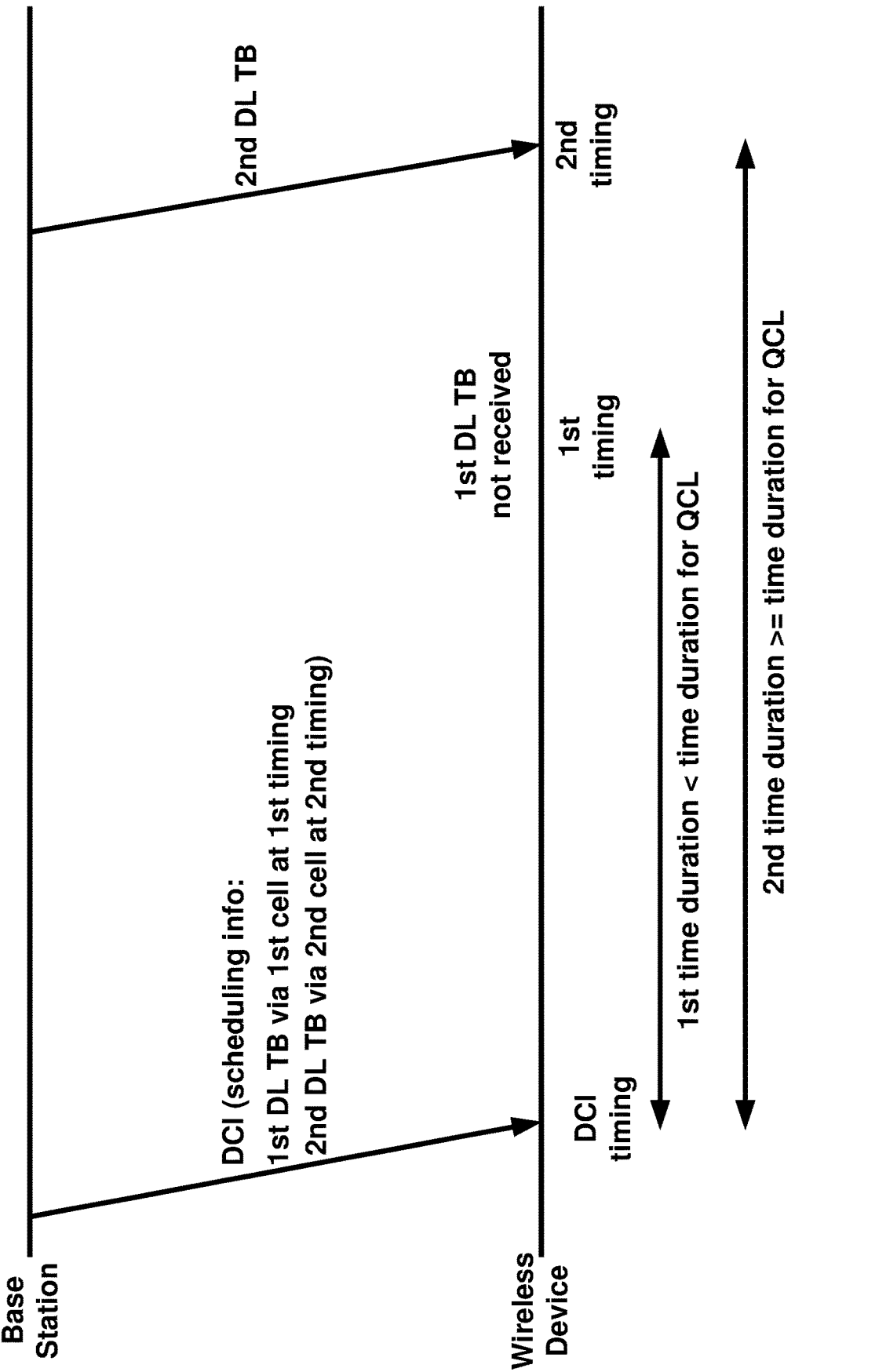
FIG. 41 shows an example process in accordance with several of various embodiments of the present disclosure.

In an example embodiment as shown in FIG. 41, the wireless device may receive a DCI at DCI timing. The wireless device may receive the DCI based on monitoring a CORESET/search space at the DCI timing. In an example, the CORESET/search space may be associated with multi-cell scheduling. The DCI may comprise scheduling information for reception of a first downlink TB, via a first cell at a first timing, and a second downlink TB via a second cell at a second timing. For example, the DCI may comprise one or more fields indicating the first timing of the first downlink TB and the second timing of the second downlink TB. A duration between the DCI timing and the first timing of the first downlink TB may be a first time duration. A duration between the DCI timing and the second timing of the second downlink TB may be a second time duration. The first time duration may be smaller than the time duration for QCL indicated by the minimumDurationForQCL parameter of the wireless device capability message. The second time duration may be larger than or equal to the time duration for QCL indicated by the minimumDurationForQCL parameter of the wireless device capability message. Based on the first time duration being smaller than the time duration for QCL indicated by the minimumDurationForQCL parameter of the wireless device capability message, the wireless device may not receive the first downlink TB. Based on the second time duration may be larger than or equal to the time duration for QCL indicated by the minimumDurationForQCL parameter of the wireless device capability message, the wireless device may receive the second downlink TB, via the second cell, at the second timing and based on the DCI.

Figure 42:
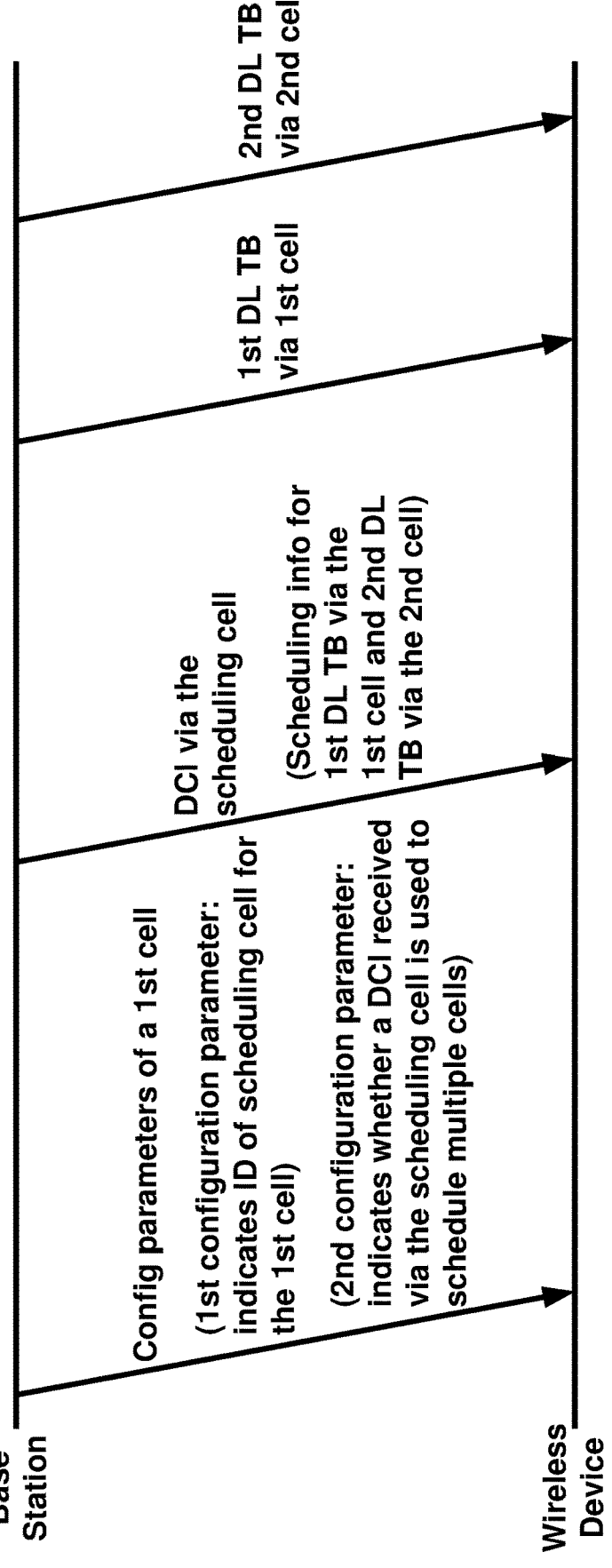
FIG. 42 shows an example process in accordance with several of various embodiments of the present disclosure.
Figure 43:
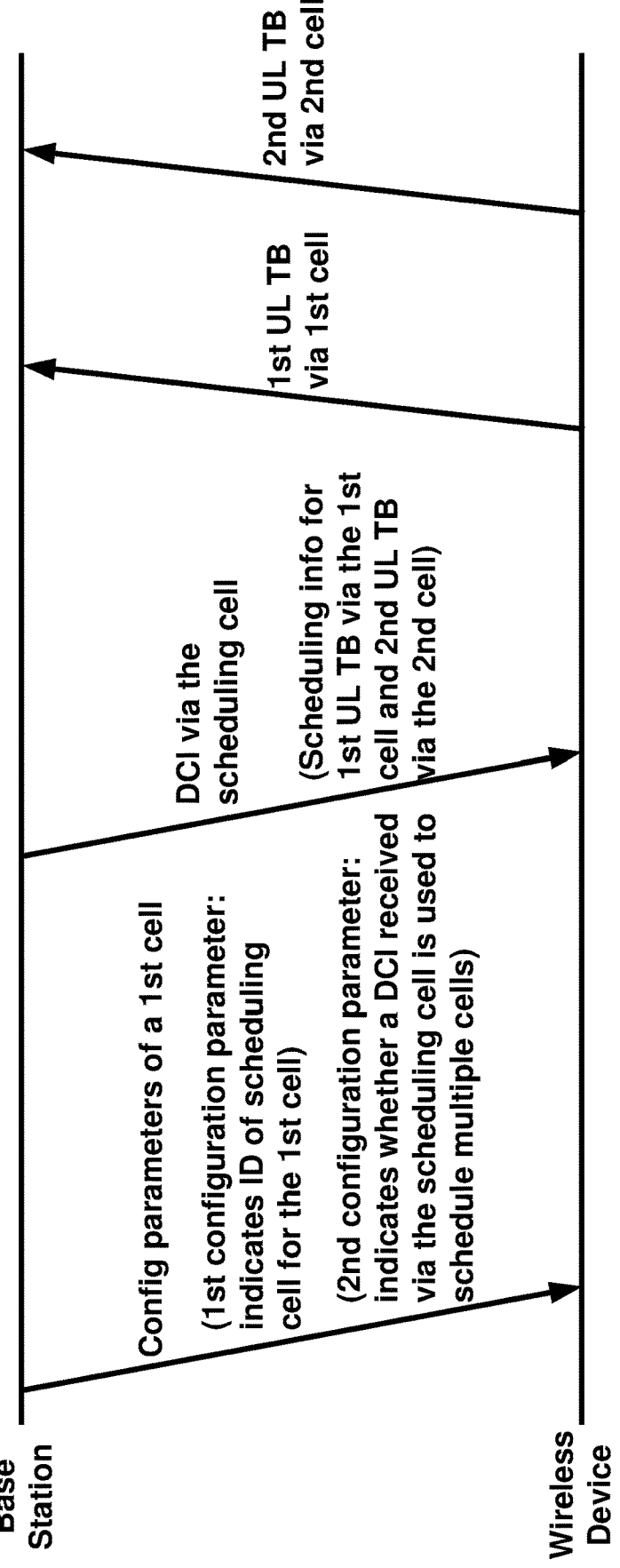
FIG. 43 shows an example process in accordance with several of various embodiments of the present disclosure.

In an example embodiment as shown in FIG. 42 and FIG. 43, a wireless device may receive one or more messages (e.g., one or more RRC messages) comprising configuration parameters of a plurality of serving cells comprising a first serving cell. In an example, the first serving cell may be a primary cell. In an example, the first serving cell may be a secondary cell. The configuration parameters of the first serving cell may comprise a first configuration parameter indicating an identifier of a scheduling cell for the first serving cell. For example, the identifier of the scheduling cell may be based on a serving cell index (e.g., using a ServCellIndex IE). The configuration parameters of the first serving cell may comprise a second configuration parameter indicating whether a DCI, received via the scheduling cell, is used to scheduled/for joint scheduling of multiple cells. The wireless device may receive a DCI via the scheduling cell. The DCI may comprise scheduling information (e.g., resource assignment, etc.) for receiving or transmitting a first TB via the first serving cell and receiving or transmitting a second TB via a second serving cell. Based on the scheduling information indicated by the DCI, the wireless device may receive or transmit the first TB via the first serving cell and may receive or transmit the second TB via the second serving cell.

Figure 44:
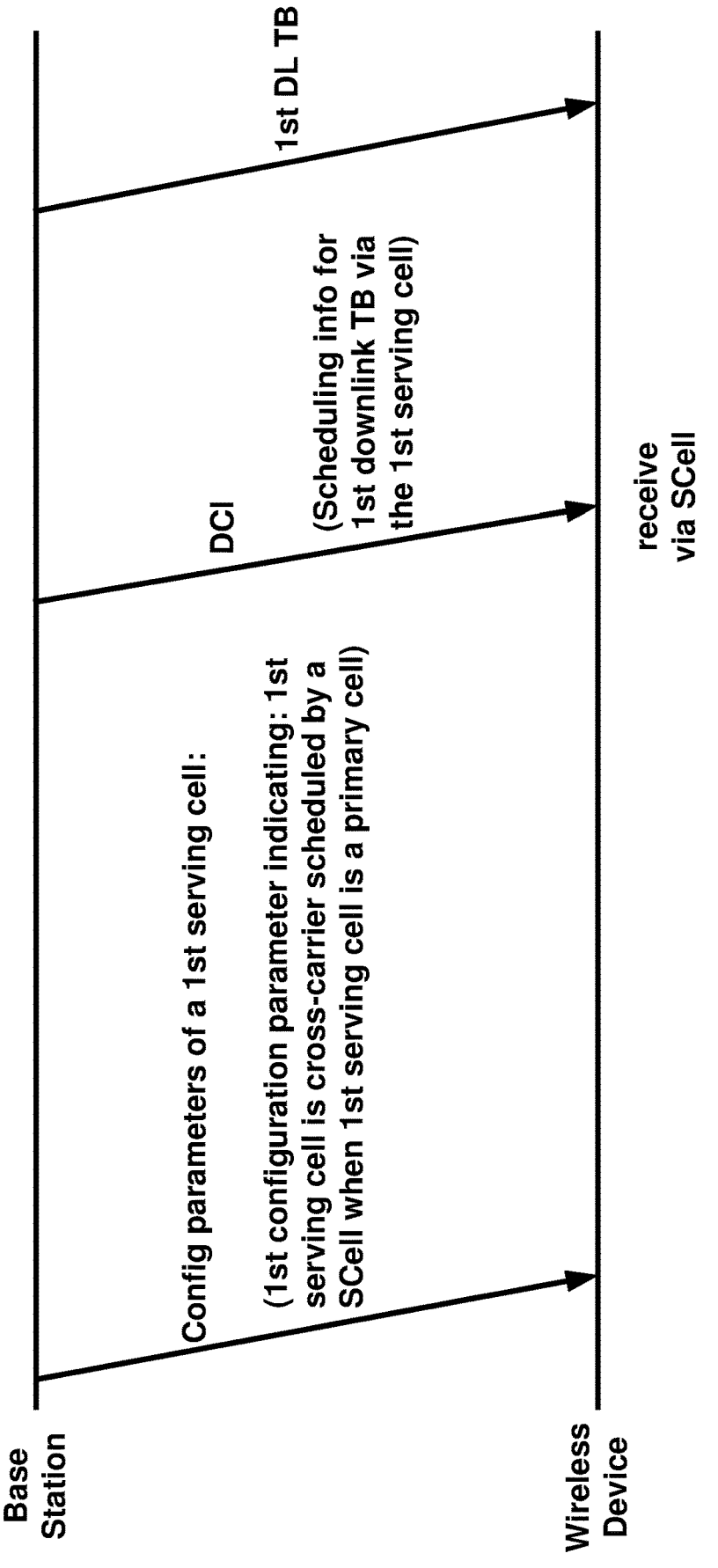
FIG. 44 shows an example process in accordance with several of various embodiments of the present disclosure.
Figure 45:
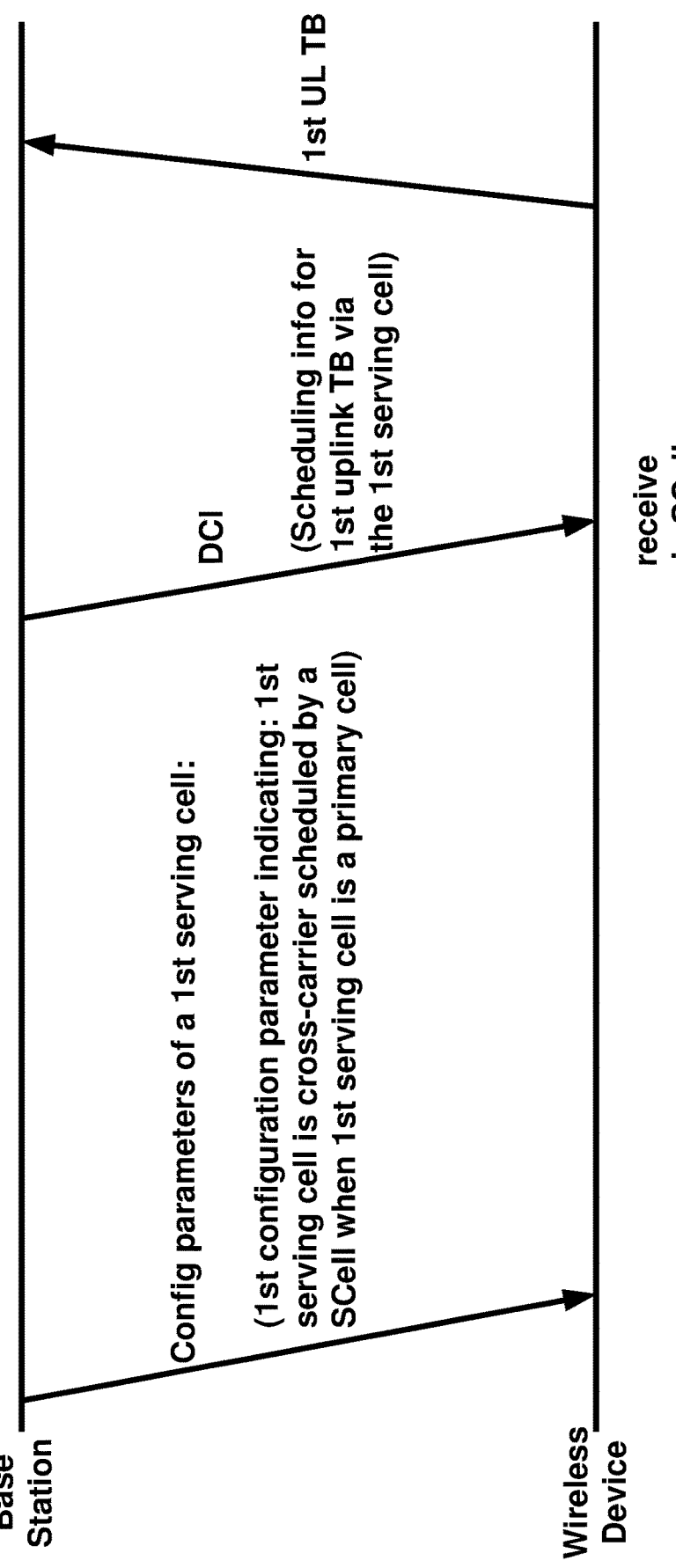
FIG. 45 shows an example process in accordance with several of various embodiments of the present disclosure.

In an example embodiment as shown in FIG. 44 and FIG. 45, a wireless device may receive one or more messages (e.g., one or more RRC messages) comprising configuration parameters of a plurality of serving cells comprising a first serving cell. The configuration parameters of the first serving cell may comprise a first configuration parameter indicating that the first serving cell may be/can be cross-carrier scheduled by second serving cell (e.g., a secondary cell) when the first serving cell is configured as a primary cell. The wireless device may receive a DCI via the second serving cell (e.g., the secondary cell). The DCI may comprise scheduling information for receiving or transmitting a first TB via the first serving cell, wherein the first serving cell is a primary cell. The wireless device may transmit or may receive the first TB via the first serving cell based on the DCI.

In an example embodiment, a wireless device may receive one or more messages (e.g., one or more RRC messages) comprising configuration parameters of a plurality of serving cells comprising a first serving cell. The configuration parameters of the first serving cell may comprise an information element indicating one of a plurality of choices comprising a first choice of a cross-carrier scheduling, a second choice of self-scheduling and a third choice of both cross-carrier and self-scheduling. The information element may indicate a choice of one of a cross-carrier scheduling field, a self-scheduling field and a third filed for both self-scheduling and cross-carrier scheduling. The information element may indicate a field for both cross-carrier and self-scheduling. The information element may indicate that the third field/field for both cross-carrier and self-scheduling is the choice configured for the first serving cell.

Figure 46:
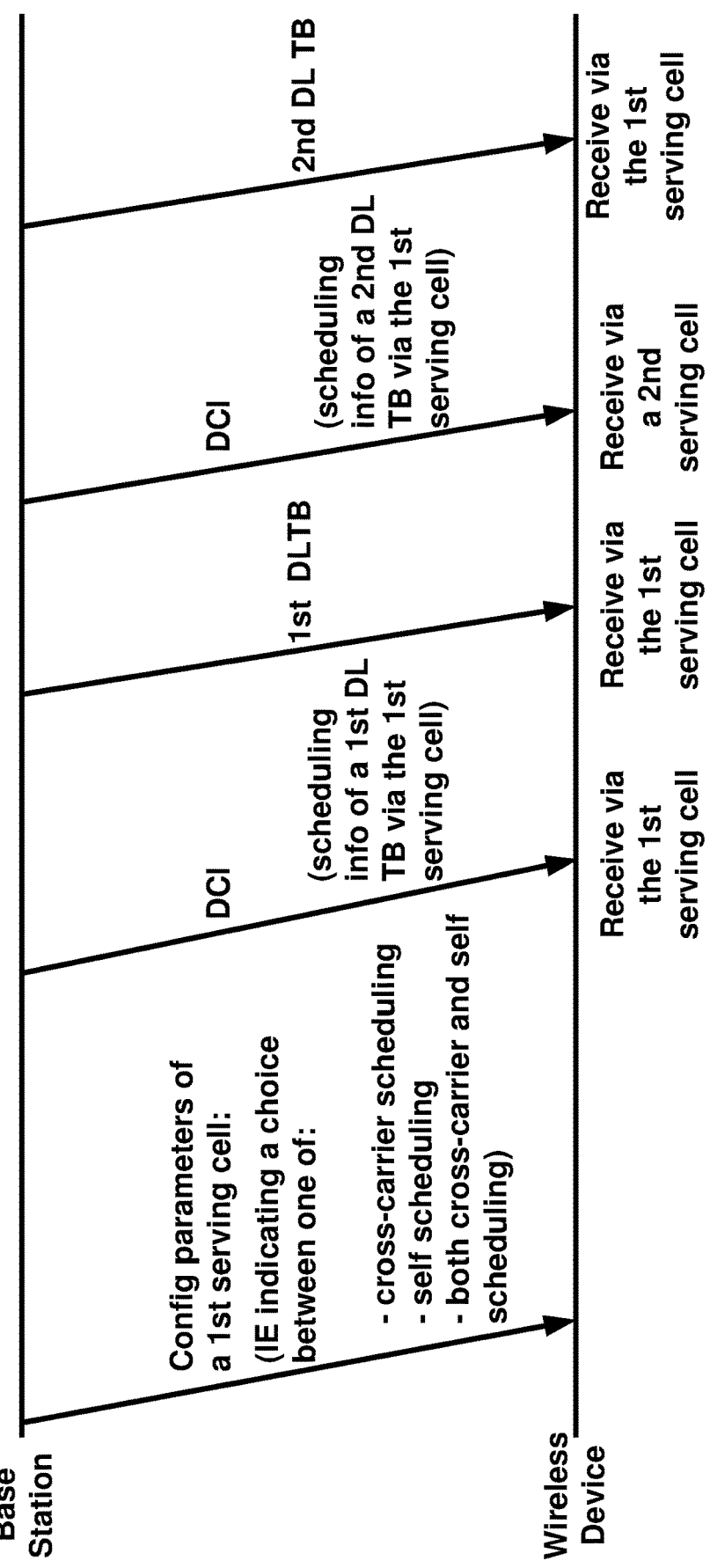
FIG. 46 shows an example process in accordance with several of various embodiments of the present disclosure.
Figure 47:
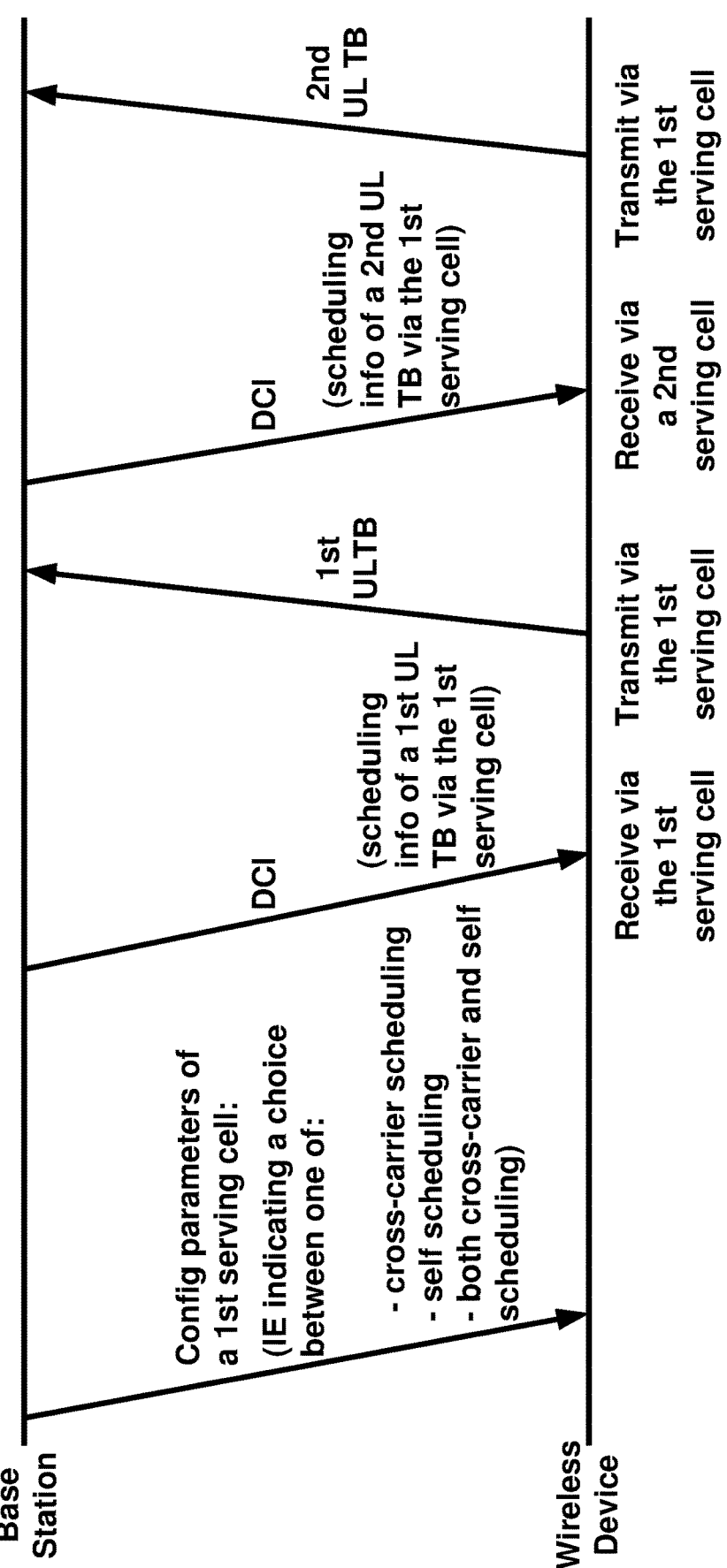
FIG. 47 shows an example process in accordance with several of various embodiments of the present disclosure.

In an example embodiment as shown in FIG. 46 and FIG. 47, in response to the information element indicating that the choice of both cross-carrier and self-scheduling is configured for the first serving cell and the first serving cell is configured with one or more parameters for both cross-carrier and self-scheduling, the wireless device may receive a first DCI, via the first serving cell and a second DCI via a second serving cell. The first DCI may indicate scheduling of a first TB via the first serving cell and the second DCI may indicate scheduling of a second TB via the first serving cell. The wireless device may receive or transmit the first TB based on the first DCI and may receive or transmit the second TB based on the second DCI.

Figure 48:
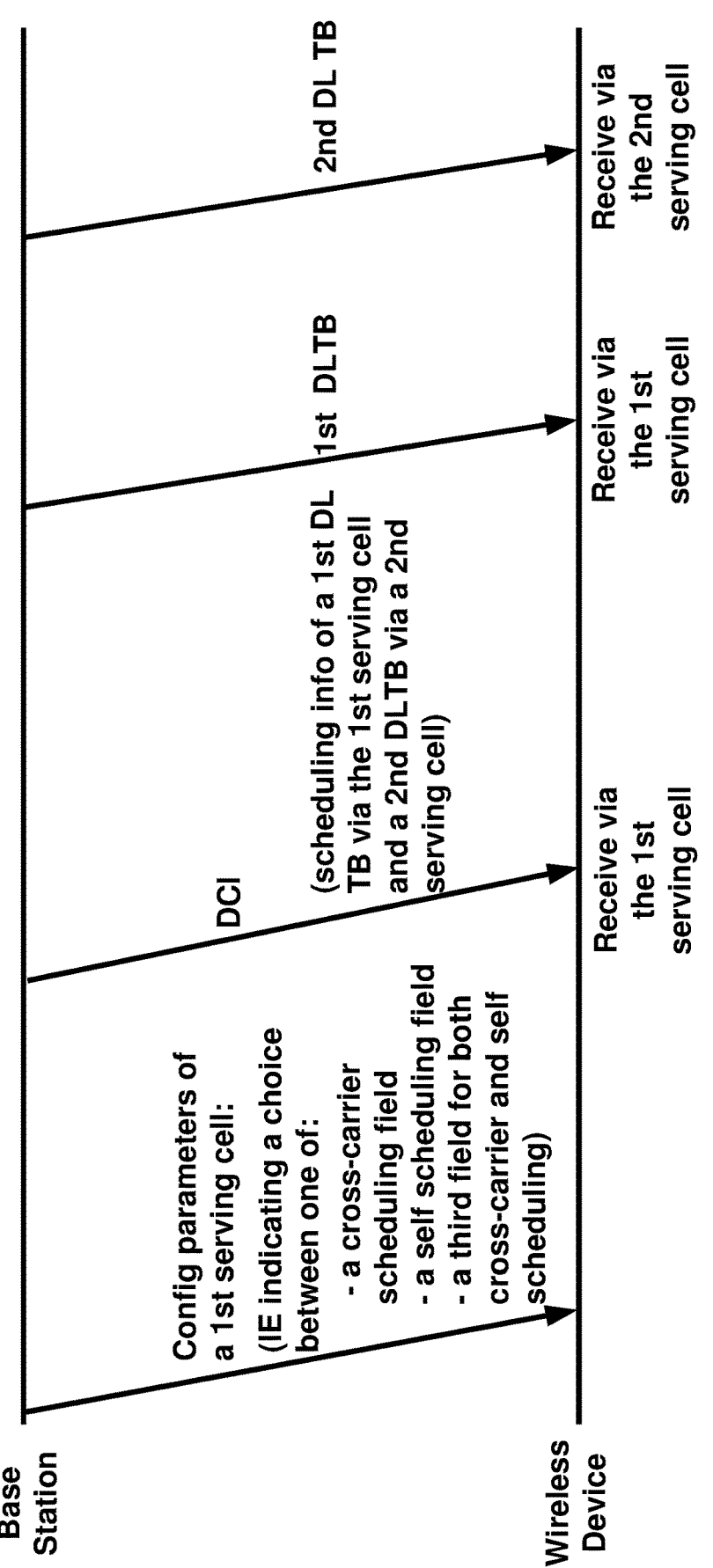
FIG. 48 shows an example process in accordance with several of various embodiments of the present disclosure.
Figure 49:
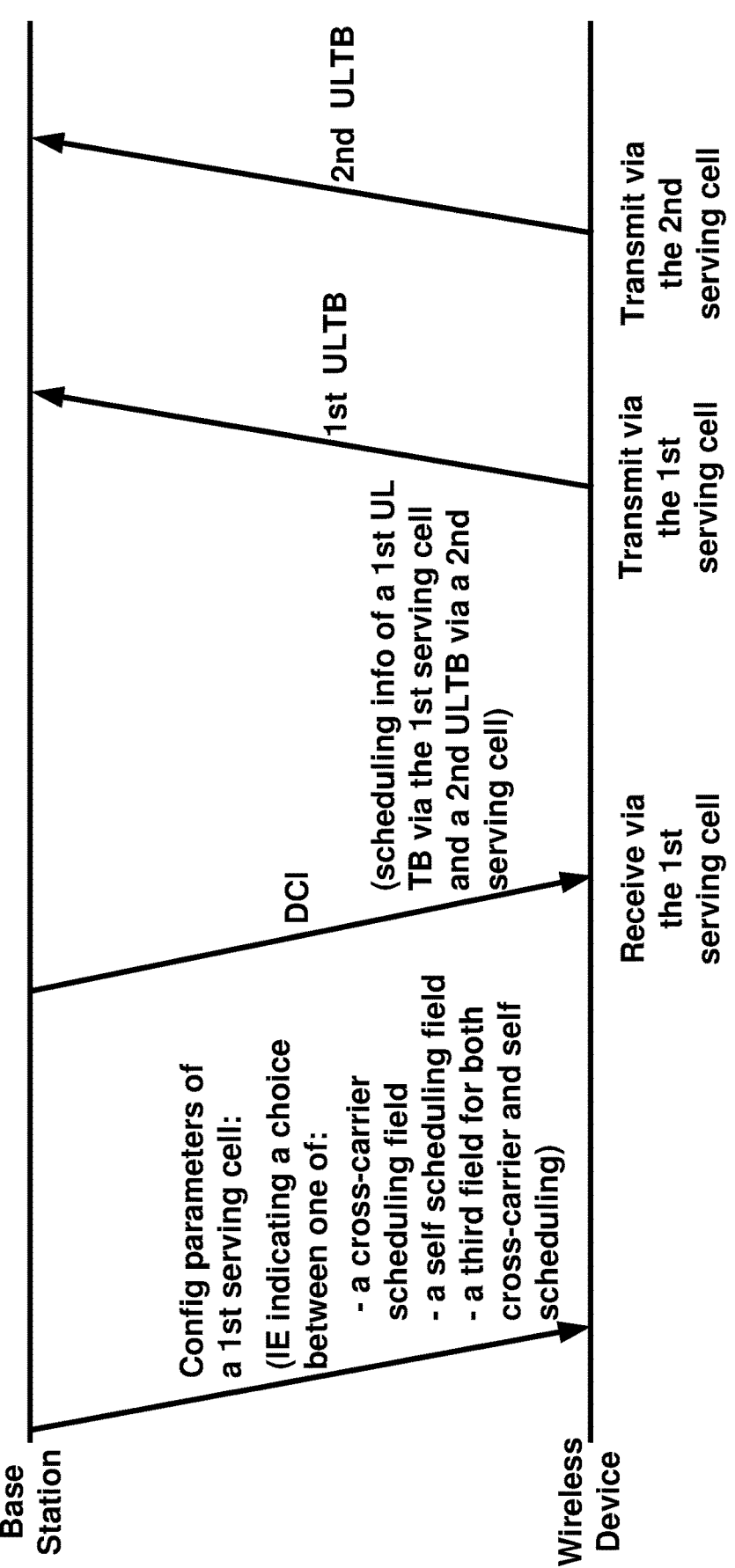
FIG. 49 shows an example process in accordance with several of various embodiments of the present disclosure.

In an example embodiment as shown in FIG. 48 and FIG. 49, in response to the information element indicating that the choice of both cross-carrier and self-scheduling is configured for the first serving cell and the first serving cell is configured with one or more parameters for both cross-carrier and self-scheduling, the wireless device may receive a DCI via the first serving cell and the DCI may indicate scheduling of a first TB via the first serving cell and scheduling a second TB via a second serving cell. Based on the scheduling information indicated by the DCI, the wireless device may receive or transmit the first TB via the first serving cell and the wireless device may receive or transmit the second TB via the second serving cell.

Figure 50:
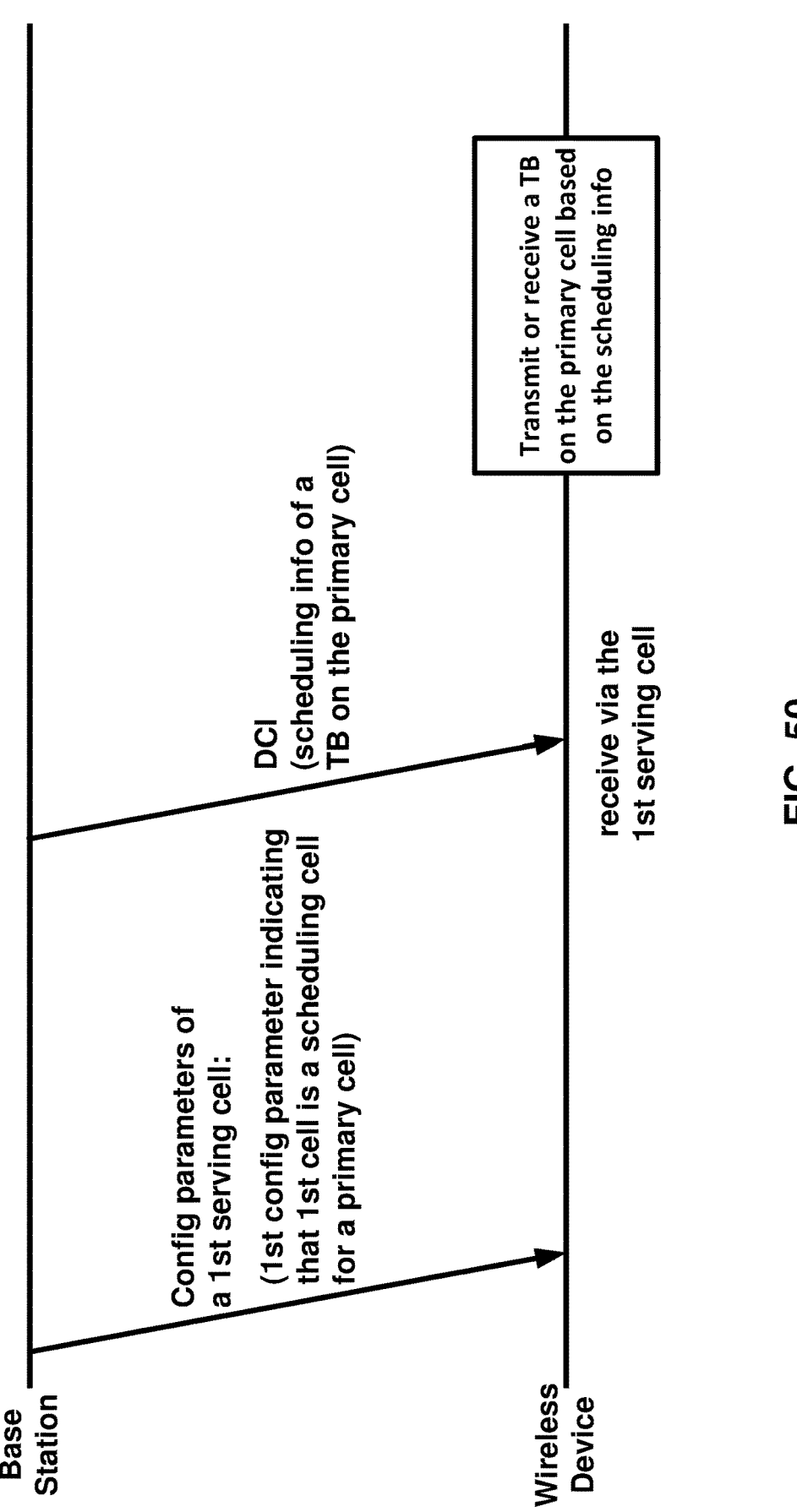
FIG. 50 shows an example process in accordance with several of various embodiments of the present disclosure.

In an example embodiment as shown in FIG. 50, a wireless device may receive one or more messages (e.g., one or more RRC messages) comprising configuration parameters of a plurality of serving cells comprising a first serving cell. The configuration parameters of the first serving cell may comprise a first configuration parameter indicating that the first serving cell is a scheduling cell for a primary cell. For example, first configuration parameter may be a Boolean parameter having one of a True value and a False parameter and the value of True may indicate that the first serving cell is a scheduling cell for the primary cell. In an example, the first serving cell, that may be configured as a scheduling cell for the primary cell, may be a secondary cell. The wireless device may receive a DCI via the first cell. The DCI may comprise scheduling information of a TB on the primary cell. The wireless device may receive or may transmit the TB on the primary cell based on the scheduling information.

Figure 51:
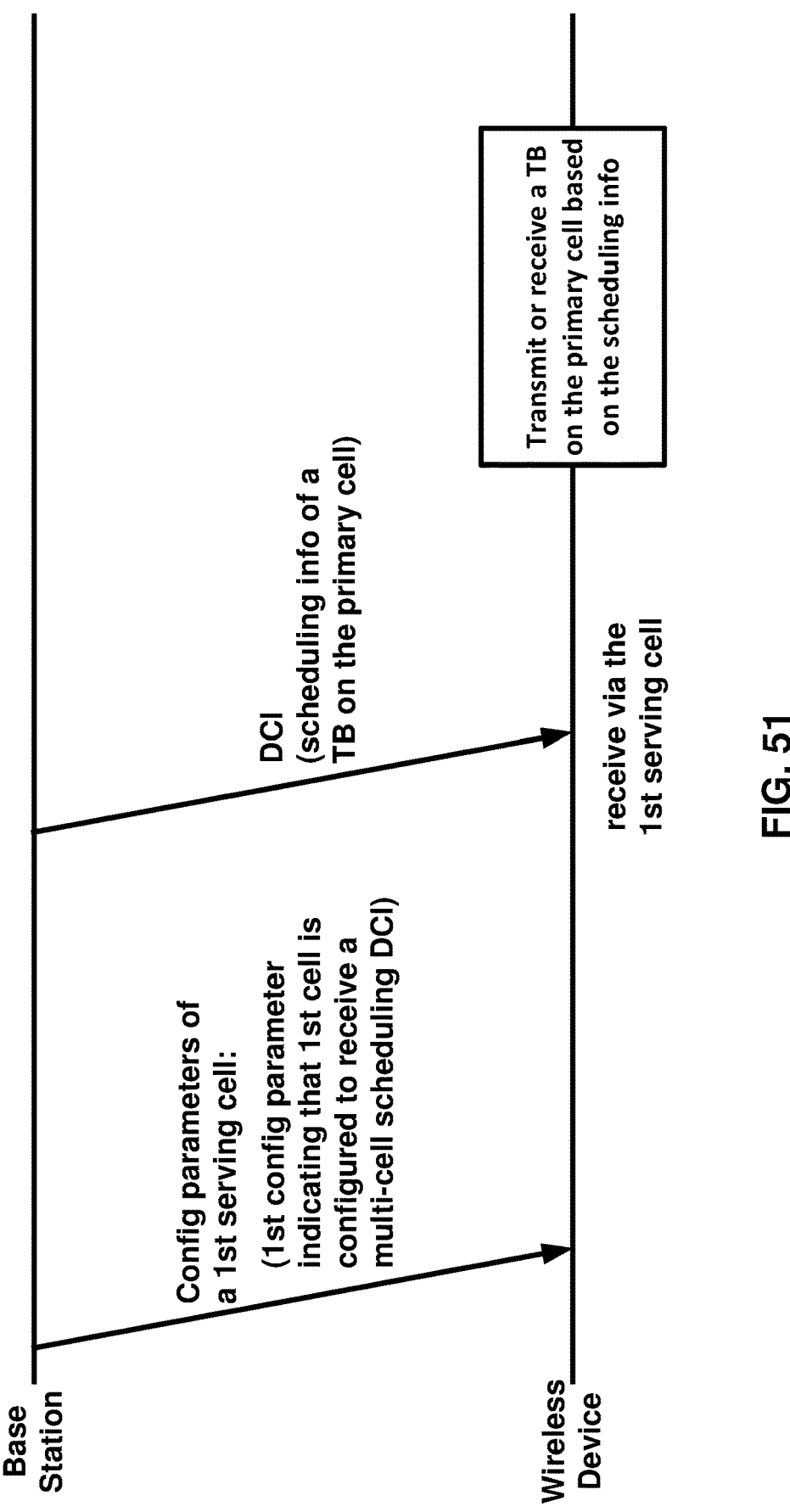
FIG. 51 shows an example process in accordance with several of various embodiments of the present disclosure.

In an example embodiment as shown in FIG. 51, a wireless device may receive one or more messages (e.g., one or more RRC messages) comprising configuration parameters of a plurality of serving cells comprising a first serving cell. The configuration parameters of the first serving cell may comprise a first configuration parameter indicating that the first serving cell is configured to receive control information (e.g., DCI) associated with multi-cell scheduling. The wireless device may receive a DCI via the first serving cell. The DCI may be a multi-cell scheduling DCI. The DCI may comprise scheduling information of a plurality of TBs on a plurality of cells. In an example, the plurality of cells may comprise the first cell (e.g., the cell that the DCI is received) and the plurality of TBs may comprise a first TB on the first cell. The wireless device may receive or may transmit, based on the DCI, the plurality of TBs via the plurality of cells.

Figure 52:
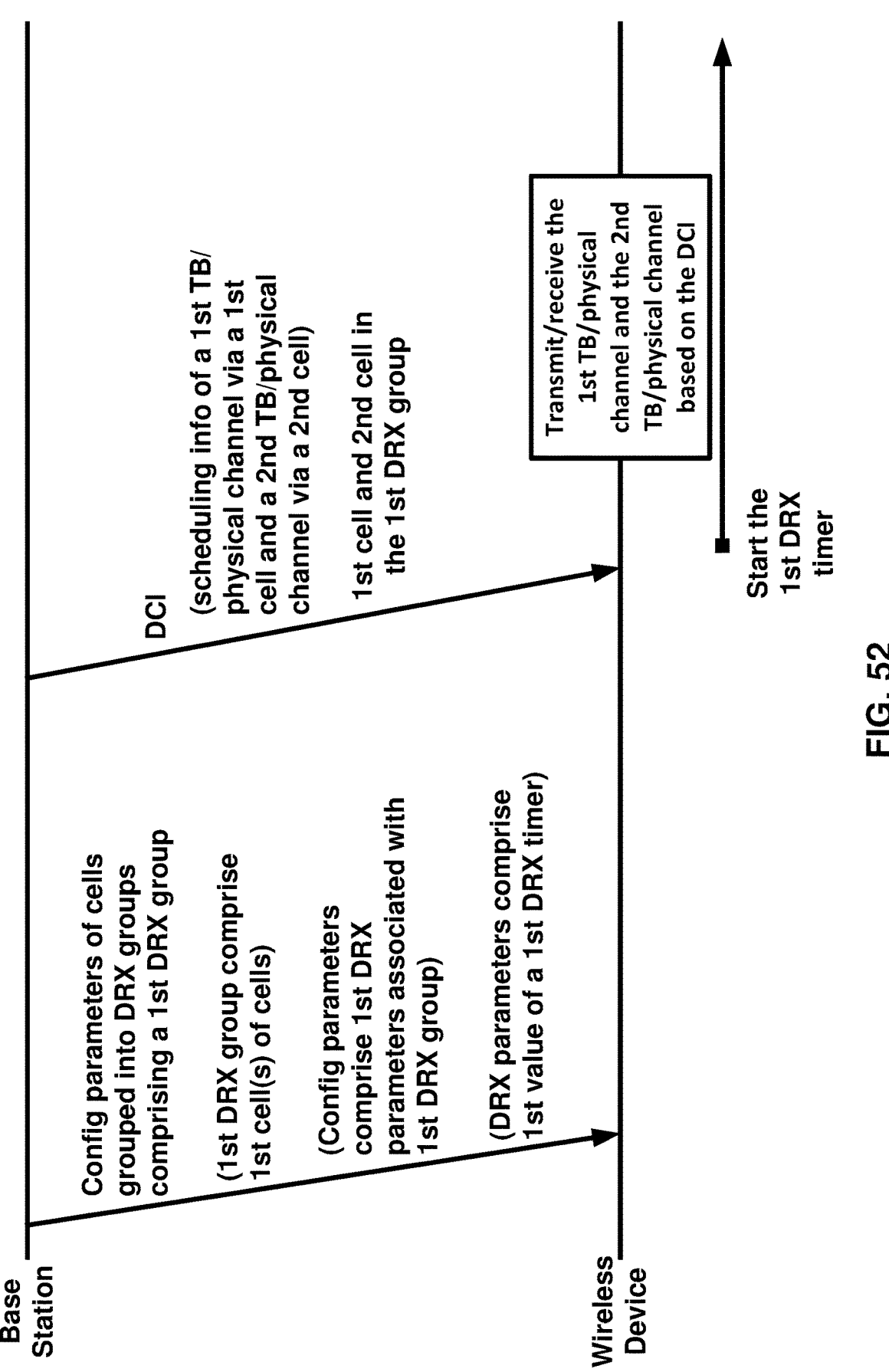
FIG. 52 shows an example process in accordance with several of various embodiments of the present disclosure.

In an example embodiment as shown in FIG. 52, a wireless device may receive one or more messages (e.g., one or more RRC messages) comprising configuration parameters of a plurality of cells. In an example, the plurality of cells may be included in one or more cell groups. In an example, a cell group may be master cell group (MCG) provided by a master base station in a dual/multi-connectivity scenario. In an example, a cell group may be a secondary cell group (SCG) provided by a secondary base station in a dual/multi-connectivity scenario. The plurality of cells may be grouped into a plurality of discontinuous reception (DRX) groups comprising a first DRX group. Each DRX group, in the plurality of the DRX groups, may comprise one or more cells. The first DRX group may comprise one or more first cells of the plurality of cells configured for the wireless device. The wireless device may receive DRX configuration parameters for the DRX groups. The DRX configuration parameters may comprise first DRX configuration parameters of the first DRX group. The first DRX parameters of the first DRX group may comprise one or more DRX timer values and/or other DRX parameters. At least for some of the DRX parameters, the DRX configuration parameters may be separately configured for each DRX group. At least for some other DRX parameters, the DRX configuration parameters may be commonly configured for the DRX groups. For example, the DRX parameters that are separately configured for each DRX group may be: drx-onDurationTimer, drx-InactivityTimer. For example, the DRX parameters that are common to the DRX groups may be: drx-SlotOffset, drx-RetransmissionTimerDL, drx-RetransmissionTimerUL, drx-LongCycleStartOffset, drx-ShortCycle, drx-ShortCycleTimer, drx-HARQ-RTT-TimerDL, and drx-HARQ-RTT-TimerUL.

The wireless device may receive a DCI (e.g., a multi-cell scheduling DCI) comprising scheduling information for transmission or reception of a first TB/physical channel (e.g., PUSCH, PDSCH) via a first cell and transmission or reception of a second TB/physical channel (e.g., PUSCH, PDSCH) via a second cell. The first cell and the second cell may be in the first DRX group. In an example, the wireless device may expect that the first cell and the second cell are in the same DRX group. In an example, the wireless device may receive the DCI may be received via a third cell and the first cell, the second cell and the third cell may be in the same DRX group. In an example, the wireless device may expect that the first cell, the second cell and the third cell are in a same DRX group. The wireless device may start the first DRX timer with the value indicated by the first DRX parameters associated with the first DRX group. In an example, the wireless device may start the first DRX timer in response to receiving the DCI. For example, the first DRX timer may be a DRX inactivity timer and the wireless device may start the first DRX timer in a first symbol after reception of the PDCCH carrying the DCI. The first DRX group of the wireless device may be in a DRX Active time while the DRX inactivity timer, associated with the first DRX group, is running. In an example, the wireless device may start the first DRX timer in response to transmission or reception of the first TB and/or the second TB.

Figure 53:
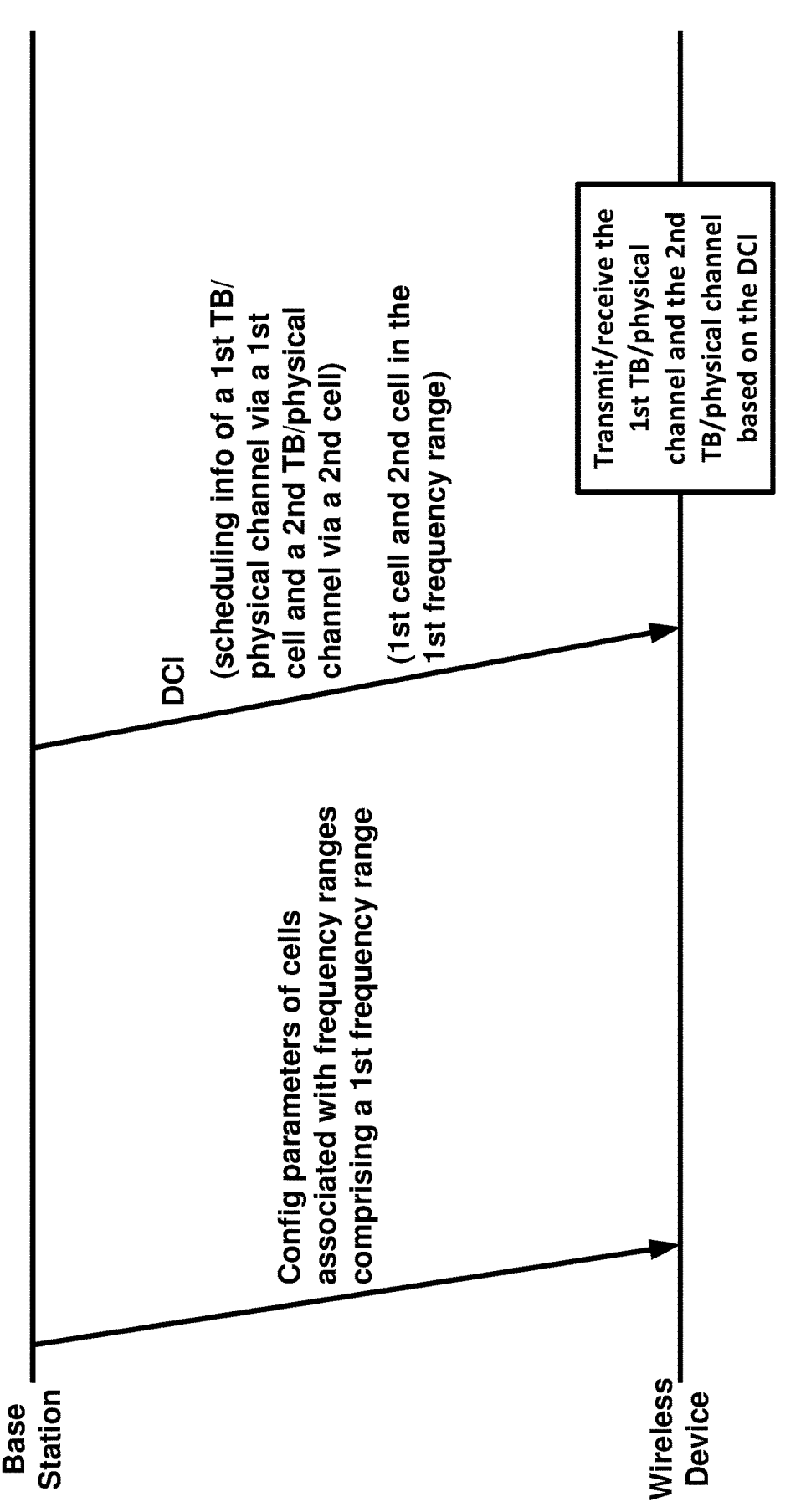
FIG. 53 shows an example process in accordance with several of various embodiments of the present disclosure.

In an example embodiment as shown in FIG. 53, a wireless device may receive one or more messages (e.g., one or more RRC messages) comprising configuration parameters of a plurality of cells. In an example, the plurality of cells may be included in one or more cell groups. In an example, a cell group may be master cell group (MCG) provided by a master base station in a dual/multi-connectivity scenario. In an example, a cell group may be a secondary cell group (SCG) provided by a secondary base station in a dual/multi-connectivity scenario. The plurality of cells may be associated with a plurality of frequency ranges comprising a first frequency range. In an example, a frequency range, in the plurality of frequency ranges, may be a frequency range 1 (FR1) or a frequency range 2 (FR2). The wireless device may receive a DCI (e.g., a multi-cell scheduling DCI) comprising scheduling information for transmission or reception of a first TB/physical channel (e.g., PUSCH, PDSCH) via a first cell and transmission or reception of a second TB/physical channel (e.g., PUSCH, PDSCH) via a second cell. The first cell and the second cell may be in the first frequency range. In an example, the wireless device may expect that the first cell and the second cell are in the same frequency range. In an example, the wireless device may receive the DCI via a third cell and the first cell, the second cell and the third cell may be in the same frequency range. In an example, the wireless device may expect that the first cell, the second cell and the third cell are in a same frequency range.

In an example embodiment, a wireless device may receive a DCI indicating scheduling a first transport block (TB) via a first cell and a second TB via a second cell. In an example, the first TB and the second TB may be uplink TBs. In an example, the first TB and the second TB may be downlink TBs. The DCI may comprise a field. The wireless device may determine a first scheduling information/parameter for the first TB based on a value of the field of the DCI. The wireless device may determine a second scheduling information/parameter for the second TB based on the first scheduling information/parameter. The wireless device may receive the first TB (if the first TB is a downlink TB) or may transmit the first TB (if the first TB is an uplink TB) based on the first scheduling information/parameter. The wireless device may receive the second TB (if the second TB is a downlink TB) or may transmit the second TB (if the second TB is an uplink TB) based on the second scheduling information/parameter.

In an example, the wireless device may determine that the value of the field of the DCI applies to the first cell.

In an example, the first cell may be the cell that the DCI is received.

In an example, the first cell may a cell other than the cell that the DCI is received.

In an example, the first cell may be associated with a first cell index. The second cell may be associated with a second cell index. The first cell index may have a smaller value than the second cell index.

In an example, the first cell may be associated with a first cell index. The second cell may be associated with a second cell index. The first cell index may have a larger value than the second cell index.

In an example, the wireless device may receive a configuration parameter, wherein determining the second scheduling information/parameter may further be based on the configuration parameter. In an example, the configuration parameter may indicate an offset.

In an example, the field of the DCI may be a HARQ process ID field. The first scheduling information/parameter may be a first HARQ process ID for the first TB. The second scheduling information/parameter may be a second HARQ process ID for the second TB.

In an example, the field of the DCI may be a carrier indicator field. The first scheduling information/parameter may be a first identifier of the first cell. The second scheduling information/parameter may be a second identifier of the second cell.

In an example, the field of the DCI may be an SRS request field. The first scheduling information/parameter may be a first SRS request for the first cell. The second scheduling information/parameter may be a second SRS request for the second cell.

In an example, the field of the DCI may be a downlink assignment index (DAI) field. The first scheduling information/parameter may be a first DAI. The second scheduling information/parameter may be a second DAI.

In an example, the field of the DCI may be a BWP indicator field. The first scheduling information/parameter may be a first BWP identifier of a first BWP of the first cell. The second scheduling information/parameter may be a second BWP identifier of a second BWP of the second cell.

In an example, the field of the DCI may be a RV field. The first scheduling information/parameter may be a first RV associated with the first TB. The second scheduling information/parameter may be a second RV associated with the second TB.

In an example, the field of the DCI may be an NDI field. The first scheduling information/parameter may be a first NDI associated with the first TB. The second scheduling information/parameter is a second NDI associated with the second TB.

In an example, the field may be a PDSCH-to-HARQ feedback timing field. The first scheduling information/parameter may be a first PDSCH to HARQ feedback timing associated with the first TB. The second scheduling information/parameter may be a second PDSCH to HARQ feedback timing associated with the second TB.

In an example, the field may be a power control command field. The first scheduling information/parameter may be a first power control command (e.g., associated with the first TB). The second scheduling information/parameter may be a second power control command (e.g., associated with the second TB).

In an example embodiment, a wireless device may receive a DCI indicating scheduling a first TB via a first cell and a second TB via a second cell, wherein the DCI may comprise a field. The wireless device may determine, based on a value of the field, a first scheduling information/parameter for the first TB and a second scheduling information/parameter for the second TB. The wireless device may receive or may transmit the first TB via the first cell and based on the first scheduling information/parameter. The wireless device may receive or transmit the second TB via the second cell and based on the second scheduling information/parameter.

In an example, the wireless device may receive one or more configuration parameters indicating mapping between the value of the field of the DCI and the first scheduling information/parameter and the second scheduling information/parameter.

In an example, the field of the DCI may be a HARQ process ID field. The first scheduling information/parameter may be a first HARQ process ID for the first TB. The second scheduling information/parameter may be a second HARQ process ID for the second TB.

In an example, the field of the DCI may be a TCI state field. The first scheduling information/parameter may be a first TCI state for reception of the first TB. The second scheduling information/parameter may be a second TCI state for reception of the second TB.

In an example, the field of the DCI may be a carrier indicator field. The first scheduling information/parameter may be a first identifier of the first cell. The second scheduling information/parameter may be a second identifier of the second cell.

In an example, the field of the DCI may be a SRS request field. The first scheduling information/parameter may be a first SRS request for the first cell. The second scheduling information/parameter may be a second SRS request for the second cell.

In an example, the field of the DCI may be a DAI field. The first scheduling information/parameter may be a first DAI for the first TB. The second scheduling information/parameter may be a second DAI for the second TB.

In an example, the field of the DCI may be a BWP indicator field. The first scheduling information/parameter may be a first BWP identifier of the first cell. The second scheduling information/parameter may be a second BWP identifier of the second cell.

In an example, the field of the DCI may be an RV field. The first scheduling information/parameter may be a first RV for the first TB. The second scheduling information/parameter may be a second RV for the second TB.

In an example, the field of the DCI may be an NDI field. The first scheduling information/parameter may be a first NDI for the first TB. The second scheduling information/parameter may be a second NDI for the second TB.

In an example embodiment, a wireless device may receive a first DCI indicating scheduling a single TB on a single cell. The wireless device may receive or may transmit the single TB via the single cell based on the first DCI. The wireless device may receive a second DCI indicating scheduling a first TB via a first cell and a second TB via a second cell. The wireless device may receive or may transmit the first TB via the first cell and the second TB via the second cell. The first DCI may comprise a first field. The second DCI may not comprise the first field.

In an example embodiment, a wireless device may receive a DCI indicating scheduling of one or more TBs. The wireless device may receive or may transmit the one or more TBs based on the DCI. The DCI may comprise a first field in response to the DCI indicating scheduling of the one or more TBs via a single cell. The DCI may not comprise the first field in response to the DCI indicating scheduling a first TB via a first cell and a second TB via a second cell.

In an example, the wireless device may receive a configuration parameter indicating a value, associated with the first field, in response to the DCI indicating scheduling a first TB via a first cell and a second TB via a second cell and the DCI not comprising the first field. In an example, the value associated with the first field and indicated by the configuration parameter may be for the first TB and for the second TB. In an example, the value associated with the first field and indicated by the configuration parameter may be for one of the first TB and the second TB.

In an example, the wireless device may receive one or more configuration parameters indicating a first value, associated with the first field and for the first TB, and a second value, associated with the first field and for the second TB, in response to the DCI indicating scheduling the first TB via the first cell and the second TB via the second cell and the DCI not comprising the first field.

In an example, the first field may be an SRS request field.

In an example, the first field may be an RV field.

In an example, the first field may be an NDI field.

In an example, the first field may be a BWP indicator field.

In an example, the first field may be a carrier indicator field.

In an example, the first field may be a HARQ process ID field.

In an example, the first field may be a transmission configuration indicator (TCI) field.

In an example, the wireless device may determine that the DCI indicates scheduling the one or more TBs via the single cell or that the DCI indicates scheduling a plurality of cells via a plurality of cells based on a value of a second field of the DCI.

In an example, the wireless device may determine that the DCI indicates scheduling the one or more TBs via the single cell or that the DCI indicates scheduling a plurality of cells via a plurality of cells based on an RNTI associated with the DCI.

In an example, the wireless device may determine that the DCI indicates scheduling the one or more TBs via the single cell or that the DCI indicates scheduling a plurality of cells via a plurality of cells based on a CORESET that the DCI is received.

In an example, the wireless device may receive downlink signals (e.g., based on a MAC CE and/or based on one or more RRC parameters) and the wireless device may determine that the DCI indicates scheduling the one or more TBs via the single cell or that the DCI indicates scheduling a plurality of cells via a plurality of cells based on the downlink signaling.

In an example, in response to the DCI indicating scheduling a first TB via a first cell and a second TB via a second cell, a value of the first field may be a predetermined value. In an example, the predetermined value, of the first field, may be for the first TB and the second TB. In an example, the predetermined value, of the first field, may be for one of the first TB and the second TB.

In an example embodiment, a wireless device may receive a DCI comprising a first field and a second field. The wireless device may determine whether the first field has a first value or a second value. In response to the first field having the first value, the wireless device may use the second field for determining scheduling information for one or more TBs (e.g., one or more downlink TBs or one or more uplink TBs) on a single cell. In response to the first field having the second value, the wireless device may use the second field for determining scheduling information for a plurality of TBs (e.g., a plurality of uplink TBs or downlink TBs) on a plurality of cells.

In an example, the first field may be used to indicate whether the DCI is for scheduling a single cell or multiple cells.

In an example, the one or more TBs (e.g., the one or more downlink TBs or the one or more uplink TBs) may be one or more first TBs (e.g., one or more first downlink TBs or one or more first uplink TBs) on a first cell. In an example, the plurality of TBs (e.g., the plurality of downlink TBs or the plurality of uplink TBs) may comprise a first TB (e.g., a first downlink TB or a first uplink TB) on the first cell and a second TB (e.g., a second downlink TB or a second uplink TB) on a second cell. In an example, the wireless device may receive the DCI via the first cell. In an example, the DCI may comprise a carrier indicator field. In an example, in response to the first field having the first value, a value of the carrier indicator field may indicate the first cell. In an example, in response to the first field having the second value: a value of the carrier indicator field may indicate the second cell; and the first cell may be the cell that the DC is received.

In an example embodiment, a wireless device may receive downlink signaling indicating that whether a DCI is used for scheduling one or more TBs (e.g., one or more downlink TBs or one or more uplink TBs)/physical channels on a single cell or for scheduling multiple TBs (e.g., downlink TBs or uplink TBs)/physical channels (e.g., PDSCHs/PUSCHs) on multiple cells. The wireless device may receive a DCI comprising a first cell. In response to the downlink signaling indicating that the DCI is used for scheduling one or more TBs (e.g., one or more downlink TBs or one or more uplink TBs)/physical channels on a single cell, the wireless device may determine, based on the first field, scheduling information for one or more TBs (e.g., one or more downlink TBs or one or more uplink TBs)/physical channels on a first cell. In response to the downlink signaling indicating that the DCI is used for scheduling multiple TBs (e.g., downlink TBs or uplink TBs)/physical channels (e.g., PDSCHs/PUSCHs) on multiple cells, the wireless device may determine, based on the first field, scheduling information for a first TB (e.g., a first downlink TB or a first uplink TB)/physical channel (e.g., PDSCH/PUSCH) on the first cell and a second TB (e.g., a second downlink TB or a second uplink TB)/physical channel (e.g., PDSCH/PUSCH) on a second cell.

In an example, the downlink signaling may be a medium access control (MAC) control element (CE).

In an example, the downlink signaling may be an RRC message comprising an RRC configuration parameter.

In an example, the DCI may be associated with a first format. The downlink signaling may indicate whether a DCI of the first format is used for scheduling a single TB/physical channel (e.g., PDSCH/PUSCH) on a single cell or for scheduling multiple TBs/physical channels (e.g., PDSCHs/PUSCHs) on multiple cells.

In an example embodiment, a wireless device may receive one or more medium access control (MAC) control elements (CEs) indicating activation of one or more first TCI states for a first cell and one or more second TCI states for a second cell. The wireless device may receive a DCI indicating scheduling information for a first downlink TB on a first cell and a second downlink TB on a second cell. The DCI may comprise a transmission configuration indication (TCI) field. A value of the transmission configuration indication field may indicate a first TCI state of the one or more first activated TCI states and a second TCI state of the one or more second activated TCI states. The wireless device may receive the first downlink TB via the first cell and based on the first TCI state. The wireless device may receive the second downlink TB via the second cell and based on the second TCI state.

In an example, the one or more first activated TCI states, for the first cell, may be the same as the one or more second TCI states for the second cell. The first TCI state may be the same as the second TCI state.

In an example, the wireless device may receive configuration parameters indicating a simultaneous update TCI list, wherein the simultaneous update TCI list may comprise a plurality of cells comprising the first cell and the second cell. In an example, a MAC CE, in the one or more MAC CEs, may comprise a field indicating a cell identifier of a cell in the simultaneous update TCI list. The one or more first activated TCI states and the one or more second activated TCI states may be the same based on the MAC CE indicat-ing a cell identifier of a cell in the simultaneous update TCI list and based on the simultaneous update TCI list comprising the first cell and the second cell. The first TCI state may be the same as the second TCI state.

In an example, the wireless device may receive first configuration parameters, indicating a first plurality of TCI states for the first cell, and second configuration parameters indicating a second plurality of TCI states for the second cell. In an example, the first plurality of configured TCI states may be the same as the second plurality of configured TCI states.

In an example, a first MAC CE, of the one or more MAC CEs, may indicate the one or more first activated TCI states for the first cell. A second MAC CE, of the one or more MAC CEs, may indicate the one or more second activated TCI states for the second cell. In an example, a first index of the first TCI state may be based on a minimum of the value of the transmission configuration indication field of the DCI and a first number of the one or more first activated TCI states. A second index of the second TCI state may be based on a minimum of the value of the transmission configuration indication field of the DCI and a second number of the one or more second activated TCI states.

In an example, the wireless device may determine a second value based on the value. The value may point to the first TCI state in the one or more first activated TCI states. The second value may point to the second TCI state in the one or more second activated TCI states. In an example, the second value may be the first value plus an offset. In an example, the wireless device may receive a configuration parameter indicating the offset.

In an example, the wireless device may receive configuration parameters indicating mapping between the value of the transmission configuration indication field and the first TCI state and the second TCI state. In an example, the value may jointly indicate the first TCI state and the second TCI state.

In an example embodiment, a wireless device may receive a DCI indicating scheduling information for a first downlink TB via a first cell and a second downlink TB via a second cell. The DCI may comprise a TCI configuration indication field. The wireless device may determine that a value of the TCI configuration indication field indicates a first TCI state for the first cell. The wireless device may receive the first downlink TB via the first cell and based on the first TCI state. The wireless device may receive the second downlink TB via the second cell and not based on the first TCI state.

In an example, the TCI configuration indication field may not be used for determining a TCI state for the second cell.

In an example, the determining may be based on a first frequency range/band of the first cell and a second frequency range/band of the second cell.

In an example, the receiving the DCI may be via the second cell. A second TCI state may be based on a TCI state used for reception of the DCI or and/or a TCI state associated with the DCI. The wireless device may receive the second downlink TB via the second cell and based on the second TCI state.

In an example embodiment, a wireless device may receive one or more configuration parameters indicating at least one TCI state for reception of a plurality of TBs, via a plurality of cells, jointly scheduled by a DCI. The wireless device may receive a DCI indicating scheduling a plurality of TBs via plurality of cells. The wireless device may receive the plurality of TBs based on the at least one TCI state via the plurality of cells.

In an example embodiment, a wireless device may receive, via a first cell, a DCI comprising a transmission configuration indication (TCI) field. The DCI may indicate scheduling information for receiving a first TB via the first cell and receiving a second TB via a second cell. The wireless device may receive the DCI via a CORESET associated with a first TCI state. The wireless device may receive the first downlink TB via the first cell and based on the first TCI state. The wireless device may receive the second TB via the second cell and based on a second TCI state. A value of the transmission configuration indication field may indicate the second TCI state.

In an example, the wireless device may receive a MAC CE (e.g., a TCI State Indication for UE-specific PDCCH MAC CE) indicating activation of the first TCI state for receiving of the DCI.

In an example embodiment, a wireless device may receive a DCI indicating scheduling information for receiving a first downlink TB via a first cell and a second downlink TB via a second cell. The DCI may comprise a first transmission configuration indication (TCI) field with a first value. The DCI may comprise a second transmission configuration indication field (TCI) with a second value. One or more first TCI states may be activated for the first cell and one or more second TCI states may be activated for the second cell. The wireless device may expect that one or more first TCI states are activated for the first cell and one or more second TCI states are activated for the second cell. The wireless device may receive the first downlink TB via the first cell and based on a first TCI state indicated by the first value of the first TCI field. The wireless device may receive the second downlink TB via the second cell and based on a second TCI state indicated by the second value of the second TCI field.

In an example, the wireless device may receive configuration parameters indicating a first plurality of TCI States for the first cell and a second plurality of TCI states for the second cell. The wireless device may receive one or more MAC CEs indicating activation of the one or more first TCI states, of the first plurality of TCI states, for the first cell and the one or more second TCI states, of the second plurality of TCI states, for the second cell.

In an example embodiment, a wireless device may receive, via a first cell, a DCI indicating scheduling information for receiving a first downlink TB via the first cell and a second downlink TB via a second cell. The DCI may comprise a transmission configuration indication field with a value. At least the second cell may be activated with one or more TCI states. The wireless device may expect that at least the second cell is activated with one or more TCI states. The wireless device may receive the first downlink TB via the first cell and based on a first TCI state. The wireless device may receive the second downlink TB via the second cell and based on a second TCI state indicated by the value of the transmission configuration indication field.

In an example, the first cell may not be activated with one or more TCI states. The first TCI state that the downlink TB is received may be a TCI state that is associated with a CORESET of the first cell that the DCI is received.

In an example embodiment, a wireless device may receive a DCI, in a DCI timing, comprising scheduling information for reception of a first downlink TB, via a first cell at a first timing, and a second downlink TB, via a second cell at a second timing. A first time duration between the DCI timing and the first timing may be larger than or equal to a time duration for QCL. The wireless device may expect that the first time duration between the DCI timing and the first timing to be larger than or equal to a time duration for QCL.

A second time duration between the DCI timing and the second timing may be larger than or equal to the time duration for QCL. The wireless device may expect that the second time duration between the DCI timing and the second timing to be larger than or equal to the time duration for QCL. The wireless device may receive the first downlink TB via the first cell at the first timing. The wireless device may receive the second downlink TB via the second cell at the second timing.

In an example, the wireless device may transmit a capability message comprising a capability information element (IE) indicating the time duration for QCL.

In an example embodiment, a wireless device may receive a DCI, in a DCI timing, comprising scheduling information for reception of a first downlink TB, via a first cell at a first timing, and a second downlink TB, via a second cell at a second timing. A first time duration between the DCI timing and the first timing may be smaller than a time duration for QCL. A second time duration between the DCI timing and the second timing may be larger than or equal to the time duration for QCL. The wireless device may receive the second downlink TB via the second cell at the second timing based on the second time duration being larger than or equal to the time duration for QCL. The wireless device may not receive the first downlink TB via the first cell at the first timing based on the first time duration being smaller than the time duration for QCL.

In an example, the wireless device may transmit a capability message comprising a capability information element (IE) indicating the time duration for QCL.

In an example embodiment, a wireless device may receive configuration parameters of a first serving cell comprising: a first configuration parameter indicating an identifier of a scheduling cell for the first serving cell; and a second configuration parameter indicating whether a DCI, received via the scheduling cell, is used to schedule/for joint scheduling of multiple cells. The wireless device may receive a DCI, via the scheduling cell, comprising scheduling information for receiving or transmitting a first TB via the first serving cell and a second TB via a second serving cell. The wireless device may receive or may transmit the first TB via the first serving cell. The wireless device may receive or may transmit the second TB via the second serving cell.

In an example embodiment, a wireless device may receive configuration parameters of a first serving cell comprising a first configuration parameter indicating that the first serving cell is cross-carrier scheduled by a secondary cell when the first serving cell is a primary cell. The wireless device may receive a DCI, via the secondary cell, comprising scheduling information for receiving or transmitting a first TB via the first serving cell, wherein the first serving cell is a primary cell. The wireless device may receive or may transmit the first TB via the first serving cell.

In an example embodiment, a wireless device may receive configuration parameters of a first serving cell comprising an information element indicating a choice of one of a cross-carrier scheduling field, a self-scheduling field and a third field for both self and cross-carrier scheduling. The information element may indicate a field for both self and cross-carrier scheduling. The third field/field may comprise one or more parameters for both self and cross-carrier scheduling. In response to the information element indicating the third field/field and comprising one or more parameters for both self and cross-carrier scheduling: the wireless device may receive a first DCI, via a first serving cell, indicating scheduling of a first TB via the first serving cell; and the wireless device may receive a second DCI, via a second serving cell, indicating scheduling of a second TB via the first serving cell. The wireless device may receive or transmit the first TB based on the first DCI and may transmit or receive the second TB based on the second DCI.

In an example, the one or more parameters, for both self and cross-carrier scheduling, may comprise a first parameter indicating an identifier of the second serving cell.

In an example embodiment, a wireless device may receive configuration parameters of a first serving cell comprising an information element indicating a choice of one of a cross-carrier scheduling field, a self-scheduling field and a third field for both self and cross-carrier scheduling. The information element may indicate a field for both self and cross-carrier scheduling. The third field/field may comprise one or more parameters for both self and cross-carrier scheduling. The wireless device may receive a DCI via the first serving cell indicating scheduling of a first TB via the first serving cell and a second TB via a second serving cell. The wireless device may receive, based on the DCI, the first TB and the second TB.

In an example embodiment, a wireless device may receive configuration parameters, of a first cell, comprising a first configuration parameter indicating that the first cell is a scheduling cell for a primary cell. The wireless device may receive a DCI, via the first cell, comprising scheduling information of a TB on the primary cell. Based on the scheduling information, the wireless device may receive or may transmit the TB.

In an example embodiment, a wireless device may receive configuration parameters of a first cell comprising a first configuration parameter indicating that the first cell is configured to receive control information associate with multi-cell scheduling. The wireless device may receive a DCI, via the first cell, comprising scheduling information of a plurality of TBs on a plurality of cells. The wireless device may receive or may transmit the plurality of TBs via the plurality of cells.

In an example, the plurality of cells may comprise the first cell, e.g., the first cell that the DCI is received.

In an example embodiment, a wireless device may receive one or more messages comprising configuration parameters of a plurality of cells grouped into a plurality of DRX groups comprising a first DRX group. The first DRX group may comprise one or more first cells of the plurality of cells. The configuration parameters may comprise first DRX parameters associated with the first DRX group. The first DRX parameters may comprise a first value of a first DRX timer. The wireless device may receive a DCI comprising scheduling information for transmission or reception of a first TB/physical channel via a first cell and transmission or reception of a second TB/physical channel via a second cell, wherein the first cell and the second cell may be in the first DRX group. The wireless device may start the first DRX timer, with the first value, for the first DRX group and based on receiving the DCI. The wireless device may receive or may transmit the first TB/physical channel and the second TB/physical channel based on the DCI.

In an example, the wireless device may expect that the first cell and the second cell, jointly scheduled by the DCI, are in a same DRX group.

In an example, the wireless device may receive the DCI via a third cell. The first cell, the second cell and the third cell may be in the first DRX group. In an example, the wireless device may expect that the first cell, the second cell and the third cell are in a same DRX group.

In an example, the wireless device may determine DRX Active time based on the first DRX timer.

In an example, the first DRX timer may be a HARQ RTT timer.

In an example, the first DRX parameters may comprise a second value of a second DRX timer. The wireless device may start the second DRX timer, with the second value, for the first DRX group and based on the first DRX timer expiring. In an example, the second DRX timer may be a DRX retransmission timer.

In an example, the first DRX timer may be a DRX inactivity timer. The wireless device may start the DRX inactivity timer is in a first symbol after the end of the PDCCH carrying the DCI. The first DRX group of the wireless device may be in a DRX Active time while the DRX inactivity timer, associated with the first DRX group, is running.

In an example embodiment, the wireless device may receive one or more messages comprising configuration parameters of a plurality of cells associated with a plurality of frequency ranges comprising a first frequency range. The wireless device may receive a DCI comprising scheduling information for transmission or reception of a first TB/physical channel via a first cell and transmission or reception of a second TB/physical channel via a second cell, wherein the first cell and the second cell may be in the first frequency range. The wireless device may receive or may transmit the first TB/physical channel and the second TB/physical channel based on the DCI.

In an example, the wireless device may expect that the first cell and the second cell, jointly scheduled by the DCI, are in a same frequency range.

In an example, the wireless device may receive the DCI via a third cell. The first cell, the second cell and the third cell may be in the first frequency range. In an example, the wireless device may expect that the first cell, the second cell and the third cell are in a same frequency range.

In an example, the first frequency range may be one of a frequency range one (FR1) and frequency range two (FR2).

Figure 54:
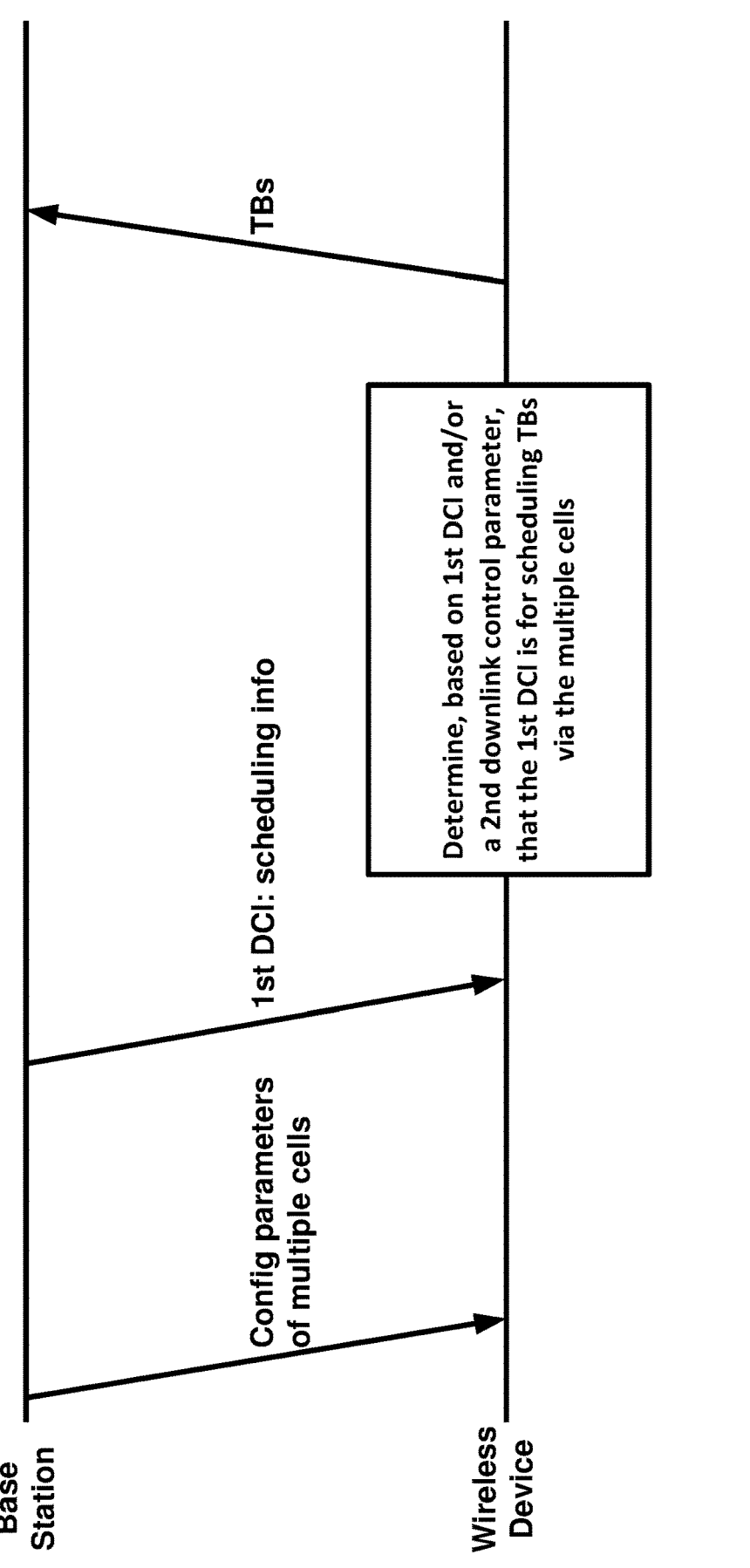
FIG. 54 shows an example process in accordance with several of various embodiments of the present disclosure.
Figure 55:
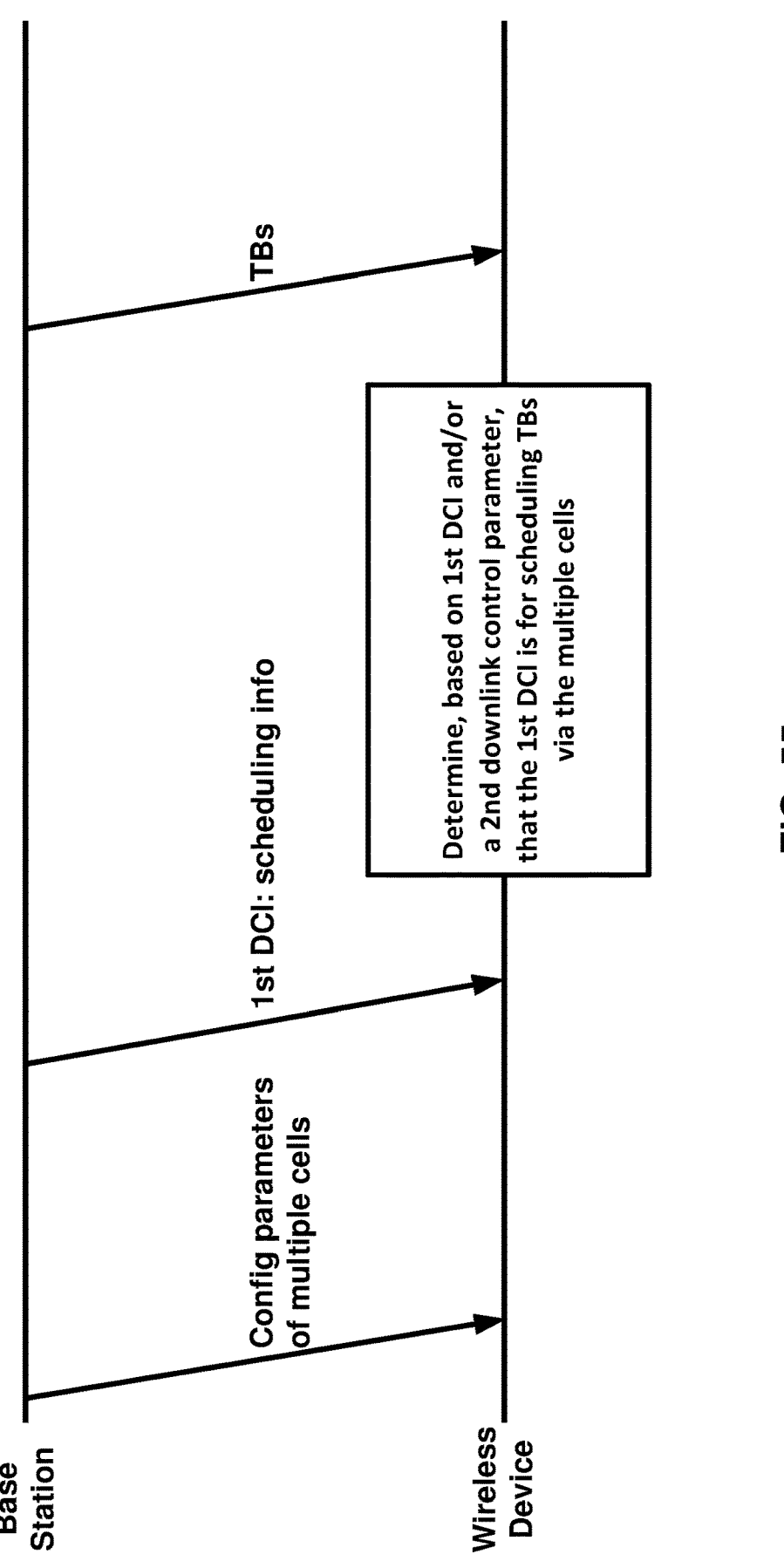
FIG. 55 shows an example process in accordance with several of various embodiments of the present disclosure.

In example embodiments as shown in FIG. 54 and FIG. 55, a wireless device may receive one or more messages (e.g., one or more RRC messages) comprising configuration parameters. The configuration parameters may comprise first configuration parameters of a plurality of cells. In an example, the plurality of cells may be provided by one base station (e.g., in case of single connectivity) or may be provided by multiple base stations (e.g., in case of multi-connectivity, e.g., may be provided by a primary base station and a secondary base station in case of dual connectivity). The wireless device may receive a first DCI (e.g., with a downlink scheduling DCI format such as DCI format 1_0, DCI format 1_1, DCI format 1_1 or a new downlink scheduling DCI format or an uplink scheduling DCI format such as DCI format 0_0, DCI format 0_1, DCI format 0_2 or a new uplink scheduling DCI format) that indicates scheduling information (e.g., transmission parameters for transmission of one or more TBs). For example, the first DCI may comprise one or more fields that indicate the scheduling information. The scheduling information may comprise one or more fields indicating time domain and frequency domain resource allocation parameters, one or more fields indicating timing(s) for transmission of the one or more TBs, one or more fields indicating timing(s) for transmission of one or more HARQ feedbacks associated with the one or more TBs, HARQ parameters (e.g., HARQ process number(s), redundancy version(s), new data indictor(s), etc.), power control parameters, etc. The wireless device may determine whether the first DCI is used for single-cell scheduling (e.g., for transmission or reception of one or more TBs via a single cell, e.g., a single cell in the plurality of configured cells) or for multiple-cell scheduling (e.g., for transmission or reception of a plurality of TBs via the plurality of configured cells). The determination, by the wireless device whether the DCI is used for single-cell scheduling or for multiple-cell scheduling may be based on the first DCI (e.g., based on the content of the first DCI and/or one or more parameters associated with the first DCI) and/or based on a second control parameter (e.g., a second downlink control parameter). The second downlink control parameter may be based on a downlink control signaling, e.g., a physical layer downlink control signaling received as a second DCI via a physical downlink control channel or based on a MAC layer signaling received as a MAC CE in a transport block or received as an RRC configuration parameter received via an RRC message. For example, a field of the second DCI or a field of the MAC CE or a field of the RRC message may indicate the second downlink control parameter.

In an example, the determination may be based on a first field of the first DCI. The wireless device may determine whether the first DCI is for single-cell scheduling or for multi-cell scheduling based on a value of the first field of the first DCI. For example, the wireless device may determine that the first DCI is for multiple-cell scheduling based on the first field of the first DCI having a first value. The wireless device may determine that the first DCI is for single-cell scheduling based on the first field of the first DCI having a second value or not having the first value.

In an example, the determination may be based on a format associated with the first DCI. The wireless device may determine whether the first DCI is for single-cell scheduling or for multi-cell scheduling based on a format associated with the first DCI. For example, the wireless device may determine that the first DCI is for multiple-cell scheduling based on the format associated with the first DCI being a first format. The wireless device may determine that the first DCI is for single-cell scheduling based on a format associated with the first DCI being a second format or not being the first format.

In an example, the determination may be based on an RNTI associated with the first DCI. The wireless device may determine whether the first DCI is for single-cell scheduling or for multi-cell scheduling based on an RNTI associated with the first DCI. For example, the wireless device may determine that the first DCI is for multiple-cell scheduling based on the RNTI associated with the first DCI being a first RNTI. The wireless device may determine that the first DCI is for single-cell scheduling based on an RNTI associated with the first DCI being a second RNTI or not being the first RNTI.

In an example, the wireless device may receive the first DCI via a search space associated with a CORESET. The determination may be based on the search space and/or the CORESET via which the first DCI is received. For example, the wireless device may determine that the first DCI is for multiple-cell scheduling based on the search space via which the first DC is received being a first search space and/or based on the CORESET associated with the search space being a first CORESET. The wireless device may determine that the first DCI is for single-cell scheduling based on the search space via which the first DC is received being a second search space (or not being the first search space) and/or based on the CORESET associated with the search space being a second CORESET or not being the first CORESET.

In an example, the second downlink control parameter, received via the downlink control signaling, may indicate whether a DCI that is associated with a first format is for multiple-cell scheduling or for single-cell scheduling or may indicate whether a DCI that is associated with a first RNTI is used for multiple-cell scheduling or for single-cell scheduling or may indicate whether a DCI that is received via a first search or that a search space that is associated with a first CORESET is for multiple-cell scheduling or for single-cell scheduling.

In response to the determination by the wireless device indicating that the received first DCI is for multiple-cell scheduling (e.g., for transmission or reception of a plurality of TBs via the plurality of configured cells), the wireless device may transmit (e.g., as shown in FIG. 54) or may receive (e.g., as shown in FIG. 55) a plurality of TBs via the plurality of configured cells.

In an example, the first DCI may be for scheduling the plurality of cells. The plurality of cells may comprise a first cell and a second cell. In an example, the first cell may be the same cell that the DCI is received. The first DCI may comprise a field with a value indicating the second cell. In an example, the first cell may be a predetermined cell (e.g., a primary cell). In an example, the scheduling information, indicated by the first DCI, may comprise first scheduling information for transmitting or receiving TB(s) via the first cell and may comprise second scheduling information for transmitting or receiving TB(s) via the second cell. In an example, the first DCI may comprise the first scheduling information and the wireless device may determine the second scheduling information based on the first scheduling information. In an example, the first DCI may comprise the first scheduling information and the second scheduling information.

Figure 56:
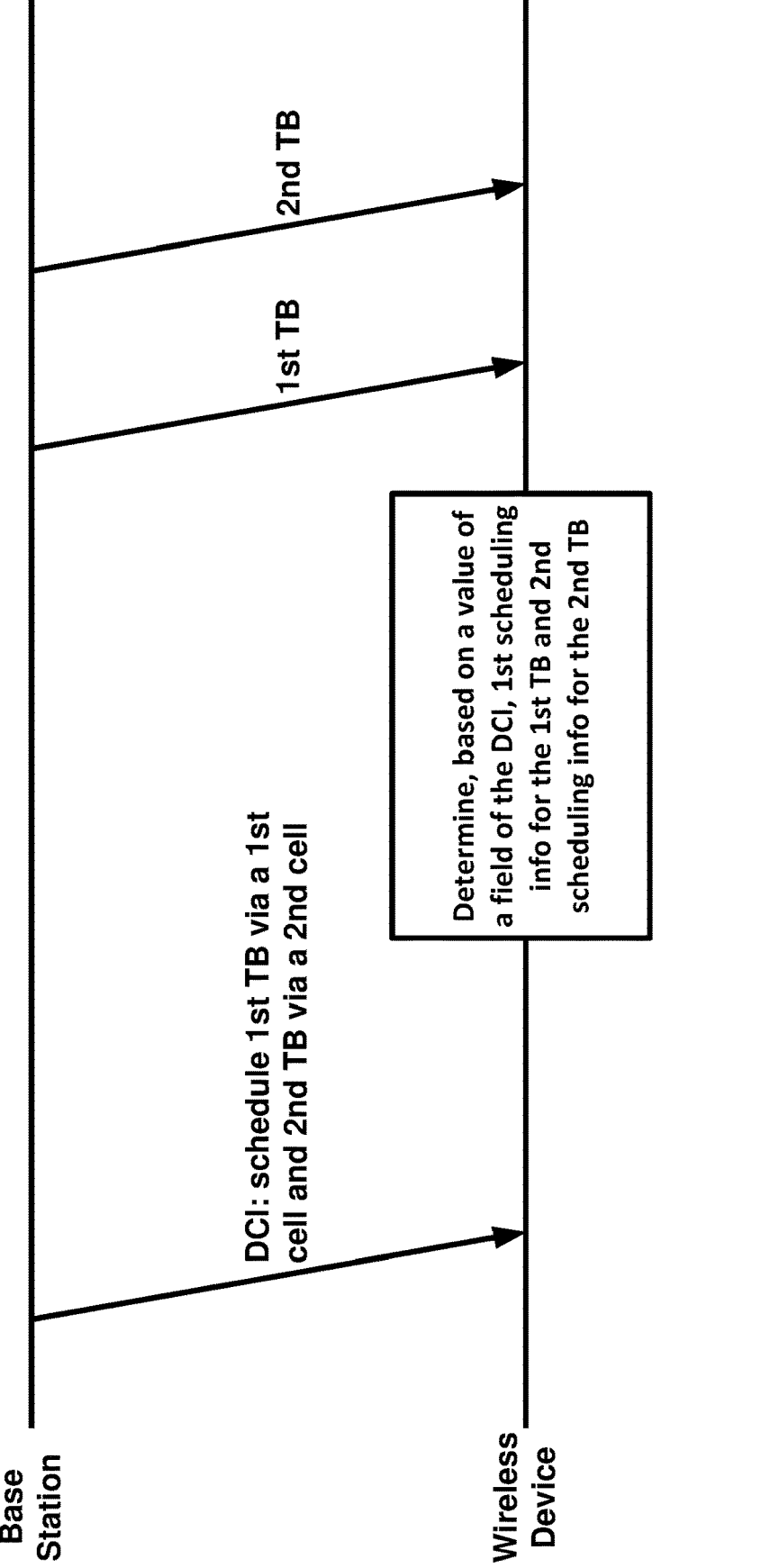
FIG. 56 shows an example process in accordance with several of various embodiments of the present disclosure.
Figure 57:
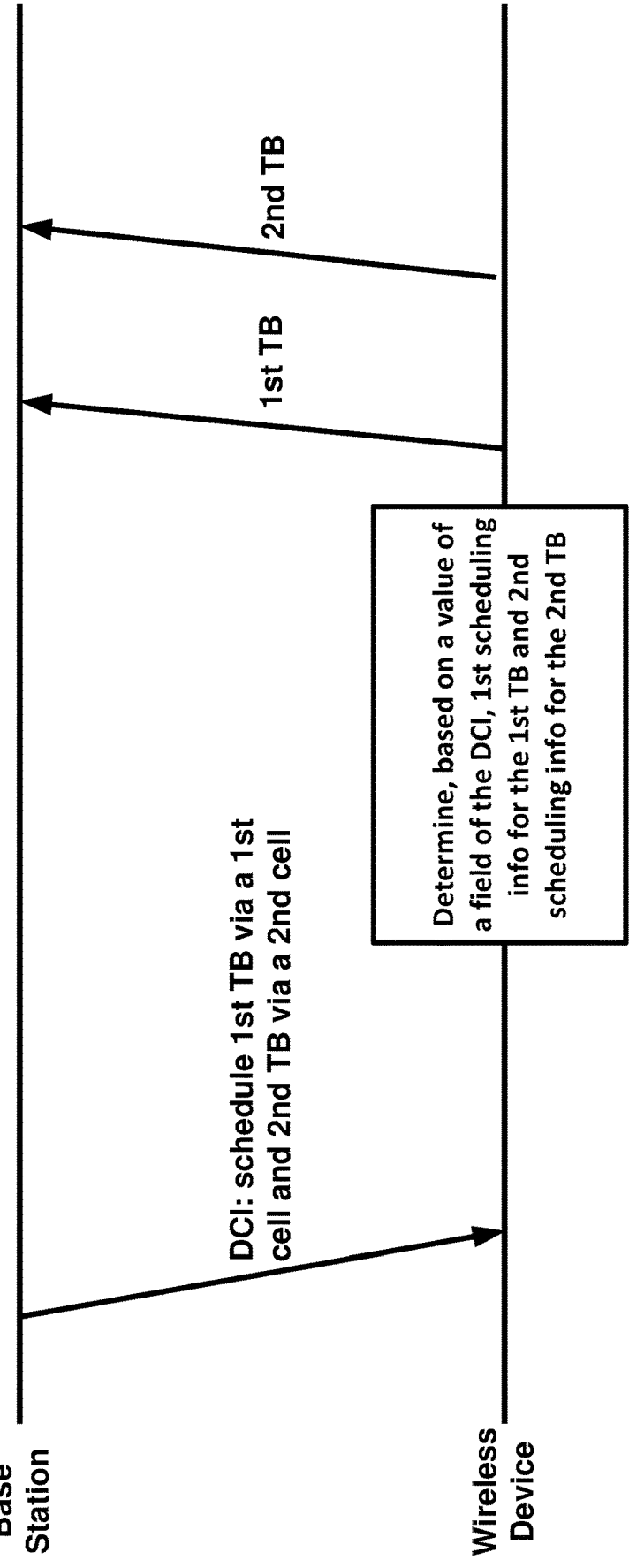
FIG. 57 shows an example process in accordance with several of various embodiments of the present disclosure.

In example embodiments as shown in FIG. 56 and FIG. 57, a wireless device may receive a DCI for multiple-cell scheduling. The DCI may indicate scheduling a first TB via a first cell and a second TB via a second cell. The DCI may comprise a field. Based on a value of a field of the DCI, the wireless device may determine first scheduling information for the first TB and second scheduling information for the second TB.

In an example, the wireless device may determine that the value of the field of the DCI applies to the first cell. In an example, the first cell may be the same cell that the DCI is received. In an example, the first cell may be the cell other than the cell that the DCI is received. In an example, the first cell may be associated with a first cell index, the second cell may be associated with a second cell index and the first cell, that the field of the DCI applies to, may be based on the first cell index and the second cell index (e.g., the first cell may be the cell with smaller cell index or the cell with larger cell index). The wireless device may determine the first scheduling information based on the value of the field of the DCI and may determine the second scheduling information based on the first scheduling information. For example, the wireless device may receive a configuration parameter (e.g., an RRC configuration parameter) and may determine the second scheduling information based on the first scheduling information, indicated by the field of the DCI, and based on the configuration parameter. In an example, the configuration parameter may indicate an offset and the wireless device may determine the second scheduling information based on the first scheduling information, indicated by the field of the DCI, and the offset indicated by the configuration parameter.

In an example, the wireless device may receive one or more configuration parameters (e.g., RRC configuration parameters) indicating mapping between the value of the field of the DCI and the first scheduling information for the first TB and the second scheduling information for the second TB.

In an example, the field of the DCI may be a HARQ process number field. The first scheduling information may be a first HARQ process number associated with a first TB and the second scheduling information may be a second HARQ process number associated with the second TB.

In an example, the field of the DCI may be a TCI field. The first scheduling information may be a first TCI state used in reception of the first TB and the second scheduling information may be a second TCI state for reception of the second TB.

In an example, the field of the DCI may be a carrier indicator field. The first scheduling information may be a first identifier of the first cell for transmission or reception of the first TB and the second scheduling information may be a second identifier of the second cell for transmission or reception of the second TB.

In an example, the field of the DCI may be an SRS request field. The first scheduling information may indicate a first SRS request for the first cell and the second scheduling information may indicate a second SRS request for the second cell.

In an example, the field of the DCI may be a downlink assignment index (DAI) field. The first scheduling information may indicate a first DAI and the second scheduling information may indicate a second DAI.

In an example, the field of the DCI may be a BWP indicator field. The first scheduling information may be a first identifier of a first BWP of the first cell for transmission or reception of the first TB and the second scheduling information may be a second identifier of a second BWP of the second cell for transmission or reception of the second TB.

In an example, the field of the DCI may be an RV field. The first scheduling information may be a first RV associated with a first TB and the second scheduling information may be a second RV associated with the second TB.

In an example, the field may be a PDSCH-to-HARQ feedback timing field. The first scheduling information may be a first PDSCH-to-HARQ feedback timing associated with the first TB (e.g., indicating a first duration between the first TB and HARQ feedback associated with the first TB) and the second scheduling information may be a second PDSCH-to-HARQ feedback timing associated with the second TB (e.g., indicating a second duration between the second TB and HARQ feedback associated with the second TB). The wireless device may determine a timing of HARQ feedback associated with the first TB based on the first PDSCH-to-HARQ feedback timing and may determine a timing of HARQ feedback associated with the second TB based on the second PDSCH-to-HARQ feedback timing. The wireless device may transmit the HARQ feedbacks based on the determined HARQ feedback timings.

In an example, the field of the DCI may be a power control command field. The first scheduling information may indicate a first power control command used in transmission of the first TB and the second scheduling information may indicate a second power control command used in transmission of the second TB. The wireless device may determine a first power level based on the first power control command and may determine a second power level based on the second power control command.

The wireless device may transmit (as shown in FIG. 56) or may receive (as shown in FIG. 57) the first TB via the first cell based on the first scheduling information. The wireless device may transmit (as shown in FIG. 56) or receive (as shown in FIG. 57) the second TB via the second cell based on the second scheduling information.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 58 shows an example flow diagram in accordance with several of various embodiments of the present disclosure. At 5810, a wireless device may receive one or more messages comprising configuration parameters of a plurality of cells. At 5820, the wireless device may receive a first downlink control information (DCI) indicating scheduling information. At 5830, the wireless device may determine, based at least on one of the first DCI, received at 5820, and a second downlink control parameter, whether the first DCI is for scheduling: one or more transport blocks via a single cell in the plurality of cells; or a plurality of transport blocks via the plurality of cells. At 5840, the wireless device may transmit or may receive the plurality of transport blocks via the plurality of cells based on the scheduling information, indicated by the first DCI, and in response to the determining, at 5830, indicating that the first DCI is for scheduling the plurality of transport blocks via the plurality of cells.

In an example embodiment, the determining, at 5830, may be based on a first field of the first DCI. In an example embodiment, the determining, at 5830, may indicate that the first DCI is for scheduling the plurality of transport blocks via the plurality of cells based on the first field having a first value. In an example embodiment, a second value of the first field may indicate single cell scheduling.

In an example embodiment, the determining, at 5830, may be based on a format associated with the first DCI. In an example embodiment, the determining, at 5830, may indicate that the first DCI is for scheduling the plurality of transport blocks via the plurality of cells based on the format being a first format. In an example embodiment, a second DCI format may indicate single cell scheduling.

In an example embodiment, the determining, at 5830, may be based on a radio network temporary identifier (RNTI) associated with the first DCI. In an example embodiment, the determining, at 5830, may indicate that the first DCI is for scheduling the plurality of transport blocks via the plurality of cells based on the RNTI being a first RNTI. In an example embodiment, a second RNTI may indicate single cell scheduling.

In an example embodiment, the wireless device may receive the first DCI via a search space associated with a control resource set (CORESET). The determining, at 5830, may be based on the CORESET or the search space. In an example embodiment, the determining, at 5830, may indicate that the first DCI is for scheduling the plurality of transport blocks via the plurality of cells based on the CORESET being a first CORESET or based on the search space being a first search space. In an example embodiment, receiving a DCI via a second search space or a second CORESET may indicate single cell scheduling.

In an example embodiment, the second downlink control parameter, used for the determining at 5830, may be based on a medium access control (MAC) control element (CE). In an example embodiment, the second downlink control parameter may be based on a field of the MAC CE.

In an example embodiment, the second downlink control parameter, used for the determining at 5830, may be a radio resource control (RRC) configuration parameter.

In an example embodiment, the second downlink control parameter, used for the determining at 5830, may indicate at least one of: whether a DCI, that is associated with a first format, is used for multiple cell scheduling or single cell scheduling; whether a DCI, that is associated with a first RNTI, is used for multiple cell scheduling or single cell scheduling; and whether a DCI, that is received via a first CORESET or a first search space, is used for multiple cell scheduling or single cell scheduling.

In an example embodiment, the plurality of cells, whose configuration parameters are received at 5810, may comprise a first cell and a second cell. The first DCI may comprise a field with a value indicating the second cell. In an example embodiment, the first cell may be the same cell on which the first DCI is received. In an example embodiment, the first cell may be a predetermined cell. In an example embodiment, the first cell may be a primary cell.

In an example embodiment, the plurality of cells, whose configuration parameters are received at 5810, may comprise a first cell and a second cell. The scheduling information, indicated by the DCI received at 5820, may comprise first scheduling information and second scheduling information. The transmitting or the receiving the plurality of transport blocks, at 5840, may comprises: transmitting or receiving a first transport block via the first cell and based on the first scheduling information; and transmitting or receiving a second transport block via the second cell and based on the second scheduling information.

Figure 59:
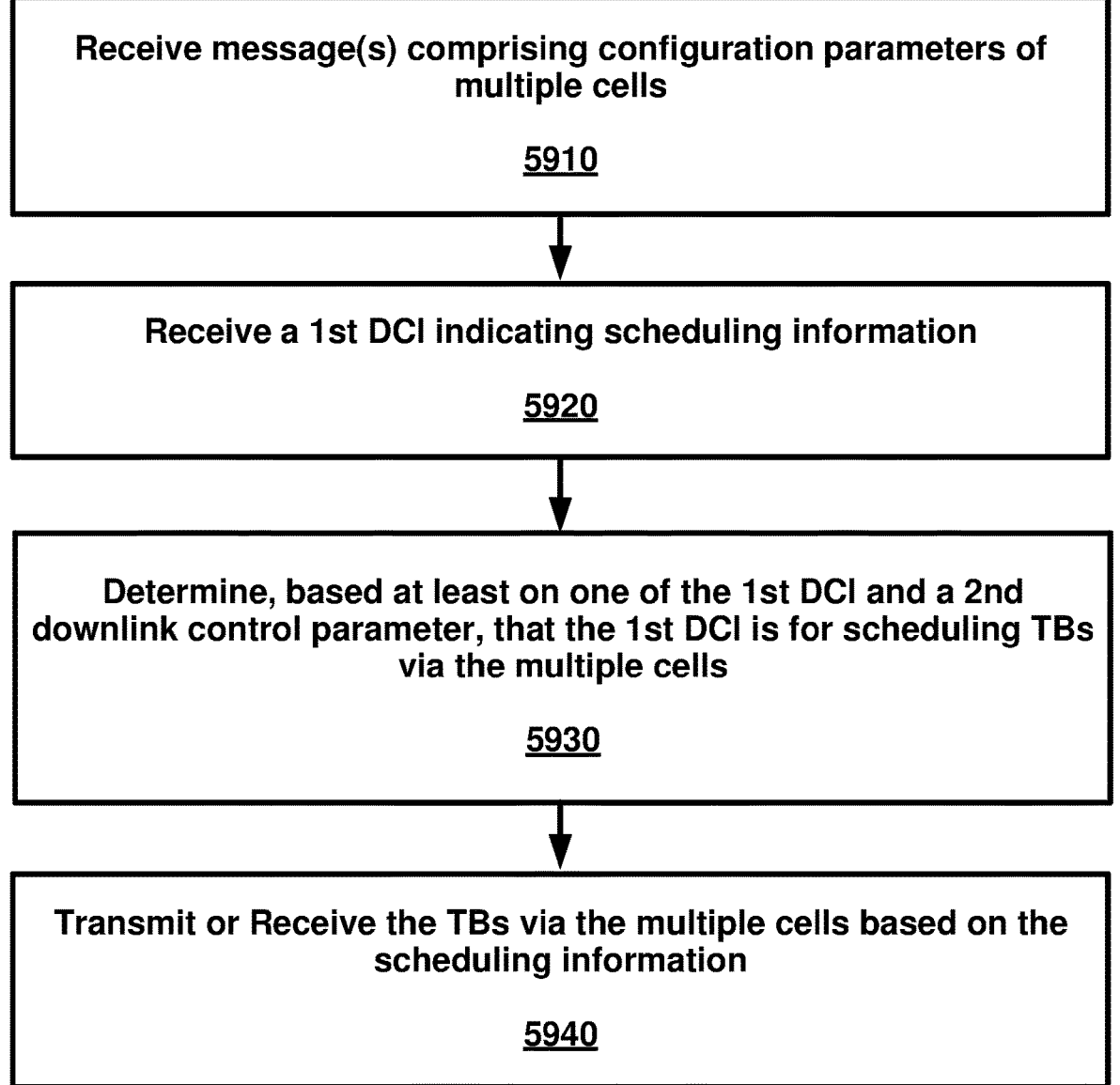
FIG. 59 shows an example flow diagram in accordance with several of various embodiments of the present disclosure.

FIG. 59 shows an example flow diagram in accordance with several of various embodiments of the present disclosure. At 5910, a wireless device may receive one or more messages comprising configuration parameters of a plurality of cells. At 5920, the wireless device may receive a first downlink control information (DCI) indicating scheduling information. At 5930, the wireless device may determine, based at least on one of the first DCI and a second control parameter, that the first DCI is for scheduling a plurality of transport blocks via the plurality of cells. At 5940, the wireless device may transmit or may receive the plurality of transport blocks via the plurality of cells based on the scheduling information.

Figure 60:
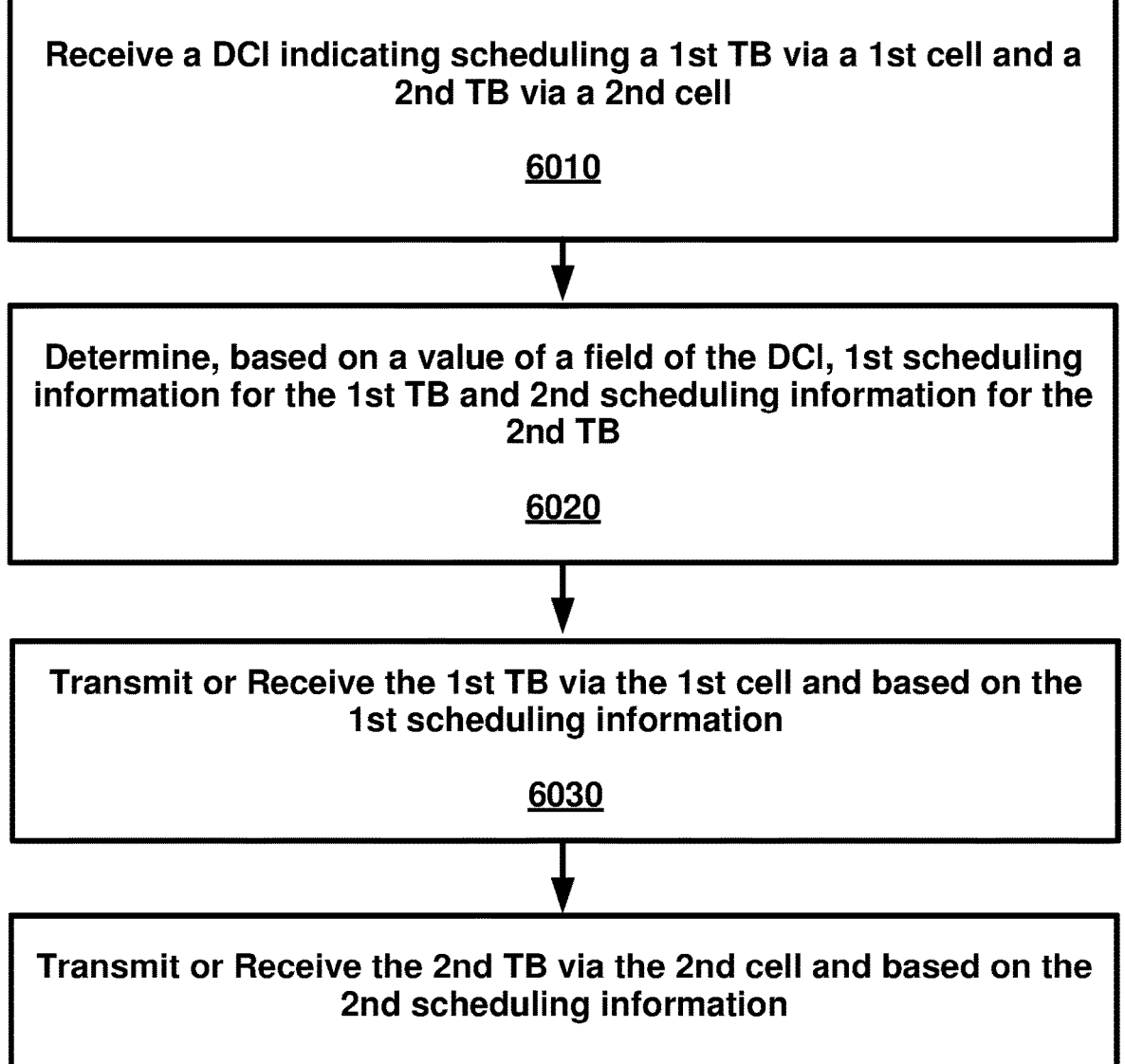
FIG. 60 shows an example flow diagram in accordance with several of various embodiments of the present disclosure.

FIG. 60 shows an example flow diagram in accordance with several of various embodiments of the present disclosure. At 6010, a wireless device may receive a downlink control information (DCI) indicating scheduling a first transport block (TB) via a first cell and a second TB via a second cell. At 6020, the wireless device may determine, based on a value of a field of the DCI, first scheduling information for the first TB and second scheduling information for the second TB. At 6030, the wireless device may transmit or may receive the first TB via the first cell and based on the first scheduling information. At 6040, the wireless device may transmit or may receive the second TB via the second cell and based on the second scheduling information.

In an example embodiment, the determining the first scheduling information, at 6020, may be based on the value of the field of the DCI. The determining the second sched-uling information, at 6020, may be based on the first scheduling information. In an example embodiment, the wireless device may determine that the value of the field of the DCI applies to the first cell. In an example embodiment, the first cell may be the cell on which the DCI is received. In an example embodiment, the first cell may be the cell on which the DCI is not received (e.g., a cell other than the one that the DCI is received). In an example embodiment, the first cell may be associated with a first cell index; the second cell may be associated with a second cell index; and a first value of the first cell index may be smaller than a second value of the second cell index. In an example embodiment, the first cell may be associated with a first cell index; the second cell may be associated with a second cell index; and a first value of the first cell index may be larger than a second value of the second cell index. In an example embodiment, the wireless device may receive a configuration parameter. The determining the second scheduling information, at 6020, may be based on the configuration parameter. In an example embodiment, the configuration parameter may indi-cate an offset.

In an example embodiment, the wireless device may receive one or more configuration parameters. The deter-mining the first scheduling information and the second scheduling information, at 6020, may be based on the one or more configuration parameters. In an example embodiment, the one or more configuration parameters may indicate mapping between the value of the field and the first sched-uling information and the second scheduling information.

In an example embodiment, the field of the DCI, received at 6010, may be a hybrid automatic repeat request (HARQ) process number field. The first scheduling information may be a first HARQ process number associated with the first TB. The second scheduling information may be a second HARQ process number associated with the second TB.

In an example embodiment, the field of the DCI, received at 6010, may be a transmission configuration indication (TCI) field. The first scheduling information may be a first TCI state. The second scheduling information may be a second TCI state.

In an example embodiment, the field of the DCI, received at 6010, may be a carrier indicator field. The first scheduling information may be a first identifier of the first cell. The second scheduling information may be a second identifier of the second cell.

In an example embodiment, the field of the DCI, received at 6010, may be a sounding reference signal (SRS) request field. The first scheduling information may indicate a first SRS request for the first cell. The second scheduling infor-mation may indicate a second SRS request for the second cell.

In an example embodiment, the field of the DCI, received at 6010, may be a downlink assignment index (DAI) field. The first scheduling information may indicate a first DAI. The second scheduling information may indicate a second DAI.

In an example embodiment, the field of the DCI, received at 6010, may be a bandwidth part (BWP) indicator field. The first scheduling information may be a first BWP identifier of a first BWP of the first cell. The second scheduling infor-mation may be a second BWP identifier of a second BWP of the second cell.

In an example embodiment, the field of the DCI, received at 6010, may be a redundancy version (RV) field. The first scheduling information may be a first RV associated with the first TB. The second scheduling information may be a second RV associated with the second TB.

In an example embodiment, the field of the DCI, received at 6010, may be a new data indicator (NDI) field. The first scheduling information may be a first NDI associated with the first TB. The second scheduling information may be a second NDI associated with the second TB.

In an example embodiment, the field of the DCI, received at 6010, may be a physical downlink shared channel (PDSCH)-to-HARQ feedback timing field. The first scheduling information may be a first PDSCH-to-HARQ feedback timing associated with the first TB. The second scheduling information may be a second PDSCH-to-HARQ feedback timing associated with the second TB.

In an example embodiment, the field of the DCI, received at 6010, may be a power control command field. The first scheduling information may be a first power control command. The second scheduling information is a second power control command.

FIG. 61 shows an example flow diagram in accordance with several of various embodiments of the present disclosure. At 6110, a wireless device may receive a downlink control information (DCI) indicating scheduling of one or more transport blocks (TBs). A first field may be present in the DCI in response to the DCI indicating scheduling the one or more TBs via a single cell. The first filed may not be present in the DCI in response to the DCI indicating scheduling the one or more TBs via multiple cells. At 6120, the wireless device may transmit or may receive the one or more TBs based on the DCI received at 6110.

In an example embodiment, the wireless device may receive a configuration parameter indicating a value associated with the first field. In an example embodiment, in response to the first field not being present in the DCI and the DCI indicating scheduling the one or more TBs via multiple cells, the transmitting or the receiving the one or more TBs, at 6120, may be based on the value indicated by the configuration parameter. In an example embodiment, in response to the first field not being present in the DCI and the DCI indicating scheduling the one or more TBs via multiple cells, the transmitting or the receiving a first TB, of the one or more TBs in 6120, may be based on the value indicated by the configuration parameter.

In an example embodiment, the wireless device may receive one or more configuration parameters indicating a first value and a second value associated with the first field. In an example embodiment, in response to the first field not being present in the DCI and the DCI indicating scheduling the one or more TBs via multiple cells, the transmitting or the receiving a first TB, in the one or more TBs in 6120, may be based on the first value and the transmitting or the receiving a second TB, in the one or more TBs in 6120, may be based on the second value.

In an example embodiment, the first field may be a sounding reference signal (SRS) request field.

In an example embodiment, the first field of the DCI received at 6110 may be a redundancy version (RV) field.

In an example embodiment, the first field of the DCI received at 6110 may be a new data indicator (NDI) field.

In an example embodiment, the first field of the DCI received at 6110 may be a bandwidth part (BWP) indicator field.

In an example embodiment, the first field of the DCI received at 6110 may be a carrier indicator field.

In an example embodiment, the first field of the DCI received at 6110 may be a hybrid automatic repeat request (HARD) process number field.

In an example embodiment, the first field of the DCI received at 6110 may be a transmission configuration indication (TCI) field.

In an example embodiment, the wireless device may determine whether the DCI, received at 6110, indicates scheduling the one or more TBs via the single cell or that the DCI indicates scheduling the one or more TBs via multiple cells. In an example embodiment, the determining may be based on a value of a second field of the DCI. In an example embodiment, the determining may be based on a radio network temporary identifier associated with the DCI. In an example embodiment, the receiving the DCI, at 6110, may be via a search space associated with a control resource set (CORESET). The determining may be based on the CORESET or the search space. In an example embodiment, the wireless device may receive a downlink control parameter. The determining may be based on the downlink control parameter. In an example embodiment, the downlink control parameter may be based on a medium access control (MAC) control element (CE). In an example embodiment, the downlink control parameter may be a radio resource control (RRC) configuration parameter.

In an example embodiment, in response to the first field not being present in the DCI and the DCI indicating scheduling the one or more TBs via multiple cells, a value of the first field may be a predetermined value. In an example embodiment, transmitting or receiving of at least one TB, of the one or more TBs in 6120, may be based on the predetermined value.

FIG. 62 shows an example flow diagram in accordance with several of various embodiments of the present disclosure. At 6210, a wireless device may receive one or more medium access control (MAC) control elements (CEs) indicating activation of one or more first transmission configuration indication (TCI) states for a first cell and one or more second TCI states for a second cell. At 6220, the wireless device may receive a downlink control information (DCI) indicating scheduling information for a first transport block (TB) on the first cell and a second TB on the second cell. A value of a TCI field of the DCI may indicate a first TCI state of the one or more first TCI states and a second TCI state of the one or more second TCI states. At 6230, the wireless device may receive the first TB via the first cell and based on the first TCI state. At 6240, the wireless device may receive the second TB via the second cell and based on the second TCI state.

In an example embodiment, the one or more first TCI states, for the first cell, may be the same as the one or more second TCI states for the second cell. The first TCI state may be the same as the second TCI state.

In an example embodiment, the wireless device may receive one or more configuration parameters indicating a simultaneous TCI update list. The simultaneous TCI update list may comprise a plurality of cells comprising the first cell and the second cell. In an example embodiment, a MAC CE, in the one or more MAC CEs, may comprise a field indicating a cell identifier of a cell in the simultaneous TCI update list. The one or more first activated TCI states and the one or more second activated TCI states may be the same based on the MAC CE indicating a cell identifier of a cell in the simultaneous TCI update list and based on the simultaneous TCI update list comprising the first cell and the second cell. The first TCI state may be the same as the second TCI state.

In an example embodiment, the wireless device may receive first configuration parameters, indicating a first plurality of TCI states for the first cell, and second configuration parameters indicating a second plurality of TCI states for the second cell. In an example embodiment. the first plurality of configured TCI states may be the same as the second plurality of configured TCI states.

In an example embodiment, a first MAC CE, of the one or more MAC CEs received at 6210, may indicate the one or more first activated TCI states for the first cell. A second MAC CE, of the one or more MAC CEs received at 6210, may indicate the one or more second activated TCI states for the second cell. In an example embodiment, a first index of the first TCI state may be based on a minimum of the value of the TCI field of the DCI and a first number of the one or more first activated TCI states. A second index of the second TCI state may be based on a minimum of the value of the TCI field and a second number of the one or more second activated TCI states.

In an example embodiment, the wireless device may determine a second value based on the value of the TCI field of the DCI received at 6220. The value of the TCI field of the DCI may indicate the first TCI state in the one or more first activated TCI states. The second value may indicate the second TCI state in the one or more second activated TCI states. In an example embodiment, the second value may be the value of the TCI filed of the DCI plus an offset. In an example embodiment, the wireless device may receive a configuration parameter indicating the offset.

In an example embodiment, the wireless device may receive one or more configuration parameters indicating mapping between the value of the TCI field of the DCI, received at 6220, and the first TCI state and the second TCI state. In an example embodiment, the value of the TCI field may indicate the first TCI state or the second TCI state.

Figure 63:
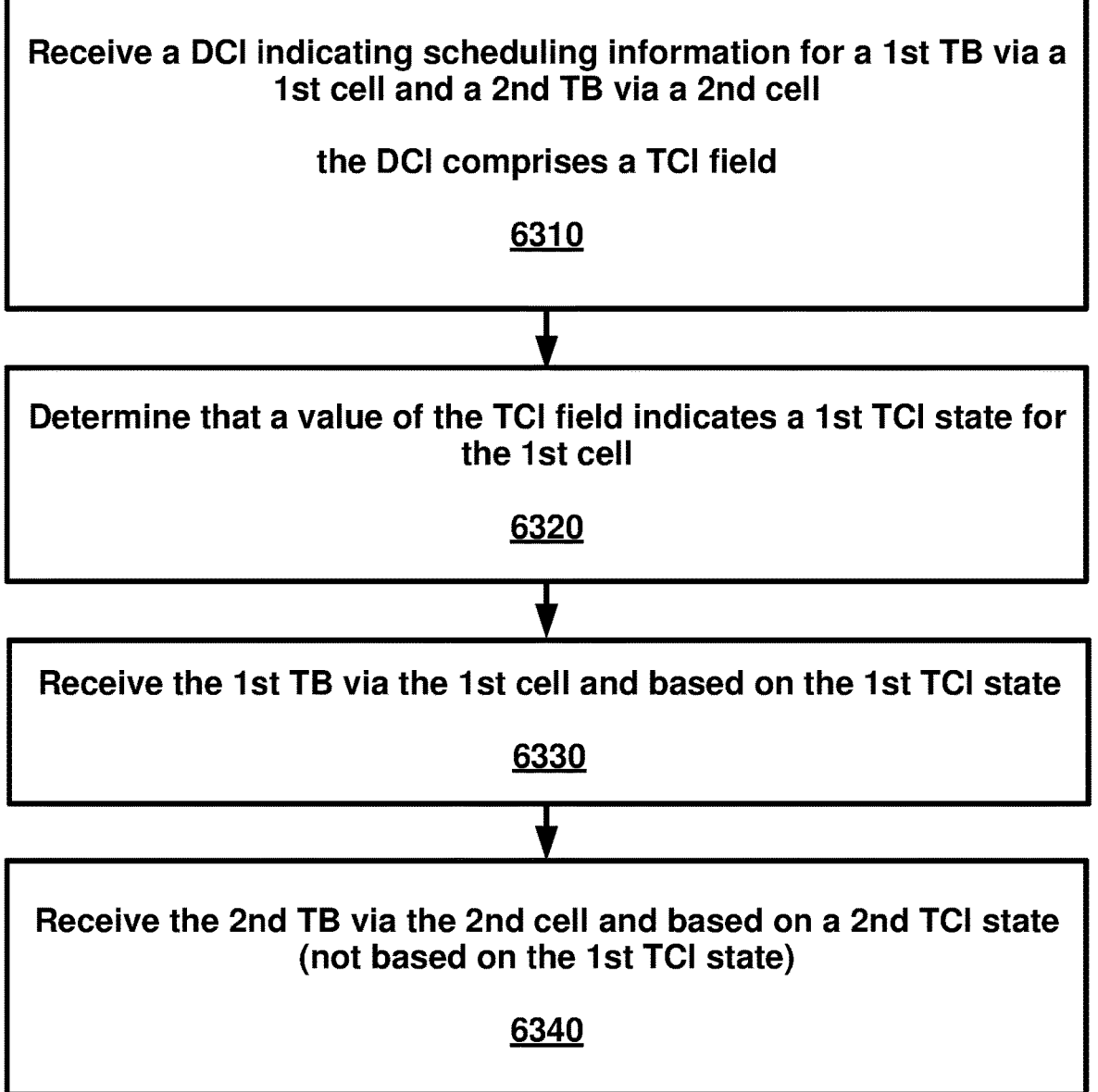
FIG. 63 shows an example flow diagram in accordance with several of various embodiments of the present disclosure.

FIG. 63 shows an example flow diagram in accordance with several of various embodiments of the present disclosure. At 6310, a wireless device may receive a downlink control information (DCI) indicating scheduling information for a first transport block (TB) via a first cell and a second TB via a second cell. The DCI may comprise a transmission configuration indication (TCI) field. At 6320, the wireless device may determine that a value of the TCI field indicates a first TCI state for the first cell. At 6330, the wireless device may receive the first TB via the first cell and based on the first TCI state. At 6340, the wireless device may receive the second TB via the second cell and based on a second TCI state (not based on the first TCI state).

In an example embodiment, the TCI field of the DCI, received at 6310, may not be used for determining the second TCI state.

In an example embodiment, the determining, at 6320, may be based on a first frequency range or a first frequency band of the first cell and a second frequency range or a second frequency band of the second cell.

In an example embodiment, the receiving the DCI, at 6310, may be via the second cell. The second TCI state may be based on a TCI state associated with (used for reception of) the DCI. In an example embodiment, the wireless device may determine the second TCI state based on the TCI state associated with (used for reception of) the DCI.

Figure 64:
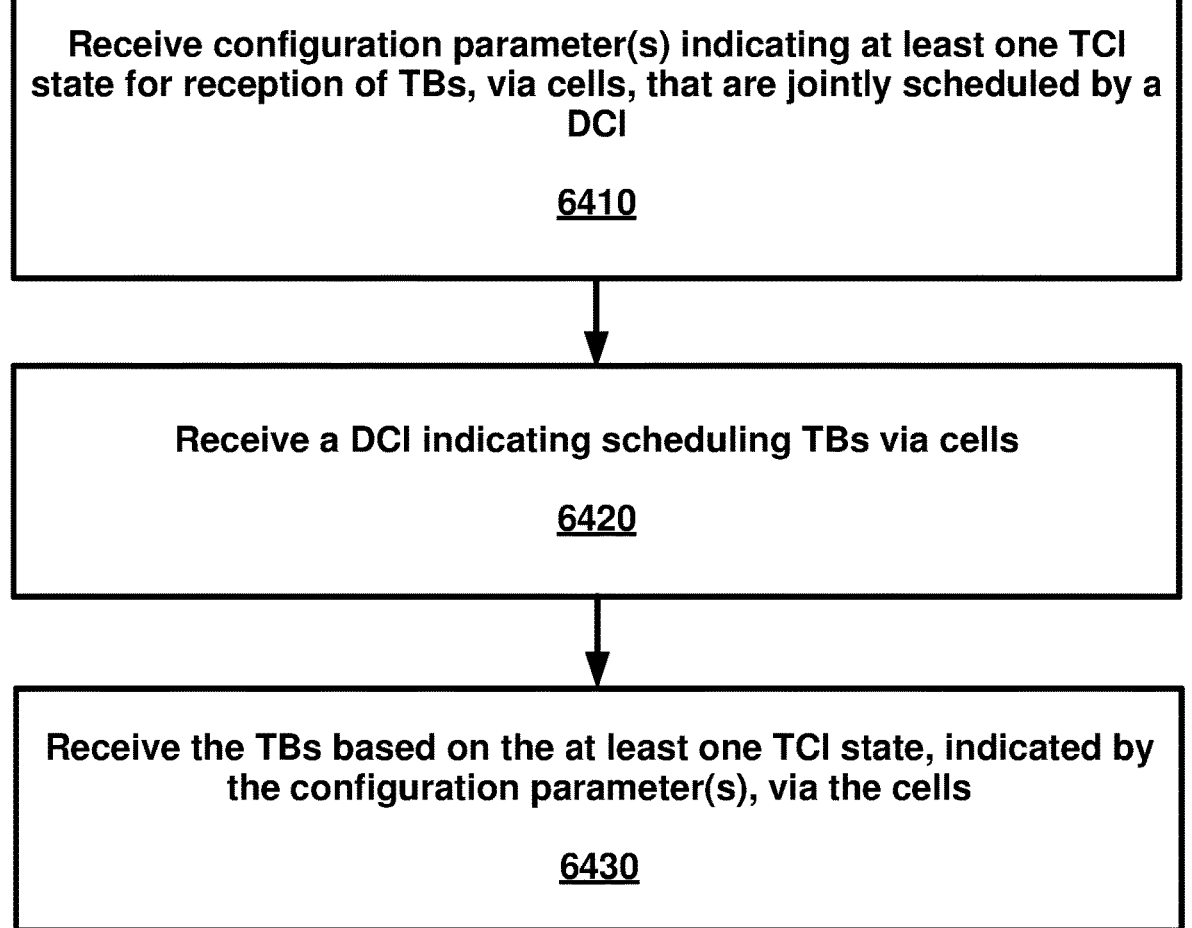
FIG. 64 shows an example flow diagram in accordance with several of various embodiments of the present disclosure.

FIG. 64 shows an example flow diagram in accordance with several of various embodiments of the present disclosure. At 6410, a wireless device may receive one or more configuration parameters indicating at least one TCI state for reception of a plurality of transport blocks (TBs), via a plurality of cells, that are jointly scheduled by a downlink control information (DCI). At 6420, the wireless device may receive a DCI indicating scheduling a plurality of TBs via a plurality of cells. At 6430, the wireless device may receive the plurality of TBs based on the at least one TCI state, indicated by the one or more configuration parameters, via the plurality of cells.

FIG. 65 shows an example flow diagram in accordance with several of various embodiments of the present disclosure. At 6510, a wireless device may receive, via a first cell, a downlink control information (DCI) comprising a transmission configuration indication (TCI) field. The DCI may indicate scheduling information for receiving a first transport block (TB) via a first cell and a second TB via a second cell. The receiving the DCI may be via a control resource set (CORESET) associate with a first TCI state. A value of the TCI field may indicate a second TCI state. At 6520, the wireless device may receive the first TB via the first cell and based on the first TCI state. At 6530, the wireless device may receive the second TB via the second cell and based on the second TCI state.

In an example embodiment, the wireless device may receive a medium access control (MAC) control element (CE) indicating activation of the first TCI state for receiving the DCI. In an example embodiment, the MAC CE may be a TCI state activation for wireless device specific physical downlink control channel (PDCCH) MAC CE.

FIG. 66 shows an example flow diagram in accordance with several of various embodiments of the present disclosure. At 6610, a wireless device may receive a downlink control information (DCI) indicating scheduling information for receiving a first TB via a first cell and a second TB via a second cell. The DCI may comprise a first transmission configuration indication (TCI) field with a first value. The DCI may comprise a second TCI field with a second value. At 6620, the wireless device may receive the first TB via the first cell based on a first TCI state indicated by the first value. At 6620, the wireless device may receive the first TB via the first cell based on a first TCI state indicated by the first value. At 6630, the wireless device may receive the second TB via the second cell based on a second TCI state indicated by the second value.

In an example embodiment, one or more first TCI states, comprising the first TCI state, may be activated for the first cell and one or more second TCI states, comprising the second TCI state, may be activated for the second cell. In an example embodiment, the wireless device may receive configuration parameters indicating a first plurality of TCI states for the first cell and a second plurality of TCI states for the second cells. The wireless device may receive one or more medium access control (MAC) control elements (CEs) indicating activation of the one or more first TCI states, of the first plurality TCI of states, and activation of the one or more second TCI state of the second plurality of TCI state.

FIG. 67 shows an example flow diagram in accordance with several of various embodiments of the present disclosure. At 6710, a wireless device may receive, via a first cell, a downlink control information (DCI) indicating scheduling information for receiving a first TB via a first cell and a second TB via a second cell. The DCI may comprise a transmission configuration indication (TCI) field with a value. At least the second cell may be activated with one or more TCI states. At 6720, the wireless device may receive the first TB via the first cell based on a first TCI state. At 6730, the wireless device may receive the second TB via the second cell and based on the second TCI state indicated by the value of the TCI field.

In an example embodiment, the first cell may not be activated with one or more TCI states. The first TCI state may be a TCI state that is associated with a control resource set (CORESET) of the first cell that the DCI is received.

FIG. 68 shows an example flow diagram in accordance with several of various embodiments of the present disclosure. At 6810, a wireless device may receive, in a downlink control information (DCI) timing, a DCI indicating scheduling information for receiving a first TB via a first cell in a first timing and a second TB via a second cell in a second timing. A first time duration between the DCI timing and the first timing may be larger than or equal to a time duration for quasi colocation (QCL). A second time duration between the DCI timing and the second timing may be larger than or equal to the time duration for QCL. At 6820, the wireless device may receive the first TB via the first cell in the first timing. At 6830, the wireless device may receive the second TB via the second cell in the second timing.

In an example embodiment, the receiving the first TB, at 6820, may be based on the first time duration being larger than or equal to the time duration for QCL. The receiving the second TB, at 6830, may be based on the second time duration being larger than or equal to the time duration for QCL.

In an example embodiment, the wireless device may transmit a capability message comprising a capability information element (IE) indicating the time duration for QCL.

FIG. 69 shows an example flow diagram in accordance with several of various embodiments of the present disclosure. At 6910, a wireless device may receive, in a downlink control information (DCI) timing, a DCI indicating scheduling information for receiving a first TB via a first cell in a first timing and a second TB via a second cell in a second timing. A first time duration between the DCI timing and the first timing may be smaller than a time duration for quasi colocation (QCL). A second time duration between the DCI timing and the second timing may be larger than or equal to the time duration for QCL. At 6920, the wireless device may receive the second TB via the second cell in the second timing. At 6930, the wireless device may not receive the first TB.

In an example embodiment, the receiving the second TB, at 6920, may be based on the second time duration being larger than or equal to the time duration for QCL.

In an example embodiment, the not receiving the first TB, at 6930, may be based on the first time duration being smaller than the time duration for QCL.

In an example embodiment, the wireless device may transmit a capability message comprising a capability information element (IE) indicating the time duration for QCL.

FIG. 70 shows an example flow diagram in accordance with several of various embodiments of the present disclosure. At 7010, a wireless device may receive configuration parameters of a first serving cell comprising: a first configuration parameter indicating an identifier of a scheduling cell for the first serving cell; and a second configuration parameter indicating whether a downlink control information (DCI), received via the scheduling cell, is used for scheduling multiple cells. At 7020, the wireless device may receive a DCI, via the scheduling cell, comprising scheduling information for transmitting or receiving a first transport block (TB) via the first serving cell and a second TB via a second serving cell. At 7030, the wireless device may receive or transmit the first TB via the first serving cell. At 7040, the wireless device may receive or transmit the second TB via the second serving cell.

FIG. 71 shows an example flow diagram in accordance with several of various embodiments of the present disclosure. At 7110, a wireless device may receive configuration parameters of a first serving cell comprising a first configuration parameter indicating that the first serving cell is cross-carrier scheduled by a secondary cell when the first serving cell is a primary cell. At 7120, the wireless device may receive a downlink control information (DCI), via the secondary cell, comprising scheduling information for receiving or transmitting a first transport block (TB) via the first serving cell, wherein the first serving cell is a primary cell. At 7130, the wireless device may receive or may transmit the first TB via the first serving cell.

FIG. 72 shows an example flow diagram in accordance with several of various embodiments of the present disclosure. At 7210, a wireless device may receive configuration parameters of a first serving cell comprising an information element (IE) indicating a choice of one of: cross-carrier scheduling; self-scheduling; and both cross-carrier scheduling and self-scheduling. At 7220, in response to the IE indicating both cross-carrier scheduling and self-scheduling, the wireless device: may receive a first downlink control information (DCI), via the first serving cell, indicating scheduling of a first transport block (TB) via the first serving cell; and may receive a second DCI, via a second serving cell, indicating scheduling of a second TB via the first serving cell.

In an example embodiment, the wireless device may receive or may transmit, based on the first DCI received at 7220, the first TB via the first serving cell. The wireless device may receive or may transmit, based on the second DCI received at 7220, the second TB via the first serving cell.

In an example embodiment, the IE, received at 7210, may indicate one or more parameters for both cross-carrier scheduling and self-scheduling. In an example embodiment, the one or more parameters may comprise a first parameter indicating an identifier of the second serving cell.

FIG. 73 shows an example flow diagram in accordance with several of various embodiments of the present disclosure. At 7310, a wireless device may receive configuration parameters of a first serving cell comprising an information element (IE) indicating both cross-carrier scheduling and self-scheduling. At 7320, in response to the IE indicating both cross-carrier and self-scheduling, the wireless device: may receive a first downlink control information (DCI), via the first serving cell, indicating scheduling of a first transport block (TB) via the first serving cell; and may receive a second DCI, via a second serving cell, indicating scheduling of a second TB via the first serving cell.

FIG. 74 shows an example flow diagram in accordance with several of various embodiments of the present disclosure. At 7410, a wireless device may receive configuration parameters of a first serving cell comprising an information element (IE) indicating both cross-carrier scheduling and self-scheduling. At 7420, the wireless device may receive a downlink control information (DCI), via the first serving cell, indicating scheduling of a first transport block (TB) via the first serving cell and a second TB via a second serving cell. At 7430, the wireless device may receive or may transmit, based on the DCI, the first TB via the first serving cell and the second TB via the second serving cell.

In an example embodiment, the DCI may be for both self-scheduling and cross-carrier scheduling. The receiving the DCI, at 7420, may be based on the IE indicating both cross-carrier scheduling and self-scheduling.

FIG. 75 shows an example flow diagram in accordance with several of various embodiments of the present disclosure. At 7510, a wireless device may receive configuration parameters of a first cell comprising an information element (IE) indicating that the first cell is a scheduling cell for a primary cell. At 7520, the wireless device may receive a downlink control information (DCI), via the first serving cell, comprising scheduling information of a transport block (TB) on the primary cell. At 7530, the wireless device may receive or may transmit the TB via the primary cell and based on the scheduling information.

In an example embodiment, the DCI, received at 7520, may be for scheduling the primary cell. The receiving the DCI, at 7530, may be based on the IE indicating scheduling of the primary cell.

FIG. 76 shows an example flow diagram in accordance with several of various embodiments of the present disclosure. At 7610, a wireless device may receive configuration parameters of a first cell comprising an information element (IE) indicating that the first cell is configured to receive control information associated with multi-cell scheduling. At 7620, the wireless device may receive a downlink control information (DCI), via the first serving cell, comprising scheduling information of a plurality of transport blocks (TBs) on a plurality of cells. At 7630, the wireless device may receive or may transmit the plurality of TBs via the plurality of cells.

In an example embodiment, the DCI may be for multi-cell scheduling. The receiving the DCI, at 7620, may be based on the IE indicating that the first serving cell is configured for multi-cell scheduling.

FIG. 77 shows an example flow diagram in accordance with several of various embodiments of the present disclosure. At 7710, a wireless device may receive configuration parameters of a plurality of cells grouped into a plurality of discontinuous reception (DRX) groups comprising a first DRX group. The first DRX group may comprise one or more first cells of the plurality of cells. The configuration parameters may comprise DRX parameters associated with the first DRX group. The DRX parameters may comprise a DRX timer. At 7720, the wireless device may receive a downlink control information (DCI) comprising scheduling information of a first transport block (TB) via a first cell and a second TB via a second cell. The first cell and the second cell may be in the first DRX group. At 7730, the wireless device may start the DRX timer for the first DRX group in response to receiving the DCI at 7720. At 7740, the wireless device may receive or may transmit, based on the DCI received at 7720, the first TB and the second TB.

In an example embodiment, the first cell and the second cell, that are scheduled by a single DCI, may be in the same DRX group.

In an example embodiment, the DCI, received at 7720, may indicate scheduling the first cell and the second cell based on the first cell and the second cell being in the same DRX group.

In an example embodiment, the receiving the DCI, at 7720, may be via a third cell. The first cell, the second cell and the third cell may be in the first DRX group. In an example embodiment, the third cell, that schedules the first cell and the second cell, and the first cell and the second cell may be in the same DRX group. In an example embodiment, the DCI, that schedules the first cell and the second cell, may be received via the third cell based on the third cell being in the same DRX group as the first DRX group of the first cell and the second cell.

In an example embodiment, the wireless device may determine DRX Active time based on the first DRX timer.

In an example embodiment, the first DRX timer may be a hybrid automatic repeat request (HARD) timer.

In an example embodiment, the configuration parameters may indicate a first value of the first DRX timer. The starting the first DRX timer may be with the first value.

In an example embodiment, the DRX parameters may comprise a second DRX timer. The configuration parameters may indicate a second value of the second DRX timer. In an example embodiment, the wireless device may start the second DRX timer, with the second value, based on the first DRX timer expiring. In an example embodiment, the second DRX timer may be a DRX retransmission timer. In an example embodiment, the second DRX timer may be a DRX inactivity timer. In an example embodiment, the starting the DRX inactivity timer may be in a first symbol after an end of a downlink control channel carrying the DCI. In an example embodiment, the first DRX group of the wireless device may be in a DRX Active time while the DRX inactivity timer, associated with the first DRX group, is running.

FIG. 78 shows an example flow diagram in accordance with several of various embodiments of the present disclosure. At 7810, a wireless device may receive configuration parameters of a plurality of cells grouped into a first DRX group. The configuration parameters comprise first DRX parameters associated with the first DRX group. At 7820, the wireless device may receive a downlink control information (DCI) comprising scheduling information of a first transport block (TB) via a first cell and a second TB via a second cell. The first cell and the second cell may be in the first DRX group. At 7830, the wireless device may determine DRX Active time, for the first DRX group, based on the DRX parameters. At 7840, the wireless device may receive or may transmit, based on the DCI received at 7820, the first TB and the second TB.

In an example embodiment, the wireless device may monitor a control channel while in the DRX Active time.

FIG. 79 shows an example flow diagram in accordance with several of various embodiments of the present disclosure. At 7910, a wireless device may receive configuration parameters of a plurality of cells grouped into a plurality of frequency ranges comprising a first frequency range. At 7920, the wireless device may receive a DCI comprising scheduling information for transmitting or receiving a first transport block (TB) via a first cell and a second TB via a second cell. The first cell and the second cell may be in a first frequency range. At 7930, the wireless device may receive or may transmit, based on the DCI received at 7920, the first TB and the second TB.

In an example embodiment, the first cell and the second cell, that are scheduled by a single DCI, may be in the same frequency range.

In an example embodiment, the DCI, received at 7920, may indicate scheduling the first cell and the second cell based on the first cell and the second cell being in the same frequency range. In an example embodiment, the third cell, that schedules the first cell and the second cell, and the first cell and the second cell may be in the same frequency range. In an example embodiment, the DCI, that schedules the first cell and the second cell, may be received via the third cell based on the third cell being in the same frequency range as the first frequency range of the first cell and the second cell.

In an example embodiment, the first frequency range may be frequency range 1 (FR1).

In an example embodiment, the first frequency range may be frequency range 2 (FR2).

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, one or more radio resource control messages comprising configuration parameters of a plurality of cells;
   receiving a downlink control information (DCI) comprising a first field;
   wherein the configuration parameters comprise a first configuration parameter indicating a mapping from a first value of the first field to a first scheduling information and a second scheduling information;
   determining whether a second field is present or is not present in the DCI, wherein:
      the second field is associated with a sounding reference signal request; and the presence and absence of the second field in the DCI is based on whether the DCI is for single-cell scheduling or multi-cell scheduling;

determining based on the first value and the mapping:

that the DCI is for scheduling a plurality of transport blocks via a plurality of cells based on a format associated with the DCI; and based on the first value and the mapping:

the first scheduling information for transmission, via a physical uplink shared channel (PUSCH), or reception, via a physical downlink shared channel (PDSCH), of a first transport block via a first cell in the plurality of cells; and the second scheduling information for transmission, via a PUSCH, or reception, via a PDSCH, of a second transport block via a second cell in the plurality of cells;

transmitting, via a PUSCH, or receiving, via a PDSCH, the first transport block via the first cell and based on the first scheduling information; and transmitting, via a PUSCH, or receiving, via a PDSCH, the second transport block via the second cell and based on the second scheduling information.

2. The method of claim 1, wherein the configuration parameters indicate configuration of scheduling multiple cells by a DCI.

3. The method of claim 1, wherein the plurality of cells comprise a primary cell and one or more secondary cells.

4. The method of claim 1, further comprising determining the first cell and the second cell based on a second value of the second field.

5. The method of claim 1, wherein the configuration parameters indicate configuration of scheduling multiple cells by a DCI.

6. The method of claim 1, wherein the plurality of cells comprises a primary cell and one or more secondary cells.

7. The method of 1, wherein the DCI comprises a third field.

8. The method of 7, wherein a third value of the third field applies to one of the first transport block and the second transport block.

9. The method of 7, wherein a third value of the third field applies to one of the first cell and the second cell.

10. A wireless device comprising:

one or more processors; and memory storing instructions that, when executed by the one or more processors, cause the wireless device to:

receive one or more radio resource control messages comprising configuration parameters of a plurality of cells;

receive a downlink control information (DCI) comprising a first field;

wherein the configuration parameters comprise a first configuration parameter indicating a mapping from a first value of the first field to a first scheduling information and a second scheduling information;

determine whether a second field is present or is not present in the DCI, wherein:

the second field is associated with a sounding reference signal request; and the presence and absence of the second field in the DCI is based on whether the DCI is for single-cell scheduling or multi-cell scheduling;

determine based on the first value and the mapping:

that the DCI is for scheduling a plurality of transport blocks via a plurality of cells based on a format associated with the DCI; and based on the first value and the mapping:

the first scheduling information for transmission, via a physical uplink shared channel (PUSCH), or reception, via a physical downlink shared channel (PDSCH), of a first transport block via a first cell in the plurality of cells; and the second scheduling information for transmission, via a PUSCH, or reception, via a PDSCH, of a second transport block via a second cell in the plurality of cells;

transmit, via a PUSCH, or receive, via a PDSCH, the first transport block via the first cell and based on the first scheduling information; and transmit, via a PUSCH, or receive, via a PDSCH, the second transport block via the second cell and based on the second scheduling information.

11. The wireless device of claim 10, wherein the configuration parameters indicate configuration of scheduling multiple cells by a DCI.

12. The wireless device of claim 10, wherein the plurality of cells comprises a primary cell and one or more secondary cells.

13. The wireless device of claim 10, wherein the instructions, when executed by the one or more processors, further cause the wireless device to determine the first cell and the second cell based on a second value of the second field.

14. The wireless device of claim 10, wherein the configuration parameters indicate configuration of scheduling multiple cells by a DCI.

15. The wireless device of claim 14, wherein the plurality of cells comprises a primary cell and one or more secondary cells.

16. The wireless device of claim 10, wherein a third value of a third field of the DCI applies to one of the first transport block and the second transport block.

17. The wireless device of claim 10, wherein a third value of a third field of the DCI applies to one of the first cell and the second cell.

18. A system comprising:

a base station; and a wireless device comprising: one or more processors; and memory storing instructions that, when executed by the one or more processors, cause the wireless to: receive, from the base station, one or more radio resource control messages comprising configuration parameters of a plurality of cells; receive a downlink control information (DCI) comprising a first field; wherein the configuration parameters comprise a first configuration parameter indicating a mapping from a value of the first field to a first scheduling information and a second scheduling information; determine whether a second field is present or is not present in the DCI, wherein: the second field is associated with a sounding reference signal request; and the presence and absence of the second field in the DCI is based on whether the DCI is for single-cell scheduling or multi-cell scheduling; determine based on the value and the mapping: that the DCI is for scheduling a plurality of transport blocks via a plurality of cells based on a format associated with the DCI; and based on the first value and the mapping: the first scheduling information for transmission, via a physical uplink shared channel (PUSCH), or reception, via a physical downlink shared channel (PDSCH), of a first transport block via a first cell in the plurality of cells; and the second scheduling information for transmission, via a PUSCH, or reception, via a PDSCH, of a second transport block via a second cell in the plurality of cells; transmit, via a PUSCH, or receive, via a PDSCH, the first transport block via the first cell and based on the first scheduling information; and transmit, via a PUSCH, or receive, via a PDSCH, the second transport block via the second cell and based on the second scheduling information.

\* \* \* \* \*